US012812161B2

(12) United States Patent
Kim et al.

(10) Patent No.: US 12,812,161 B2
(45) Date of Patent: Nov. 24, 2026

(54) METHOD, APPARATUS, AND RECORDING MEDIUM FOR IMAGE ENCODING/DECODING

(71) Applicant: ELECTRONICS AND TELECOMMUNICATIONS RESEARCH INSTITUTE, Daejeon (KR)

(72) Inventors: Dong-Hyun Kim, Daejeon (KR); Jong-Ho Kim, Daejeon (KR); Sung-Chang Lim, Daejeon (KR); Woong Lim, Daejeon (KR); Jin-Soo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/881,252

(22) PCT Filed: Jul. 4, 2023

(86) PCT No.: PCT/KR2023/009423

§ 371 (c)(1),
(2) Date: Jan. 3, 2025

(87) PCT Pub. No.: WO2024/010338

PCT Pub. Date: Jan. 11, 2024

(65) Prior Publication Data

US 2025/0392743 A1 Dec. 25, 2025

(30) Foreign Application Priority Data

Jul. 5, 2022 (KR) ........................ 10-2022-0082796
Jul. 4, 2023 (KR) ........................ 10-2023-0086379

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/139* (2014.11); *H04N 19/176* (2014.11)

(58) Field of Classification Search
CPC .. H04N 19/105; H04N 19/139; H04N 19/176; H04N 19/521; H04N 19/119; H04N 19/129; H04N 19/513
(Continued)

(56) References Cited

U.S. PATENT DOCUMENTS

| | | | | |
|---|---|---|---|---|
| 12,519,971 | B2 * | 1/2026 | Kim | H04N 19/573 |
| 2014/0205006 | A1 | 7/2014 | Jeong et al. | |
| 2020/0077088 | A1 * | 3/2020 | Chuang | H04N 19/567 |
| 2020/0296414 | A1 | 9/2020 | Park et al. | |
| 2021/0344946 | A1 | 11/2021 | Bang et al. | |
| 2021/0385487 | A1 | 12/2021 | Xu et al. | |

(Continued)

FOREIGN PATENT DOCUMENTS

| | | | |
|---|---|---|---|
| KR | 10-1527085 | B1 | 6/2015 |
| KR | 10-2019-0114913 | A | 10/2019 |

(Continued)

OTHER PUBLICATIONS

International Search Report and Written Opinion for PCT/KR2023/009423 by Korean Intellectual Property Office dated Oct. 17, 2023.

*Primary Examiner* — Behrooz M Senfi
(74) *Attorney, Agent, or Firm* — BROADVIEW IP LAW, PC

(57) ABSTRACT

Disclosed herein are a method, an apparatus and a storage medium for image encoding/decoding. When initial motion information for a target block is determined, a list is generated based on the initial motion information. Motion information for the target block is determined using candidates in the list. Motion information or final motion infor-
(Continued)

mation generated by correction of the motion information is used to generate a prediction block for the target block. Some of candidates in the list may be selected based on costs of the candidates. Various methods are used to determine costs of candidates and perform selection based on the costs.

20 Claims, 45 Drawing Sheets

(51) Int. Cl.
*H04N 19/139* (2014.01)
*H04N 19/176* (2014.01)

(58) Field of Classification Search
USPC .................................................... 375/240.16
See application file for complete search history.

(56) References Cited

U.S. PATENT DOCUMENTS

| | | | | |
|---|---|---|---|---|
| 2022/0086486 | A1 | 3/2022 | Lim et al. | |
| 2022/0417554 | A1* | 12/2022 | Lee | H04N 19/533 |
| 2023/0232036 | A1 | 7/2023 | Ma et al. | |
| 2024/0064289 | A1* | 2/2024 | Lim | H04N 19/137 |
| 2024/0098289 | A1 | 3/2024 | Moon et al. | |
| 2024/0155150 | A1 | 5/2024 | Lee et al. | |

FOREIGN PATENT DOCUMENTS

| | | | | |
|---|---|---|---|---|
| KR | 10-2020-0101986 | A | 8/2020 | |
| KR | 10-2387363 | B1 | 4/2022 | |
| KR | 10-2022-0054572 | A | 5/2022 | |
| WO | WO-2023182781 | A1 * | 9/2023 | H04N 19/52 |

* cited by examiner

HORIZONTAL SCANNING

VERTICAL SCANNING

| SEARCH PATTERN AND SEARCH RESOLUTION | ADVANCED MOTION VECTOR PREDICTION MODE<br>INDEX OF ADAPTIVE MOTION VECTOR RESOLUTION | | | | MERGE MODE | |
|---|---|---|---|---|---|---|
| | 4-PEL | FULL-PEL | HALF-PEL | QUARTER-PEL | AltIF=0 | AltIF=1 |
| 4-PEL DIAMOND | V | | | | | |
| 4-PEL CROSS | V | | | | | |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | V | |
| OCTA-PEL CROSS | | | | | V | |

FIG. 31

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | | | | | |
| 4-PEL CROSS | V | | | | | |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | V | |
| OCTA-PEL CROSS | | | | | | |

FIG. 32

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | V | V | V | V | V |
| 4-PEL CROSS | V | V | V | V | V | V |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | V | |
| OCTA-PEL CROSS | | | | | V | |

FIG. 33

| SEARCH PATTERN AND SEARCH RESOLUTION | ADVANCED MOTION VECTOR PREDICTION MODE — INDEX OF ADAPTIVE MOTION VECTOR RESOLUTION | | | | MERGE MODE | |
|---|---|---|---|---|---|---|
| | 4-PEL | FULL-PEL | HALF-PEL | QUARTER-PEL | AltIF=0 | AltIF=1 |
| 4-PEL DIAMOND | V | | | | | |
| 4-PEL CROSS | V | | | | | |
| FULL-PEL DIAMOND | | V | V | V | V | V |
| FULL-PEL CROSS | | V | V | V | V | V |
| HALF-PEL CROSS | | | V | V | V | V |
| QUARTER-PEL CROSS | | | | V | | |
| OCTA-PEL CROSS | | | | | | |

FIG. 34

| SEARCH PATTERN AND SEARCH RESOLUTION | ADVANCED MOTION VECTOR PREDICTION MODE — INDEX OF ADAPTIVE MOTION VECTOR RESOLUTION | | | | MERGE MODE | |
|---|---|---|---|---|---|---|
| | 4-PEL | FULL-PEL | HALF-PEL | QUARTER-PEL | AltIF=0 | AltIF=1 |
| 4-PEL DIAMOND | | | | | | |
| 4-PEL CROSS | V | | | | | |
| FULL-PEL DIAMOND | | | | | | |
| FULL-PEL CROSS | | V | V | V | V | V |
| HALF-PEL CROSS | | | | | | |
| QUARTER-PEL CROSS | | | | V | V | |
| OCTA-PEL CROSS | | | | | | |

| SEARCH PATTERN AND SEARCH RESOLUTION | ADVANCED MOTION VECTOR PREDICTION MODE | | | | MERGE MODE | |
|---|---|---|---|---|---|---|
| | INDEX OF ADAPTIVE MOTION VECTOR RESOLUTION | | | | | |
| | 4-PEL | FULL-PEL | HALF-PEL | QUARTER-PEL | AltIF=0 | AltIF=1 |
| 4-PEL DIAMOND | V | V | V | V | V | V |
| 4-PEL CROSS | V | V | V | V | V | V |
| FULL-PEL DIAMOND | | | V | V | V | V |
| FULL-PEL CROSS | | | V | V | V | V |
| HALF-PEL CROSS | | | | V | V | |
| QUARTER-PEL CROSS | | | | | V | |
| OCTA-PEL CROSS | | | | | | |

| |
|---|
| . . . |
| **intra_tmp_flag** |
| if(intra_tmp_flag) |
| **intra_tmp_idx** |
| } |
| . . . |

METHOD, APPARATUS, AND RECORDING MEDIUM FOR IMAGE ENCODING/DECODING

TECHNICAL FIELD

The present disclosure relates generally to a method, an apparatus, and a storage medium for image encoding/decoding. More particularly, the present disclosure relates to a method, an apparatus and a storage medium for image encoding/decoding related to inter-prediction.

This application claims the benefit of Korean Patent Application No. 10-2023-0086379, filed Jul. 4, 2023, which is hereby incorporated by reference in its entirety into this application.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or video.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is currently required.

As image compression technology, there are various technologies, such as inter-prediction technology, intra-prediction technology, transform, quantization technology and entropy coding technology.

Inter-prediction technology is technology for predicting the value of a pixel included in a current picture using a picture previous to and/or a picture subsequent to the current picture. Intra-prediction technology is technology for predicting the value of a pixel included in a current picture using information about pixels in the current picture. Transform and quantization technology may be technology for compressing the energy of a residual signal. The entropy coding technology is technology for assigning a short codeword to a frequently occurring value and assigning a long codeword to a less frequently occurring value.

By utilizing this image compression technology, data about images may be effectively compressed, transmitted, and stored.

DISCLOSURE

Technical Problem

An embodiment is intended to provide an apparatus, a method, and a storage medium, which store a final motion information candidate by utilizing a list in a process of correcting motion information in template matching and/or bilateral matching.

An embodiment is intended to provide an apparatus, a method, and a storage medium, which improve coding efficiency through correction of motion information.

Technical Solution

In accordance with an aspect, there is provided an image decoding method, including determining initial motion information for a target block; and determining motion information based on the initial motion information, wherein a prediction block for the target block is generated based on the motion information.

A list for the target block may be generated using the initial motion information.

The motion information may be determined based on the list.

The motion information may be one of multiple candidates in the list.

The prediction block for the target block may be generated using final motion information derived through correction of the motion information.

The final motion information may be configured to determine a reference block for the target block.

Reordering of the multiple candidates may be applied based on costs of the multiple candidates.

The list may be generated by applying correction to the initial motion information.

The correction may be at least one of template matching, bilateral matching, and an operation using a motion offset.

Each of multiple candidates in the list may be at least one of motion information, a sample, a motion information offset, and a motion information correction vector.

In accordance with another aspect, there is provided an image encoding method, including determining initial motion information for a target block; and determining motion information based on the initial motion information, wherein the motion information is information used to generate a prediction block for the target block.

A list for the target block may be generated using the initial motion information.

The motion information may be determined based on the list.

The motion information may be one of multiple candidates in the list.

Final motion information derived through correction of the motion information may be used to generate the prediction block for the target block.

The final motion information may be configured to determine a reference block for the target block.

Reordering of the multiple candidates may be applied based on costs of the multiple candidates.

The list may be generated by applying correction to the initial motion information.

The correction may be at least one of template matching, bilateral matching, and an operation using a motion offset.

Each of multiple candidates in the list may be at least one of motion information, a sample, a motion information offset, and a motion information correction vector.

The final motion information derived through correction of the motion information may be used to generate the prediction block for the target block.

In accordance with a further aspect, there is a provided a computer-readable storage medium for storing a bitstream for image decoding, wherein the bitstream includes coding information, initial motion information for a target block is determined using the coding information, motion information is determined based on the initial motion information, and a prediction block for the target block is generated based on the motion information.

A list for the target block may be generated using the initial motion information.

The motion information may be determined based on the list.

The motion information may be one of multiple candidates in the list.

The prediction block for the target block may be generated using final motion information derived through correction of the motion information.

The final motion information may be configured to determine a reference block for the target block.

Reordering of the multiple candidates may be applied based on costs of the multiple candidates.

The list may be generated by applying correction to the initial motion information.

The correction may be at least one of template matching, bilateral matching, and an operation using a motion offset.

Advantageous Effects

There are provided an apparatus, a method, and a storage medium, which store a final motion information candidate by utilizing a list in a process of correcting motion information in template matching and/or bilateral matching.

There are provided an apparatus, a method, and a storage medium, which improve coding efficiency through correction of motion information.

DESCRIPTION OF DRAWINGS

FIGS. 30 to 35 illustrate search methods in template matching according to an example;

FIG. 36 illustrates a first template configuration method in an affine mode according to an example;

MODE FOR INVENTION

Figure 1:
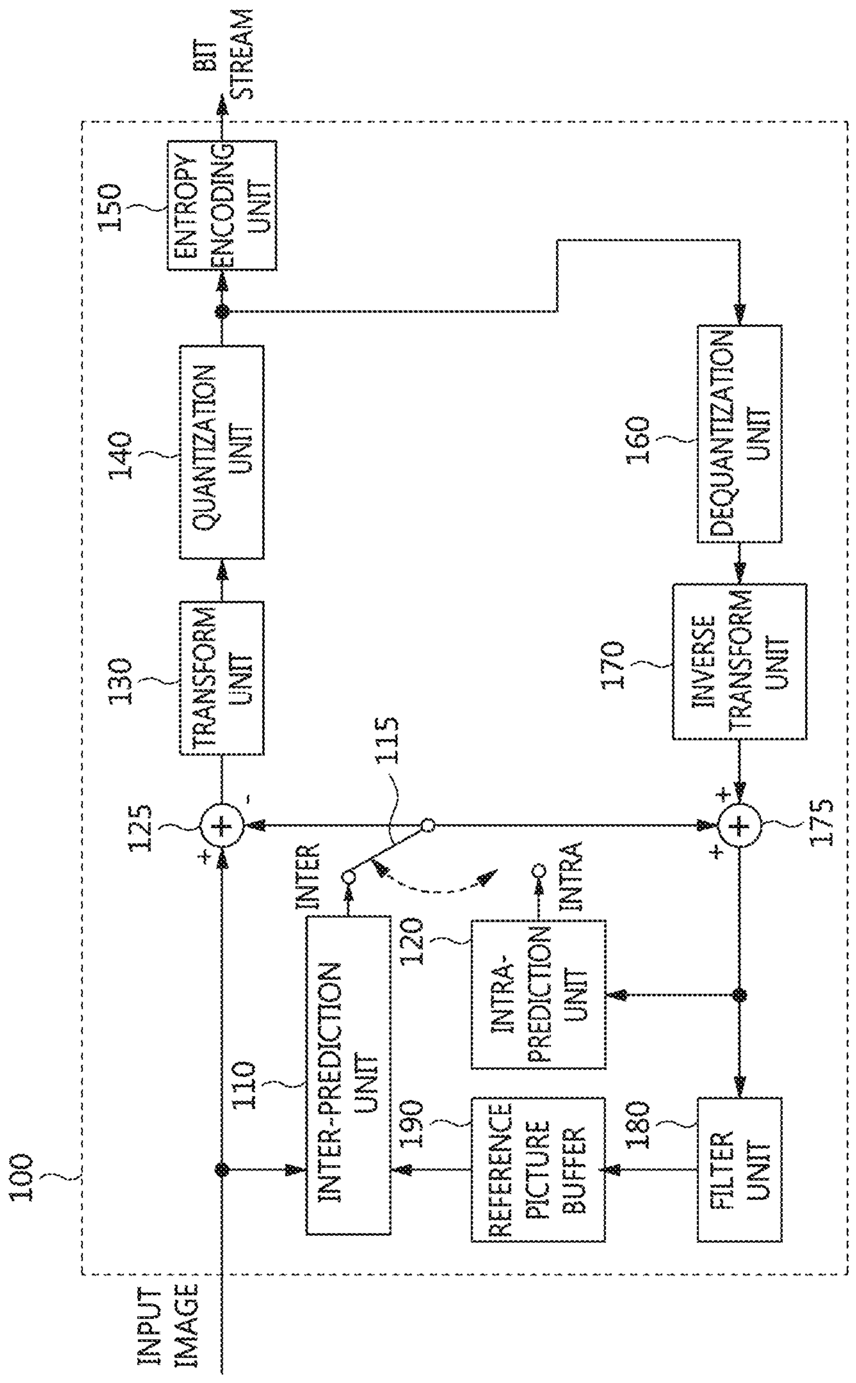
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. On the other hand, it will be understood that when a component is referred to as being "directly connected or coupled", no intervening components are present between the two components.

Components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

The terms used in the embodiment are merely used to describe specific embodiments and are not intended to limit the present invention. A singular expression includes a plural expression unless a description to the contrary is specifically pointed out in context. In the embodiments, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, in the embodiments, an expression describing that a component "comprises" a specific component means that additional components may be included within the scope of the practice of the present invention or the technical spirit of the present invention, but does not preclude the presence of components other than the specific component.

In the embodiments, a term "at least one" may mean one of one or more numbers, such as 1, 2, 3, and 4.

In phrases in which items are listed, such as "A or B", "at least one of A and B", "at least one of A or B", "at least one of A, B and C", and "at least one of A, B or C" used in embodiments, each of the phrases may indicate any one of the items listed in the corresponding phrase, or may indicate all possible combinations of the listed items.

In the embodiments, a term "a plurality of" may mean one of two or more numbers, such as 2, 3 and 4.

Some components of the embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus. And, a target image may be a current image, that is, the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other. A current block may denote an encoding target block, which is the target of encoding, during encoding and/or a decoding target block, which is the target of decoding, during decoding. Also, the current block may be at least one of a coding block, a prediction block, a residual block, and a transform block.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

In the following embodiments, specific information, data, a flag, an index, an element, and an attribute may have their respective values. A value of "0" corresponding to each of the information, data, flag, index, element, and attribute may indicate a false, a logical false or a first predefined value. In other words, the value of "0", a false, logical false, and a first predefined value may be used interchangeably with each other. A value of "1" corresponding to each of the information, data, flag, index, element, and attribute may indicate a true, a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

In embodiments, the term "one or more" or the term "at least one" may mean the term "plural". The term "one or more" or the term "at least one" may be used interchangeably with "plural".

Below, the terms to be used in embodiments will be described.

Encoder: An encoder denotes a device for performing encoding. That is, an encoder may mean an encoding apparatus.

Decoder: A decoder denotes a device for performing decoding. That is, a decoder may mean a decoding apparatus.

Unit: A unit may denote the unit of image encoding and decoding. The terms "unit" and "block" may be used to have the same meaning, and may be used interchangeably with each other.

- A unit may be an M×N array of samples. Each of M and N may be a positive integer. A unit may typically mean an array of samples in the form of two-dimensions.
- In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.
- In the encoding and decoding of an image, predefined processing may be performed on each unit depending on the type of the unit.
- Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc. For example, a target unit, which is the target of encoding and/or decoding, may be at least one of a CU, a PU, a residual unit, and a TU.
- The term "unit" may mean information including a luminance (luma) component block, a chrominance (chroma) component block corresponding thereto, and syntax elements for respective blocks so that the unit is designated to be distinguished from a block.
- The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.
- Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.
- One unit may be partitioned into sub-units, each having a smaller size than that of the relevant unit.

Depth: A depth may mean an extent to which the unit is partitioned. Further, the depth of the unit may indicate the level at which the corresponding unit is present when unit(s) are represented by a tree structure.

- Unit partition information may include a depth indicating the depth of a unit. A depth may indicate the number of times the unit is partitioned and/or the degree to which the unit is partitioned.
- In a tree structure, it may be considered that the depth of a root node is the smallest, and the depth of a leaf node is the largest. The root node may be the highest (top) node. The leaf node may be a lowest node.
- A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.
- In a tree structure, the top node may correspond to the initial node before partitioning. The top node may be referred to as a "root node". Further, the root node may have a minimum depth value. Here, the top node may have a depth of level '0'.
- A node having a depth of level '1' may denote a unit generated when the initial unit is partitioned once. A node having a depth of level '2' may denote a unit generated when the initial unit is partitioned twice.
- A leaf node having a depth of level 'n' may denote a unit generated when the initial unit has been partitioned n times.
- The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. A quad tree may mean a quaternary tree. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

A neighbor block may mean a reconstructed neighbor block.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction mode: The prediction mode may be information indicating the mode used for intra prediction, or the mode used for inter prediction.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighbor unit: A reconstructed neighbor unit may be a unit which has already been decoded and reconstructed neighboring a target unit.

A reconstructed neighbor unit may be a unit that is spatially adjacent to the target unit or that is temporally adjacent to the target unit.

A reconstructed spatial neighbor unit may be a unit which is included in a target picture and which has already been reconstructed through encoding and/or decoding.

A reconstructed temporal neighbor unit may be a unit which is included in a reference image and which has already been reconstructed through encoding and/or decoding. The location of the reconstructed temporal neighbor unit in the reference image may be identical to that of the target unit in the target picture, or may correspond to the location of the target unit in the target picture. Also, a reconstructed temporal neighbor unit may be a block neighboring the corresponding block in a reference image. Here, the location of the corresponding block in the reference image may correspond to the location of the target block in the target image. Here, the fact that the locations of blocks correspond to each other may mean that the locations of the blocks are identical to each other, may mean that one block is included in another block, or may mean that one block occupies a specific location in another block.

Sub-picture: A picture may be divided into one or more sub-pictures. A sub-picture may be composed of one or more tile rows and one or more tile columns.

A sub-picture may be a region having a square shape or a rectangular (i.e., a non-square rectangular) shape in a picture. Further, a sub-picture may include one or more CTUs.

A sub-picture may be a rectangular region of one or more slices in a picture.

One sub-picture may include one or more tiles, one or more bricks, and/or one or more slices.

Tile: A tile may be a region having a square shape or rectangular (i.e., a non-square rectangular) shape in a picture.

A tile may include one or more CTUs.

A tile may be partitioned into one or more bricks.

Brick: A brick may denote one or more CTU rows in a tile.

A tile may be partitioned into one or more bricks. Each brick may include one or more CTU rows.

A tile that is not partitioned into two parts may also denote a brick.

Slice: A slice may include one or more tiles in a picture. Alternatively, a slice may include one or more bricks in a tile.

A sub-picture may contain one or more slices that collectively cover a rectangular region of a picture. Consequently, each sub-picture boundary is also always a slice boundary, and each vertical sub-picture boundary is always also a vertical tile boundary.

Parameter set: A parameter set may correspond to header information in the internal structure of a bitstream.

A parameter set may include at least one of a video parameter set (VPS), a sequence parameter set (SPS), a picture parameter set (PPS), an adaptation parameter set (APS), a decoding parameter set (DPS), etc.

Information signaled through each parameter set may be applied to pictures which refer to the corresponding parameter set. For example, information in a VPS may be applied to pictures which refer to the VPS. Information in an SPS may be applied to pictures which refer to the SPS. Information in a PPS may be applied to pictures which refer to the PPS.

Each parameter set may refer to a higher parameter set. For example, a PPS may refer to an SPS. An SPS may refer to a VPS.

Further, a parameter set may include a tile group, slice header information, and tile header information. The tile group may be a group including multiple tiles. Also, the meaning of "tile group" may be identical to that of "slice".

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the equation "$D+\lambda*R$". Generally, a combination enabling the rate-distortion cost to be minimized may be selected as the optimal combination in the rate-distortion optimization scheme.

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and/or inverse transform so as to calculate precise D and R. These procedures may greatly increase the complexity of the encoding apparatus.

Bitstream: A bitstream may denote a stream of bits including encoded image information.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference pictures used to generate a prediction unit of a target unit. Alternatively, the inter-prediction indicator may denote the number of prediction blocks used for inter prediction or motion compensation of a target unit.

Prediction list utilization flag: A prediction list utilization flag may indicate whether a prediction unit is generated using at least one reference picture in a specific reference picture list.

An inter-prediction indicator may be derived using the prediction list utilization flag. In contrast, the prediction list utilization flag may be derived using the inter-prediction indicator. For example, the case where the prediction list utilization flag indicates "0", which is a first value, may indicate that, for a target unit, a prediction block is not generated using a reference picture in a reference picture list. The case where the prediction list utilization flag indicates "1", which is a second value, may indicate that, for a target unit, a prediction unit is generated using the reference picture list.

Reference picture index: A reference picture index may be an index indicating a specific reference picture in a reference picture list.

Picture Order Count (POC): A POC value for a picture may denote an order in which the corresponding picture is displayed.

Motion vector (MV): A motion vector may be a 2D vector used for inter prediction or motion compensation. A motion vector may mean an offset between a target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using one or more merge candidates.

Merge candidate: A merge candidate may be a spatial merge candidate, a temporal merge candidate, a combined merge candidate, a combined bi-prediction merge candidate, a candidate based on a history, a candidate based on an average of two candidates, a zero-merge candidate, etc. A merge candidate may include an inter-prediction indicator, and may include motion information such as prediction type information, a reference picture index for each list, a motion vector, a prediction list utilization flag, and an inter-prediction indicator.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple sub-transform units having a smaller size. Here, a transform may include one or more of a primary transform and a secondary transform, and an inverse transform may include one or more of a primary inverse transform and a secondary inverse transform.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter may mean a difference value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may mean a quantization matrix to be signaled from the encoding apparatus to the decoding apparatus by a user.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM use indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium by an encoding apparatus. Information signaled by an encoding apparatus may be used by a decoding apparatus.

The encoding apparatus may generate encoded information by performing encoding on information to be signaled. The encoded information may be transmitted from the encoding apparatus to the decoding apparatus. The decoding apparatus may obtain information by decoding the transmitted encoded information. Here, the encoding may be entropy encoding, and the decoding may be entropy decoding.

Selective Signaling: Information may be signaled selectively. A selective signaling FOR information may mean that an encoding apparatus selectively includes information (according to a specific condition) in a bitstream or a recording medium. Selective signaling for information may mean that a decoding apparatus selectively extracts information from a bitstream (according to a specific condition).

Omission of signaling: Signaling for information may be omitted. Omission of signaling for information on information may mean that an encoding apparatus does not include information (according to a specific condition) in a bitstream or a recording medium. Omission of signaling for information may mean that a decoding apparatus does not extract information from a bitstream (according to a specific condition).

Statistic value: A variable, a coding parameter, a constant, etc. may have values that can be calculated. The statistic value may be a value generated by performing calculations (operations) on the values of specified targets. For example, the statistic value may indicate one or more of the average, weighted average, weighted sum, minimum value, maximum value, mode, median value, and interpolated value of the values of a specific variable, a specific coding parameter, a specific constant, or the like.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode. In other words, a prediction mode for a target block may be one of an intra mode and an inter mode.

Hereinafter, the terms "intra mode", "intra-prediction mode", "intra-picture mode" and "intra-picture prediction mode" may be used to have the same meaning, and may be used interchangeably with each other.

Hereinafter, the terms "inter mode", "inter-prediction mode", "inter-picture mode" and "inter-picture prediction mode" may be used to have the same meaning, and may be used interchangeably with each other.

Hereinafter, the term "image" may indicate only part of an image, or may indicate a block. Also, the processing of an "image" may indicate sequential processing of multiple blocks.

Further, the encoding apparatus 100 may generate a bitstream, including encoded information, via encoding on the target image, and may output and store the generated bitstream. The generated bitstream may be stored in a computer-readable storage medium and may be streamed through a wired and/or wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual block for the target block using a residual between the target block and the prediction block.

When the prediction mode is the intra mode, the intra-prediction unit 120 may use pixels of previously encoded/decoded neighbor blocks adjacent to the target block as reference samples. The intra-prediction unit 120 may perform spatial prediction on the target block using the reference samples, and may generate prediction samples for the target block via spatial prediction. the prediction samples may mean samples in the prediction block.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area. Here, the motion-prediction unit may use a search range as a target area for searching.

The reference image may be stored in the reference picture buffer 190. More specifically, an encoded and/or decoded reference image may be stored in the reference picture buffer 190 when the encoding and/or decoding of the reference image have been processed.

Since a decoded picture is stored, the reference picture buffer 190 may be a Decoded Picture Buffer (DPB).

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighbor block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of a size of a unit/block, a shape/form of a unit/block, a depth of a unit/block, partition information of a unit/block, a partition structure of a unit/block, information indicating whether a unit/block is partitioned in a quad-tree structure, information indicating whether a unit/block is partitioned in a binary tree structure, a partitioning direction of a binary tree structure (horizontal direction or vertical direction), a partitioning form of a binary tree structure (symmetrical partitioning or asymmetrical partitioning), information indicating whether a unit/block is partitioned in a ternary tree structure, a partitioning direction of a ternary tree structure (horizontal direction or vertical direction), a partitioning form of a ternary tree structure (symmetrical partitioning or asymmetrical partitioning, etc.), information indicating whether a unit/block is partitioned in a multi-type tree structure, a combination and a direction (horizontal direction or vertical direction, etc.) of a partitioning of the multi-type tree structure, a partitioning form of a multi-type tree structure (symmetrical partitioning or asymmetrical partitioning, etc.), a partitioning tree (a binary tree or a ternary tree) of the multi-type tree form, a type of a prediction (intra prediction or inter prediction), an intra-prediction mode/direction, an intra luma prediction mode/direction, an intra chroma prediction mode/direction, an intra partitioning information, an inter partitioning information, a coding block partitioning flag, a prediction block partitioning flag, a transform block partitioning flag, a reference sample filtering method, a reference sample filter tap, a reference sample filter coefficient, a prediction block filtering method, a prediction block filter tap, a prediction block filter coefficient, a prediction block boundary filtering method, a prediction block boundary filter tap, a prediction block boundary filter coefficient, an inter-prediction mode, motion information, a motion vector, a motion vector difference, a reference picture index, an inter-prediction direction, an inter-prediction indicator, a prediction list utilization flag, a reference picture list, a reference image, a POC, a motion vector predictor, a motion vector prediction index, a motion vector prediction candidate, a motion vector candidate list, information indicating whether a merge mode is used, a merge index, a merge candidate, a merge candidate list, information indicating whether a skip mode is used, a type of an interpolation filter, a tap of an interpolation filter, a filter coefficient of an interpolation filter, a magnitude of a motion vector, accuracy of motion vector representation, a transform type, a transform size, information indicating whether a first transform is used, information indicating whether an additional (secondary) transform is used, first transform selection information (or a first transform index), secondary transform selection information (or a secondary transform index), information indicating a presence or absence of a residual signal, a coded block pattern, a coded block flag, a quantization parameter, a residual quantization parameter, a quantization matrix, information about an intra-loop filter, information indicating whether an intra-loop filter is applied, a coefficient of an intra-loop filter, a tap of an intra-loop filter, a shape/form of an intra-loop filter, information indicating whether a deblocking filter is applied, a coefficient of a deblocking filter, a tap of a deblocking filter, deblocking filter strength, a shape/form of a deblocking filter, information indicating whether an adaptive sample offset is applied, a value of an adaptive sample offset, a category of an adaptive sample offset, a type of an adaptive sample offset, information indicating whether an adaptive in-loop filter is applied, a coefficient of an adaptive in-loop filter, a tap of an adaptive in-loop filter, a shape/form of an adaptive in-loop filter, a binarization/inverse binarization method, a context model, a context model decision method, a context model update method, information indicating whether a regular mode is performed, information whether a bypass mode is performed, a significant coefficient flag, a last significant coefficient flag, a coding flag for a coefficient group, a position of a last significant coefficient, information indicating whether a value of a coefficient is greater than 1, information indicating whether a value of a coefficient is greater than 2, information indicating whether a value of a coefficient is greater than 3, a remaining coefficient value information, a sign information, a reconstructed luma sample, a reconstructed chroma sample, a context bin, a bypass bin, a residual luma sample, a residual chroma sample, a transform coefficient, a luma transform coefficient, a chroma transform coefficient, a quantized level, a luma quantized level, a chroma quantized level, a transform coefficient level, a transform coefficient level scanning method, a size of a motion vector search region on a side of a decoding apparatus, a shape/form of a motion vector search region on a side of a decoding apparatus, the number of a motion vector search on a side of a decoding apparatus, a size of a CTU, a minimum block size, a maximum block size, a maximum block depth, a minimum block depth, an image display/output order, slice identification information, a slice type, slice partition information, tile group identification information, a tile group type, a tile group partitioning information, tile identification information, a tile type, tile partitioning information, a picture type, bit depth, input sample bit depth, reconstructed sample bit depth, residual sample bit depth, transform coefficient bit depth, quantized level bit depth, information about a luma signal, information about a chroma signal, a color space of a target block and a color space of a residual block. Further, the above-described coding parameter-related information may also be included in the coding parameter. Information used to calculate and/or derive the above-described coding parameter may also be included in the coding parameter. Information calculated or derived using the above-described coding parameter may also be included in the coding parameter.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling information may mean that the encoding apparatus 100 includes an entropy-encoded information, generated by performing entropy encoding a flag or an index, in a bitstream, and that the decoding apparatus 200 acquires information by performing entropy decoding on the entropy-encoded information, extracted from the bitstream. Here, the information may comprise a flag, an index, etc.

A signal may mean information to be signaled. Hereinafter, information for an image and a block may be referred to as a signal. Further, hereinafter, the terms "information" and "signal" may be used to have the same meaning and may be used interchangeably with each other. For example, a specific signal may be a signal representing a specific block. An original signal may be a signal representing a target block. A prediction signal may be a signal representing a prediction block. A residual signal may be a signal representing a residual block.

A bitstream may include information based on a specific syntax. The encoding apparatus 100 may generate a bitstream including information depending on a specific syntax. The decoding apparatus 200 may acquire information from the bitstream depending on a specific syntax.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate a inversely quantized and inversely transformed coefficient by performing inverse transform for the inversely quantized coefficient.

The inversely quantized and inversely transformed coefficient may be added to the prediction block by the adder 175. The inversely quantized and inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block. Here, the reconstructed block may mean a recovered block or a decoded block.

The reconstructed block may be subjected to filtering through the filter unit 180. The filter unit 180 may apply one or more of a deblocking filter, a Sample Adaptive Offset (SAO) filter, an Adaptive Loop Filter (ALF), and a Non Local Filter (NLF) to a reconstructed sample, the reconstructed block or a reconstructed picture. The filter unit 180 may also be referred to as an "in-loop filter".

The deblocking filter may eliminate block distortion occurring at the boundaries between blocks in a reconstructed picture. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, one or more filters of a long-tap filter, a strong filter, a weak filter and Gaussian filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined groups, filters to be applied to each group may be determined, and filtering may be differentially performed for respective groups. information related to whether to apply an adaptive loop filter may be signaled for each CU. Such information may be signaled for a luma signal. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190 as a reference picture. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction or a motion compensation.

Figure 2:
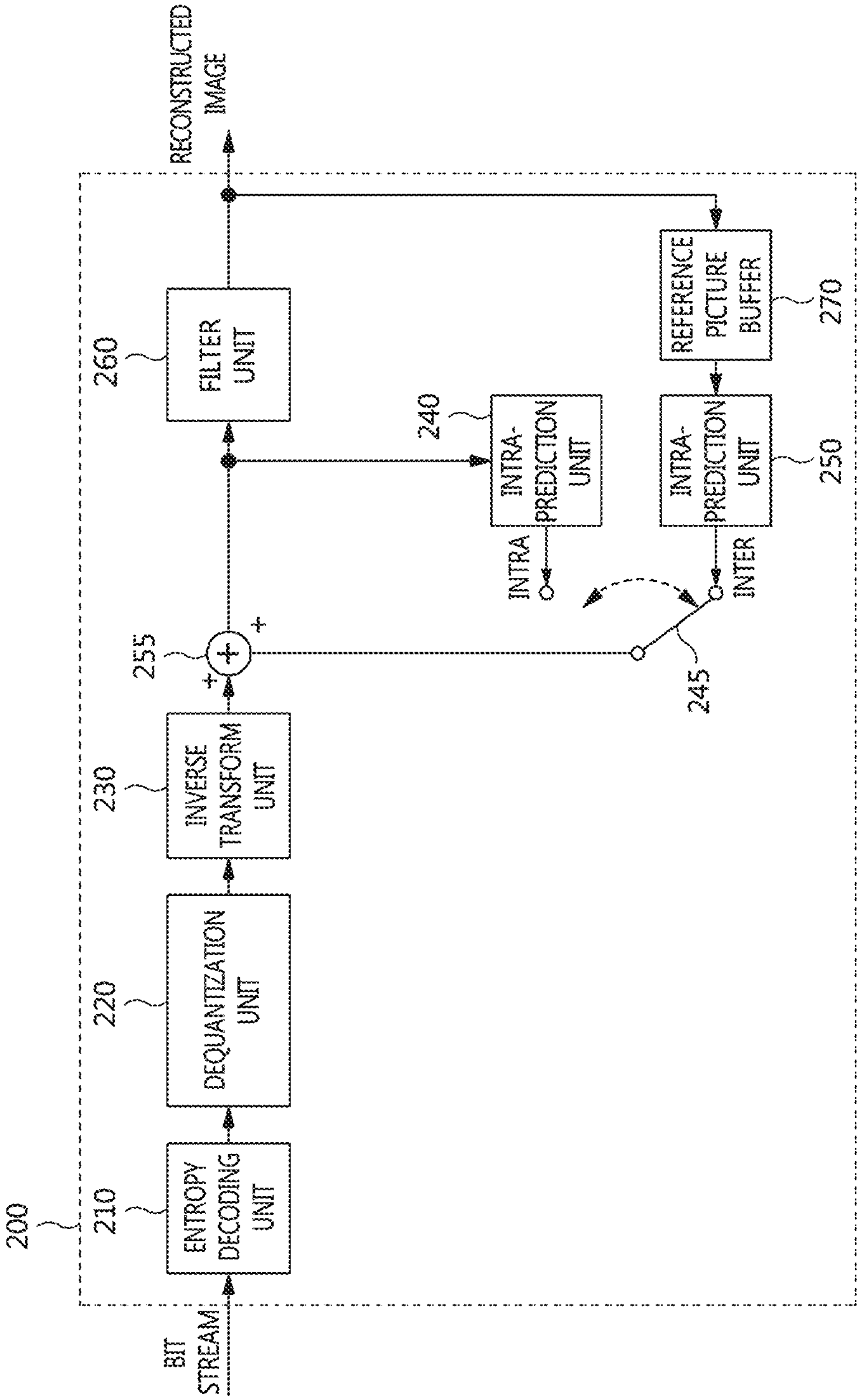
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block and the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighbor blocks adjacent to a target block for the target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270 for the target block.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The filter unit may output the reconstructed image.

The reconstructed image and/or the reconstructed block subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction or a motion compensation.

Figure 3:
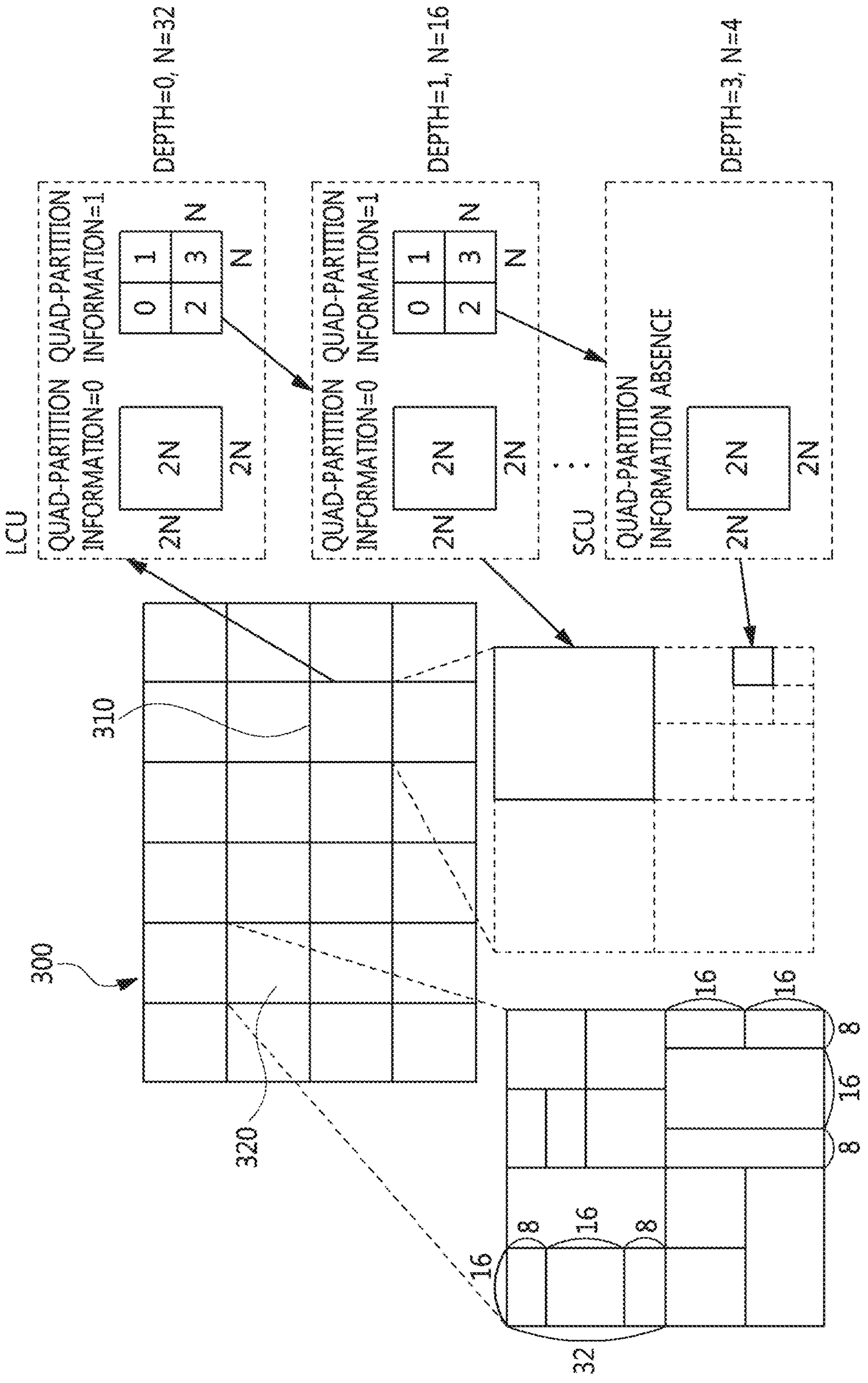
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into a plurality of sub-units while having depth information based on a tree structure.

Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc.

The horizontal size and the vertical size of each of CUs generated by the partitioning may be less than the horizontal size and the vertical size of a CU before being partitioned, depending on the number of CUs generated by partitioning. For example, the horizontal size and the vertical size of each of CUs generated by the partitioning may be half of the horizontal size and the vertical size of a CU before being partitioned.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size.

For example, the depth of a CU may have a value ranging from 0 to 3. The size of the CU may range from a size of 64×64 to a size of 8×8 depending on the depth of the CU.

For example, the depth of an LCU 310 may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be a first value. The value of the partition information of a CU that is partitioned may be a second value. When the partition information indicates whether a CU is partitioned or not, the first value may be "0" and the second value may be "1".

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure. In other words, it may be considered that a quad-tree partition has been applied to a CU.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure. In other words, it may be considered that a binary-tree partition has been applied to a CU.

For example, when a single CU is partitioned (or split) into three CUs, the original CU before being partitioned is partitioned so that the horizontal size or vertical size thereof is divided at a ratio of 1:2:1, thus enabling three sub-CUs to be generated. For example, when a CU having a 16×32 size is horizontally partitioned into three sub-CUs, the three sub-CUs resulting from the partitioning may have sizes of 16×8, 16×16, and 16×8, respectively, in a direction from the top to the bottom. For example, when a CU having a 32×32 size is vertically partitioned into three sub-CUs, the three sub-CUs resulting from the partitioning may have sizes of 8×32, 16×32, and 8×32, respectively, in a direction from the left to the right. When a single CU is partitioned into three CUs, it may be considered that the CU is partitioned in a ternary-tree form. In other words, it may be considered that a ternary-tree partition has been applied to the CU.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

The Coding Tree Unit (CTU) 320 in FIG. 3 is an example of a CTU to which all of a quad-tree partition, a binary-tree partition, and a ternary-tree partition are applied.

As described above, in order to partition a CTU, at least one of a quad-tree partition, a binary-tree partition, and a ternary-tree partition may be applied to the CTU. Partitions may be applied based on specific priority.

For example, a quad-tree partition may be preferentially applied to the CTU. A CU that cannot be partitioned in a quad-tree form any further may correspond to a leaf node of a quad-tree. A CU corresponding to the leaf node of the quad-tree may be a root node of a binary tree and/or a ternary tree. That is, the CU corresponding to the leaf node of the quad-tree may be partitioned in a binary-tree form or a ternary-tree form, or may not be partitioned any further. In this case, each CU, which is generated by applying a binary-tree partition or a ternary-tree partition to the CU corresponding to the leaf node of a quad-tree, is prevented from being subjected again to quad-tree partitioning, thus effectively performing partitioning of a block and/or signaling of block partition information.

The partition of a CU corresponding to each node of a quad-tree may be signaled using quad-partition information. Quad-partition information having a first value (e.g., "1") may indicate that the corresponding CU is partitioned in a quad-tree form. Quad-partition information having a second value (e.g., "0") may indicate that the corresponding CU is not partitioned in a quad-tree form. The quad-partition information may be a flag having a specific length (e.g., 1 bit).

Priority may not exist between a binary-tree partition and a ternary-tree partition. That is, a CU corresponding to the leaf node of a quad-tree may be partitioned in a binary-tree form or a ternary-tree form. Also, the CU generated through a binary-tree partition or a ternary-tree partition may be further partitioned in a binary-tree form or a ternary-tree form, or may not be partitioned any further.

Partitioning performed when priority does not exist between a binary-tree partition and a ternary-tree partition may be referred to as a "multi-type tree partition". That is, a CU corresponding to the leaf node of a quad-tree may be the root node of a multi-type tree. Partitioning of a CU corresponding to each node of the multi-type tree may be signaled using at least one of information indicating whether the CU is partitioned in a multi-type tree, partition direction information, and partition tree information. For partitioning of a CU corresponding to each node of a multi-type tree, information indicating whether partitioning in the multi-type tree is performed, partition direction information, and partition tree information may be sequentially signaled.

For example, information indicating whether a CU is partitioned in a multi-type tree and having a first value (e.g., "1") may indicate that the corresponding CU is partitioned in a multi-type tree form. Information indicating whether a CU is partitioned in a multi-type tree and having a second value (e.g., "0") may indicate that the corresponding CU is not partitioned in a multi-type tree form.

When a CU corresponding to each node of a multi-type tree is partitioned in a multi-type tree form, the corresponding CU may further include partition direction information.

The partition direction information may indicate the partition direction of the multi-type tree partition. Partition direction information having a first value (e.g., "1") may indicate that the corresponding CU is partitioned in a vertical direction. Partition direction information having a second value (e.g., "0") may indicate that the corresponding CU is partitioned in a horizontal direction.

When a CU corresponding to each node of a multi-type tree is partitioned in a multi-type tree form, the corresponding CU may further include partition-tree information. The partition-tree information may indicate the tree that is used for a multi-type tree partition.

For example, partition-tree information having a first value (e.g., "1") may indicate that the corresponding CU is partitioned in a binary-tree form. Partition-tree information having a second value (e.g., "0") may indicate that the corresponding CU is partitioned in a ternary-tree form.

Here, each of the above-described information indicating whether partitioning in the multi-type tree is performed, partition-tree information, and partition direction information may be a flag having a specific length (e.g., 1 bit).

At least one of the above-described quad-partition information, information indicating whether partitioning in the multi-type tree is performed, partition direction information, and partition-tree information may be entropy-encoded and/or entropy-decoded. In order to perform entropy encoding/decoding of such information, information of a neighbor CU adjacent to a target CU may be used.

For example, it may be considered that there is a high probability that the partition form of a left CU and/or an above CU (i.e., partitioning/non-partitioning, a partition tree and/or a partition direction) and the partition form of a target CU will be similar to each other. Therefore, based on the information of a neighbor CU, context information for entropy encoding and/or entropy decoding of the information of the target CU may be derived. Here, the information of the neighbor CU may include at least one of 1) quad-partition information of the neighbor CU, 2) information indicating whether the neighbor CU is partitioned in a multi-type tree, 3) partition direction information of the neighbor CU, and 4) partition-tree information of the neighbor CU.

In another embodiment, of a binary-tree partition and a ternary-tree partition, the binary-tree partition may be preferentially performed. That is, the binary-tree partition may be first applied, and then a CU corresponding to the leaf node of a binary tree may be set to the root node of a ternary tree. In this case, a quad-tree partition or a binary-tree partition may not be performed on the CU corresponding to the node of the ternary tree.

A CU, which is not partitioned any further through a quad-tree partition, a binary-tree partition, and/or a ternary-tree partition, may be the unit of encoding, prediction and/or transform. That is, the CU may not be partitioned any further for prediction and/or transform. Therefore, a partition structure for partitioning the CU into Prediction Units (PUs) and/or Transform Units (TUs), partition information thereof, etc. may not be present in a bitstream.

However, when the size of a CU, which is the unit of partitioning, is greater than the size of a maximum transform block, the CU may be recursively partitioned until the size of the CU becomes less than or equal to the size of the maximum transform block. For example, when the size of a CU is 64×64 and the size of the maximum transform block is 32×32, the CU may be partitioned into four 32×32 blocks so as to perform a transform. For example, when the size of a CU is 32×64 and the size of the maximum transform block is 32×32, the CU may be partitioned into two 32×32 blocks.

In this case, information indicating whether a CU is partitioned for a transform may not be separately signaled. Without signaling, whether a CU is partitioned may be determined via a comparison between the horizontal size (and/or vertical size) of the CU and the horizontal size (and/or vertical size) of the maximum transform block. For example, when the horizontal size of the CU is greater than the horizontal size of the maximum transform block, the CU may be vertically bisected. Further, when the vertical size of the CU is greater than the vertical size of the maximum transform block, the CU may be horizontally bisected.

Information about the maximum size and/or minimum size of a CU and information about the maximum size and/or minimum size of a transform block may be signaled or determined at a level higher than that of the CU. For example, the higher level may be a sequence level, a picture level, a tile level, a tile group level or a slice level. For example, the minimum size of the CU may be set to 4×4. For example, the maximum size of the transform block may be set to 64×64. For example, the maximum size of the transform block may be set to 4×4.

Information about the minimum size of a CU corresponding to the leaf node of a quad-tree (i.e., the minimum size of the quad-tree) and/or information about the maximum depth of a path from the root node to the leaf node of a multi-type tree (i.e., the maximum depth of a multi-type tree) may be signaled or determined at a level higher than that of the CU. For example, the higher level may be a sequence level, a picture level, a slice level, a tile group level or a tile level. Information about the minimum size of a quad-tree and/or information about the maximum depth of a multi-type tree may be separately signaled or determined at each of an intra-slice level and an inter-slice level.

Information about the difference between the size of a CTU and the maximum size of a transform block may be signaled or determined at a level higher than that of a CU. For example, the higher level may be a sequence level, a picture level, a slice level, a tile group level or a tile level. Information about the maximum size of a CU corresponding to each node of a binary tree (i.e., the maximum size of the binary tree) may be determined based on the size and the difference information of a CTU. The maximum size of a CU corresponding to each node of a ternary tree (i.e., the maximum size of the ternary tree) may have different values depending on the type of slice. For example, the maximum size of the ternary tree at an intra-slice level may be 32×32. For example, the maximum size of the ternary tree at an inter-slice level may be 128×128. For example, the minimum size of a CU corresponding to each node of a binary tree (i.e., the minimum size of the binary tree) and/or the minimum size of a CU corresponding to each node of a ternary tree (i.e., the minimum size of the ternary tree) may be set to the minimum size of a CU.

In a further example, the maximum size of a binary tree and/or the maximum size of a ternary tree may be signaled or determined at a slice level. Also, the minimum size of a binary tree and/or the minimum size of a ternary tree may be signaled or determined at a slice level.

Based on the above-described various block sizes and depths, quad-partition information, information indicating whether partitioning in a multi-type tree is performed, partition tree information and/or partition direction information may or may not be present in a bitstream.

For example, when the size of a CU is not greater than the minimum size of a quad-tree, the CU may not include quad-partition information, and quad-partition information of the CU may be inferred as a second value.

For example, when the size of a CU corresponding to each node of a multi-type tree (horizontal size and vertical size) is greater than the maximum size of a binary tree (horizontal size and vertical size) and/or the maximum size of a ternary tree (horizontal size and vertical size), the CU may not be partitioned in a binary-tree form and/or a ternary-tree form. By means of this determination manner, information indicating whether partitioning in a multi-type tree is performed may not be signaled, but may be inferred as a second value.

Alternatively, when the size of a CU corresponding to each node of a multi-type tree (horizontal size and vertical size) is equal to the minimum size of a binary tree (horizontal size and vertical size), or when the size of a CU (horizontal size and vertical size) is equal to twice the minimum size of a ternary tree (horizontal size and vertical size), the CU may not be partitioned in a binary tree form and/or a ternary tree form. By means of this determination manner, information indicating whether partitioning in a multi-type tree is performed may not be signaled, but may be inferred as a second value. The reason for this is that, when a CU is partitioned in a binary tree form and/or a ternary tree form, a CU smaller than the minimum size of the binary tree and/or the minimum size of the ternary tree is generated.

Alternatively, a binary-tree partition or a ternary-tree partition may be limited based on the size of a virtual pipeline data unit (i.e., the size of a pipeline buffer). For example, when a CU is partitioned into sub-CUs unsuitable for the size of a pipeline buffer through a binary-tree partition or a ternary-tree partition, a binary-tree partition or a ternary-tree partition may be limited. The size of the pipeline buffer may be equal to the maximum size of a transform block (e.g., 64×64).

For example, when the size of the pipeline buffer is 64×64, the following partitions may be limited.

Ternary-tree partition for N×M CU (where N and/or M are 128)

Horizontal binary-tree partition for 128×N CU (where N<=64)

Vertical binary-tree partition for N×128 CU (where N<=64)

Alternatively, when the depth of a CU corresponding to each node of a multi-type tree is equal to the maximum depth of the multi-type tree, the CU may not be partitioned in a binary-tree form and/or a ternary-tree form. By means of this determination manner, information indicating whether partitioning in a multi-type tree is performed may not be signaled, but may be inferred as a second value.

Alternatively, information indicating whether partitioning in a multi-type tree is performed may be signaled only when at least one of a vertical binary-tree partition, a horizontal binary-tree partition, a vertical ternary-tree partition, and a horizontal ternary-tree partition is possible for a CU corresponding to each node of a multi-type tree. Otherwise, the CU may not be partitioned in a binary-tree form and/or a ternary-tree form. By means of this determination manner, information indicating whether partitioning in a multi-type tree is performed may not be signaled, but may be inferred as a second value.

Alternatively, partition direction information may be signaled only when both a vertical binary-tree partition and a horizontal binary-tree partition are possible or only when both a vertical ternary-tree partition and a horizontal ternary-tree partition are possible, for a CU corresponding to each node of a multi-type tree. Otherwise, the partition direction information may not be signaled, but may be inferred as a value indicating the direction in which the CU can be partitioned.

Alternatively, partition tree information may be signaled only when both a vertical binary-tree partition and a vertical ternary-tree partition are possible or only when both a horizontal binary-tree partition and a horizontal ternary-tree partition are possible, for a CU corresponding to each node of a multi-type tree. Otherwise, the partition tree information may not be signaled, but may be inferred as a value indicating a tree that can be applied to the partition of the CU.

Figure 4:
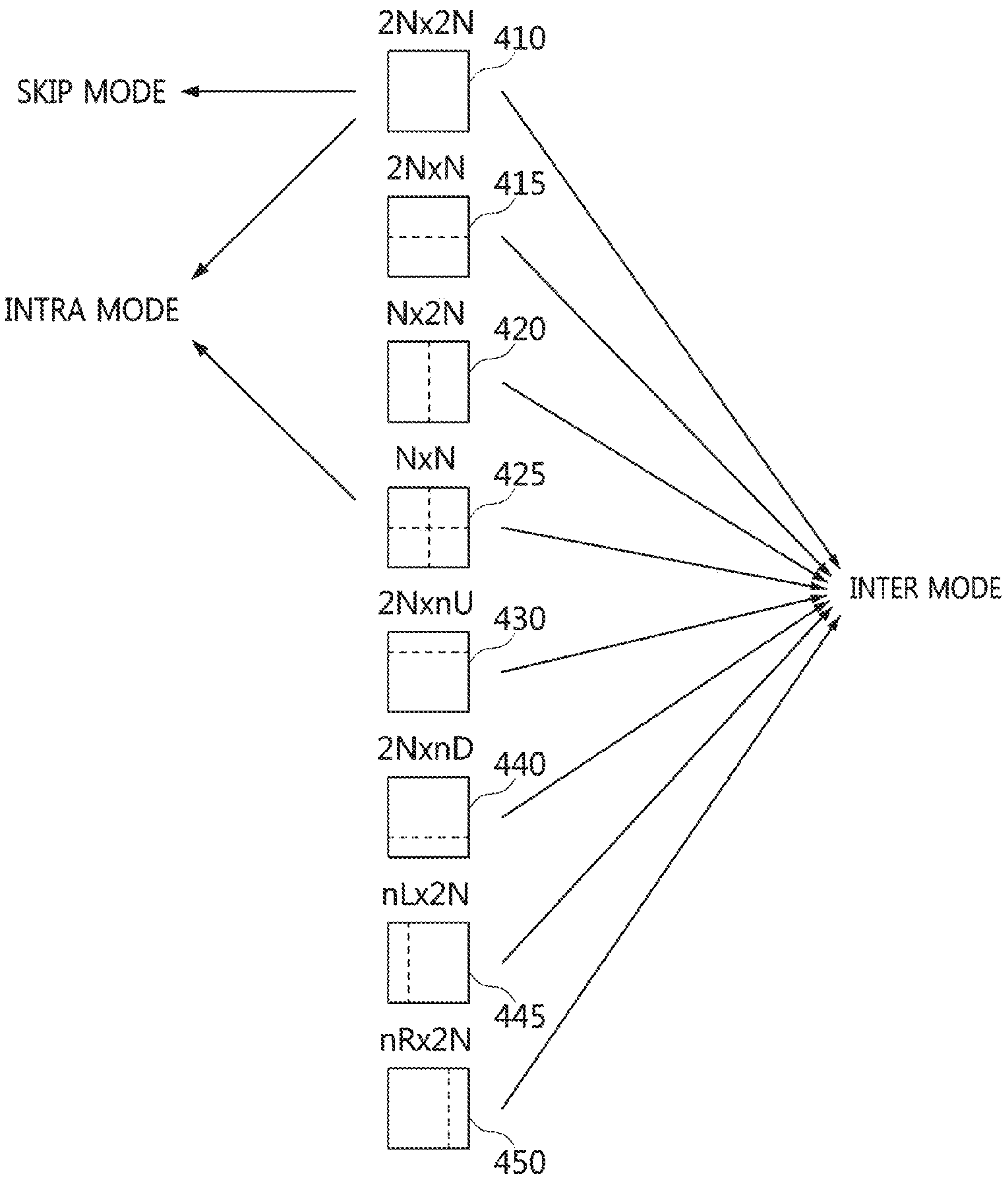
FIG. 4 is a diagram illustrating the form of a Prediction Unit (PU) that a Coding Unit (CU) can include.

FIG. 4 is a diagram illustrating the form of a Prediction Unit that a Coding Unit can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
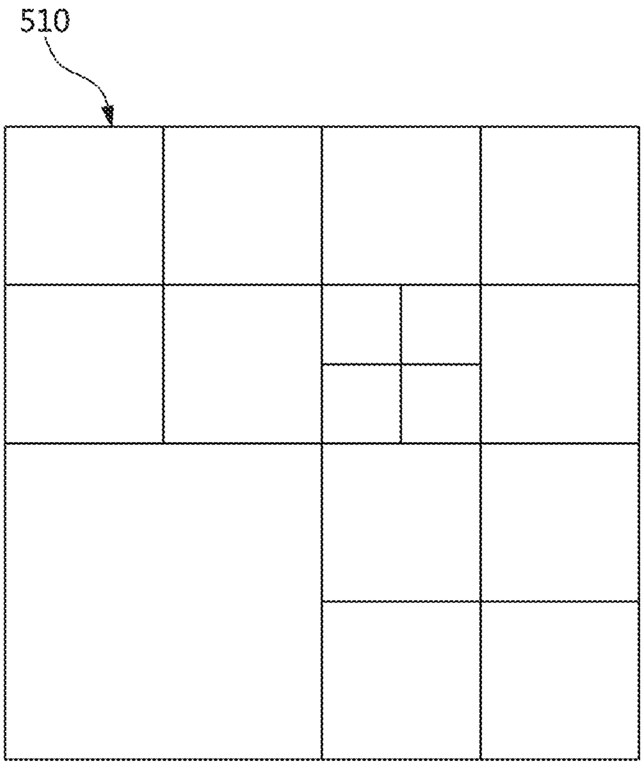
FIG. 5 is a diagram illustrating the form of a Transform Unit (TU) that can be included in a CU.

FIG. 5 is a diagram illustrating the form of a Transform Unit that can be included in a Coding Unit.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

In a way differing from that illustrated in FIG. 5, a CU may be split.

For example, a single CU may be split into three CUs. The horizontal sizes or vertical sizes of the three CUs generated from splitting may be ¼, ½, and ¼, respectively, of the horizontal size or vertical size of the original CU before being split.

For example, when a CU having a 32×32 size is vertically split into three CUs, the sizes of the three CUs generated from the splitting may be 8×32, 16×32, and 8×32, respectively. In this way, when a single CU is split into three CUs, it may be considered that the CU is split in the form of a ternary tree.

One of exemplary splitting forms, that is, quad-tree splitting, binary tree splitting, and ternary tree splitting, may be applied to the splitting of a CU, and multiple splitting schemes may be combined and used together for splitting of a CU. Here, the case where multiple splitting schemes are combined and used together may be referred to as "complex tree-format splitting".

Figure 6:
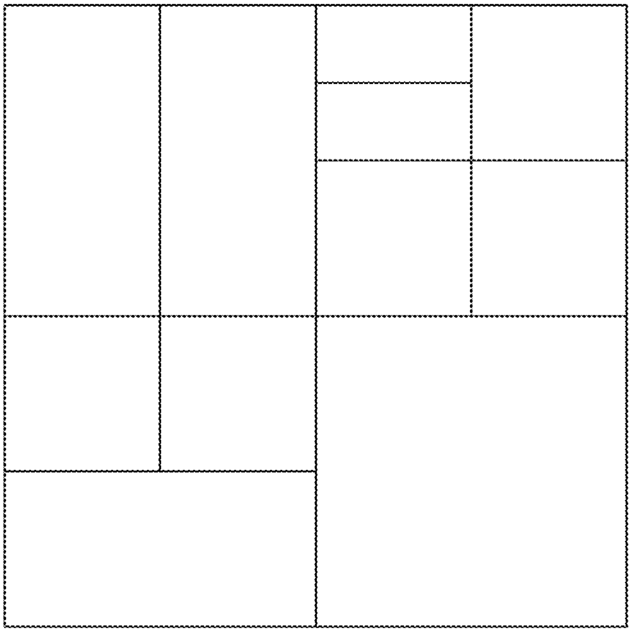
FIG. 6 illustrates splitting of a block according to an example.

FIG. 6 illustrates the splitting of a block according to an example.

In a video encoding and/or decoding process, a target block may be split, as illustrated in FIG. 6. For example, the target block may be a CU.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| 0 | | |
| | 0 | |
| 0 | | |
| | 0 | |
| 0 | | |
| | 1 | |
| | | 0 |
| | 1 | |
| | | 1 |
| | 0 | |
| | 0 | |
| | 0 | |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, a parameter, a tile group, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block is greater than the maximum size of a transform block, only partitioning in a quad-tree form may be possible. Here, a sub-block resulting from partitioning may be at least one of a CU and a TU.

In this case, split_flag may be a flag indicating whether a CU is partitioned in a quad-tree form.

When the size of a block falls within the specific range, only splitting in a binary tree form or a ternary tree form may be possible. For example, the specific range may be defined by at least one of a maximum block size and a minimum block size at which only splitting in a binary tree form or a ternary tree form is possible.

Information indicating the maximum block size and/or the minimum block size at which only splitting in a binary tree form or splitting in a ternary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form or a ternary tree form is performed.

The above description of partitioning in a quad-tree form may be equally applied to a binary-tree form and/or a ternary-tree form.

The partition of a block may be limited by a previous partition. For example, when a block is partitioned in a specific binary-tree form and then multiple sub-blocks are generated from the partitioning, each sub-block may be additionally partitioned only in a specific tree form. Here, the specific tree form may be at least one of a binary-tree form, a ternary-tree form, and a quad-tree form.

When the horizontal size or vertical size of a partition block is a size that cannot be split further, the above-described indicator may not be signaled.

Figure 7:
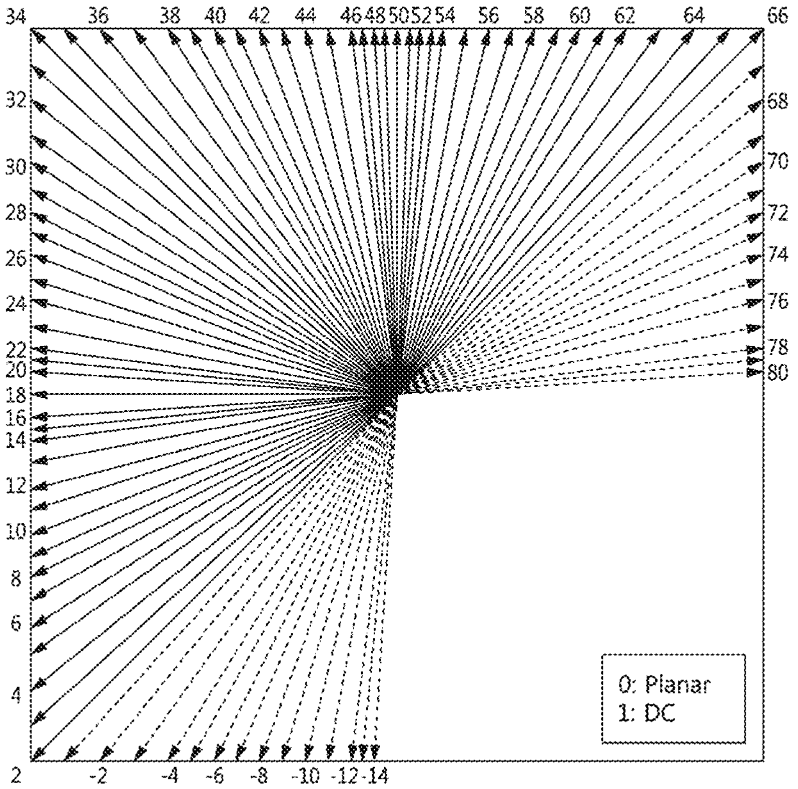
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

In FIG. 7, A number 0 may represent a Planar mode which is a non-directional intra prediction mode. A number 1 may represent a DC mode which is a non-directional intra prediction mode Intra encoding and/or decoding may be performed using a reference sample of neighbor block of a target block. The neighbor block may be a reconstructed neighbor block. The reference sample may mean a neighbor sample.

For example, intra encoding and/or decoding may be performed using the value of a reference sample which are included in are reconstructed neighbor block or the coding parameters of the reconstructed neighbor block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc. Further, the attribute of a prediction block may indicate a coding parameter for the prediction block.

For example, the number of intra-prediction modes may be fixed at N regardless of the size of a prediction block. Alternatively, the number of intra-prediction modes may be, for example, 3, 5, 9, 17, 34, 35, 36, 65, 67 or 95.

The intra-prediction modes may be non-directional modes or directional modes.

For example, the intra-prediction modes may include two non-directional modes and 65 directional modes corresponding to numbers 0 to 66 illustrated in FIG. 7.

For example, the intra-prediction modes may include two non-directional modes and 93 directional modes corresponding to numbers −14 to 80 illustrated in FIG. 7 in a case that a specific intra prediction method is used.

The two non-directional modes may include a DC mode and a planar mode.

A directional mode may be a prediction mode having a specific direction or a specific angle. The directional mode may also be referred to as an "angular mode".

An intra-prediction mode may be represented by at least one of a mode number, a mode value, a mode angle, and a mode direction. In other words, the terms "(mode) number of the intra-prediction mode", "(mode) value of the intra-prediction mode", "(mode) angle of the intra-prediction mode", and "(mode) direction of the intra-prediction mode" may be used to have the same meaning, and may be used interchangeably with each other.

The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size and/or the color component of a block. For example, the number of intra-prediction modes may be fixed at any one of 35 and 67 regardless of the size of a block.

Alternatively, the number of intra-prediction modes may differ depending on the shape, the size and/or the type of the color component of a block.

For example, in FIG. 7, directional prediction modes illustrated as dashed lines may be applied only for a prediction for a non-square block.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 50, prediction may be performed in a vertical direction based on the pixel value of a reference sample. For example, in a horizontal mode having a mode value of 18, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 51, 52, 53, 54, 55, 56, 57, 58, 59, 60, 61, 62, 63, 64, 65, and 66 may be vertical-right modes. Intra-prediction modes in which a mode value is one of 2, 3, 4, 5, 6, 7, 8, 9, 10, 11, 12, 13, 14, 15, 16, and 17 may be horizontal-below modes.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighbor block can be used as reference samples of a target block may be performed. When a sample that cannot be used as a reference sample of the target block is present among samples in the neighbor block, a value generated via copying and/or interpolation that uses at least one sample value, among the samples included in the reconstructed neighbor block, may replace the sample value of the sample that cannot be used as the reference sample. When the value generated via copying and/or interpolation replaces the sample value of the existing sample, the sample may be used as the reference sample of the target block.

When intra prediction is used, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the length of filter tap, the value of a filter coefficient, and filter strength. The length of filter tap may mean the number of filter taps. Also, the number of filter tap may mean the length of the filter.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighbor block adjacent to the target block, and the information used for prediction may be entropy-encoded/decoded.

For example, when the intra-prediction modes of the target block and the neighbor block are identical to each other, it may be signaled, using a predefined flag, that the intra-prediction modes of the target block and the neighbor block are identical.

For example, an indicator for indicating an intra-prediction mode identical to that of the target block, among intra-prediction modes of multiple neighbor blocks, may be signaled.

When the intra-prediction modes of the target block and a neighbor block are different from each other, information about the intra-prediction mode of the target block may be encoded and/or decoded using entropy encoding and/or decoding.

Figure 8:
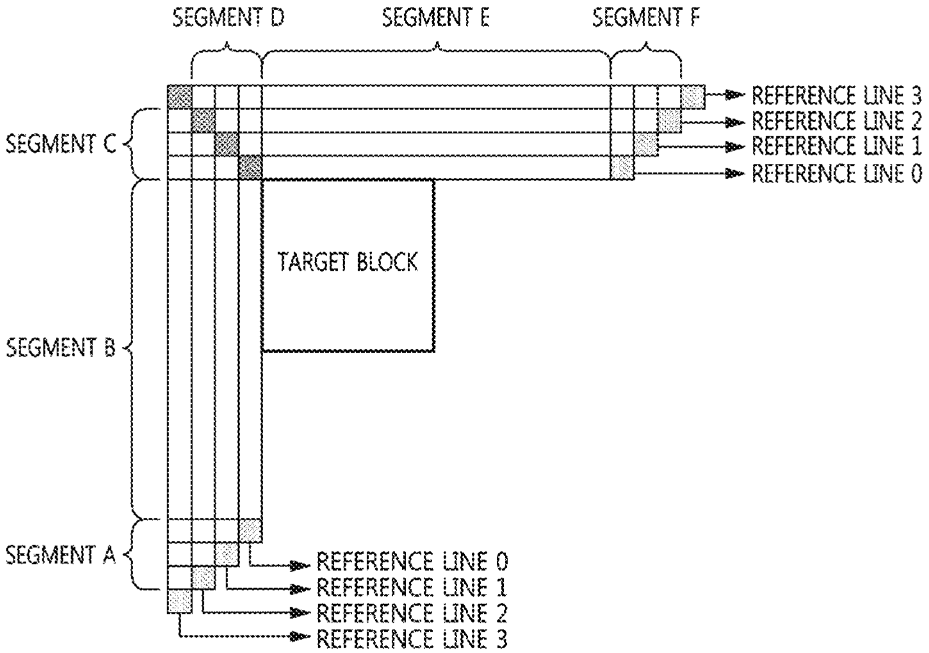
FIG. 8 is a diagram illustrating reference samples used in an intra-prediction procedure.

FIG. 8 is a diagram illustrating reference samples used in an intra-prediction procedure.

Reconstructed reference samples used for intra prediction of the target block may include below-left reference samples, left reference samples, an above-left corner reference sample, above reference samples, and above-right reference samples.

For example, the left reference samples may mean reconstructed reference pixels adjacent to the left side of the target block. The above reference samples may mean reconstructured reference pixels adjacent to the top of the target block. The above-left corner reference sample may mean a reconstructed reference pixel located at the above-left corner of the target block. The below-left reference samples may mean reference samples located below a left sample line composed of the left reference samples, among samples located on the same line as the left sample line. The above-right reference samples may mean reference samples located to the right of an above sample line composed of the above reference samples, among samples located on the same line as the above sample line.

When the size of a target block is N×N, the numbers of the below-left reference samples, the left reference samples, the above reference samples, and the above-right reference samples may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode, the above reference samples may be used for intra prediction. When the intra-prediction mode is the vertical mode, the value of a pixel in the prediction block may be the value of a reference sample vertically located above the location of the pixel. Therefore, the above reference samples adjacent to the top of the target block may be used for intra prediction. Furthermore, the values of pixels in one row of the prediction block may be identical to those of the above reference samples.

In an example, when the intra-prediction mode of a target block is a horizontal mode, the left reference samples may be used for intra prediction. When the intra-prediction mode is the horizontal mode, the value of a pixel in the prediction block may be the value of a reference sample horizontally located left to the location of the pixel. Therefore, the left reference samples adjacent to the left of the target block may be used for intra prediction. Furthermore, the values of pixels in one column of the prediction block may be identical to those of the left reference samples.

In an example, when the mode value of the intra-prediction mode of the current block is 34, at least some of the left reference samples, the above-left corner reference sample, and at least some of the above reference samples may be used for intra prediction. When the mode value of the intra-prediction mode is 34, the value of a pixel in the prediction block may be the value of a reference sample diagonally located at the above-left corner of the pixel.

Further, At least a part of the above-right reference samples may be used for intra prediction in a case that an intra prediction mode of which a mode value is a value ranging from 52 to 66.

Further, At least a part of the below-left reference samples may be used for intra prediction in a case that an intra prediction mode of which a mode value is a value ranging from 2 to 17.

Further, the above-left corner reference sample may be used for intra prediction in a case that an intra prediction mode of which a mode value is a value ranging from 19 to 49.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms “difference”, “error”, and “residual” may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighbor blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

As illustrated in FIG. 8, for intra prediction of a target block, at least one of reference line 0 to reference line 3 may be used.

Each reference line in FIG. 8 may indicate a reference sample line comprising one or more reference samples. As the number of the reference line is lower, a line of reference samples closer to a target block may be indicated.

Samples in segment A and segment F may be acquired through padding that uses samples closest to the target block in segment B and segment E instead of being acquired from reconstructed neighbor blocks.

Index information indicating a reference sample line to be used for intra-prediction of the target block may be signaled. The index information may indicate a reference sample line to be used for intra-prediction of the target block, among multiple reference sample lines. For example, the index information may have a value corresponding to any one of 0 to 3.

When the top boundary of the target block is the boundary of a CTU, only reference sample line 0 may be available. Therefore, in this case, index information may not be signaled. When an additional reference sample line other than reference sample line 0 is used, filtering of a prediction block, which will be described later, may not be performed.

In the case of inter-color intra prediction, a prediction block for a target block of a second color component may be generated based on the corresponding reconstructed block of a first color component.

For example, the first color component may be a luma component, and the second color component may be a chroma component.

In order to perform inter-color intra prediction, parameters for a linear model between the first color component and the second color component may be derived based on a template.

The template may include reference samples above the target block (above reference samples) and/or reference samples to the left of the target block (left reference samples), and may include above reference samples and/or left reference samples of a reconstructed block of the first color component, which correspond to the reference samples.

For example, parameters for a linear model may be derived using 1) the value of the sample of a first color component having the maximum value, among the samples in the template, 2) the value of the sample of a second color component corresponding to the sample of the first color component, 3) the value of the sample of a first color component having the minimum value, among the samples in the template, and 4) the value of the sample of a second color component corresponding to the sample of the first color component.

When the parameters for the linear model are derived, a prediction block for the target block may be generated by applying the corresponding reconstructed block to the linear model.

Depending on the image format, sub-sampling may be performed on samples adjacent to the reconstructed block of the first color component and the corresponding reconstructed block of the first color component. For example, when one sample of the second color component corresponds to four samples of the first color component, one corresponding sample may be calculated by performing sub-sampling on the four samples of the first color component. When sub-sampling is performed, derivation of the parameters for the linear model and inter-color intra prediction may be performed based on the sub-sampled corresponding sample.

Information about whether inter-color intra prediction is performed and/or the range of the template may be signaled in an intra-prediction mode.

The target block may be partitioned into two or four sub-blocks in a horizontal direction and/or a vertical direction.

The sub-blocks resulting from the partitioning may be sequentially reconstructed. That is, as intra-prediction is performed on each sub-block, a sub-prediction block for the sub-block may be generated. Also, as dequantization (inverse quantization) and/or an inverse transform are performed on each sub-block, a sub-residual block for the corresponding sub-block may be generated. A reconstructed sub-block may be generated by adding the sub-prediction block to the sub-residual block. The reconstructed sub-block may be used as a reference sample for intra prediction of the sub-block having the next priority.

A sub-block may be a block including a specific number (e.g., 16) of samples or more. For example, when the target block is an 8×4 block or a 4×8 block, the target block may be partitioned into two sub-blocks. Also, when the target block is a 4×4 block, the target block cannot be partitioned into sub-blocks. When the target block has another size, the target block may be partitioned into four sub-blocks.

Information about whether intra prediction based on such sub-blocks is performed and/or information about a partition direction (horizontal direction or vertical direction) may be signaled.

Such sub-block-based intra prediction may be limited such that it is performed only when reference sample line 0 is used. When sub-block-based intra-prediction is performed, filtering of a prediction block, which will be described below, may not be performed.

A final prediction block may be generated by performing filtering on the prediction block generated via intra prediction.

Filtering may be performed by applying specific weights to a filtering target sample, which is the target to be filtered, a left reference sample, an above reference sample, and/or an above-left reference sample.

The weights and/or reference samples (e.g., the range of reference samples, the locations of the reference samples, etc.) used for filtering may be determined based on at least one of a block size, an intra-prediction mode, and the location of the filtering target sample in a prediction block.

For example, filtering may be performed only in a specific intra-prediction mode (e.g., DC mode, planar mode, vertical mode, horizontal mode, diagonal mode and/or adjacent diagonal mode).

The adjacent diagonal mode may be a mode having a number obtained by adding k to the number of the diagonal mode, and may be a mode having a number obtained by subtracting k from the number of the diagonal mode. In other words, the number of the adjacent diagonal mode may be the sum of the number of the diagonal mode and k, or may be the difference between the number of the diagonal mode and k. For example, k may be a positive integer of 8 or less.

The intra-prediction mode of a target block may be derived using the intra-prediction mode of a neighboring block present around the target block, and such a derived intra-prediction mode may be entropy-encoded and/or entropy-decoded.

For example, when the intra-prediction mode of the target block is identical to the intra-prediction mode of the neighbor block, information indicating that the intra-prediction mode of the target block is identical to the intra-prediction mode of the neighbor block may be signaled using specific flag information.

Further, for example, indicator information for a neighbor block having an intra-prediction mode identical to the intra-prediction mode of the target block, among intra-prediction modes of multiple neighbor blocks, may be signaled.

For example, when the intra-prediction mode of the target block is different from the intra-prediction mode of the neighbor block, entropy encoding and/or entropy decoding may be performed on information about the intra-prediction mode of the target block by performing entropy encoding and/or entropy decoding based on the intra-prediction mode of the neighbor block.

Figure 9:
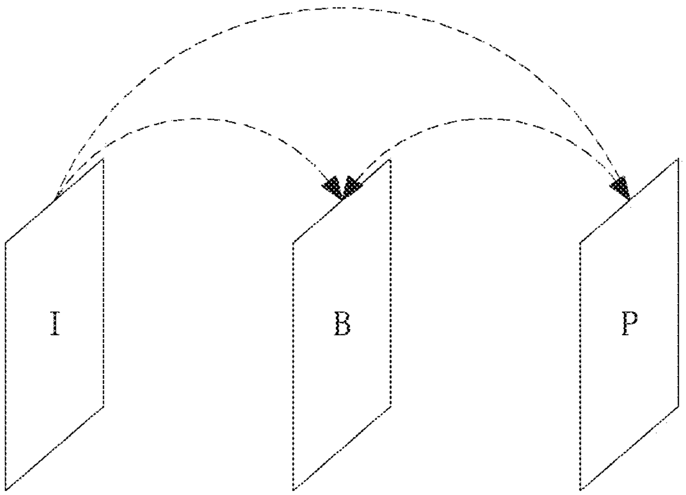
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. An arrow pointing from a first picture to a second picture means that the second picture refers to the first picture. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction or a motion compensation may be performed using a reference image and motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighbor block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighbor block that is horizontally adjacent to the target block, or a block horizontally adjacent to a neighbor block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture.

The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+ (nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first temporal distance to a second temporal distance. The first temporal distance may be the distance between the reference picture and the target picture of the target block. The second temporal distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a merge mode with a motion vector difference, a sub block merge mode, a triangle partition mode, an inter-intra combined prediction mode, an affine inter mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighbor region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighbor block. In other words, the motion vector of the reconstructed neighbor block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The encoding apparatus 100 may generate an entropy-encoded prediction motion vector index by applying entropy encoding to a prediction motion vector index, and may generate a bitstream including the entropy-encoded prediction motion vector index. The entropy-encoded prediction motion vector index may be signaled from the encoding apparatus 100 to the decoding apparatus 200 through a bitstream. The decoding apparatus 200 may extract the entropy-encoded prediction motion vector index from the bitstream, and may acquire the prediction motion vector index by applying entropy decoding to the entropy-encoded prediction motion vector index.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

A Motion Vector Difference (MVD) may be the difference between the motion vector of the target block and the prediction motion vector. The encoding apparatus 100 may calculate the MVD, and may generate an entropy-encoded MVD by applying entropy encoding to the MVD. The encoding apparatus 100 may generate a bitstream including the entropy-encoded MVD.

The MVD may be transmitted from the encoding apparatus 100 to the decoding apparatus 200 through the bitstream. The decoding apparatus 200 may extract the entropy-encoded MVD from the bitstream, and may acquire the MVD by applying entropy decoding to the entropy-encoded MVD.

The decoding apparatus 200 may derive the motion vector of the target block by summing the MVD and the prediction motion vector. In other words, the motion vector of the target block derived by the decoding apparatus 200 may be the sum of the MVD and the motion vector candidate.

Also, the encoding apparatus 100 may generate entropy-encoded MVD resolution information by applying entropy encoding to calculated MVD resolution information, and may generate a bitstream including the entropy-encoded MVD resolution information. The decoding apparatus 200 may extract the entropy-encoded MVD resolution information from the bitstream, and may acquire MVD resolution information by applying entropy decoding to the entropy-encoded MVD resolution information. The decoding apparatus 200 may adjust the resolution of the MVD using the MVD resolution information.

Meanwhile, the encoding apparatus 100 may calculate an MVD based on an affine model. The decoding apparatus 200 may derive the affine control motion vector of the target block through the sum of the MVD and an affine control motion vector candidate, and may derive the motion vector of a sub-block using the affine control motion vector.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture that is used for prediction of the target block, among reference pictures present in a reference picture list. The encoding apparatus 100 may generate an entropy-encoded reference picture index by applying entropy encoding to the reference picture index, and may generate a bitstream including the entropy-encoded reference picture index. The entropy-encoded reference picture index may be signaled from the encoding apparatus 100 to the decoding apparatus 200 through the bitstream. The decoding apparatus 200 may extract the entropy-encoded reference picture index from the bitstream, and may acquire the reference picture index by applying entropy decoding to the entropy-encoded reference picture index.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighbor blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighbor blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighbor units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighbor block.

When a merge mode is used, the encoding apparatus 100 may predict the motion information of a target block using the motion information of a spatial candidate and/or the motion information of a temporal candidate. The spatial candidate may include a reconstructed spatial neighbor block that is spatially adjacent to the target block. The spatial neighbor block may include a left neighbor block and an above neighbor block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional. The reference direction may mean a inter prediction indicator.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. In other words, the merge candidates list may comprise motion information of a temporal candidates and/or spatial candidates, etc.

Further, the merge candidate list may include new merge candidates generated by a combination of merge candidates that are already present in the merge candidate list. In other words, the merge candidate list may include new motion information generated by a combination of pieces of motion information previously present in the merge candidate list.

Also, a merge candidate list may include history-based merge candidates. The history-based merge candidates may be the motion information of a block which is encoded and/or decoded prior to a target block.

Also, a merge candidate list may include a merge candidate based on an average of two merge candidates.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list.

For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100. The decoding apparatus 200 may extract entropy-encoded inter-prediction information from the bitstream, and may acquire inter-prediction information by applying entropy decoding to the entropy-encoded inter-prediction information.

The decoding apparatus 200 may perform inter prediction on the target block using the inter-prediction information of the bitstream.

The inter-prediction information may contain 1) mode information indicating whether a merge mode is used, 2) a merge index and 3) correction information.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighbor blocks spatially or temporally adjacent to the target block.

The encoding apparatus 100 may select a merge candidate having the highest encoding performance among the merge candidates included in the merge candidate list and set a value of the merge index to indicate the selected merge candidate.

Correction information may be information used to correct a motion vector. The encoding apparatus 100 may generate correction information. The decoding apparatus 200 may correct the motion vector of a merge candidate selected by a merge index based on the correction information.

The correction information may include at least one of information indicating whether correction is to be performed, correction direction information, and correction size information. A prediction mode in which the motion vector is corrected based on the signaled correction information may be referred to as a "merge mode having a motion vector difference".

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be the same as a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream. The decoding apparatus 200 may extract entropy-encoded information from the bitstream, and may acquire information by applying entropy decoding to the entropy-encoded information.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVD, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the target picture exists at an arbitrary location in the reference picture list, an additional reference picture index indicating such an arbitrary location may be signaled by the encoding apparatus 100 to the decoding apparatus 200.

5) Subblock Merge Mode

A sub-block merge mode may be a mode in which motion information is derived from the sub-block of a CU.

When the subblock merge mode is applied, a subblock merge candidate list may be generated using the motion information of a co-located subblock (col-subblock) of a target subblock (i.e., a subblock-based temporal merge candidate) in a reference image and/or an affine control point motion vector merge candidate.

6) Triangle Partition Mode

In a triangle partition mode, a target block may be partitioned in a diagonal direction, and sub-target blocks resulting from partitioning may be generated. For each sub-target block, motion information of the corresponding sub-target block may be derived, and a prediction sample for each sub-target block may be derived using the derived motion information. A prediction sample for the target block may be derived through a weighted sum of the prediction samples for the sub-target blocks resulting from the partitioning.

7) Combination Inter-Intra Prediction Mode

The combination inter-intra prediction mode may be a mode in which a prediction sample for a target block is derived using a weighted sum of a prediction sample generated via inter-prediction and a prediction sample generated via intra-prediction.

In the above-described modes, the decoding apparatus 200 may autonomously correct derived motion information. For example, the decoding apparatus 200 may search a specific area for motion information having the minimum sum of Absolute Differences (SAD) based on a reference block indicated by the derived motion information, and may derive the found motion information as corrected motion information.

In the above-described modes, the decoding apparatus 200 may compensate for the prediction sample derived via inter prediction using an optical flow.

In the above-described AMVP mode, merge mode, skip mode, etc., motion information to be used for prediction of the target block may be specified among pieces of motion information in a list using the index information of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
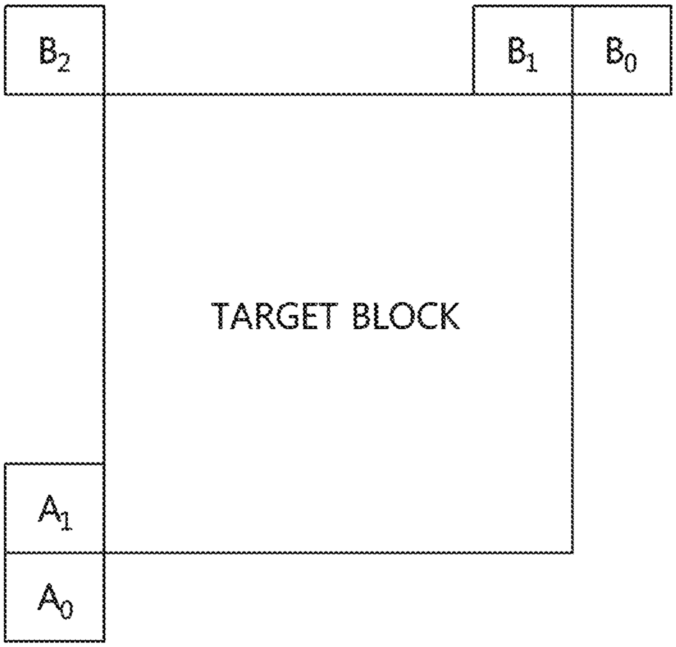
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH−1).

Spatial candidate $B_0$ may be a block adjacent to the above-right corner of the target block. $B_0$ may be a block that occupies pixels located at coordinates (xP+nPSW, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW−1, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
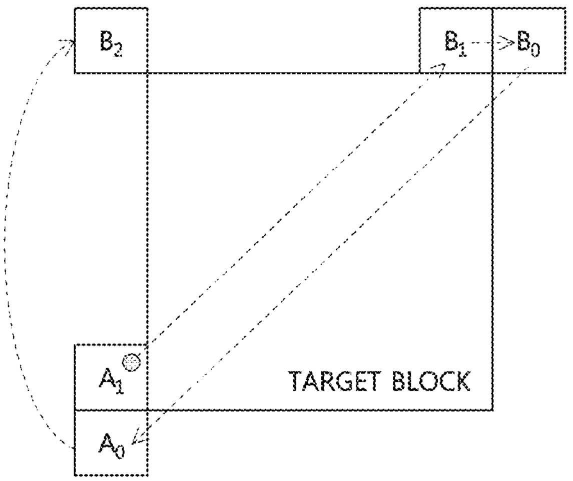
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1$, $B_1$, $B_0$, $A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
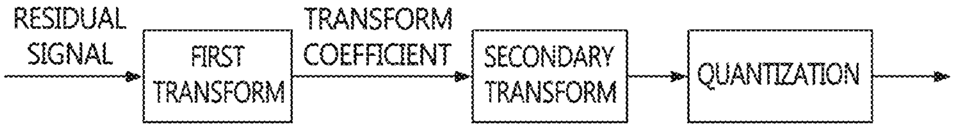
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in each of the following Table 3 and the following table 4.

TABLE 3

| Transform set | Transform candidates |
|---|---|
| 0 | DST-VII, DCT-VIII |
| 1 | DST-VII, DST-I |
| 2 | DST-VII, DCT-V |

TABLE 4

| Transform set | Transform candidates |
|---|---|
| 0 | DST-VII, DCT-VIII, DST-I |
| 1 | DST-VII, DST-I, DCT-VIII |
| 2 | DST-VII, DCT-V, DST-I |

As shown in Table 3 and Table 4, when a DCT type or a DST type to be used for a transform is derived, transform sets may be used. Each transform set may include multiple transform candidates. Each transform candidate may be a DCT type or a DST type.

The following Table 5 shows examples of a transform set to be applied to a horizontal direction and a transform set to be applied to a vertical direction depending on intra-prediction modes.

TABLE 5

| | Intra-prediction mode | | | | | | | | | |
|---|---|---|---|---|---|---|---|---|---|---|
| | 0 | 1 | 2 | 3 | 4 | 5 | 6 | 7 | 8 | 9 |
| Vertical transform set | 2 | 1 | 0 | 1 | 0 | 1 | 0 | 1 | 0 | 1 |
| Horizontal transform set | 2 | 1 | 0 | 1 | 0 | 1 | 0 | 1 | 0 | 1 |

| | Intra-prediction mode | | | | | | | | | |
|---|---|---|---|---|---|---|---|---|---|---|
| | 10 | 11 | 12 | 13 | 14 | 15 | 16 | 17 | 18 | 19 |
| Vertical transform set | 0 | 1 | 0 | 1 | 0 | 0 | 0 | 0 | 0 | 0 |
| Horizontal transform set | 0 | 1 | 0 | 1 | 2 | 2 | 2 | 2 | 2 | 2 |

| | Intra-prediction mode | | | | | | | | | |
|---|---|---|---|---|---|---|---|---|---|---|
| | 20 | 21 | 22 | 23 | 24 | 25 | 26 | 27 | 28 | 29 |
| Vertical transform set | 0 | 0 | 0 | 1 | 0 | 1 | 0 | 1 | 0 | 1 |
| Horizontal transform set | 2 | 2 | 2 | 1 | 0 | 1 | 0 | 1 | 0 | 1 |

| | Intra-prediction mode | | | | | | | | | |
|---|---|---|---|---|---|---|---|---|---|---|
| | 30 | 31 | 32 | 33 | 34 | 35 | 36 | 37 | 38 | 39 |
| Vertical transform set | 0 | 1 | 0 | 1 | 0 | 1 | 0 | 1 | 0 | 1 |
| Horizontal transform set | 0 | 1 | 0 | 1 | 0 | 1 | 0 | 1 | 0 | 1 |

| | Intra-prediction mode | | | | | | | | | |
|---|---|---|---|---|---|---|---|---|---|---|
| | 40 | 41 | 42 | 43 | 44 | 45 | 46 | 47 | 48 | 49 |
| Vertical transform set | 0 | 1 | 0 | 1 | 0 | 1 | 2 | 2 | 2 | 2 |
| Horizontal transform set | 0 | 1 | 0 | 1 | 0 | 1 | 0 | 0 | 0 | 0 |

TABLE 5-continued

| | Intra-prediction mode | | | | | | | | | |
|---|---|---|---|---|---|---|---|---|---|---|
| | 50 | 51 | 52 | 53 | 54 | 55 | 56 | 57 | 58 | 59 |
| Vertical transform set | 2 | 2 | 2 | 2 | 2 | 1 | 0 | 1 | 0 | 1 |
| Horizontal transform set | 0 | 0 | 0 | 0 | 0 | 1 | 0 | 1 | 0 | 1 |

| | Intra-prediction mode | | | | | | |
|---|---|---|---|---|---|---|---|
| | 60 | 61 | 62 | 63 | 64 | 65 | 66 |
| Vertical transform set | 0 | 1 | 0 | 1 | 0 | 1 | 0 |
| Horizontal transform set | 0 | 1 | 0 | 1 | 0 | 1 | 0 |

In Table 5, numbers of vertical transform sets and horizontal transform sets that are to be applied to the horizontal direction of a residual signal depending on the intra-prediction modes of the target block are indicated.

As exemplified in FIGS. 4 and 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

For example, when the size of the target block is 64×64 or less, transform sets, each having three transforms, may be configured depending on the intra-prediction mode. An optimal transform method may be selected from among a total of nine multiple transform methods resulting from combinations of three transforms in a horizontal direction and three transforms in a vertical direction. Through such an optimal transform method, the residual signal may be encoded and/or decoded, and thus coding efficiency may be improved.

Here, information indicating which one of transforms belonging to each transform set has been used for at least one of a vertical transform and a horizontal transform may be entropy-encoded and/or -decoded. Here, truncated unary binarization may be used to encode and/or decode such information.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme".

AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

Further, a first transform may be a transform having various transform types depending on a kernel function that defines a Discrete Cosine Transform (DCT) or a Discrete Sine Transform (DST).

For example, the transform type may be determined based at least one of 1) a prediction mode of a target block (for example, one of an intra prediction and an inter prediction), 2) a size of a target block, 3) a shape of a target block, 4) an intra prediction mode of a target block, 5) a component of a target block (for example, one of a luma component an a chroma component), and 6) a partitioning type applied to a target block (for example, one of a Quad Tree, a Binary Tree and a Ternary Tree).

For example, the first transform may include transforms, such as DCT-2, DCT-5, DCT-7, DST-7, DST-1, DST-8, and DCT-8 depending on the transform kernel presented in the following Table 6. In the following Table 6, various transform types and transform kernel functions for Multiple Transform Selection (MTS) are exemplified.

MTS may refer to the selection of combinations of one or more DCT and/or DST kernels so as to transform a residual signal in a horizontal and/or vertical direction.

TABLE 6

| Transfor m type | Transform kernel function $T_i(j)$ |
|---|---|
| DCT-2 | $T_i(j) = \omega_0 \cdot \sqrt{\frac{2}{N}} \cdot \cos\left(\frac{\pi \cdot i \cdot (2j+1)}{2N}\right)$ where $\omega_0 = \sqrt{\frac{2}{N}}$ $(i = 0)$ or 1 (otherwise) |
| DST-7 | $T_i(j) = \sqrt{\frac{4}{2N+1}} \cdot \sin\left(\frac{\pi \cdot (2j+1) \cdot (j+1)}{2N+1}\right)$ |
| DCT-5 | $T_i(j) = \omega_0 \cdot \omega_1 \cdot \sqrt{\frac{2}{2N-1}} \cdot \cos\left(\frac{2\ \pi i \cdot j}{2N+1}\right)$ where $\omega_{0/1} = \sqrt{\frac{2}{N}}$ $(i$ or $j = 0)$ or 1 (otherwise) |
| DCT-8 | $T_i(j) = \sqrt{\frac{4}{2N+1}} \cdot \cos\left(\frac{\pi \cdot (2j+1) \cdot (2j+1)}{4N+2}\right)$ |
| DST-1 | $T_i(j) = \sqrt{\frac{2}{N+1}} \cdot \sin\left(\frac{\pi \cdot (i+1) \cdot (j+1)}{N+1}\right)$ |

In Table 6, i and j may be integer values that are equal to or greater than 0 and are less than or equal to N−1.

The secondary transform may be performed on the transform coefficient generated by performing the first transform.

As in the first transform, transform sets may also be defined in a secondary transform. The methods for deriving and/or determining the above-described transform sets may be applied not only to the first transform but also to the secondary transform.

The first transform and the secondary transform may be determined for a specific target.

For example, a first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighbor block. For example, whether to apply the first transform and/or the secondary transform may be determined depending on the size and/or shape of the target block.

In the encoding apparatus 100 and the decoding apparatus 200, transform information indicating the transform method to be used for the target may be derived by utilizing specified information.

For example, the transform information may include a transform index to be used for a primary transform and/or a secondary transform. Alternatively, the transform information may indicate that a primary transform and/or a secondary transform are not used.

For example, when the target of a primary transform and a secondary transform is a target block, the transform method(s) to be applied to the primary transform and/or the secondary transform indicated by the transform information may be determined depending on at least one of coding parameters for the target block and/or blocks neighbor the target block.

Alternatively, transform information indicating a transform method for a specific target may be signaled from the encoding apparatus 100 to the decoding apparatus 200.

For example, for a single CU, whether to use a primary transform, an index indicating the primary transform, whether to use a secondary transform, and an index indicating the secondary transform may be derived as the transform information by the decoding apparatus 200. Alternatively, for a single CU, the transform information, which indicates whether to use a primary transform, an index indicating the primary transform, whether to use a secondary transform, and an index indicating the secondary transform, may be signaled.

The quantized transform coefficient (i.e. the quantized levels) may be generated by performing quantization on the result, generated by performing the first transform and/or the secondary transform, or on the residual signal.

Figure 13:
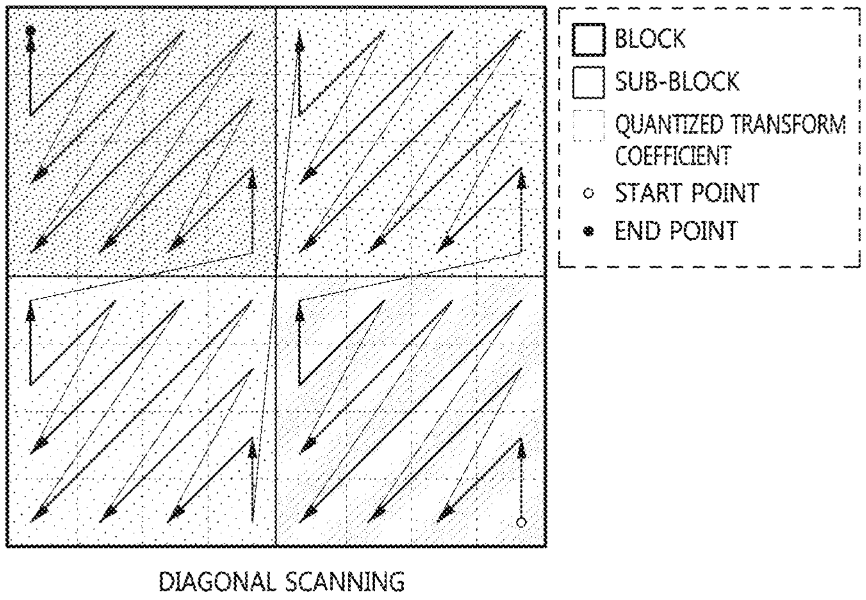
FIG. 13 illustrates diagonal scanning according to an example.

FIG. 13 illustrates diagonal scanning according to an example.

Figure 14:
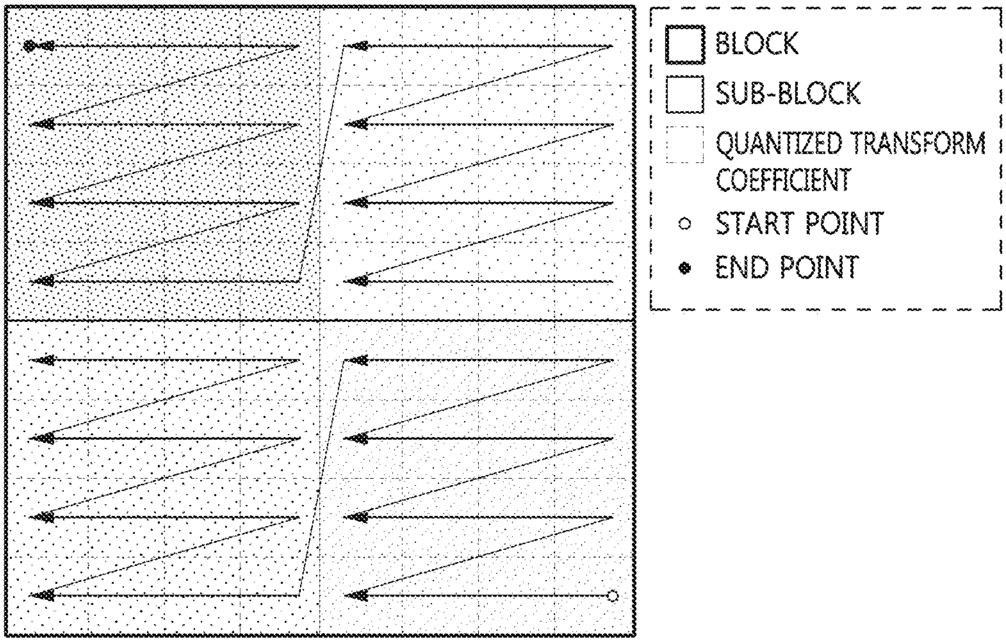
FIG. 14 illustrates horizontal scanning according to an example.

FIG. 14 illustrates horizontal scanning according to an example.

Figure 15:
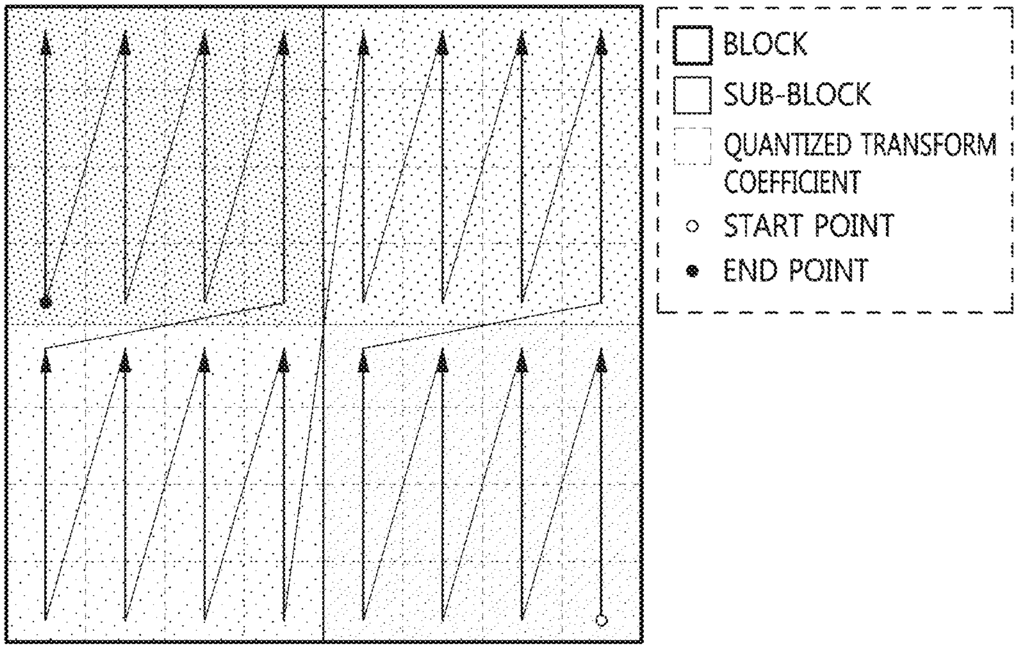
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG.

15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a first transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The encoding apparatus 100 may generate entropy-encoded quantized transform coefficients by performing entropy encoding on scanned quantized transform coefficients, and may generate a bitstream including the entropy-encoded quantized transform coefficients.

The decoding apparatus 200 may extract the entropy-encoded quantized transform coefficients from the bitstream, and may generate quantized transform coefficients by performing entropy decoding on the entropy-encoded quantized transform coefficients. The quantized transform coefficients may be aligned in the form of a 2D block via inverse scanning. Here, as the method of inverse scanning, at least one of up-right diagonal scanning, vertical scanning, and horizontal scanning may be performed.

In the decoding apparatus 200, dequantization may be performed on the quantized transform coefficients. A secondary inverse transform may be performed on the result generated by performing dequantization depending on whether to perform the secondary inverse transform. Further, a first inverse transform may be performed on the result generated by performing the secondary inverse transform depending on whether the first inverse transform is to be performed. A reconstructed residual signal may be generated by performing the first inverse transform on the result generated by performing the secondary inverse transform.

For a luma component which is reconstructed via intra prediction or inter prediction, inverse mapping having a dynamic range may be performed before in-loop filtering.

The dynamic range may be divided into 16 equal pieces, and mapping functions for respective pieces may be signaled. Such a mapping function may be signaled at a slice level or a tile group level.

An inverse mapping function for performing inverse mapping may be derived based on the mapping function.

In-loop filtering, the storage of a reference picture, and motion compensation may be performed in an inverse mapping area.

A prediction block generated via inter prediction may be changed to a mapped area through mapping using a mapping function, and the changed prediction block may be used to generate a reconstructed block. However, since intra prediction is performed in the mapped area, a prediction block generated via intra prediction may be used to generate a reconstructed block without requiring mapping and/or inverse mapping.

For example, when the target block is a residual block of a chroma component, the residual block may be changed to an inversely mapped area by scaling the chroma component of the mapped area.

Whether scaling is available may be signaled at a slice level or a tile group level.

For example, scaling may be applied only to the case where mapping is available for a luma component and where the partitioning of the luma component and the partitioning of the chroma component follow the same tree structure.

Scaling may be performed based on the average of the values of samples in a luma prediction block, which corresponds to a chroma prediction block. Here, when the target block uses inter prediction, the luma prediction block may mean a mapped luma prediction block.

A value required for scaling may be derived by referring to a look-up table using the index of a piece to which the average of sample values of the luma prediction block belongs.

The residual block may be changed to an inversely mapped area by scaling the residual block using a finally derived value. Thereafter, for the block of a chroma component, reconstruction, intra prediction, inter prediction, in-loop filtering, and the storage of a reference picture may be performed in the inversely mapped area.

For example, information indicating whether the mapping and/or inverse mapping of a luma component and a chroma component are available may be signaled through a sequence parameter set.

A prediction block for the target block may be generated based on a block vector. The block vector may indicate displacement between the target block and a reference block. The reference block may be a block in a target image.

In this way, a prediction mode in which the prediction block is generated by referring to the target image may be referred to as an "Intra-Block Copy (IBC) mode".

An IBC mode may be applied to a CU having a specific size. For example, the IBC mode may be applied to an M×N CU. Here, M and N may be less than or equal to 64.

The IBC mode may include a skip mode, a merge mode, an AMVP mode, etc. In the case of the skip mode or the merge mode, a merge candidate list may be configured, and a merge index is signaled, and thus a single merge candidate may be specified among merge candidates present in the merge candidate list. The block vector of the specified merge candidate may be used as the block vector of the target block.

In the case of the AMVP mode, a differential block vector may be signaled. Also, a prediction block vector may be derived from the left neighbor block and the above neighbor block of the target block. Further, an index indicating which neighbor block is to be used may be signaled.

A prediction block in the IBC mode may be included in a target CTU or a left CTU, and may be limited to a block within a previously reconstructed area. For example, the value of a block vector may be limited so that a prediction block for a target block is located in a specific area. The specific area may be an area defined by three 64×64 blocks that are encoded and/or decoded prior to a 64×64 block including the target block. The value of the block vector is limited in this way, and thus memory consumption and device complexity caused by the implementation of the IBC mode may be decreased.

Figure 16:
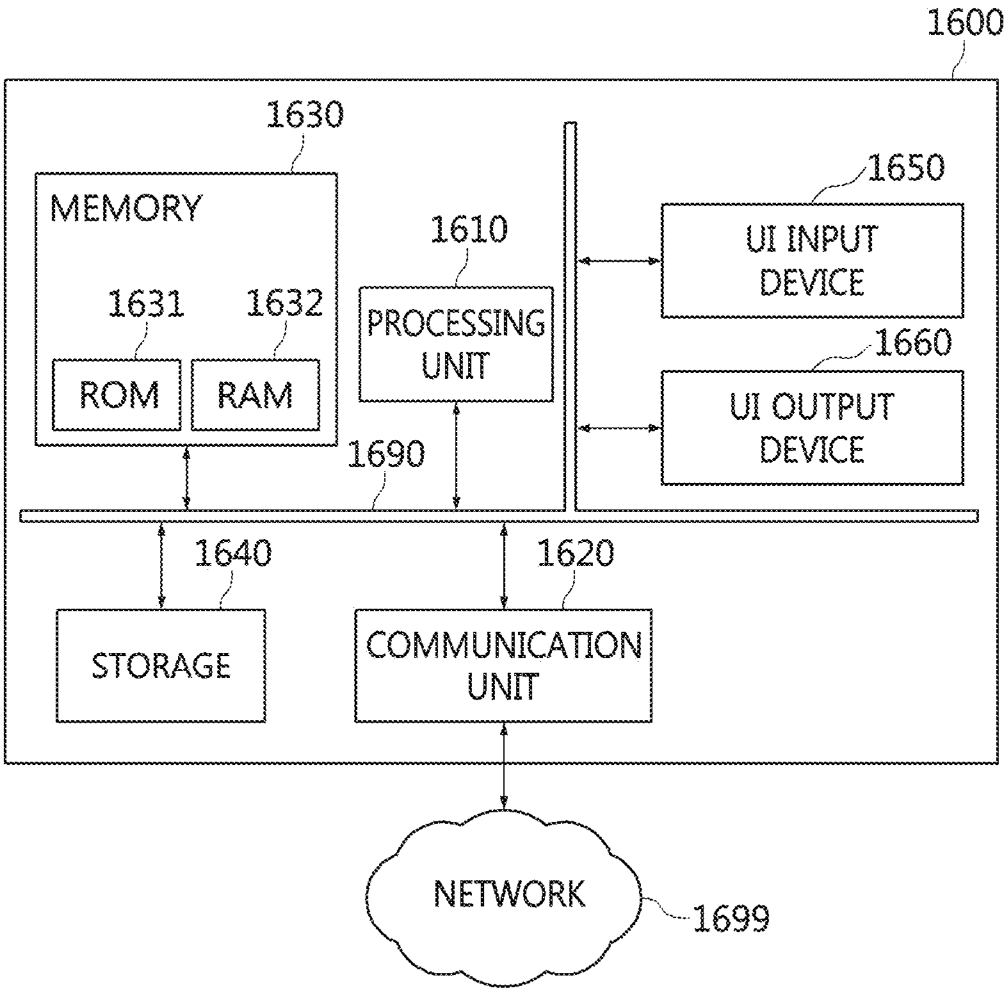
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640. Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1620.

For example, the communication unit 1620 may transmit a bitstream to a decoding apparatus 1600, which will be described later.

Figure 17:
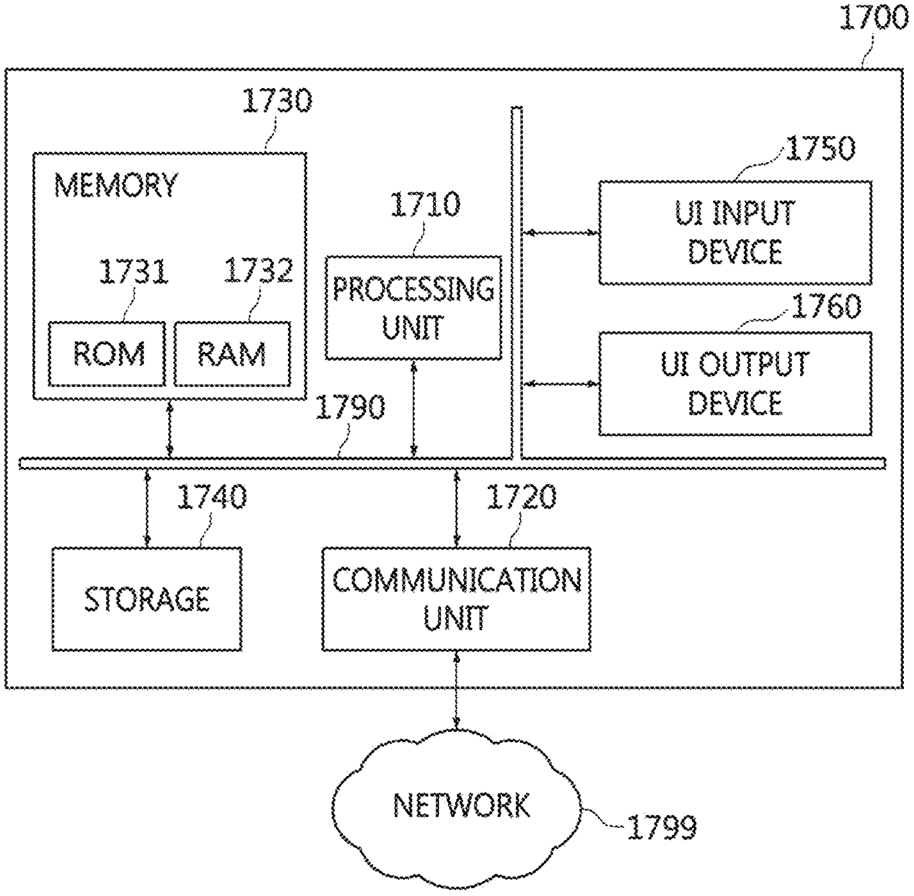
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1799.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740. Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1700.

Hereinafter, a processing unit may represent the processing unit 1610 of the encoding apparatus 1600 and/or the processing unit 1710 of the decoding apparatus 1700. For example, as to functions relating to prediction, the processing unit may represent the switch 115 and/or the switch 245. As to functions relating to inter prediction, the processing unit may represent the inter-prediction unit 110, the subtractor 125 and the adder 175, and may represent the inter prediction unit 250 and the adder 255. As to functions relating to intra prediction, the processing unit may represent the intra prediction unit 120, the subtractor 125, and the adder 175, and may represent the intra prediction unit 240 and the adder 255. As to functions related to transform, the processing unit may represent the transform unit 130 and the inverse transform unit 170, and may represent the inverse transform unit 230. As to functions relating quantization, the processing unit may represent the quantization unit 140 and the inverse quantization unit 160, and may indicate the inverse quantization unit 220. As to functions relating to entropy encoding and/or entropy decoding, the processing unit may represent the entropy encoding unit 150 and/or the entropy decoding unit 210. As to functions relating filtering, the processing unit may represent the filter unit 180 and/or the filter unit 260. As to functions relating a reference picture, the processing unit may indicate the reference picture buffer 190 and/or the reference picture buffer 270.

Figure 18:
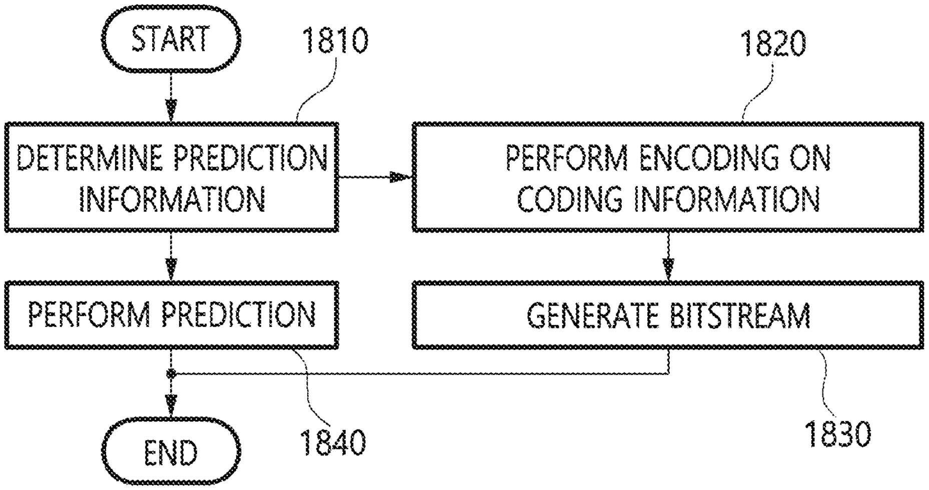
FIG. 18 is a flowchart illustrating a target block prediction method and a bitstream generation method according to an embodiment.

FIG. 18 is a flowchart illustrating a target block prediction method and a bitstream generation method according to an embodiment.

The target block prediction method and the bitstream generation method according to the embodiment may be performed by the encoding apparatus 1600. The embodiment may be a part of a target block encoding method or a video encoding method.

Prediction may be one of prediction methods described above in embodiments. For example, prediction may be inter-prediction or intra-prediction.

At step 1810, the processing unit 1610 may determine prediction information to be used for the encoding of the target block.

The prediction information may include information used for prediction, described in embodiments.

For example, the prediction information may include inter-prediction information. For example, the prediction information may include intra-prediction information.

At step 1820, encoded coding information may be generated by performing encoding on the coding information.

The coding information may refer to signaled/encoded/decoded information, described in embodiments. In other words, the coding information may be information that is used to allow the decoding apparatus 1700 to perform prediction corresponding to prediction performed by the encoding apparatus 1600.

The coding information may comprise syntax elements described in embodiments.

At step 1830, the processing unit 1610 may generate a bitstream.

The bitstream may include information about the target block. Also, the bitstream may include the information, described above in the embodiments.

For example, the bitstream may include either the encoded coding information or the coding information.

For example, the bitstream may include coding parameters related to the target block and/or the attributes of the target block.

The information included in the bitstream may be generated at step 1820, or may be at least partially generated at steps 1810 and 1820.

The processing unit 1610 may store the generated bitstream in the storage 1640. Alternatively, the communication unit 1620 may transmit the bitstream to the decoding apparatus 1700.

The bitstream may include the encoded information about the target block. The processing unit 1610 may generate the encoded information about the target block by performing entropy encoding on the information about the target block.

At step 1840, the processing unit 1610 may perform prediction for the target block using the information about the target block and the prediction information.

The processing unit 1610 may use the coding information when performing prediction for the target block. Alternatively, the coding information may be generated to correspond to information used in prediction for the target block.

A prediction block may be generated by prediction for the target block. A residual block that is the difference between the target block and the prediction block may be generated. The information about the target block may be generated by applying transform and quantization to the residual block.

The information about the target block may include transformed and quantized coefficients for the target block. A reconstructed residual block may be generated by applying dequantization and inverse transform to the transformed and quantized coefficients for the target block. A reconstructed block that is the sum of the prediction block and the reconstructed residual block may be generated.

In the embodiments, the terms "reconstructed", "reconstructed", and "reconstruction" may be used to have the same meaning, and may be used interchangeably with each other.

Figure 19:
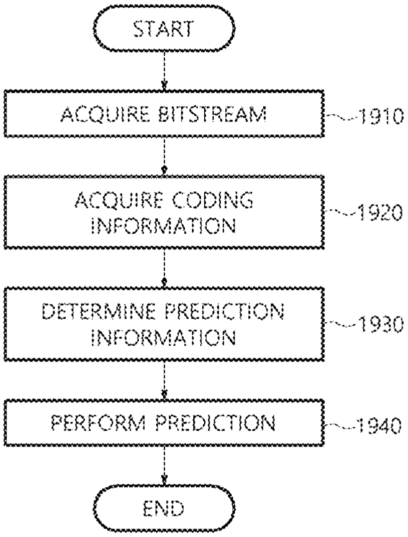
FIG. 19 is a flowchart illustrating a target block prediction method using a bitstream according to an embodiment.

FIG. 19 is a flowchart illustrating a target block prediction method using a bitstream according to an embodiment.

The target block prediction method using a bitstream according to the embodiment may be performed by the decoding apparatus 1700. The embodiment may be a part of a target block decoding method or a video decoding method.

Prediction may be one of prediction methods, described above in embodiments. For example, second prediction may be inter-prediction or intra-prediction.

At step 1910, the communication unit 1720 may acquire a bitstream. The communication unit 1720 may receive the bitstream from the encoding apparatus 1600. The processing unit 1710 may store the acquired bitstream in the storage 1740.

The processing unit 1710 may read the bitstream from the storage 1740.

The bitstream may include information about a target block.

The information about the target block may include transformed and quantized coefficients for the target block.

Also, the bitstream may include the information, described above in the embodiments.

For example, the bitstream may include either encoded coding information or coding information.

For example, the bitstream may include coding parameters related to the target block and/or the attributes of the target block.

A computer-readable storage medium may include the bitstream, and prediction and decoding for the target block may be performed using the information about the target block included in the bitstream.

The computer-readable storage medium may be a non-transitory computer-readable storage medium.

The bitstream may include the encoded information about the target block. The processing unit 1710 may generate information about the target block by performing entropy decoding on the encoded information about the target block.

At step 1920, the processing unit 1710 may acquire coding information from the bitstream.

The processing unit 1710 may generate coding information by performing decoding on the encoded coding information of the bitstream.

The coding information may refer to signaled/encoded/decoded information, described in embodiments. In other words, the coding information may be information that is used to allow the decoding apparatus 1700 to perform prediction corresponding to prediction performed by the encoding apparatus 1600.

The coding information may comprise syntax elements described in embodiments.

At step 1930, the processing unit 1710 may determine prediction information to be used for the decoding of the target block.

The prediction information may include information used for prediction, described in embodiments.

The prediction information in the decoding apparatus 1700 may be identical to the prediction information in the encoding apparatus 1600. In other words, the processing unit 1710 may generate prediction information identical to the prediction information used at step 1840 so as to perform the same prediction as that performed at step 1840.

The processing unit 1710 may determine the prediction information using the methods used in embodiments.

The processing unit 1710 may determine the prediction information for the target block based on prediction method-related information acquired from the bitstream.

The prediction information may include inter-prediction information. The prediction information may include intra-prediction information.

At step 1940, the processing unit 1710 may perform prediction for the target block using the information about the target block and the prediction information.

The processing unit 1710 may use the coding information when performing prediction for the target block. A prediction block may be generated by prediction for the target block.

The information about the target block may include transformed and quantized coefficients for the target block. A reconstructed residual block may be generated by applying dequantization and inverse transform to the transformed and quantized coefficients for the target block. A reconstructed block that is the sum of the prediction block and the reconstructed residual block may be generated.

Terms of Invention

Neighbor block: A neighbor block may be a block adjacent to a target block. A neighbor block may include a spatial neighbor block and a temporal neighbor block. A neighbor block may also refer to a reconstructed neighbor block in a reference image. A neighbor block does not necessarily have to come into contact with the target block.

Spatial neighbor block: A spatial neighbor block may be a block spatially adjacent to the target block.

The target block and the spatial neighbor block may be included in a target image.

A spatial neighbor block may include a block, at least a part of the boundary of which comes into contact with at least a part of the boundary of the target block. Alternatively, a spatial neighbor block may include a block to which the distance from the target block is less than or equal to a reference value.

A spatial neighbor block may include a block diagonally adjacent to the vertex of the target block.

A spatial neighbor block may include a left-above block adjacent to the top-left of the target block, an above block adjacent to the top of the target block, a right-above block adjacent to the top-right of the target block, a left block adjacent to the left of the target block, a right block adjacent to the right of the target block, a left-below block adjacent to the bottom-left of the target block, a below block adjacent to the bottom of the target block, and a right-below block adjacent to the bottom-right of the target block.

Temporal neighbor block: A temporal neighbor block may be a block temporally adjacent to the target block.

A temporal neighbor block may include a collocated block (col block). A col block may be a block in a reconstructed image stored in a reference image (picture) buffer. A collocated picture (col picture) may refer to a picture (image) including a col block. A col picture may be an image included in a reference image list.

A col block may be determined based on the location of the target block in the target image. The fact that two blocks are 'temporally adjacent to each other' may mean that the locations of the two blocks satisfy a specific condition.

The location of the col block in the col picture may be identical to that of the target block in the target image. Alternatively, the location of the col block in the col picture may correspond to that of the target block in the target image. Here, the locations of blocks corresponding to each other may mean that the regions of the blocks are identical to each other, may mean that the region of one block is included in the region of an additional block, and may mean that one block occupies a specific location of the additional block.

For example, the location of the col block in the col picture may be identical to that of the target block in the target image. Alternatively, the col block may be a block including a col pixel in the col picture. The col pixel may be a pixel having coordinates identical to those of a specific pixel in the target block.

A temporal neighbor block may be a block temporally adjacent to the spatial neighbor block of the target block.

Neighbor sample: A neighbor sample may refer to a sample in a neighbor block. A neighbor sample may include a prediction sample, a reconstructed sample, a residual sample, and a decoded sample.

Hereinafter, terms listed in one line may be used as the same meaning in embodiments, and may be used interchangeably with each other in embodiments.

"motion information", "motion vector", and "block vector"

"bi-prediction", "bidirectional prediction", "inter bi-prediction", and "bidirectional inter-prediction"

Predefined value: A predefined value may refer to a value used in common by an encoding apparatus and a decoding apparatus. For example, the predefined value may be construed as being limited to a fixed value. Alternatively, a predefined value may be a value shared between the encoding apparatus and the decoding apparatus through signaling. Alternatively, a predefined value may be a value derived by the encoding apparatus and the decoding apparatus through the same procedure so that the encoding apparatus and the decoding apparatus have a common value. Alternatively, a predefined value may be a common value which the encoding apparatus and the decoding apparatus have.

The value derived by the encoding apparatus and the decoding apparatus through the same procedure may include values derived through the same procedure for the same value and/or the same information by the encoding apparatus and the decoding apparatus.

The value derived by the encoding apparatus and the decoding apparatus through the same procedure may include values derived using the same conditional statement for the same value and/or the same information by the encoding apparatus and the decoding apparatus.

The description of the predefined value in embodiments may also be applied to predefined information. In the above descriptions, 'value' may be replaced with 'information'.

Motion information: Motion information may refer to information including at least one of reference picture list information, a reference image, a motion vector candidate, a motion vector candidate index, a merge candidate and a merge index, a block vector, a block vector candidate, and a block vector candidate index, as well as a motion vector, a reference picture index, and an inter-prediction indicator.

In embodiments, "the case where an indicator indicating whether a specific method is performed is true" may mean "the case where whether the specific method is performed is true in a prediction mode; motion information; a coding parameter; and/or a location which are indicated by the indicator".

In embodiments, "the case where an indicator indicating whether the specific method is applied is true" may mean "the case where whether the specific method is applied is true in a prediction mode, motion information, a coding parameter, and/or a location which are indicated by the indicator".

For example, an indicator indicating whether a specific mode is performed may have values ranging from 0 to 3, and the specific mode may be performed only when the indicator has a value of 1 or 3. In this case, "the case where the indicator indicating whether the specific mode is performed is true" may mean "the case where the indicator indicating whether the specific mode is performed has a value of 1 or 3".

In embodiments, "the case where the indicator indicating whether the specific method is performed is false" may mean "the case where the indicator indicating whether the specific method is performed is not true".

In embodiments, "the case where the indicator indicating whether the specific method is applied is false" may mean "the case where the indicator indicating whether the specific method is applied is not true".

In a specific unit, when the specific mode (or the specific method) is not enabled, signaling/encoding/decoding of at least one of syntax elements for the specific mode (or the specific method) may be skipped in the specific unit and sub-units of the specific unit.

A unit may refer to at least one of a sequence level, a picture level, a tile level, a tile group level, a slice level, a Coding Tree Unit (CTU) level, a Coding Unit (CU) level, and a Prediction Unit (PU) level.

A sub-unit may refer to the sub-unit of a slice. A sub-unit may refer to a unit included in a slice, described in embodiments. Alternatively, the sub-unit of the specific unit may refer to a unit described as being included in the specific unit in embodiments.

The fact that the specific mode (or the specific method) is performed only in a specific condition may mean that the specific mode (or the specific method) is enabled only in the specific condition.

In embodiments, the term "motion information refinement" and the term "motion information correction" may be used as the same meaning, and may be replaced with each other.

In embodiments, the term "motion information refinement value" and the term "motion information correction vector" may be used as the same meaning, and may be replaced with each other.

In embodiments, deriving second motion information from first motion information may mean that the second motion information is obtained by correcting the first motion information.

In embodiments, a coding parameter may include at least one of the type of a target picture and the type of a target slice.

The type of the target picture may be one of an I-picture, a B-picture, and a P-picture. The type of the target slice may be one of an I-slice, a B-slice, and a P-slice.

When a target image that is the target of encoding is an I-slice, the target image may be encoded using data contained in the image itself without inter-prediction which refers to another image. For example, the I-slice may be encoded only through intra-prediction.

When the target image is a P-slice, the target image may be encoded through inter-prediction that uses only a reference slice present in one direction. Here, the one direction may be a forward direction or a reverse direction.

When the target image is a B-slice, the target image may be encoded through inter-prediction that uses reference slices present in both directions or inter-prediction that uses a reference slice present in one direction of a forward direction and a reverse direction. Here, both directions may be a forward direction and a reverse direction.

A P-slice and a B-slice which are encoded and/or decoded using a reference slice may be regarded as images in which inter-prediction is used.

Adaptive Motion Vector Resolution (AMVR)

In adaptive motion vector resolution, the resolution of a motion vector difference may be adjusted on a block basis.

Adaptive motion vector resolution may improve encoding/decoding efficiency by adjusting the resolution of a motion vector difference.

For example, the adjusted resolution may be, but is not limited to, one of 16-pel (pixel), 8-pel, 4-pel, full-pel, half-pel, and quarter-pel. Pel may refer to a pixel unit for a sample. For example, when the adjusted resolution of a target block is 4-pel, each component of the motion vector difference may have a value that is a multiple of four pixels.

The resolution of the motion vector difference may be predefined.

In embodiments, motion information may include at least one of adaptive motion vector resolution and the index of the adaptive motion vector resolution.

Subsampling

Performing subsampling on a specific operation may mean that only some of samples in a specific area are selected for the specific operation.

Performing subsampling may mean that, when only some of samples in the specific area are selected, 1) a sample at a SUBSAMPLE_START_HOR-th position in a horizontal direction and at a SUBSAMPLE_START_VER-th position in a vertical direction with respect to a specific sample, and 2) a sample having a sample interval of a multiple of SUBSAMPLE_STEP_HOR in the horizontal direction and a multiple of SUBSAMPLE_STEP_VER in the vertical direction from the sample in 1) are selected. Alternatively, performing subsampling may mean that some of the sample in 1) and the sample in 2) are selected.

A specific location may indicate a top-left sample of an area on which subsampling is performed. However, the specific location is not limited to the top-left sample of the area on which subsampling is performed.

Each of SUBSAMPLE_START_HOR and SUBSAMPLE_START_VER may be 0 or a positive integer. Information about at least one of SUBSAMPLE_START_HOR and SUBSAMPLE_START_VER may be signaled/encoded/decoded or, alternatively, the values of SUBSAMPLE_START_HOR and/or SUBSAMPLE_START_VER may be determined to be predefined values without requiring signaling/encoding/decoding of the information.

Each of SUBSAMPLE_STEP_VER and SUBSAMPLE_STEP_HOR may be 0, 1, 2 or a positive integer. Information about at least one of SUBSAMPLE_STEP_VER and SUBSAMPLE_STEP_HOR may be signaled/encoded/decoded or, alternatively, the values of SUBSAMPLE_STEP_VER and/or SUBSAMPLE_STEP_HOR may be determined to be predefined values without requiring signaling/encoding/decoding of the information.

Subsampling methods may be classified by an area on which subsampling is performed, the location of the area on which subsampling is performed, the size of the area on which subsampling is performed, SUBSAMPLE_START_HOR, SUBSAMPLE_START_VER, SUBSAMPLE_STEP_HOR, and SUBSAMPLE_STEP_VER. However, criteria based on which the subsampling methods are classified are not limited to the above-described values.

Information about each subsampling method may be signaled/encoded/decoded or, alternatively, a predefined subsampling method may be used without requiring signaling/encoding/decoding.

The information about each subsampling method may be information required for determining the subsampling method.

For example, the information about each subsampling method may be information about at least one of the area on which subsampling is performed, the location of the area on which subsampling is performed, the size of the area on which subsampling is performed, SUBSAMPLE_START_HOR, SUBSAMPLE_START_VER, SUBSAMPLE_STEP_HOR and SUBSAMPLE_STEP_VER.

For example, the subsampling method may be determined based on at least one of the motion information, the coding parameter, size, and prediction mode of the target block.

The subsampling method may be determined at the level of at least one of a sequence level, a picture level, a tile level, a tile group level, a slice level, a CTU level, a CU level, and a PU level, but the determined unit is not limited thereto.

Geometric Partitioning Mode (GPM)

A GPM may be a mode in which a partition boundary for a target block is determined and a weighted sum of two prediction blocks (or reference blocks) is derived as a final prediction block for the target block using a weight map determined based on the partition boundary. The partition boundary may be a straight light for partitioning the target block into two blocks, and may have one of various directions.

The partition boundary may be named as a partition straight line. The partition straight line may be a straight line forming a boundary between partition regions in the geometric partitioning mode. Hereinafter, the terms "partition boundary" and "partition straight line" may be used interchangeably with each other.

For example, at least one prediction block (or at least one reference block) in the geometric partitioning mode may refer to a prediction block generated by 1) unidirectional prediction and/or bidirectional prediction or 2) a reference block in at least one direction in unidirectional prediction and/or bidirectional prediction.

Alternatively, for example, at least one prediction block in the geometric partitioning mode may refer to a prediction block generated by intra-prediction.

For example, one of prediction blocks in the geometric partitioning mode may be generated by inter-prediction, and the other prediction block may be generated by intra-prediction.

Figure 20:
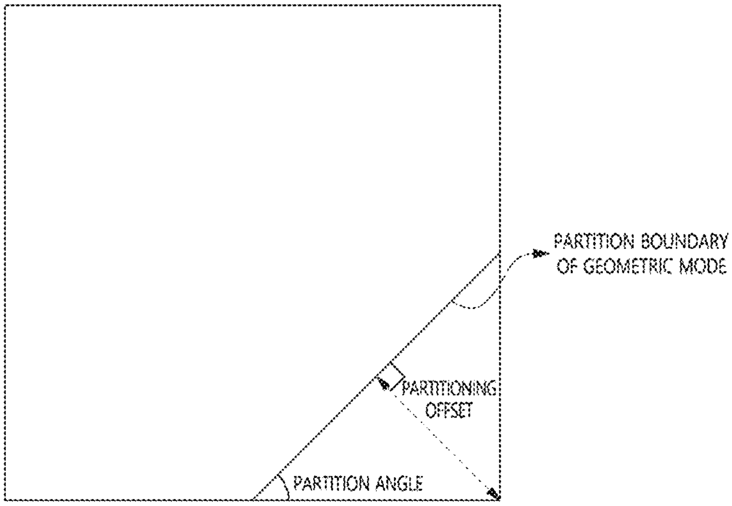
FIG. 20 illustrates a partition boundary, a partitioning offset, and a partition angle in a geometric partitioning mode according to an example.

FIG. 20 illustrates a partition boundary, a partitioning offset, and a partition angle in a geometric partitioning mode according to an example.

Geometric partitioning in the GPM may be specified by the partition angle and the partitioning offset.

Hereinafter, θ(Theta) may indicate the partition angle. Also, this may be specified by the partitioning offset ρ(Rho).

θ may be the angle of the partition boundary. For example, θ may be an angle between the bottom line of a target block and the partition boundary. Alternatively, θ may be an angle between an X axis and the partition boundary.

ρ may be the (shortest) distance between a specific location of the target block and the partition boundary. Alternatively, ρ may be the distance between two points in a line that passes through the specific location of the target block and that is perpendicular to the partition boundary. The two points may be a point at the specific location of the target block and a point on the partition boundary.

For example, as illustrated in FIG. 20, the specific point may be the bottom-right corner of the target block. The specific point may be the lowermost-rightmost pixel of the target block.

For example, the specific point may be the center of the target block. The specific location may be the center pixel of the target block.

For example, the specific point may be the bottom-left corner of the target block. The specific point may be the lowermost-leftmost pixel of the target block.

$\theta$ may be limited to predefined values. For example, $\theta$ may be one of 20 predefined angles.

$\rho$ may be limited to predefined values. For example, $\rho$ may be one of four predefined distances.

The predefined distances may be changed by $\theta$. Alternatively, the predefined distances may be determined based on $\theta$.

The predefined distances may be changed by the size of the target block. Alternatively, the predefined distances may be determined based on the size of the target block.

$\theta$ and $\rho$ may be implemented as fixed point values, and may be represented by integers.

Two partition regions of the target block may be specified depending on the partition boundary of the geometric partitioning mode. The partition boundary may partition the target block into two partition regions. A first partition region may be an above-left region, an above region or a left region of the partition boundary. A second partition region may be a below-right region, a below region or a right region of the partition boundary. In other words, when the partition straight line is not a vertical line, the first partition region may be a region above the partition straight line, and the second partition region may be a region below the partition straight line. In other words, when the partition straight line is a vertical line, the first partition region may be a region to the left of the partition straight line, and the second partition region may be a region to the right of the partition straight line.

Figure 21:
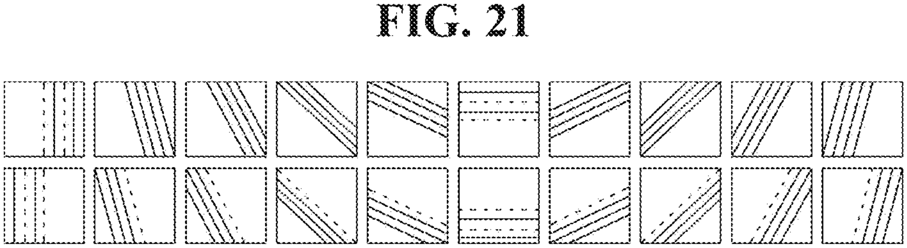
FIG. 21 illustrates partition boundaries in a geometric partitioning mode according to an example.

FIG. 21 illustrates partition boundaries in a geometric partitioning mode according to an example.

In FIG. 21, rectangles may refer to blocks. Solid lines or dotted lines in respective rectangles may refer to partition boundaries of geometric partitioning.

In FIG. 21, 20 square blocks for 20 predefined angles are illustrated. In other words, one block may indicate one angle. In each square block, four partition boundaries corresponding to four distances are illustrated as solid lines or dotted lines.

In FIG. 21, the partition boundaries illustrated in one block may represent partition boundaries of partitioning modes for geometric partitioning that can be selected by specific angle $\theta$ and $\rho$ to the angle $\theta$.

Each partitioning mode may be a value indicating a partition boundary. Each partitioning mode may be a mode for performing geometric partitioning.

The value of the partitioning mode may indicate a combination of $\theta$ and $\rho$. The specific value of the partitioning mode may indicate a combination of specific $\theta$ and specific $\rho$.

The partitioning mode may be an integer value. In other words, the combination of the specific $\theta$ and the specific $\rho$ may be represented by the value of one partitioning mode, and may be signaled between the encoding apparatus 1600 and the decoding apparatus 1700.

A predefined number of partitioning modes of GPM may be determined depending on a limitation of $\theta$ and $\rho$. For example, 80 partitioning modes of GPM may be defined and used depending on 20 predefined angles for the above-described $\theta$ and four predefined distances for $\rho$.

The combination of the specific $\theta$ and the specific $\rho$ may be excluded from the partitioning modes of geometric partitioning. For example, such an excluded combination may be a combination overlapping other combinations. Alternatively, such an excluded combination may refer to the same partitioning method as another partitioning method for the target block.

In FIG. 21, each dotted line may indicate the combination of $\theta$ and $\rho$, which is excluded from the partitioning modes of geometric partitioning. By such exclusion, 64 partitioning modes of GPM may be defined and used.

The partitioning modes of GPM may specify the shape of GPM and the partition boundary of GPM. Due to these characteristics, hereinafter, the term “partitioning mode” of GPM may have the same meaning as “shape” of GPM or “partition boundary” of GPM, and the terms “mode”, “partitioning mode”, “shape”, and “partition boundary” may be used interchangeably with each other.

Each partitioning mode of GPM may be indicated by an integer value or an index. Hereinafter, the partitioning mode of GPM may refer to an integer value and/or an index for determining and/or identifying the shape of GPM and/or the partition boundary of GPM.

Here, no values may be assigned to partitioning modes indicated by dotted lines in FIG. 21. That is, the partitioning modes indicated by the dotted lines in FIG. 21 are used only to determine the order of the partitioning modes, and may not be actually used in GPM.

A partition information candidate list for the geometric partitioning mode may include multiple partition information candidates. Each of the partition information candidates may be information for specifying the process of the geometric partitioning mode. For example, each of the partition information candidates may include information for specifying a partition boundary/partition straight line. The partition information candidates may specify different processes, respectively.

Figure 22:
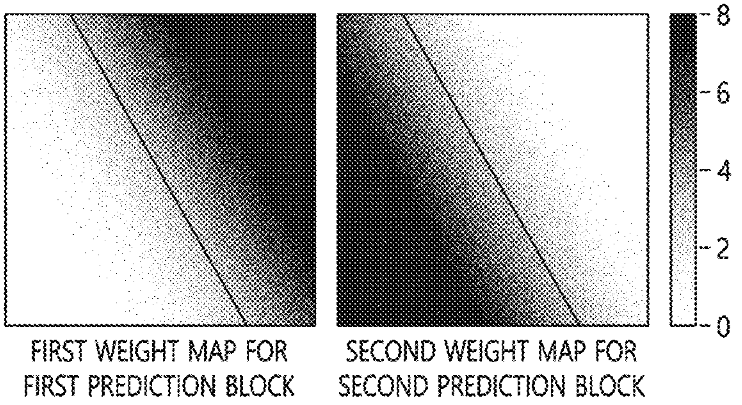
FIG. 22 illustrates weight maps used in respective prediction blocks depending on a specific partition boundary according to an example.

FIG. 22 illustrates weight maps used in respective prediction blocks depending on a specific partition boundary according to an example.

In FIG. 22, a first weight map for a first prediction block and a second weight map for a second prediction block are illustrated.

The first prediction block may be one of two prediction blocks generated in a geometric partitioning mode. The second prediction block may be the other of the two prediction blocks generated in the geometric partitioning mode. The first weight map for the first prediction block may indicate weights of pixels in the first prediction block. The second weight map for the second prediction block may indicate weights of pixels in the second prediction block.

By means of the first weight map and the second weight map, the weights of the pixels corresponding to the first prediction block and the second prediction block may be determined. Here, the corresponding pixels may be pixels having the same coordinates.

The first prediction block may be a prediction block for a first partition region. Here, “the first prediction block for the first partition region” may mean that the first prediction block is used to determine the value of each of all pixels in the first partition region. Among the weights in the first weight map for the first prediction block, weights included in the first partition region may be 0 or more. Among the weights in the first weight map for the first prediction block, at least some of weights included in the second partition region may be 0. In other words, the first prediction block may not be used to determine the values of at least some of the pixels included in the second partition region. Alternatively, the values of at least some of the pixels included in the first partition region may be determined only by the first prediction block regardless of the second prediction block. The values of at least some of the pixels included in the second partition region may be determined only by the second prediction block regardless of the first prediction block.

The second prediction block may be a prediction block for the second partition region. Here, "the second prediction block for the second partition region" may mean that the second prediction block is used to determine the value of each of all pixels in the second partition region. Among the weights in the second weight map for the second prediction block, weights included in the second partition region may be 0 or more. Among the weights in the second weight map for the second prediction block, at least some of weights included in the first partition region may be 0. In other words, the second prediction block may not be used to determine the values of at least some of the pixels included in the first partition region. Alternatively, the values of at least some of the pixels included in the second partition region may be determined only by the second prediction block regardless of the first prediction block. The values of at least some of the pixels included in the first partition region may be determined only by the first prediction block regardless of the second prediction block.

In FIG. 22, a white region in the weight map for each prediction block may mean that the prediction block does not affect the configuration of a white region in a final prediction block. That is, the white region in the weight map for the prediction block may indicate that the weights of pixels in the white region in the prediction block are 0.

The weight of a specific pixel in the first prediction block may be determined based on the distance between the specific pixel and the partition boundary. The weight of a specific pixel in the second prediction block may be determined based on the distance between the specific pixel and the partition boundary.

The weight of a specific pixel in the first prediction block may be determined depending on the distance between the specific pixel and the partition boundary. The weight of a specific pixel in the second prediction block may be determined depending on the distance between the specific pixel and the partition boundary.

For example, when the distance between the specific pixel in the target block and the partition boundary is less than a reference value, the value of the specific pixel may be a weighted sum of the value of the first pixel in the first prediction block and the value of the second pixel in the second prediction block. Here, the location of the specific pixel, the location of the first pixel, and the location of the second pixel may be identical to each other. In this case, when the first pixel is included in the first partition region, the first weight for the first pixel may be larger as the first pixel is located farther from the partition boundary. When the first pixel is included in the second partition region, the weight for the first pixel may be smaller as the first pixel is located farther from the partition boundary. When the second pixel is included in the second partition region, the weight for the second pixel may be larger as the second pixel is located farther from the partition boundary. When the second pixel is included in the first partition region, the weight for the second pixel may be smaller as the second pixel is located farther from the partition boundary.

For example, when the distance between the specific pixel in the target block and the partition boundary is greater than a reference value, the value of the specific pixel may be the value of the first pixel in the first prediction block or the value of the second pixel in the second prediction block. In this case, when the specific pixel is included in the first partition region, the value of the first pixel in the first prediction block may be used as the value of the specific pixel. When the specific pixel is included in the second partition region, the value of the second pixel in the second prediction block may be used as the value of the specific pixel. Here, the location of the specific pixel, the location of the first pixel, and the location of the second pixel may be identical to each other.

The following Equation 1 indicates the generation of prediction signals of GPM corresponding to the weight maps illustrated in FIG. 22.

$$P_G = (W_0 \cdot P_0 + W_1 \cdot P_1 + 4) \gg 3 \quad \text{[Equation 1]}$$

$P_0$ may be the pixel value of a pixel at a specific location in the first prediction block.

$W_0$ may be a weight for the specific location among the weights in the first weight map.

$P_1$ may be the pixel value of a pixel at a specific location in the second prediction block.

$W_1$ may be a weight for the specific location among the weights in the second weight map.

$P_G$ may be the pixel value of a pixel at a specific location in the final prediction block.

Respective partition information candidates in the partition information candidate list may include pieces of information for specifying weight maps in the geometric partitioning mode.

The partition information candidates in the partition information candidate list may specify different processes, respectively, in the geometric partitioning mode. Here, the processes in the geometric partitioning mode may include partition boundaries and weight maps.

Correction of Motion Information

When bidirectional prediction is applied to the target block, only motion information in an LX direction of an L0 or L1 direction may be first corrected, and motion information in an L(1−X) direction may then be corrected using the corrected motion information.

For example, correcting only the motion information in the LX direction may mean that a motion information correction vector for minimizing matching cost for the LX direction is searched for. However, correcting only the motion information in the LX direction is not limited to the above-described search.

Here, X may be 0, 1 or a positive integer.

For example, information about X may be determined through encoding/decoding.

For example, the LX direction may be a direction having lower matching cost of the L0 direction and the L1 direction. The LX direction may be a direction having higher matching cost of the L0 direction and the L1 direction.

The matching cost may refer to at least one of template matching cost and bilateral matching cost. However, the matching cost is not limited to the above-described meaning.

For example, a motion information correction vector $MV_{diff}$ in the LX direction may be determined. Next, a motion information correction vector in the L(1−X) direction may be determined to be $MV_{diff}$. For example, the motion information correction vector $MV_{diff}$ in the LX direction may be determined. Next, the motion information correction vector in the L(1−X) direction may be determined to be a motion vector derived by applying scaling of the motion information in the L(1−X) direction to $MV_{diff}$.

When bidirectional prediction is applied to the target block, only the motion information in the LX direction of the L0 direction and the L1 direction may be corrected.

For example, correcting only the motion information in the LX direction may mean that a motion information correction vector for minimizing matching cost for the LX direction is searched for. However, correcting only the motion information in the LX direction is not limited to the above-described search.

Here, X may be 0, 1 or a positive integer.

For example, information about X may be determined through encoding/decoding.

For example, the LX direction may be a direction having lower matching cost of the L0 direction and the L1 direction. The LX direction may be a direction having higher matching cost of the L0 direction and the L1 direction.

The matching cost may refer to at least one of template matching cost and bilateral matching cost. However, the matching cost is not limited to the above-described meaning.

For example, when bidirectional prediction is applied to the target block, an indicator indicating a direction in which correction of the motion information is performed may be encoded/decoded. The indicator may indicate one direction and a direction in which motion information correction is performed of two directions. The indicator may indicate that motion information correction is performed in one direction, and may also indicate that motion information correction is performed in two directions.

For example, an indicator indicating whether correction is performed in each direction may be encoded/decoded.

Matching cost for specific motion information may be replaced with matching cost for motion information in which a motion vector in the specific motion information is replaced with ROUNDED_MV.

For example, the matching cost for the specific motion vector may be replaced with matching cost for ROUNDED_MV.

ROUNDED_MV may be defined by the following Equation 2.

$$\text{ROUNDED\_MV} = \text{ROUND}(MV, \text{TARGET\_PRECISION}) \quad \text{[Equation 2]}$$

ROUND(MV, TARGET_PRECISION) may be a function of rounding off MV in units of TARGET_PRECISION.

Here, MV may refer to the motion vector of the above-described specific motion information or a specific motion vector.

For example, when the existing precision of MV is ORIG_PRECISION, ROUND(MV, TARGET_PRECISION) may be identical to a result obtained when the precision of MV is changed to TARGET_PRECISION and the precision of MV is changed back to ORIG_PRECISION.

Each of ORIG_PRECISION and TARGET_PRECISION may be one of 16-pel, 8-pel, 4-pel, full-pel, half-pel, and quarter-pel. However, ORIG_PRECISION and TARGET_PRECISION are not limited to the above-described pels.

Template Matching (TM)

Figure 23:
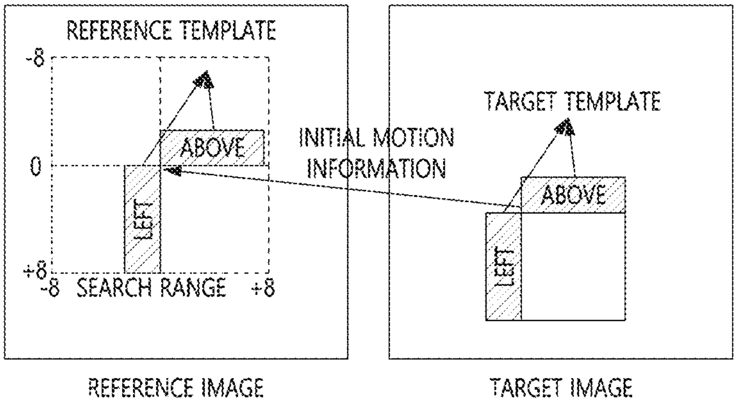
FIG. 23 illustrates template matching according to an example.

FIG. 23 illustrates template matching according to an example.

In template matching, the motion information of the target block may be determined and/or changed based on the result of calculating a cost function between a target template and a reference template.

A reference block may include at least one of 1) a block indicated by initial motion information, 2) a block indicated by motion information derived in a search process in template matching, 3) a block indicated by motion information finally refined through template matching, 4) a block in which one of a top-left sample, a bottom-left sample, a top-right sample, a bottom-right sample, and a central sample is a sample falling within the search range of template matching (or a block in which one of a top-left position, a bottom-left position, a top-right position, a bottom-right position, and a central position falls within the search range of template matching, 5) a block in which a specific sample is a sample falling within the search range of template matching (or a block in which a specific position falls within the search range of template matching), and 6) a block finally determined through template matching. Here, the specific position may correspond to the top-left sample, the bottom-left sample, the top-right sample, the bottom-right sample, or the central sample. The specific position may be the top-left position, the bottom-left position, the top-right position, the bottom-right position, or the central position.

The size of the reference block may be identical to that of the target block.

The motion information refined by template matching may be motion information having lowest matching cost, derived in the search process in template matching. However, a method for deriving the motion information is not limited to the above-described criteria.

Template matching cost may refer to the result of calculation using a cost function between the template of the target block and the template of the reference block, which are used in template matching.

Each of a reference block, a reference template, and a reference region may include at least one of a prediction sample, a reconstructed sample, a residual sample, and a decoded sample for a reference image. Alternatively, each of the reference block, the reference template, and the reference region may include at least one of a prediction sample, a reconstructed sample, a residual sample, and a decoded sample for a target image.

A template matching method may include at least one of an intra template matching method and an inter template matching method.

An intra template matching mode may refer to a template matching method in which each of the reference block, the reference template, and the reference region includes at least one of the prediction sample, the reconstructed sample, the residual sample, and the decoded sample for the target image.

An inter template matching mode may refer to a template matching method in which each of the reference block, the reference template, and the reference region includes at least one of the prediction sample, the reconstructed sample, the residual sample, and the decoded sample for the reference image.

Template Configuration in Template Matching

Hereinafter, a target template will be described.

The target template may include a surrounding sample of a target block.

In embodiments, the surrounding sample of a block may include adjacent samples of the block. Alternatively, the surrounding sample of the block may be a sample to which the distance from the block is less than or equal to a reference value. Here, the distance may be the larger of a horizontal distance and a vertical distance. Alternatively, the distance may be 1) a horizontal distance, 2) a vertical distance, 3) a diagonal distance, or 4) the smaller of the horizontal distance and the vertical distance. Further, the surrounding sample of the block may refer to a sample referenced by the block.

For example, the surrounding sample may be a sample encoded/decoded before the block is encoded/decoded. The surrounding sample of the block may be a sample in a specific unit including the target block. Alternatively, the surrounding sample may be limited to a sample encoded/decoded before the block is encoded/decoded.

The surrounding sample of the block may include a sample within a specific region indicated by the motion information of the target block.

When the target block is a chroma component block, the surrounding sample may include a sample within a luma component block or a luma component corresponding to the target block.

A reference region for the target block may include the surrounding sample of the target block.

For example, the reference region for the target block may include at least one of samples located in a left-below region, a left region, a left-above region, an above region, and a right-above region around the target block.

A target template for template matching may be identical to the reference region for the target block.

For example, samples in a target template determined by using the target block as a reference may be samples corresponding to samples in a reference template determined by using the reference block as a reference.

For example, when the target template is configured in template matching, some of the samples in the reference region of the target block may be selected. The target template may be configured using the selected samples.

For example, the samples selected to configure the target template by using the target block as a reference may be samples corresponding to the samples selected to configure the template of the reference block by using the reference block as a reference.

For example, the reference region of the target block determined by using the target block as a reference may be a region corresponding to the reference region of the reference block determined by using the reference block as a reference.

Hereinafter, the reference template will be described.

The reference template may include a surrounding sample of a reference block.

The reference region of the reference block may include a surrounding sample of the reference block.

For example, the reference region of the reference block may include at least one of samples located in a left-below region, a left region, a left-above region, an above region and a right-above region around the reference block.

For example, a reference template in template matching may be identical to the reference region of the reference block.

For example, samples in a reference template determined by using the reference block as a reference may be samples corresponding to samples in a target template determined by using the target block as a reference.

For example, when a reference template is configured in template matching, some of samples in the reference region of the reference block may be selected. The reference template may be configured using the selected samples.

For example, the samples selected to configure the reference template by using the reference block as a reference may be samples corresponding to samples selected to configure the template of the target block by using the target block as a reference.

For example, the reference region of the reference block determined by using the reference block as a reference may be a region corresponding to the reference region of the target block determined by using the target block as a reference.

The target/reference template in template matching may include at least one of 1) at least one of samples in TMSIZE_LEFT lines adjacent to the left of the target/reference block; and 2) at least one of samples in TMSIZE_ABOVE lines adjacent to the top of the target/reference block.

However, a positional relationship between each sample in the template and the target/reference block and/or a template configuration method are not limited to the above-described relationships or methods.

Each of TMSIZE_LEFT and TMSIZE_ABOVE may be 0, 1, 2, 3, 4 or a positive integer of 4 or more.

TMSIZE_LEFT and TMSIZE_ABOVE may be identical to each other. Alternatively, TMSIZE_LEFT and TMSIZE_ABOVE may be different from each other.

Each of TMSIZE_LEFT and TMSIZE_ABOVE may be a predefined value or a value determined based on signaled/encoded/decoded information.

Each of TMSIZE_LEFT and TMSIZE_ABOVE may be determined based on at least one of the motion information, coding parameter, size, and prediction mode of the target block.

For example, when the width of the target block is W and the height thereof is H, the smaller (or the larger) of W and H is less than (or greater than) TMSIZE_THRES, TMSIZE1 may be used as TMSIZE_LEFT/TMSIZE_ABOVE. Otherwise, TMSIZE2 may be used as TMSIZE_LEFT/TMSIZE_ABOVE.

Each of TMSIZE1 and TMSIZE2 may be a predefined value.

Each of TMSIZE1 and TMSIZE2 may be 0,1,2,4 or a positive integer. However, the value of each of TMSIZE1 and TMSIZE2 is not limited thereto.

For example, when the template is configured, interpolation filtering may be performed.

An interpolation filter used to configure the template may be identical to an interpolation filter used in motion compensation for a prediction block. Alternatively, the interpolation filter used to configure the template may be different from the interpolation filter used in motion compensation for the prediction block.

For example, the fact that the interpolation filters are different from each other may mean that they are different from each other in at least one or more of an interpolation filter type, an interpolation filter tap, and an interpolation filter coefficient. However, a criterion for determining whether the interpolation filters are different from each other is not limited to the above-described criterion.

For example, in order to decrease operational complexity, an interpolation filter having fewer taps than those of the interpolation filter used in motion compensation for a prediction block may be used when the template is configured.

For example, when the template is configured, reference sample filtering may be performed.

A reference sample filter used to configure the template may be identical to a reference sample filter used for intra-prediction for the prediction block. Alternatively, a reference sample filter used to configure the template may be different from a reference sample filter used for intra-prediction for the prediction block.

For example, the fact that the reference sample filters are different from each other may mean that they are different from each other in at least one or more of a reference sample filter type, a reference sample filter tap, and a reference sample filter coefficient. However, a criterion for determining that the reference sample filters are different from each other is not limited to the above-described criterion.

For example, in order to decrease operational complexity, a reference sample filter having fewer taps than those of the reference sample filter used for intra-prediction for the prediction block may be used when the template is configured.

Configuration of Template in Geometric Partitioning Mode

When a geometric partitioning mode is applied to the target block, a template that is used in a prediction block for each partition region may be determined depending on partition information of the geometric partitioning mode.

The partition information of the geometric partitioning mode may include information for determining the partition regions in the geometric partitioning mode. Further, the partition information may include at least one of a partition angle, a partitioning offset, and an index for specifying a partition information candidate from a partition information candidate list.

The partition angle may refer to an angle between a partition straight line and an X axis (or a Y axis). However, the partition angle is not limited to the above-described definition.

The partitioning offset may refer to the distance from the position of a specific sample in the target block to the partition straight line. However, the partitioning offset is not limited to the above-described definition.

For example, the position of the specific sample in the target block may be one of the central position of target block, the top-left position of the target block, the bottom-left position of the target block, the top-right position of the target block, and the bottom-right position of the target block. However, the position of the specific sample in the target block is not limited to one of the foregoing positions.

For example, when the geometric partitioning mode is applied to the target block and the partition angle is less than or equal to a specific angle, a prediction block for a X_PARTITION-th partition region may use only one of a left sample set located to the left of the target block and an above sample set located above the target block to configure the template.

For example, when a geometric partitioning mode is applied to the target block and the partition angle is equal to or greater than a specific angle, a prediction block for a X_PARTITION-th partition region may use only one of a left sample set located to the left of the target block and an above sample set located above the target block so as to configure the template.

X_PARTITION may be 1, 2 or a positive integer.

Figure 24:
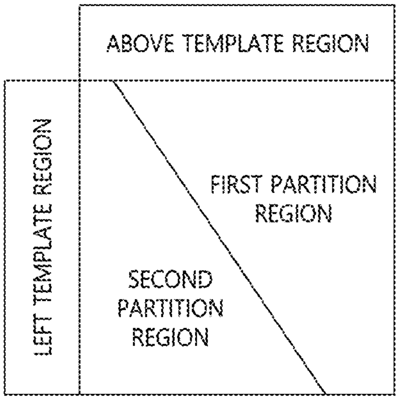
FIG. 24 illustrates partition regions and template regions according to an example.

FIG. 24 illustrates partition regions and template regions according to an example.

When a target block is partitioned, as illustrated in FIG. 24, a first template of a first prediction block for a first partition region may be configured using only samples belonging to an above template region of the target block, and a template of a second prediction block for a second partition region may be configured using only samples belonging to a left template region of the target block.

The above template region of the block may refer to a template region located above the corresponding block or a template region adjacent to the top of the corresponding block. The left template region of the block may refer to a template region located to the left of the block or a template region adjacent to the left of the block.

Figure 25:
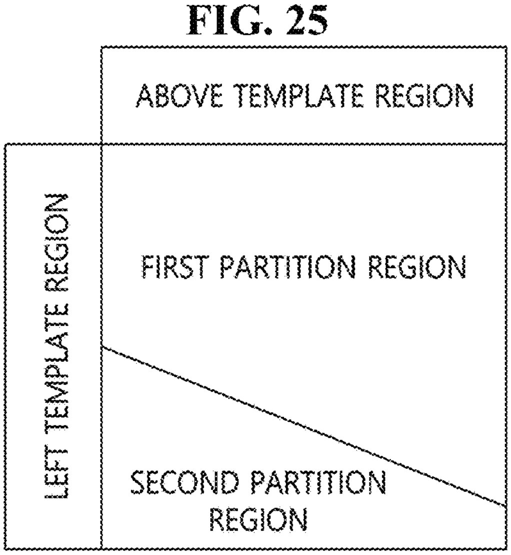
FIG. 25 illustrates other partition regions and other template regions according to an example.

FIG. 25 illustrates other partition regions and other template regions according to an example.

When a geometric partitioning mode is applied to a target block and a partition angle is less than or equal to a specific angle (or equal to or greater than the specific angle), both a left sample set and an above sample set of the target block may be used to configure the template of a prediction block for a X_PARTITION-th partition region.

When a target block is partitioned, as illustrated in FIG. 25, a first template of a first prediction block for a first partition region may be configured using samples belonging to a left template region and an above template region of the target block, and a second template of a second prediction block for a second partition region may be configured using only samples belonging to the left template region of the target block.

Figure 26:
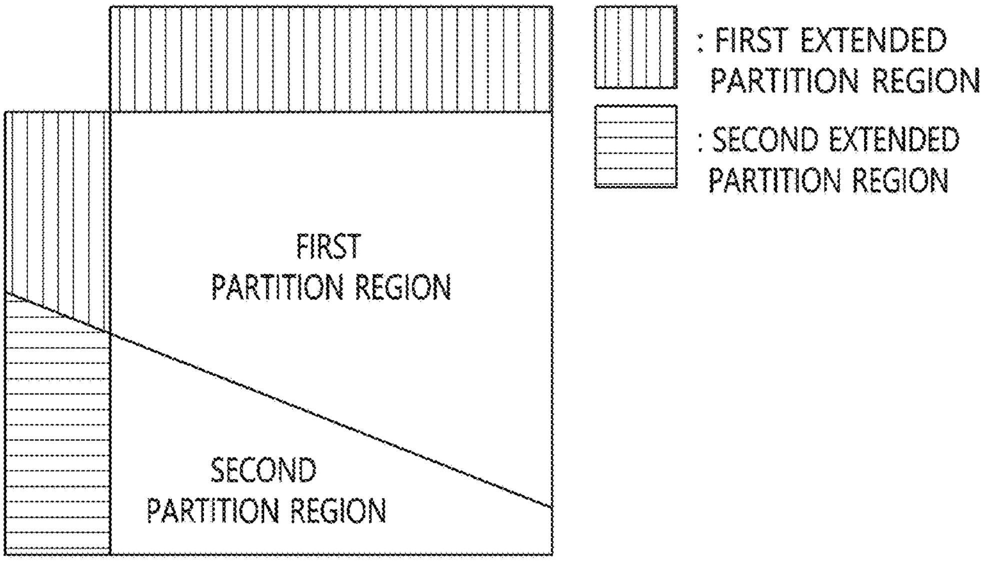
FIG. 26 illustrates partition regions and extended partition regions according to an example.

FIG. 26 illustrates partition regions and extended partition regions according to an example.

When a geometric partitioning mode is applied to a target block and partition information is specified, the partition information may extend to a template region. In other words, a partition straight line indicated by the partition information may extend not only to the target block but also to the template regions. The template regions may be regarded as extended partition regions. The partition straight line may partition at least one of template regions.

A first extended partition region may be a region configured using samples belonging to a region to which the first extended partition region belongs, among samples in template regions. The first extended partition region may be a region including a first partition region of two regions separated by the partition straight line.

The second extended partition region may be a region configured using samples belonging to a region to which the second extended partition region belongs, among the samples in the template regions. The second extended partition region may be a region including a second partition region of two regions separated by the partition straight line.

When the template of the prediction block for each partition region is configured, only samples within an extended partition region adjacent to a specific partition region may be used to configure the template of the prediction block for the specific partition region.

For example, when the target block is partitioned as shown in FIG. 25, the first template of the first prediction block for the first partition region may be configured using samples included in a first extended partition region, and the second template of the second partition block for the second partition region may be configured using samples included in a second extended partition region.

Subsampling in Template Matching

Subsampling for Template Configuration

When a template for template matching is configured, all of samples in a reference region may be used or, alternatively, only some of samples in the reference region may be used.

The template for template matching may refer to at least one of the template of the target block and the template of the reference block.

The reference region may refer to at least one of a reference region for the target block for template matching and a reference region for a reference block.

When the template for template matching is configured using only some of the samples in the reference region, subsampling may be performed on all or part of the reference region.

When the template for template matching is configured using only some of the samples located in the reference region, the reference region may be partitioned into two or more regions.

Each of the partition regions may be one of 1) a region to which subsampling is applied, 2) a region to which subsampling is not applied and that is used to configure the template, and 3) a region that is not used for template configuration.

In an embodiment, the template for template matching may be configured using 1) samples selected by subsampling in a first region and 2) samples in a second region.

For example, 1) the region to which subsampling is applied may be a left region and/or a left-above region of the block among regions in the reference region.

For example, 1) the region to which subsampling is applied may be an above region and/or the left-above region of the block among the regions in the reference region.

Alternatively, when the template for template matching is configured using only some of the samples in the reference region, each reference region may be partitioned into two or more regions. Each of the partition regions may be one of 1) a region to which subsampling is applied and 2) a region that is not used for template configuration.

In an embodiment, the template for template matching may be configured using 1) the samples selected by the subsampling.

Subsampling for Cost Function Calculation

When a cost function between a target template and a reference template in template matching is calculated, all of samples in each template may be used or only some of the samples in each template may be used. That is, only for some samples, the calculation of the cost function may be performed.

When the cost function between the templates is calculated using only some of the samples in the template, subsampling may be performed on all or part of the template region.

When the cost function between the templates is calculated using only some of the samples in the template, the region of each template for template matching may be partitioned into two or more regions.

Each of the partitioned regions may be one of 1) a region to which subsampling is applied, 2) a region to which subsampling is not applied and that is used to calculate a cost function, and 3) a region that is not used to calculate a cost function.

In an embodiment, a cost function between templates in template matching may be calculated using 1) the samples selected by subsampling in the first region and 2) the samples in the second region.

Alternatively, when a cost function between the templates is calculated using only some of the samples in the template, the region of each template for template matching may be partitioned into two or more regions. Each of the partition regions may be one of 1) a region to which subsampling is applied and 2) a region that is not used to calculate a cost function.

In an embodiment, the cost function between the templates in template matching may be calculated using 1) the samples selected by subsampling.

Subsampling for Search Area

When a search process in template matching is performed, all of the samples/positions in a search area may be used or, alternatively, only some of the samples/positions in the search area may be selected. Search and/or matching cost calculation may be performed only for the selected samples/positions. Alternatively, the search and/or matching cost calculation may be performed only for multiple pieces of motion information indicating the selected samples/positions.

When the search process in template matching is performed using only some of the samples/positions in the search area, subsampling may be performed on all or part of the search area.

When the search process in template matching is configured using only some of the samples/positions in the search area, each search area may be partitioned into two or more regions.

Each of the partitioned regions may be one of 1) a region to which subsampling is applied, 2) a region to which subsampling is not applied and a search process is applied, and 3) a region to which a search process is not applied.

In an embodiment, the search process in template matching may be performed on 1) samples/positions selected by subsampling in a first region and 2) samples/positions in a second region.

In an embodiment, a search process in template matching may be performed on multiple pieces of motion information indicating 1) the samples/positions selected by subsampling in the first region and 2) the samples/positions in the second region.

Alternatively, when the search process in template matching is configured using only some of the samples/positions in the search area, each search area may be partitioned into two or more regions.

Each of the partition regions may be one of 1) a region to which subsampling is applied and 2) a region to which a search process is not applied.

In an embodiment, the search process in template matching may be performed using 1) the samples/positions selected by the subsampling.

In an embodiment, the search process in template matching may be performed on multiple pieces of motion information indicating 1) the samples/positions selected by subsampling.

Figure 27A:
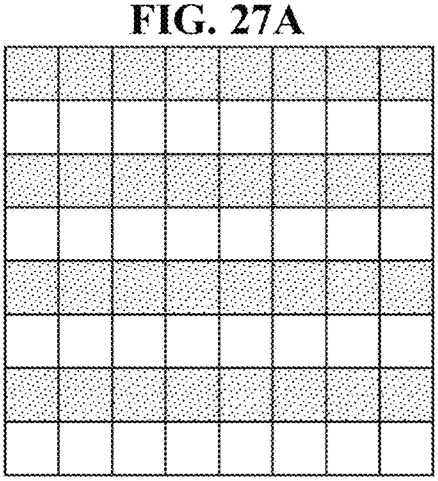
FIGS. 27A to 27T illustrate subsampling methods in template matching according to an example.
Figure 27B:
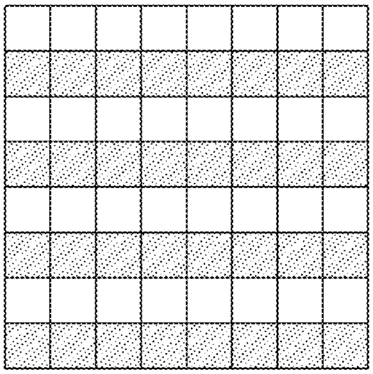
Figure 27C:
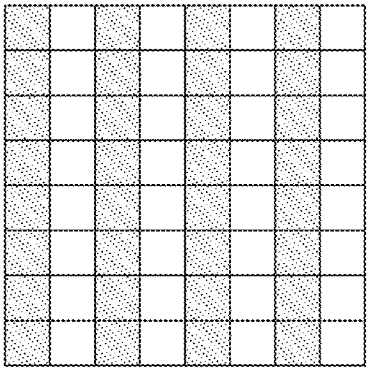
Figure 27D:
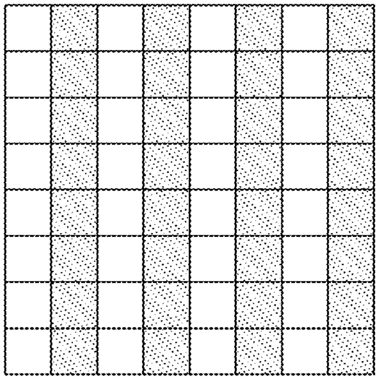
Figure 27E:
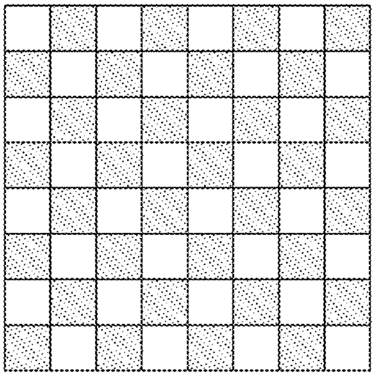
Figure 27F:
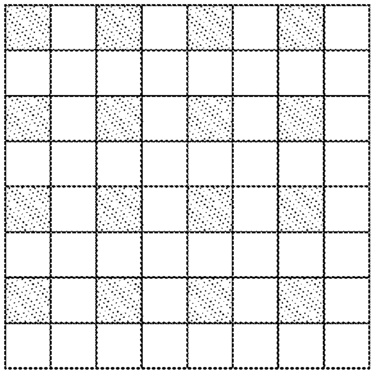
Figure 27G:
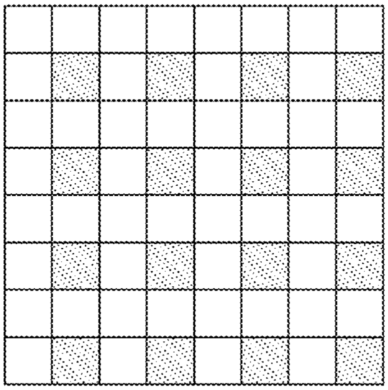
Figure 27H:
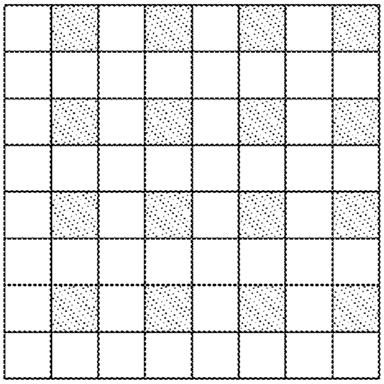
Figure 27I:
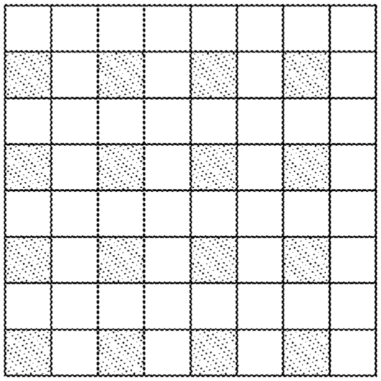
Figure 27J:
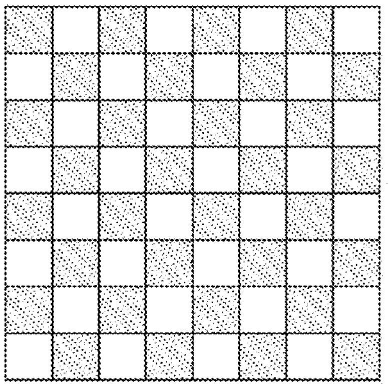
Figure 27K:
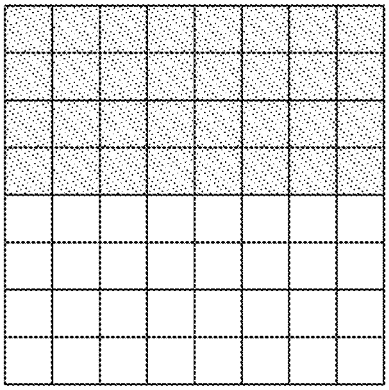
Figure 27L:
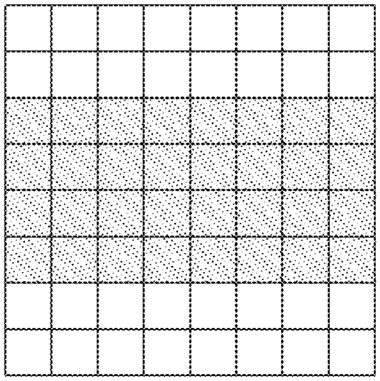
Figure 27M:
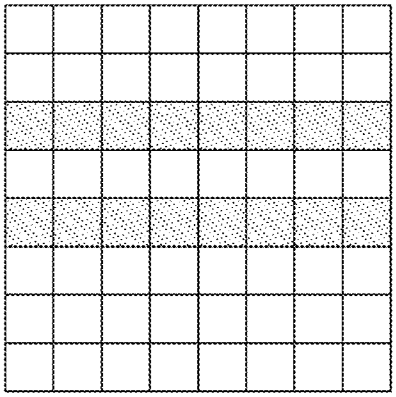
Figure 27N:
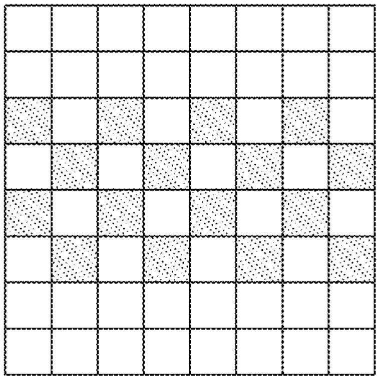
Figure 27O:
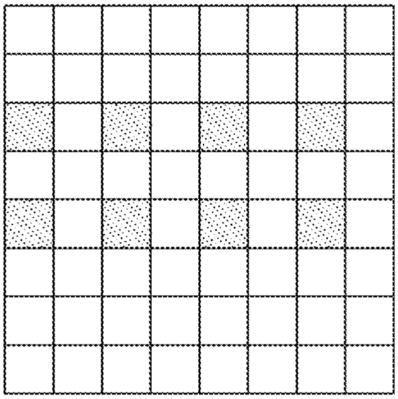
Figure 27P:
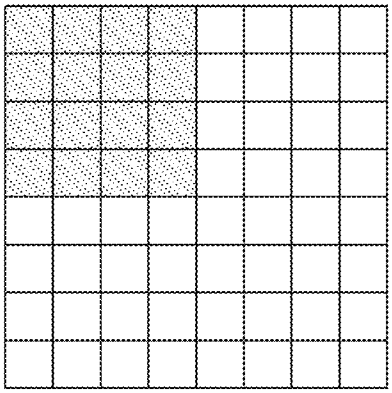
Figure 27Q:
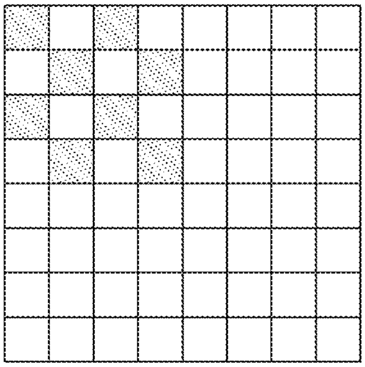
Figure 27R:
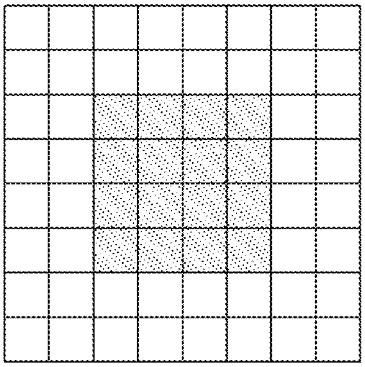
Figure 27S:
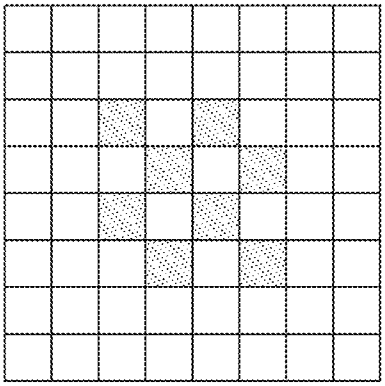
Figure 27T:
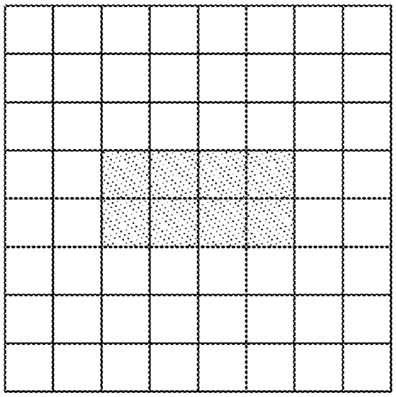

FIGS. 27A to 27T illustrate subsampling methods in template matching according to an example.

Figure 28A:
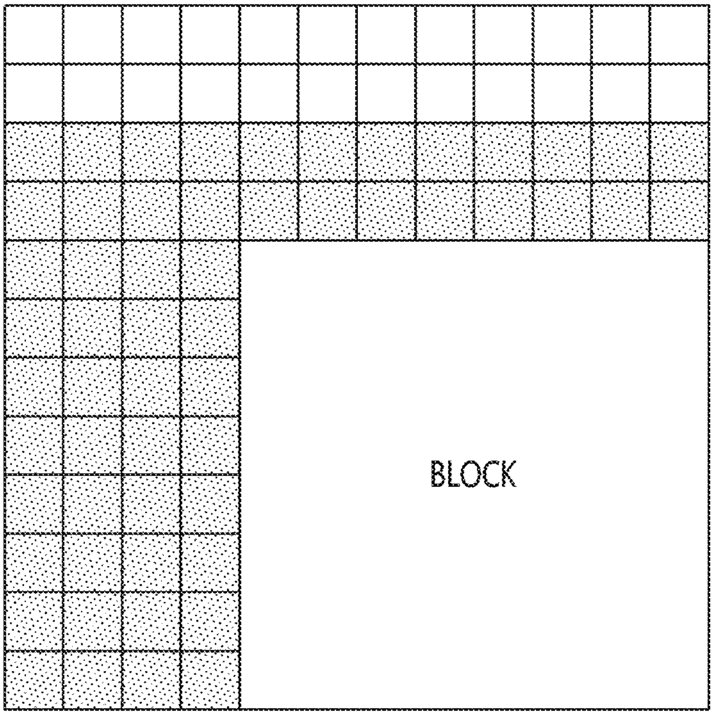
FIGS. 28A to 28N illustrate some of subsampling methods in template matching according to an example.
Figure 28B:
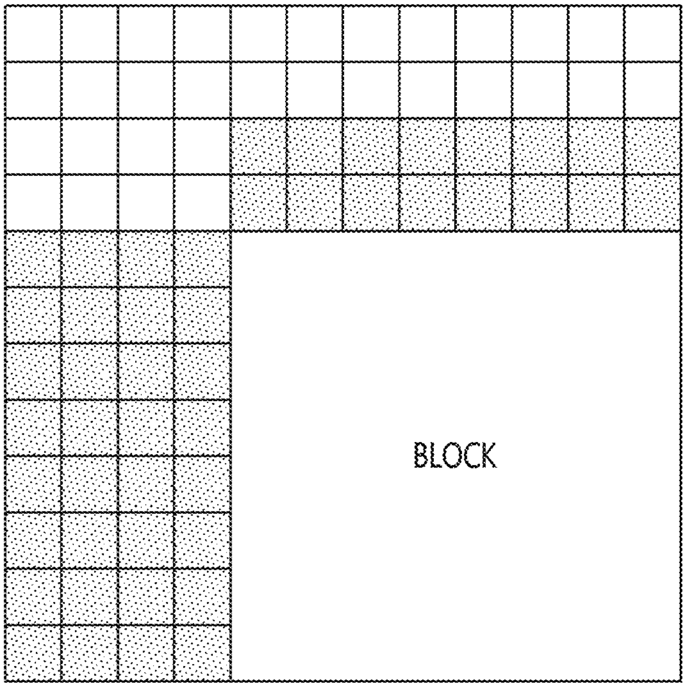
Figure 28C:
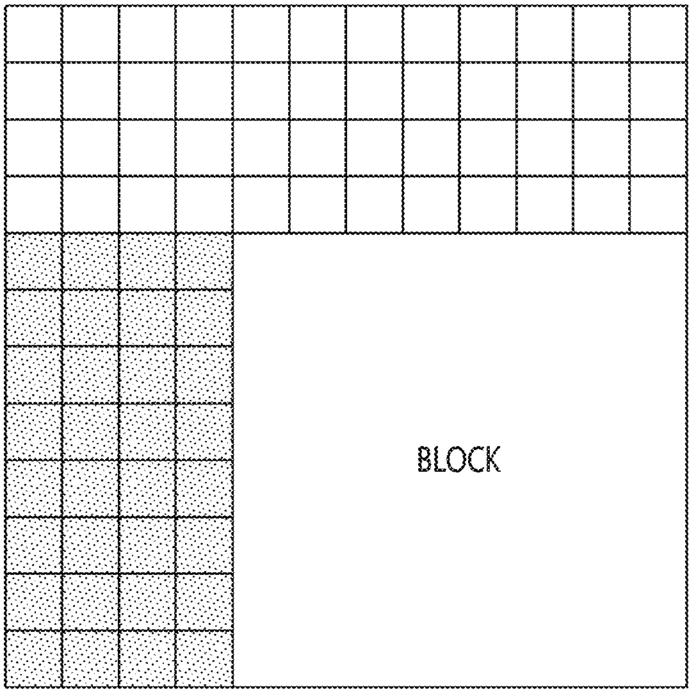
Figure 28D:
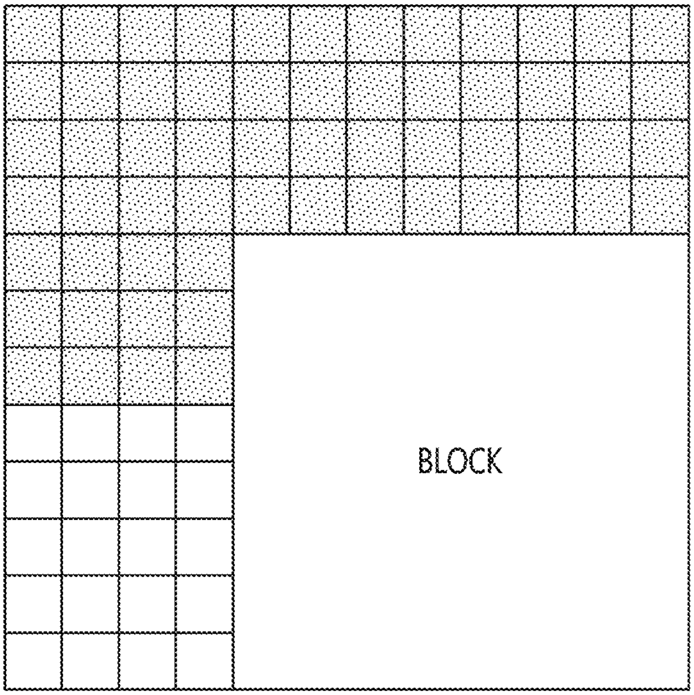
Figure 28E:
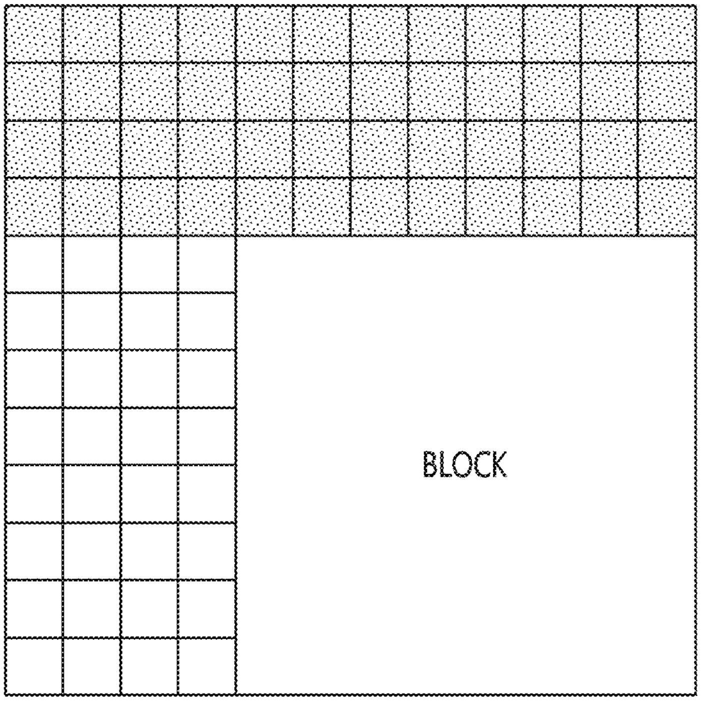
Figure 28F:
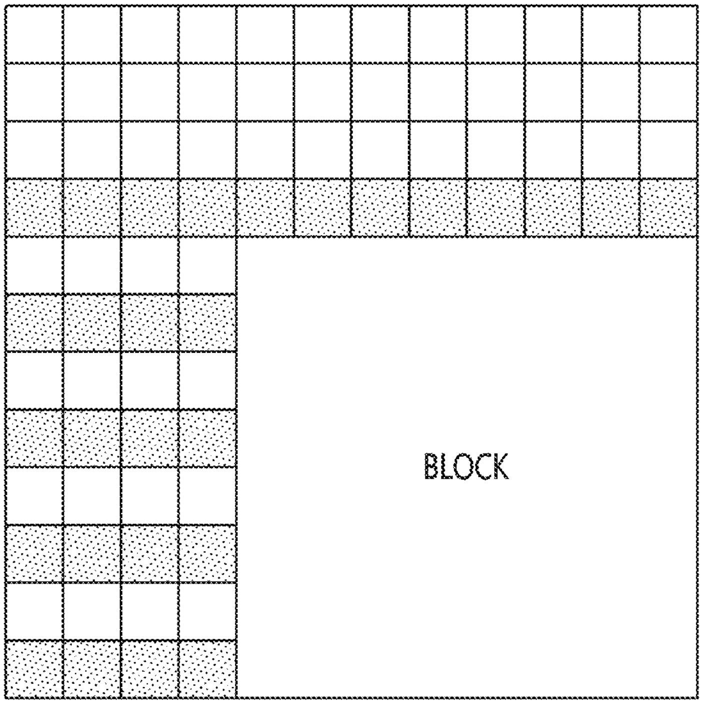
Figure 28G:
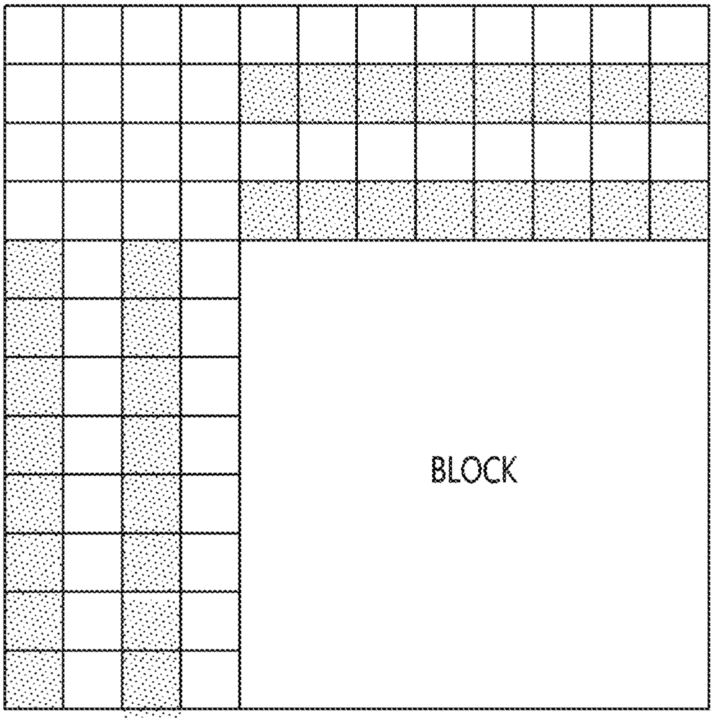
Figure 28H:
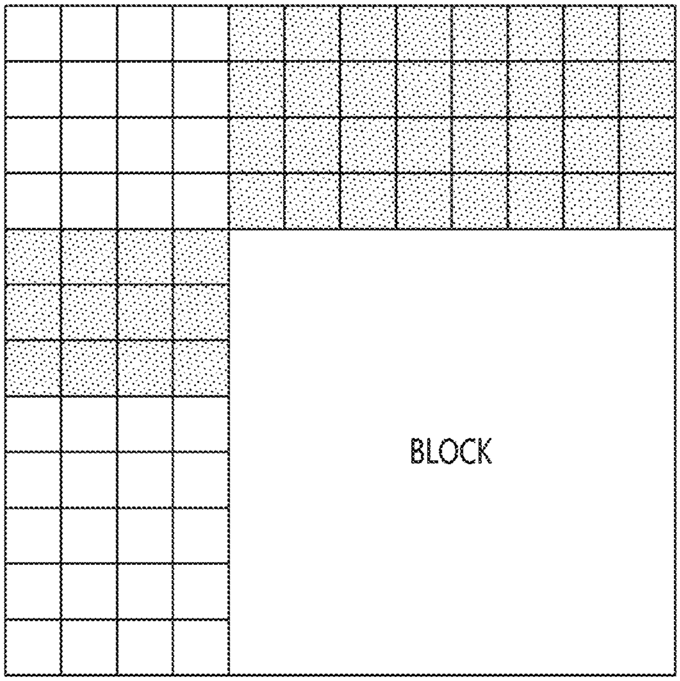
Figure 28I:
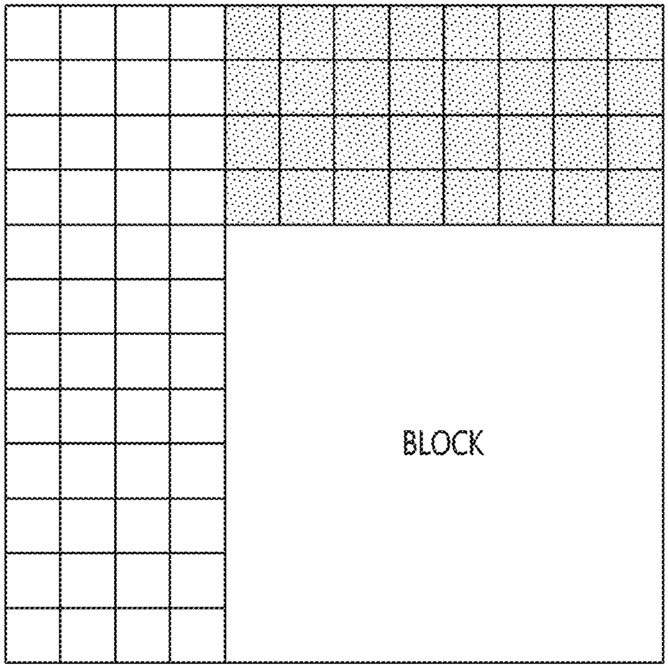
Figure 28J:
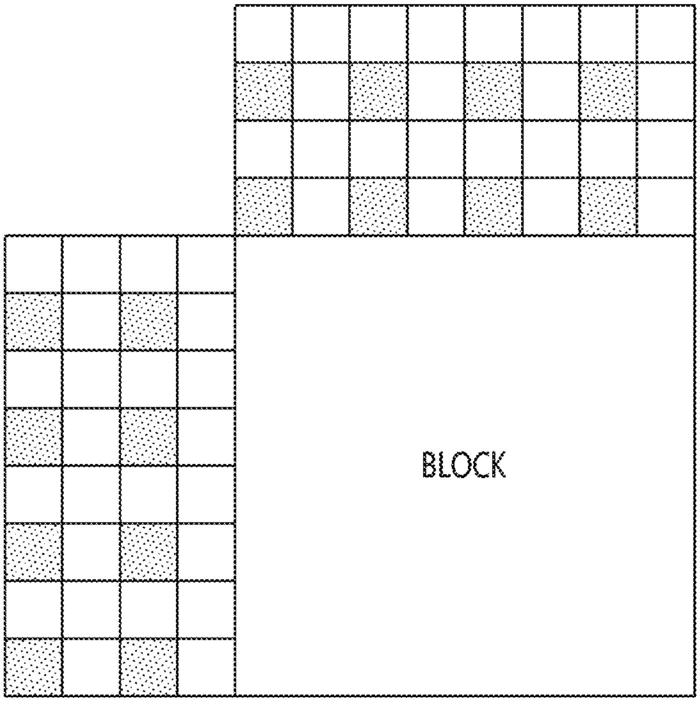
Figure 28K:
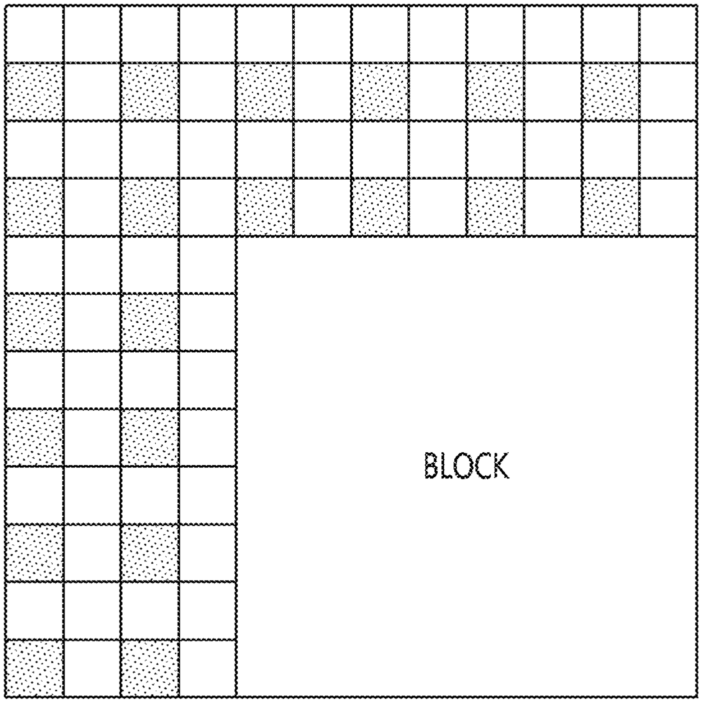
Figure 28L:
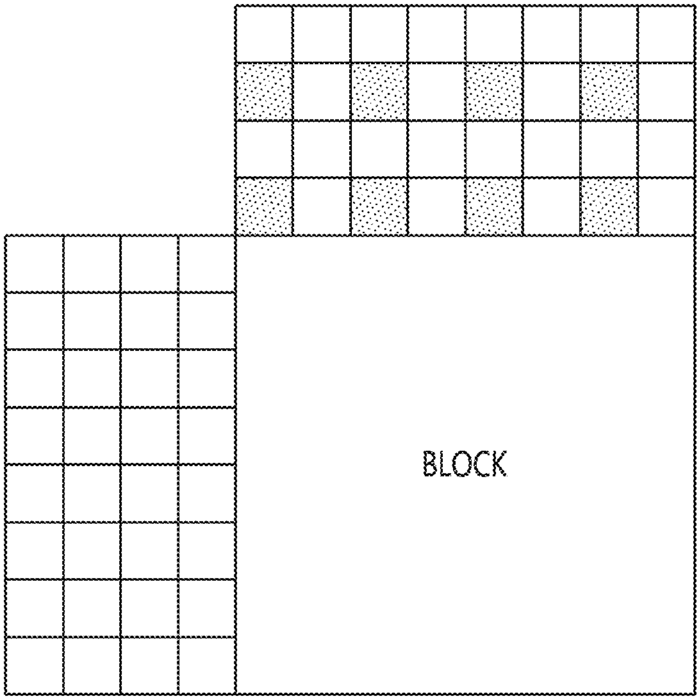
Figure 28M:
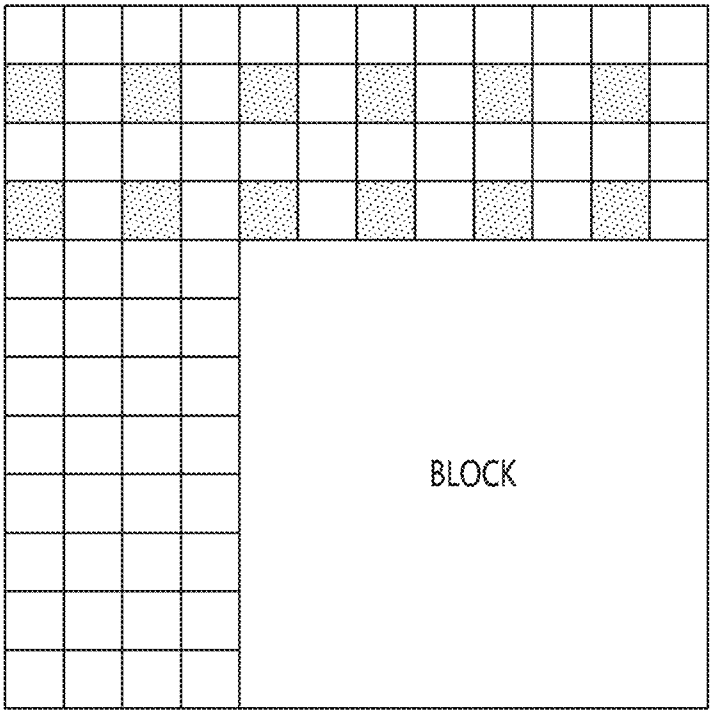
Figure 28N:
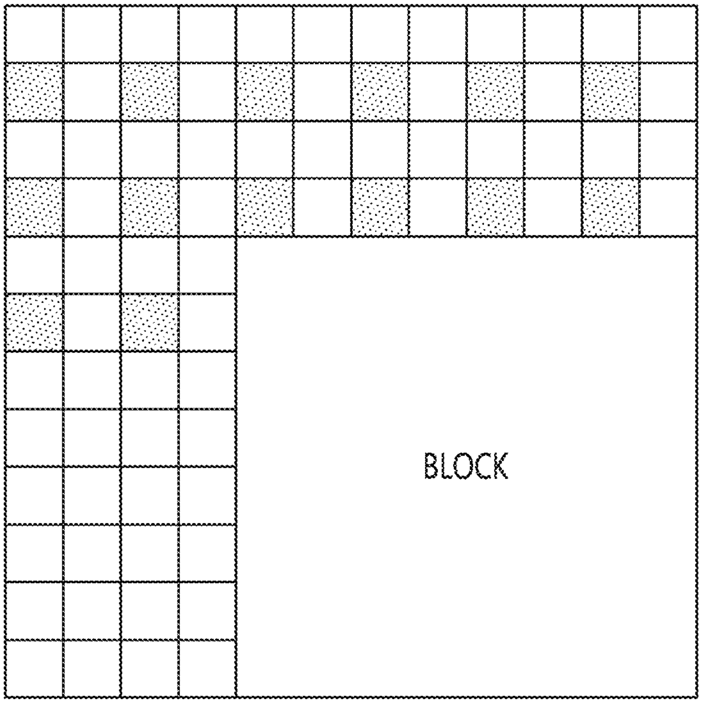

FIGS. 28A to 28N illustrate some of subsampling methods in template matching according to an example.

Figure 29A:
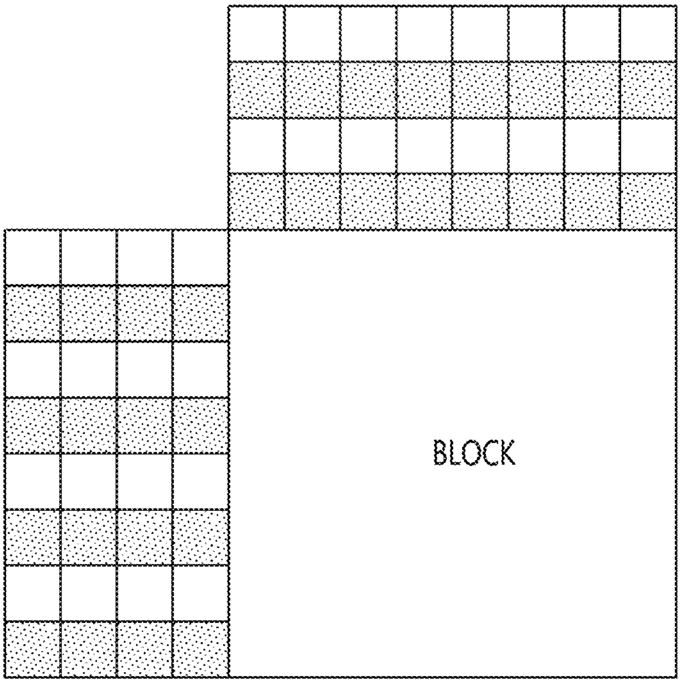
FIGS. 29A to 29N illustrate others of subsampling methods in template matching according to an example.
Figure 29B:
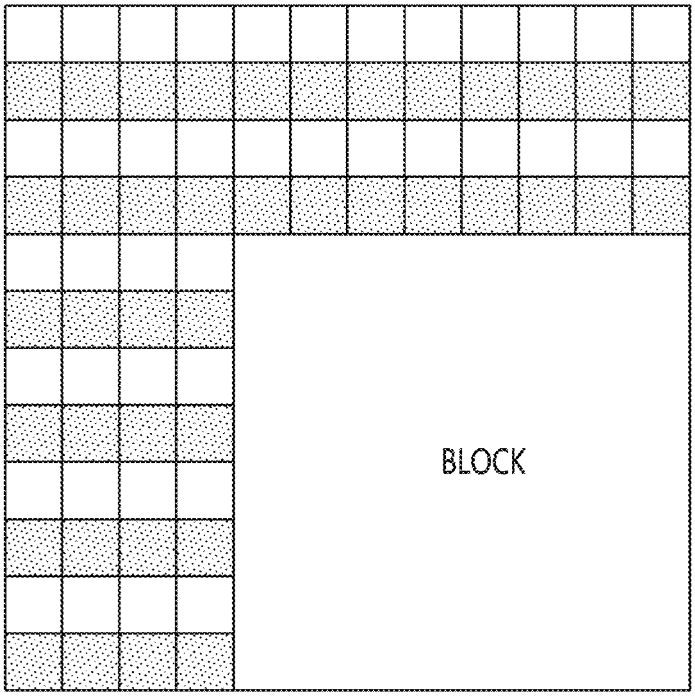
Figure 29C:
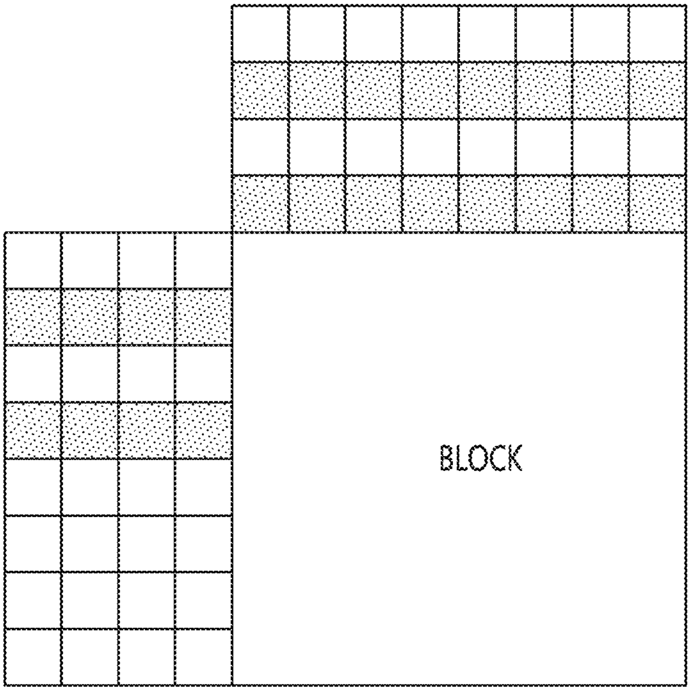
Figure 29D:
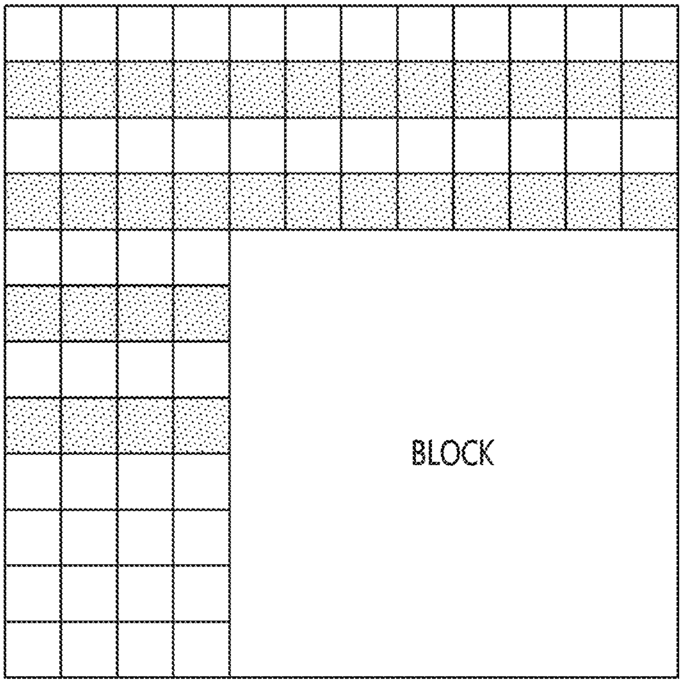
Figure 29E:
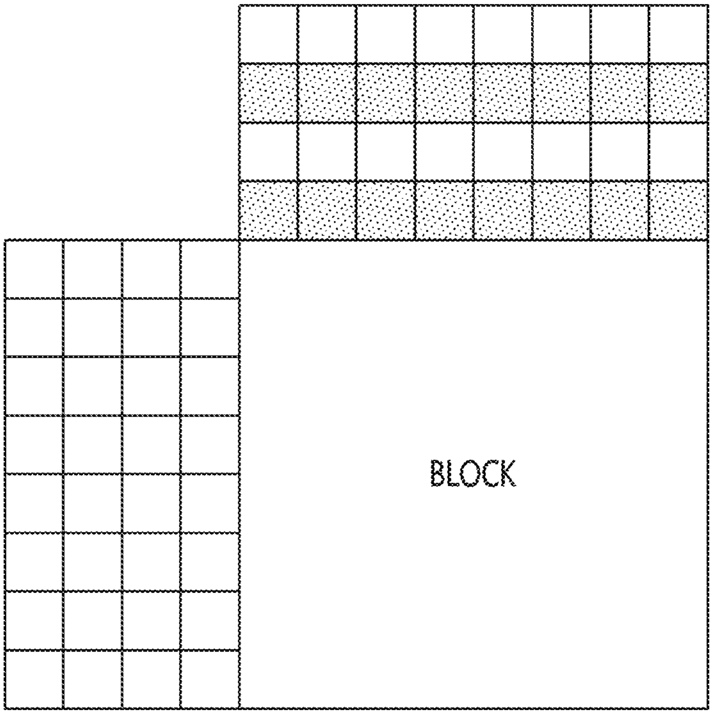
Figure 29F:
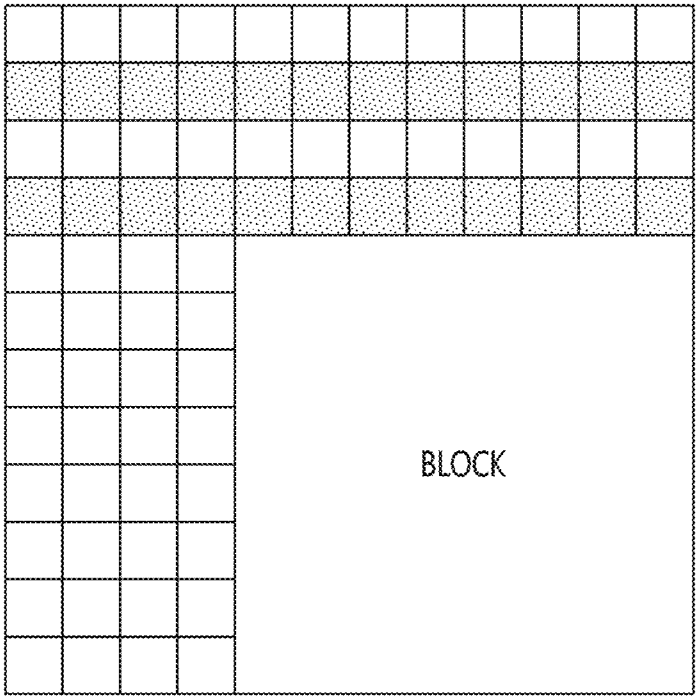
Figure 29G:
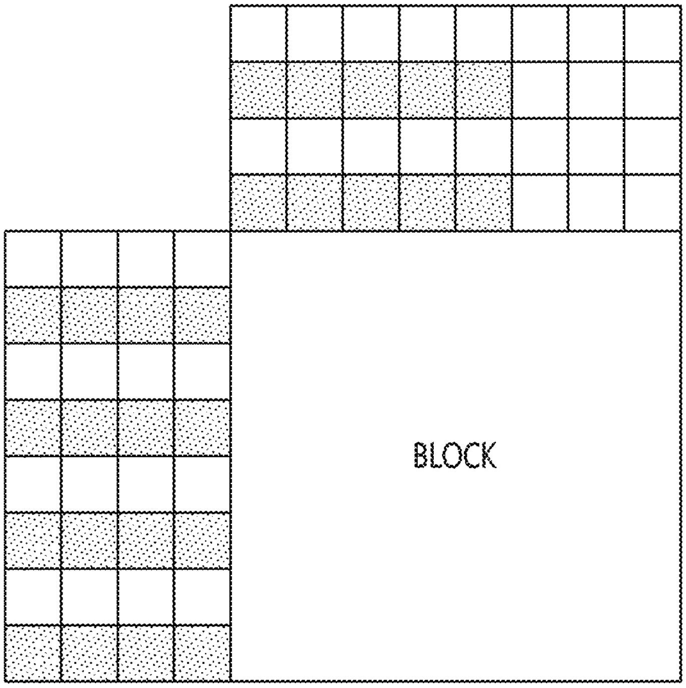
Figure 29H:
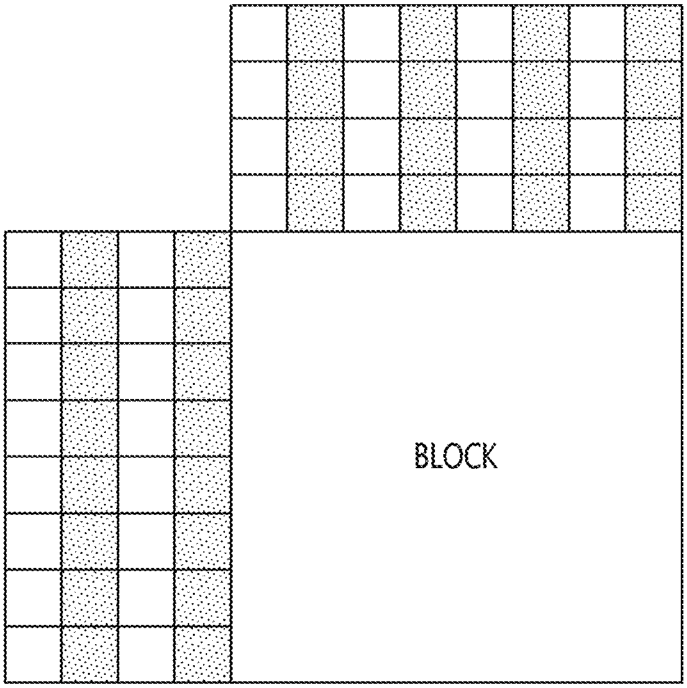
Figure 29I:
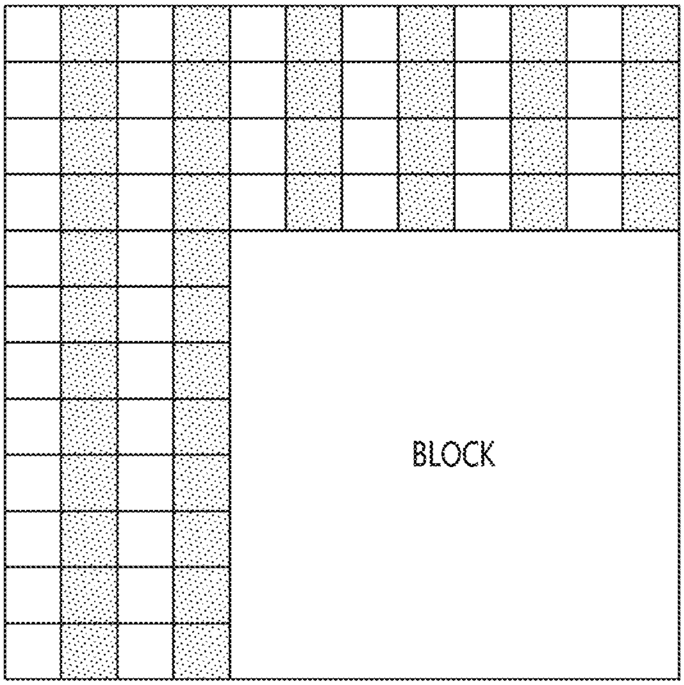
Figure 29J:
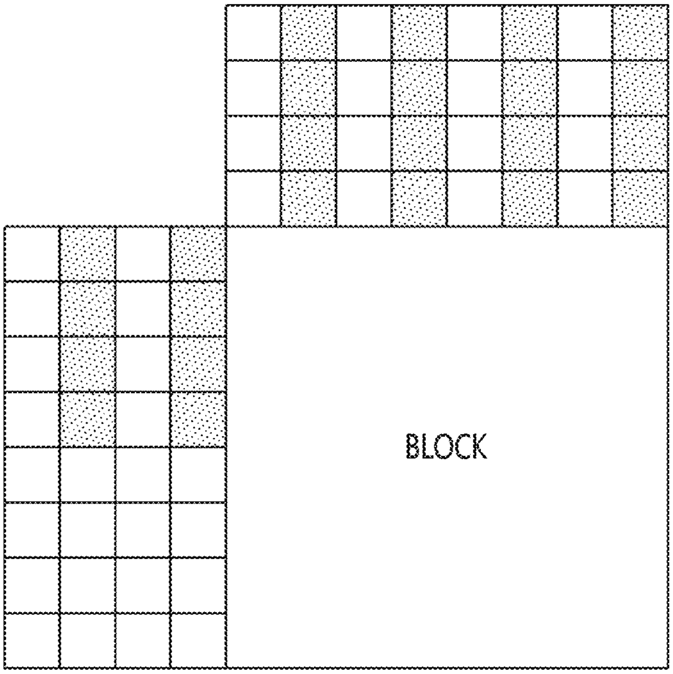
Figure 29K:
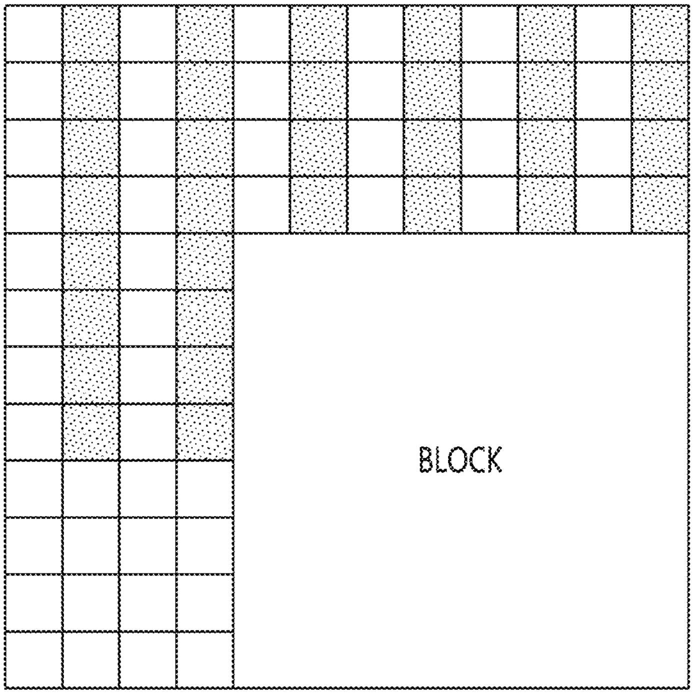
Figure 29L:
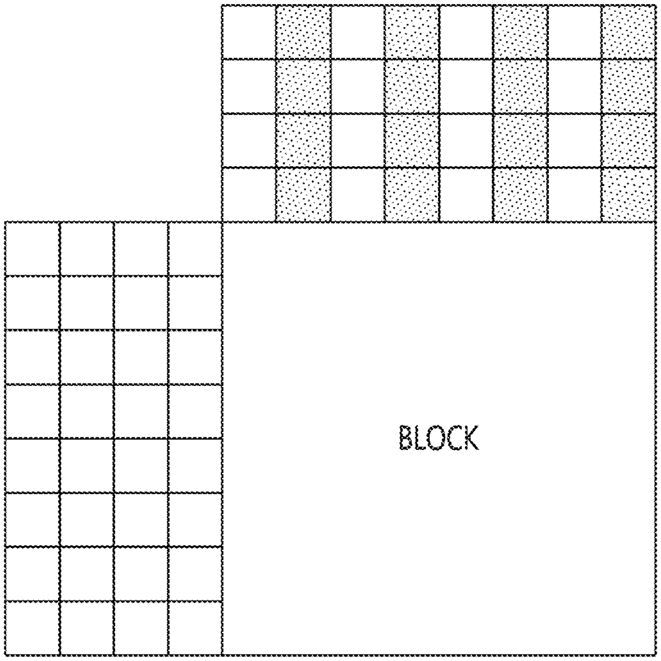
Figure 29M:
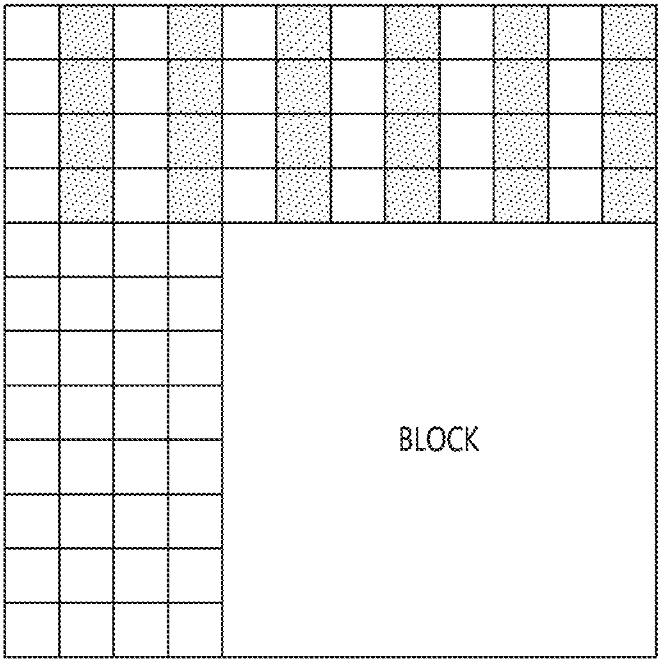
Figures 29N, 30:
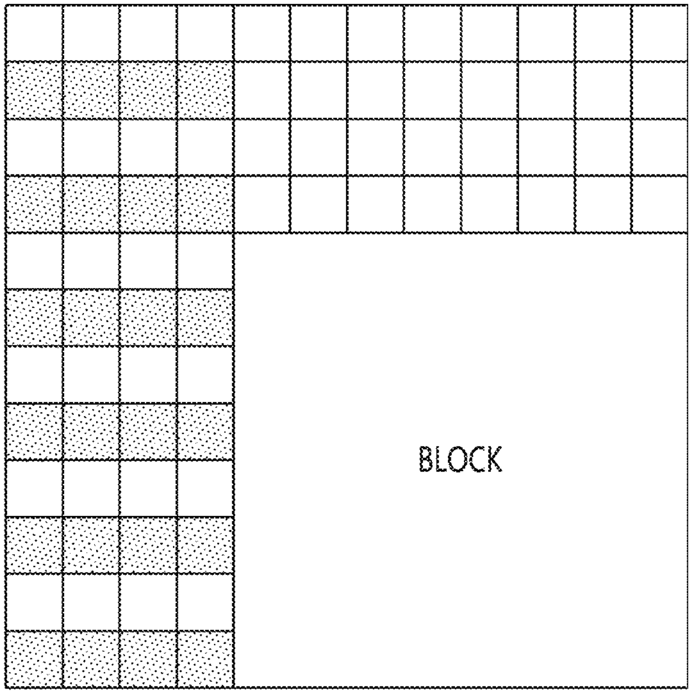

FIGS. 29A to 29N illustrate others of subsampling methods in template matching according to an example.

In FIGS. 27A to 27T, FIGS. 28A to 28N, and FIGS. 29A to 29N, shaded samples (or positions) may represent samples (or positions) selected through subsampling.

In FIGS. 27A to 27T, FIGS. 28A to 28N, and FIGS. 29A to 29N, white samples (or positions) may represent samples (or positions) that are not selected through subsampling.

As illustrated in FIGS. 28A to 28N and FIGS. 29A to 29N, subsampling may be applied to all or part of a reference region, and a template may be configured using only samples (or positions) selected by subsampling.

In embodiments, the samples selected by subsampling may refer to subsampled samples.

As illustrated in FIGS. 28A to 28N and FIGS. 29A to 29N, subsampling may be applied to all or part of a template region in template matching, and calculation of a cost function may be performed only on the samples (or positions) selected by subsampling.

As illustrated in FIGS. 27A to 27*t*, subsampling may be applied to all or part of the search area in template matching, and search and/or matching cost calculation may be performed only on the samples (or positions) selected by subsampling As illustrated in FIGS. 27A to 27*t*, subsampling may be applied to all or part of the search area in template matching, and search and/or matching cost calculation may be performed only on multiple pieces of motion information indicating the samples and/or locations selected by subsampling.

Search Method in Template Matching

Definition of Search

Search may be performed using calculation of a cost function for determining similarity between NUM_TEMPLATE_COMPARE templates.

The search may include a procedure for determining at least one piece of motion information which satisfies a specific condition within a specific search range. Based on the at least one piece of motion information determined through the search, the motion information of the target block may be determined and/or changed.

The motion information satisfying the specific condition may refer to motion information having lowest matching cost among multiple pieces of motion information within the search range. However, the definition of the motion information satisfying the specific condition is not limited thereto.

Cost Function

The cost function may refer to a function of determining similarity between at least one first sample within a target template and at least one second sample within a reference template.

In embodiments, similarity between a first value of the first sample and a second value of the second sample may be determined using at least one of 1) the difference between the two values, 2) the ratio of the two values, and 3) an operation of comparing the difference between the two values with a specific value.

The cost function may be a function of determining similarity between at least one first sample within the target template and a second sample within the reference template, which corresponds to the first sample.

The cost function may be one or more of the Sum of Absolute Differences (SAD), the Sum of Absolute Transformed Differences (SATD), the Mean-Removed Sum of Absolute Differences (MR-SAD), Mean Squared Error (MSE), and the Sum of Squared Error (SSE). However, the cost functions may not be limited to the above-listed items.

The cost function used in template matching may be predefined, and may be determined based on signaled/encoded/decoded information.

For example, in the case where the target block satisfies the enabling condition of bilateral matching and/or a part of the enabling condition of bilateral matching, or in the case where bilateral matching is performed on the target block, MR-SAD may be used as a cost function in template matching.

For example, in the case where the target block does not satisfy the enabling condition of bilateral matching and/or the part of the enabling condition of bilateral matching, or in the case where bilateral matching is not performed on the target block, SAD may be used as a cost function in template matching.

For example, based on whether the specific condition is satisfied in bilateral matching, the type of the cost function in bilateral matching may be determined. In this case, based on whether the enabling condition of bilateral matching and the specific condition for determining the type of the cost function in bilateral matching are satisfied, the type of the cost function in template matching may be determined.

For example, when the target block satisfies the enabling condition of bilateral matching and the specific condition, MR-SAD may be used as a cost function in bilateral matching, whereas when the enabling condition of bilateral matching or the specific condition is not satisfied, SAD may be used as a cost function in bilateral matching.

For example, when the target block satisfies the enabling condition of bilateral matching; and inter weighted bi-prediction (inter bi-prediction with weights) is performed or the number of samples in the target block is greater than a specific value, MR-SAD may be used as a cost function in template matching. Otherwise, SAD may be used as a cost function in template matching.

Search Range

A search range may be a specific range having a position indicated by initial motion information as the center. In other words, the center of the search range may be the position indicated by the initial motion information.

Alternatively, the search range may be a specific range having the position indicated by the initial motion information as a top-left position. In other words, the top-left position of the search range may be the position indicated by the initial motion information.

Alternatively, the search range may include at least one of samples located in a left-below region, a left region, a left-above region, an above region and a right-above region around the target block.

Alternatively, the search range may include at least one of the positions of the samples located in a left-below region, a left region, a left-above region, an above region and a right-above region around the target block.

At least one of the size and shape of the search range of the target block may be determined based on at least one of the size of the target block, the coding parameter of the target block, the motion information of the target block, and the prediction mode of the target block.

The search range may have a rectangular shape, a horizontal length of which is SR_X and a vertical length of which is SR_Y. Alternatively, the search range may have a diamond shape, a horizontal length of which is SR_X and a vertical length of which is SR_Y. However, the shape and size of the search range are not limited to the above-described forms.

Each of SR_X and SR_Y may be a positive integer. Each of SR_X and SR_Y may be a predefined value or a value determined based on signaled/encoded/decoded information.

The initial motion information may be determined based on at least one of motion information of the target block, a coding parameter of the target block, a motion vector of the target block, a reference image of the target block, a block vector of the target block, a motion vector predictor of the target block, a block vector predictor of the target block, motion information of at least one neighboring block of the target block, a merge candidate of the target block, a motion vector difference of the target block, and a block vector difference of the target block.

In embodiments, the neighboring block of the target block may refer to a block adjacent to the target block. Alternatively, the neighboring block of the target block may include a block adjacent to the target block. Alternatively, the neighboring block of the target block may be a block to which the distance from the target block is less than or equal to a reference value. Here, the distance may be the larger of a horizontal distance and a vertical distance. Alternatively, the distance may be 1) a horizontal distance, 2) a vertical distance, 3) a diagonal distance, or 4) the smaller of the horizontal distance and the vertical distance. Here, the unit of the distance may be a pixel or a block.

Search Method

Search methods may be classified based on a search pattern, search resolution, a search range, initial motion information, and the unit of derivation of motion information.

Each search method may be determined based on at least one of the motion information of the target block, the coding parameter of the target block, the size of the target block, the prediction mode of the target block, the reference image of the target block, at least one sample value within the target block, the target template, at least one sample value within the target template, and the region of the target template.

Search Pattern

A search pattern may be one of a diamond pattern, a cross pattern, and a full-search pattern. However, the search pattern is not limited to the above-listed patterns.

Search using the diamond pattern may refer to an operation of searching for one or more of positions corresponding to (0, 2×RR), (RR, RR), (2×RR, 0), (RR, −RR), (0, −RR), (−RR, −RR), (−RR, 0), (−RR, RR), and (0, 0) when (0, 0) represents the position indicated by the initial motion information.

Search using the cross pattern may be an operation of searching for one or more of positions corresponding to (0, RR), (RR, 0), (0, −RR), (−RR, 0) and (0, 0) when (0, 0) represents the position indicated by the initial motion information.

RR may be search resolution or a value determined based on the search resolution, and may be a predefined positive number.

Search using the full-search pattern may be an operation of searching for all positions within a predefined search range.

For example, assuming that $FS_i$ has values ranging from $-FS_X$ to $FS_X$ and $FS_j$ has values ranging from $-FS_Y$ to $FS_Y$, the search using the full-search pattern may refer to an operation of searching for positions corresponding to ($FS_i$×RR, $FS_j$×RR). Here, (0, 0) may be the position indicated by the initial motion information. However, the search range is not limited to the above-described positions. Each of $FS_X$ and $FS_Y$ may be a predefined positive number.

Search Resolution

The search resolution may be one of 4-pel, full-pel, half-pel, and quarter-pel. However, the search resolution is not limited to the above-described pels.

The search resolution may be predefined, may be determined based on at least one of pieces of information about adaptive motion vector resolution, and may be determined based on a signaled/encoded/decoded value.

In embodiments, the above-described motion information may be derived for a (whole) target block, and may be derived for each subblock. In other words, the unit for which the motion information is derived may be a target block or a subblock.

FIGS. 30 to 35 illustrate search methods in template matching according to an example.

A specific column may be determined among columns in tables illustrated in FIGS. 30 to 35, based on the motion information, coding parameter, prediction mode, and adaptive motion vector resolution of the target block.

Search using search patterns and search resolution, which correspond to rows in which "v" is indicated in the order from the top to bottom of the determined column may be performed.

For example, in FIG. 30, in the case where an AMVP mode is used for a target block and resolution determined through adaptive motion vector resolution is 4-pel, search for a diamond pattern using 4-pel search resolution may be performed, and search for a cross pattern using 4-pel search resolution may be performed after the search for the diamond pattern using the 4-pel search resolution is performed.

In tables, AltIF may denote the index of an adaptive interpolation filter. In order to calculate a pixel value at the sample position of specific resolution, an interpolation filter may be applied.

The adaptive interpolation filter may be an interpolation filter selected by the index from among multiple interpolation filters. In other words, when the adaptive interpolation filter is applied, different interpolation filters may be used depending on the index so as to calculate the pixel value at the sample position of specific resolution.

For example, the specific resolution may be half-pel. However, the specific resolution is not limited to the half-pel.

For example, the interpolation filter determined by the index may be one of a 6-tap interpolation filter and an 8-tap interpolation filter. However, determination of the interpolation filter is not limited to the above-described scheme.

Figures 35, 36:
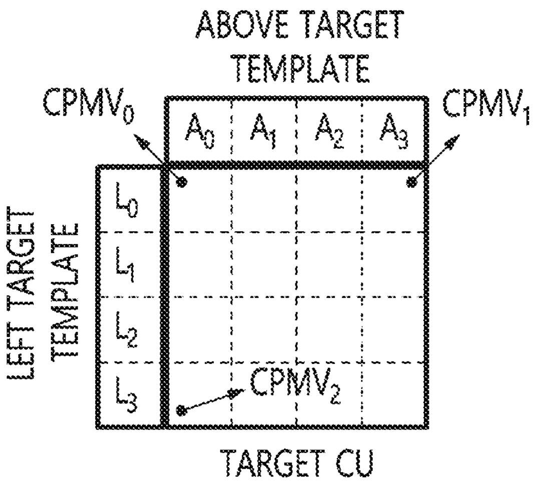

FIG. 36 illustrates a first template configuration method in an affine mode according to an example.

Figure 37:
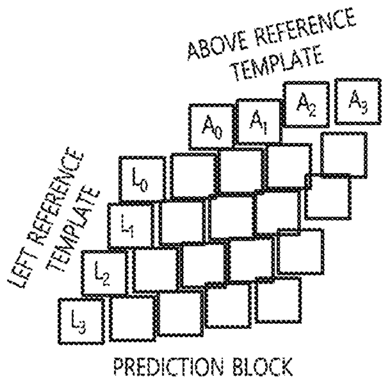
FIG. 37 illustrates a second template configuration method in an affine mode according to an example.

FIG. 37 illustrates a second template configuration method in an affine mode according to an example.

In FIG. 36, an affine control point motion vector (CPMV) is illustrated. The motion vector of each subblock in a target block may be derived using CPMV.

When the affine mode is used for the target block, the target block may be partitioned into subblocks. The width of each subblock may be N, and the height thereof may be M.

Motion information of each subblock may be determined based on at least one of motion information, coding parameter, and size of the target block.

Template matching cost for the target block may be determined based on at least one of template matching costs for partitioned subblocks. For example, template matching cost for the target block may be the sum or average of the template matching costs for the partition subblocks.

Each of N and M May 2, 4, 8 or a positive integer.

Each of N and M may be a predefined value, and may be a value determined based on signaled/encoded/decoded information.

Template Matching in Bidirectional Prediction Block

For example, determining motion information of the target block based on motion information of a neighboring block may be expressed as "the target block inherited the motion information from the neighboring block".

For example, when a merge mode is used for the target block, one merge candidate may be specified from a merge candidate list based on a merge index, and motion information of the specified merge candidate may be used as the motion information of the target block.

For example, when an AMVP mode is used for the target block, one motion vector candidate may be specified from a motion vector candidate list based on a motion vector candidate index, and motion information of the specified motion vector candidate may be used as the motion information of the target block.

When the motion information inherited by the target block from the neighboring block indicates bidirectional prediction, template matching for the target block may be performed according to an embodiment including the following steps 1 to 4.

Step 1

Template matching may be performed in an L0 direction and an L1 direction, respectively. Template matching costs C0 and C1 depending on the motion information determined in the L0 direction and the L1 direction may be calculated.

Here, when template matching in each direction is performed, motion information in other directions may not be taken into consideration, and template matching may be performed in the same manner as the performance of template matching in unidirectional prediction for the corresponding direction.

For example, when the target block satisfies a predefined condition, MR-SAD may be used as a cost function, whereas when the target block does not satisfy the predefined condition, SAD may be used as the cost function.

The predefined condition may be a condition based on at least one of 1) whether a model-based prediction method is performed on the target block, 2) an indicator indicating whether a model-based prediction method is performed on the target block, 3) whether bilateral matching is performed on the target block, 4) an indicator indicating whether bilateral matching is performed on the target block, 5) motion information of the target block, 6) the size of the target block, 7) a coding parameter of the target block, 8) motion information of a neighboring block of the target block, 9) a coding parameter of the neighboring block of the target block, and 10) the type of a cost function for template matching in the neighboring block of the target block.

For example, when the model-based prediction method is performed on the target block or when the value of the indicator indicating whether the model-based prediction method is performed on the target block is true, MR-SAD may be used as a cost function, otherwise SAD may be used as the cost function.

For example, when 1) bilateral matching is performed on the target block, 2) the value of the indicator indicating whether bilateral matching is performed on the target block is true; and the number of samples in the target block is equal to or greater than a specific value, MR-SAD may be used as a cost function, otherwise SAD may be used as the cost function.

The cost function in embodiments may refer to a cost function used for search in template matching; and/or a cost function used to calculate at least one of C0, C1 and C'.

The cost function used for search in template matching and the cost function used to calculate at least one of C0, C1 and C' may be identical to each other. Further, the cost function used for search in template matching and the cost function used to calculate at least one of C0, C1 and C' may be different from each other.

For example, for search in template matching, MR-SAD may be used as the cost function, and C0, C1 and C' may be calculated using SAD.

Step 2

When C0 is less than C1, a new target template T' may be generated using the target template and a template in the L0 direction.

T may refer to the target template. TO may refer to a reference template in the L0 direction. T1 may refer to a reference template in the L1 direction.

T' may be determined based on the following Equation 3.

$$T' = \omega_\tau \times T + \omega_{\tau 0} \times T0 \qquad \text{[Equation 3]}$$

Each of $\omega_\tau$ and $\omega_{\tau 0}$ may be a predefined value.

Each of $\omega_\tau$ and $\omega_{\tau 0}$ may be a value determined based on whether inter bi-prediction with weights is performed for the target block; and/or weights in inter bi-prediction with weights.

For example, $\omega_\tau$ may be 2, and $\omega_{\tau 0}$ may be −1.

When C0 is greater than C1, a new target template T' may be generated using the target template and a template in the L1 direction.

When C0 is equal to C1, a procedure at step 2 in one of the above-described case where C0 is less than C1 or the above-described case where C0 is greater than C1 may proceed. [Step 3]

When C0 is less than C1, template matching in which T' is used as a target template may be performed in the L1 direction. Template matching cost C' of the motion information determined in the L1 direction may be calculated.

When C0 is greater than C1, template matching in which T' is used as a target template may be performed in the L0 direction. Template matching cost C' of the motion information determined in the L0 direction may be calculated.

When C0 is equal to C1, a procedure at step 3 in one of the above-described case where C0 is less than C1 or the above-described case where C0 is greater than C1 may proceed. [Step 4]

When the following Equation 4 is established, the motion information of the target block may be changed to motion information indicating unidirectional prediction in the L0 direction or the L1 direction based on C0 and C1.

$$C' = \omega_{c0} \times C0 + \omega_{c1} \times C1 \qquad \text{[Equation 4]}$$

When C0 is less than C1, the motion information of the target block may be changed to motion information indicating unidirectional prediction in the L0 direction. Alternatively, it may be considered that motion information in the L1 direction is unavailable in the target block.

When C0 is greater than C1, the motion information of the target block may be changed to motion information indicating unidirectional prediction in the L0 direction. Alternatively, it may be considered that motion information in the L1 direction is unavailable in the target block.

When C0 is equal to C1, a procedure at step 4 in one of the above-described case where C0 is less than C1 or the above-described case where C0 is greater than C1 may proceed.

Each of $\omega_{c0}$ and $\omega_{c1}$ may be a predefined value.

Each of $\omega_{c0}$ and $\omega_{c1}$ may be a value determined based on whether inter bi-prediction with weights is performed for the target block; and/or weights in inter bi-prediction with weights.

Each of C0 and C1 may be a predefined value.

For example, $\omega_{c0}$ may be 1. $\omega_{c1}$ may be ⅛.

For example, the above-described steps 2 to 4 may be performed only when the target block satisfies a predefined condition.

For example, the above-described steps 2 to 4 may be performed only 1) when bidirectional prediction is used for the target block; and 2) when bilateral matching is not performed for the target block or when the target block does not satisfy the enabling condition of bilateral matching.

When correction using template matching is performed on first motion information that uses a first picture as a reference picture, second motion information that uses a second picture as a reference picture may be derived from the first motion information. Thereafter, correction using template matching may be performed on the second motion information.

For example, first corrected motion information may be derived by applying correction using template matching to the first motion information. A first reference block indicated by the first corrected motion information may be used to generate a prediction block for the target block.

For example, second corrected motion information may be derived by applying correction using template matching to the second motion information. A second reference block indicated by the second corrected motion information may be used to generate a prediction block for the target block.

For example, when the prediction block for the target block is generated, a weighted sum of the first reference block and the second reference block may be used.

Each of the first picture and the second picture may be one of pictures present in a reference picture list for the L0 direction of the target block and/or a reference picture list for the L1 direction for the target block.

When the second motion information is derived from the first motion information, a result (i.e., a scaled first motion vector) generated by applying scaling to a first motion vector based on the Picture Order Count (POC) of the first reference picture, the POC of the second reference picture, and the POC of the target picture may be used as the motion vector of the second motion information.

For example, the magnitude of the motion vector of the second motion information and the magnitude of the motion vector of the first motion information may be identical to each other, and the direction of the motion vector of the second motion information and the direction of the motion vector of the first motion information may be opposite to each other.

For example, the first motion information and the second motion information may be different from each other in at least one of a reference picture, a reference picture index, and motion information.

For example, the first motion information and the second motion information may be identical to each other in the remaining items other than the at least one of the reference picture, the reference picture index, and the motion information.

By means of a method of deriving the second motion information and a method corresponding to a method of generating a prediction block for the target block in embodiments, N-th motion information may be derived, and a reference block indicated by the N-th motion information may be used when the prediction block for the target block is generated.

Here, N may be 2, 3, or a positive integer.

Bilateral Matching

In bilateral matching, a reference block in an L0 direction and a reference block in an L1 direction may be used as templates, and motion information of a target block may be determined and/or changed based on the result of calculating a cost function between the two templates.

The reference block may include at least one of 1) a reference block indicated by initial motion information, 2) a reference block indicated by motion information derived in a search process in bilateral matching, and 3) a reference block indicated by motion information finally refined through bilateral matching.

For example, when a template for bilateral matching is configured, a reference block in a L0 direction and a reference block in a L1 direction may be used as templates.

Bilateral matching cost may refer to the result value of the cost function between the templates of the reference block in the L0 direction and the reference block in the L1 direction, which are used in bilateral matching.

Subsampling in Bilateral Matching

Subsampling in Template Configuration

When a template for bilateral matching is configured, only some of pixels and/or locations within a reference block in an L0 direction and a reference block in an L1 direction may be selected. The template may be configured using only the selected pixels and/or the selected locations.

The template for bilateral matching may refer to at least one of a template in the L0 direction and a template in the L1 direction.

For example, when the template for bilateral matching is configured, subsampling for the reference block in the L0 direction and the reference block in the L1 direction may be used.

For example, when the template for bilateral matching is configured, subsampling for a part of the reference block in the L0 direction and a part of the reference block in the L1 direction may be used.

Alternatively, for example, when the template for bilateral matching is configured, each of the reference block in the L0 direction and the reference block in the L1 direction may be partitioned into two or more regions.

Each of the partition regions may be one of 1) a region to which subsampling is applied, 2) a region to which subsampling is not applied and that is used to configure the template, and 3) a region that is not used for template configuration.

In an embodiment, the template for bilateral matching may be configured using 1) pixels and/or locations selected by subsampling in a first region and 2) pixels and/or locations in a second region.

Alternatively, for example, when the template for bilateral matching is configured, each of the reference block in the L0 direction and the reference block in the L1 direction may be partitioned into two or more regions.

Each of the partition regions may be one of 1) a region to which subsampling is applied and 2) a region that is not used for template configuration.

In an embodiment, the template for bilateral matching may be configured using 1) the pixels and/or locations selected by the subsampling.

For example, when the template for bilateral matching is configured, regions used for the configuration of the template may be a partial region of the reference block in the L0 direction and a partial region of the reference block in the L1 direction.

For example, when the template for bilateral matching is configured, pixels (or locations) used to configure the template may be selected only from the partial region of the reference block in the L0 direction and the partial region of the reference block in the L1 direction.

Here, the size of the partial region of the reference block in the L0 direction may be smaller than the size of the region of the reference block in the L0 direction.

For example, the height (or vertical size) of the partial region of the reference block in the L0 direction may be smaller than the height (or vertical size) of the reference block in the L0 direction.

For example, the width (or horizontal size) of the partial region of the reference block in the L0 direction may be smaller than the width (or horizontal size) of the reference block in the L0 direction.

Here, the size of the partial region of the reference block in the L1 direction may be smaller than the size of the region of the reference block in the L1 direction.

For example, the height (or vertical size) of the partial region of the reference block in the L1 direction may be smaller than the height (or vertical size) of the reference block in the L1 direction.

For example, the width (or horizontal size) of the partial region of the reference block in the L1 direction may be smaller than the width (or horizontal size) of the reference block in the L1 direction.

Subsampling for Cost Function Calculation

When a cost function between the templates of bilateral matching is calculated, only some of pixels and/or locations in a template region may be selected. The calculation of the cost function may be performed only on the selected pixels and/or the selected locations.

For example, when the cost function between the templates of bilateral matching is calculated, subsampling may be performed on a template region in an L0 direction and a template region for an L1 direction.

For example, when the cost function between the templates of bilateral matching is calculated, subsampling may be performed on a portion of the template region in the L0 direction and a portion of the template region in the L1 direction.

Alternatively, for example, when a cost function between the templates of bilateral matching is calculated, each of the template region in the L0 direction and the template region for the L1 direction may be partitioned into two or more regions.

Each of the partitioned regions may be one of 1) a region to which subsampling is applied, 2) a region to which subsampling is not applied and that is used to calculate a cost function, and 3) a region that is not used to calculate a cost function.

In an embodiment, a cost function between the templates of bilateral matching may be calculated using 1) pixels and/or locations selected by subsampling in a first region and 2) pixels and/or locations in a second region.

Alternatively, for example, when a cost function between the templates of bilateral matching is calculated, each of the template region in the L0 direction and the template region for the L1 direction may be partitioned into two or more regions.

Each of the partition regions may be one of 1) a region to which subsampling is applied and 2) a region that is not used to calculate a cost function.

In an embodiment, the cost function between the templates of bilateral matching may be calculated using 1) the pixels and/or locations selected by subsampling.

For example, when the cost function between the templates of bilateral matching is calculated, regions used to calculate the cost function may be a partial region of the template in the L0 direction and a partial region of the template in the L1 direction.

Here, the size of the partial region of the template in the L0 direction may be smaller than the size of the region of the template in the L0 direction.

For example, the height (or vertical size) of the partial region of the template in the L0 direction may be smaller than the height (or vertical size) of the template in the L0 direction.

For example, the width (or horizontal size) of the partial region of the template in the L0 direction may be smaller than the width (or horizontal size) of the template in the L0 direction.

Here, the size of the partial region of the template in the L1 direction may be smaller than the size of the region of the template in the L1 direction.

For example, the height (or vertical size) of the partial region of the template in the L1 direction may be smaller than the height (or vertical size) of the template in the L1 direction.

For example, the width (or horizontal size) of the partial region of the template in the L1 direction may be smaller than the width (or horizontal size) of the template in the L1 direction.

Subsampling for Search Area

When a search process in bilateral matching is performed, only some of pixels and/or locations in a search area may be selected. Search and/or matching cost calculation may be performed only on the selected pixels and/or the selected locations. Alternatively, search and/or matching cost calculation may be performed only on multiple pieces of motion information indicating the selected pixels and/or the selected locations.

For example, when the search process in bilateral matching is performed, subsampling may be performed on all or part of the search area.

Alternatively, for example, when the search process in bilateral matching is performed, each of search areas may be partitioned into two or more regions.

Each of the partitioned regions may be one of 1) a region to which subsampling is applied, 2) a region to which subsampling is not applied and a search process is applied, and 3) a region to which a search process is not applied.

In an embodiment, the search process in bilateral matching may be performed on 1) pixels and/or locations selected by subsampling in a first region and 2) pixels and/or locations in a second region.

In an embodiment, the search process in bilateral matching may be performed on multiple pieces of motion information indicating 1) the pixels and/or locations selected by subsampling in the first region and 2) the pixels and/or locations in the second region.

Alternatively, for example, when the search process in bilateral matching is performed, each of search areas may be partitioned into two or more regions.

Each of the partition regions may be one of 1) a region to which subsampling is applied and 2) a region to which a search process is not applied.

In an embodiment, the search process in bilateral matching may be performed using 1) the pixels and/or locations selected by the subsampling.

In an embodiment, the search process in bilateral matching may be performed on the multiple pieces of motion information indicating 1) the pixels and/or locations selected by the subsampling.

The above-described FIGS. 27A to 27T illustrate subsampling methods in bilateral matching according to an example.

In FIGS. 27A to 27T, shaded samples (or locations) may represent samples (or locations) selected through subsampling.

In FIGS. 27A to 27T, white samples (or locations) may represent samples (or locations) that are not selected through subsampling.

As shown in FIGS. 27A to 27T, subsampling may be applied to the region of the reference block in the L0 direction and to the region of the reference block in the L1 direction. A template may be configured using only the samples (or locations) selected by subsampling.

As illustrated in FIGS. 27A to 27T, subsampling may be applied to a part of the region of the reference block in the L0 direction and a part of the region of the reference block in the L1 direction, and the template may be configured using only the samples (or locations) selected by the subsampling.

As illustrated in FIGS. 27A to 27T, subsampling may be applied to all or part of the template region in bilateral matching. A cost function may be calculated only for the samples (or locations) selected by subsampling.

As illustrated in FIGS. 27A to 27T, subsampling may be applied to all or part of the search area in bilateral matching. Search and/or matching cost calculation may be performed only on the pixels and/or locations selected by subsampling.

As illustrated in FIGS. 27A to 27T, subsampling may be applied to all or part of the search area in bilateral matching. Search and/or matching cost calculation may be performed only on multiple pieces of motion information indicating the pixels and/or the locations selected by subsampling.

Enabling Condition Predefined for Bilateral Matching

Bilateral matching may be operated only when a predefined enabling condition is satisfied.

For example, bilateral matching may always be operated.

For example, bilateral matching may be performed when an inter-prediction mode is used for the target block and two or more reference blocks are used in the inter-prediction mode.

For example, bilateral matching may be performed only when a first direction and a second direction are different from each other and a first POC interval and a second POC interval are identical to each other. The first direction may be a direction from a target image to a reference image in an L0 direction. The second direction may be a direction from the target image to a reference image in an L1 direction. The first POC interval may be the difference between the POC of the target image and the POC of the reference image in the L0 direction. The second POC interval may be the difference between the POC of the target image and the POC of the reference image in the L1 direction.

For example, bilateral matching may be performed only when the first direction and the second direction are different from each other. The first direction may be the direction from the target image to the reference image in the L0 direction. The second direction may be the direction from the target image to the reference image in the L1 direction.

Here, the fact that the first direction and the second direction are different from each other may mean that the following Equation 5 is satisfied.

$$(POC_t - POC0)\times(POC_t - POC1) < 0 \qquad \text{[Equation 5]}$$

Here, the fact that the first direction and the second direction are identical to each other may mean that the following Equation 6 is satisfied.

$$(POC_t - POC0)\times(POC_t - POC1) > 0 \qquad \text{[Equation 6]}$$

$POC_t$ may be the POC of the target image.

POC0 may be the POC of the reference image in the L0 direction.

POC1 may be the POC of the reference image in the L1 direction.

Search Step in Bilateral Matching

Bilateral matching may include one or more search steps.

For example, bilateral matching may be configured to sequentially include 1) the step of deriving motion information of the whole block and 2) the step of deriving multiple pieces of motion information of subblocks of the block. However, the methods of deriving the motion information, performed at respective steps, and the order of respective steps are not limited to the above-described configurations.

At each search step of bilateral matching, motion information in BM_NUM directions of the motion information in the L0 direction and the motion information in the L1 direction may be refined.

BM_NUM may be 0, 1, 2 or a positive integer. BM_NUM values used at steps of bilateral matching may be identical to or different from each other.

For example, when BM_NUM is 1 at the specific search step, refinement of the motion information may be performed only on motion information in $LX_{BM}$ direction at the specific search step.

For example, when BM_NUM is 1 and $X_{BM}$ is 0 at the specific search step, only search in the L0 direction may be performed in the state in which a template in the L1 direction and motion information in the L1 direction are fixed, at the specific search step.

$X_{BM}$ may be 0, 1 or a positive integer.

$X_{BM}$ may be predefined.

For example, the $X_{BM}$ direction may be a direction having a larger POC value of the L0 direction and the L1 direction. POC may be the difference between the POC of the reference image (in a specific direction) and the POC of the target image.

For example, the $X_{BM}$ direction may be a direction having higher template matching cost of the L0 direction and the L1 direction. Here, the template matching cost for the specific direction may be the template matching cost of motion information in the specific direction.

The information about $X_{BM}$ may be signaled/encoded/decoded.

Method for Determining Direction $X_{BM}$ may be 0 when a first POC difference is greater than a second POC difference, and may be 1 otherwise. Alternatively, $X_{BM}$ may be 1 when the first POC difference is greater than the second POC difference, and may be 0 otherwise.

Here, the first POC difference may be the difference between the POC of the target image and the POC of the reference image in the L0 direction. The second POC difference may be the difference between the POC of the target image and the POC of a reference image in the L1 direction.

For example, $X_{BM}$ may be determined based on a context model and/or a probability model that are used to perform entropy encoding and/or entropy decoding on the motion information and the coding parameter of the target block.

For example, $X_{BM}$ may be determined based on at least one of a context model and/or a probability model that are used when the inter-prediction indicator of the target block is entropy encoded and/or entropy decoded.

For example, a direction determined to be more powerful for the target block in unidirectional prediction in the L0 direction and unidirectional prediction in the L1 direction by the context model and/or the probability model that are used when the inter-prediction indicator is entropy encoded and/or entropy decoded may be selected as the $LX_{BM}$ direction.

For example, a direction determined to be more powerful for the target block in unidirectional prediction in the L0 direction and unidirectional prediction in the L1 direction by the context model and/or the probability model that are used when the inter-prediction indicator is entropy encoded and/or entropy decoded may be selected as the $L(1-X_{BM})$ direction.

The more powerful direction may refer to a direction in which fewer bits are used when entropy encoding and/or entropy decoding are performed using the context model and/or the probability model. Alternatively, the more powerful direction may be a direction having a higher probability. The probability of direction may be the probability that the direction will be indicated by the context model and/or the probability model.

For example, $LX_{BM}$ may be determined based on the weights of inter bi-prediction for the target block. For example, $LX_{BM}$ may be a direction having a higher inter bi-prediction weight of the L0 direction and the L1 direction. Alternatively, for example, $LX_{BM}$ may be a direction having a lower inter bi-prediction weight of the L0 direction and the L1 direction.

For example, $X_{BM}$ may be determined based on at least one of motion information and coding parameters of neighboring blocks.

For example, X of the target block may be determined based on at least one of multiple pieces of motion information and coding parameters of neighboring blocks corresponding to at least one of $A_0$, $A_1$, $B_0$, $B_1$ and $B_2$ of FIG. 11.

For example, $X_{BM}$ of the target block may be determined based on at least one of inter-prediction indicators and inter bi-prediction weights of the neighboring blocks.

For example, one or more context models and/or probability models may be used to perform entropy encoding and/or entropy decoding of $X_{BM}$.

Among the multiple context models and/or multiple probability models, the context model and/or the probability model to be used for entropy encoding and/or entropy decoding of $X_{BM}$ of the target block may be determined based on at least one of the multiple pieces of motion information and pieces of coding information of the neighboring models.

For example, in blocks, context models and/or probability models used for entropy encoding and/or entropy decoding of $X_{BM}$ may be identical to each other. Alternatively, in blocks, context models and/or probability models used for entropy encoding and/or entropy decoding of $X_{BM}$ may be different from each other depending on at least one of the inter-prediction direction and inter bi-prediction weight of the corresponding neighboring block.

At the search steps of bilateral matching processes, the same $X_{BM}$ may be used. Alternatively, at the search steps of bilateral matching processes, different $X_{BM}$ values may be respectively used.

For example, when bilateral matching is performed, a cost function to be used for calculation of bilateral matching cost may be determined based on the weights of inter bi-prediction with weights for the target block and/or the weight index of inter bi-prediction with weights.

In embodiments, bi-prediction with weights may refer to bi-prediction with CU-level weights (BCW).

For example, when a first weight and a second weight of the target block are identical to each other, bilateral matching cost may be calculated using SAD or SATD. When the first weight and the second weight of the target block are different from each other, bilateral matching cost may be calculated using MRSAD or MRSATD. Here, the first weight may be the weight of inter bi-prediction with weights in the L0 direction. The second weight may be the weight of inter bi-prediction with weights in the L1 direction.

BM_NUM may be 0, 1, 2 or a positive integer.

BM_NUM may be predefined.

BM_NUM at each search step of bilateral matching may be determined based on coding parameters. Alternatively, BM_NUM may be determined based on at least one of motion information, the search step of bilateral matching, matching cost at a previous search step, matching cost for initial motion information at a current search step, and BM_NUM at the previous search step.

For example, at the first search step of bilateral matching, BM_NUM may be 1 or 2.

For example, BM_NUM at the current search step may be determined based on the matching cost at the previous search step.

For example, when the difference between the matching cost for the initial motion information at the previous search step and matching cost for refined motion information at the previous search step is less than COSTDIFF_FORBMNUM, BM_NUM at the current search step may be 0.

COSTDIFF_FORBMNUM may be 0, 1, 2, 4, 8, 16 or a positive integer.

For example, COSTDIFF_FORBMNUM may be determined based on the size of the target block. COSTDIFF_FORBMNUM may be the product of the number of pixels in the target block and a specific value. The specific value may be 0, 1, 2, 4, 8 or a positive integer.

For example, when BM_NUM at the previous search step is 0, BM_NUM at the current search step may be 0.

For example, when matching cost for the initial motion information at the current search step is less than COSTDIFF_FORBMNUM_INIT, BM_NUM of the target block may be 0.

COSTDIFF_FORBMNUM may be 0, 1, 2, 4, 8, 16 or a positive integer.

For example, COSTDIFF_FORBMNUM_INIT may be determined based on the size of the target block. COSTDIFF_FORBMNUM_INIT may be the product of the number of pixels in the target block and a specific value. The specific value may be 0, 1, 2, 4, 8 or a positive integer.

For example, when motion refinement is performed at the search step of bilateral matching, refinement of motion information in the L0 direction may be performed only in the case where matching cost for L0 direction motion information of the initial motion information at the current search step is greater than COSTDIFF_FORBMNUM_INIT.

For example, when motion refinement is performed at the search step of bilateral matching, refinement of motion information in the L1 direction may be performed only in the case where matching cost for L1 direction motion information of the initial motion information at the current search step is greater than COSTDIFF_FORBMNUM_INIT.

COSTDIFF_FORBMNUM may be 0, 1, 2, 4, 8, 16 or a positive integer.

For example, COSTDIFF_FORBMNUM_INIT may be determined based on the size of the target block. COSTDIFF_FORBMNUM_INIT may be the product of the number of pixels in the target block and a specific value. The specific value may be 0, 1, 2, 4, 8 or a positive integer.

The case where BM_NUM at the specific search step of bilateral matching is 0 may indicate that the refinement of motion information is not performed at the specific search step. Alternatively, the case where BM_NUM at the specific search step of bilateral matching is 0 may indicate that the specific search step is not performed.

For example, when bilateral matching is performed, BM_NUM at a motion information derivation step for the entire (whole) block may be 1, and BM_NUM at a motion information derivation step for a subblock may be 2. In this case, at the motion information derivation step for the entire block, only motion information in the $LX_{BM}$ direction may be refined, and at the motion information derivation step for the subblock, both motion information in the L0 direction and motion information in the L1 direction may be refined.

Figure 38:
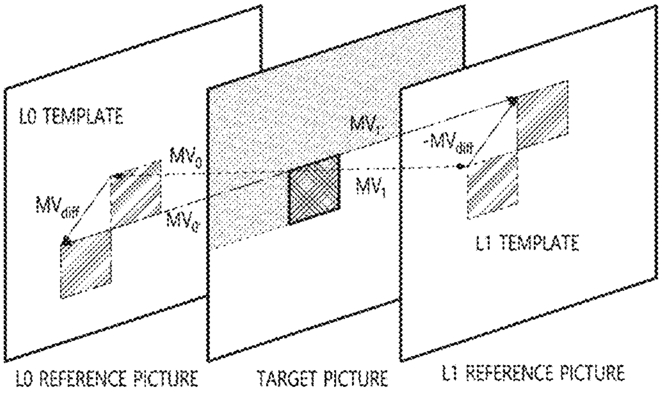
FIG. 38 illustrates bilateral matching according to an example.

FIG. 38 illustrates bilateral matching according to an example.

FIG. 38 illustrates the case where BM_NUM is 2 at the step of deriving motion information for the entire block of bilateral matching.

$MV_0$ may be initial motion information in an L0 direction.

$MV_1$ may be initial motion information in an L1 direction.

$MV_{diff}$ may refer to a motion information refinement value derived through bilateral matching. The motion information refinement value may be a value used to refine the motion information. The motion information refinement value may be the difference between the motion information derived through bilateral matching and the initial motion information.

Each of $MV_{0'}$ and $MV_{1'}$ may be motion information derived through bilateral matching.

In bilateral matching, the magnitude of the motion information refinement value for the L0 direction may be identical to the magnitude of the motion information refinement value for the L1 direction. The direction of the motion information refinement value for the L0 direction and the direction of the motion information refinement value for the L1 direction may be opposite to each other. That is, the following Equations 7 and 8 may be established.

$$MV_{0'} = MV_0 + MV_{diff} \quad \text{[Equation 7]}$$

$$MV_{1'} = MV_1 - MV_{diff} \quad \text{[Equation 8]}$$

Search Step in Bilateral Matching that Uses Subblock as Unit of Bilateral Matching When bilateral matching is performed, the unit of bilateral matching may always be a subblock. That is, only derivation of motion information for each subblock may be performed, and derivation of motion information for the whole block may not be performed.

When bilateral matching is performed, an indicator indicating whether the unit of bilateral matching is a subblock may be signaled/encoded/decoded.

When bilateral matching is performed, whether the unit of correction of motion information is a subblock may be determined based on at least one of the size of the target block, the coding parameter of the target block, motion information of the target block, the coding parameter of a neighboring block, and motion information of the neighboring block.

In the following descriptions, W may denote the weight of the target block. H may denote the height of the target block.

For example, in performing bilateral matching, a subblock may be used as the unit of motion information derivation only when the larger of W and H is greater than MIN_SIZE_THRES_FOR_SUB.

For example, in performing bilateral matching, an indicator indicating whether a subblock is used as the unit of motion information derivation may be encoded/decoded only when the larger of W and H is greater than MIN_SIZE_THRES_FOR_SUB.

MIN_SIZE_THRES_FOR_SUB may be a predefined value.

For example, MIN_SIZE_THRES_FOR_SUB may be 8, 16, 32, 64, 128 or a positive integer.

For example, in performing bilateral matching, a subblock may be used as the unit of motion information derivation only when the larger of W and H is less than MAX_SIZE_THRES_FOR_SUB.

For example, in performing bilateral matching, an indicator indicating whether a subblock is used as the unit of motion information derivation may be encoded/decoded only when the larger of W and H is less than MAX_SIZE_THRES_FOR_SUB.

MAX_SIZE_THRES_FOR_SUB may be a predefined value.

For example, MAX_SIZE_THRES_FOR_SUB may be 8, 16, 32, 64, 128 or a positive integer.

For example, in performing bilateral matching, a subblock may be used as the unit of motion information derivation only when the smaller of W and H is greater than MIN_SIZE_THRES_FOR_SUB.

For example, in performing bilateral matching, an indicator indicating whether a subblock is used as the unit of motion information derivation may be encoded/decoded only when the smaller of W and H is greater than MIN_SIZE_THRES_FOR_SUB.

MIN_SIZE_THRES_FOR_SUB may be a predefined value.

For example, MIN_SIZE_THRES_FOR_SUB may be 8, 16, 32, 64, 128 or a positive integer.

For example, in performing bilateral matching, a subblock may be used as the unit of motion information derivation only when the smaller of W and H is less than MAX_SIZE_THRES_FOR_SUB.

For example, in performing bilateral matching, an indicator indicating whether a subblock is used as the unit of motion information derivation may be encoded/decoded only when the smaller of W and H is less than MAX_SIZE_THRES_FOR_SUB.

MAX_SIZE_THRES_FOR_SUB may be a predefined value.

MAX_SIZE_THRES_FOR_SUB may be 8, 16, 32, 64, 128 or a positive integer.

For example, in performing bilateral matching, a subblock may be used as the unit of motion information derivation only when W×H is greater than MIN_SIZE_AREA_THRES_FOR_SUB.

For example, in performing bilateral matching, an indicator indicating whether a subblock is used as the unit of motion information derivation may be encoded/decoded only when W×H is greater than MIN_SIZE_AREA_THRES_FOR_SUB.

MIN_SIZE_AREA_THRES_FOR_SUB may be a predefined value.

For example, MIN_SIZE_AREA_THRES_FOR_SUB may be 8, 16, 32, 64, 128 or a positive integer. Alternatively, MIN_SIZE_AREA_THRES_FOR_SUB may be the product of the above-described values.

For example, in performing bilateral matching, a subblock may be used as the unit of motion information derivation only when W×H is less than MAX_SIZE_AREA_THRES_FOR_SUB.

For example, in performing bilateral matching, an indicator indicating whether a subblock is used as the unit of motion information derivation may be encoded/decoded only when W×H is less than MAX_SIZE_AREA_THRES_FOR_SUB.

MAX_SIZE_AREA_THRES_FOR_SUB may be a predefined value.

For example, MAX_SIZE_AREA_THRES_FOR_SUB may be 8, 16, 32, 64, 128 or a positive integer. Alternatively, MAX_SIZE_AREA_THRES_FOR_SUB may be the product of the above-described values.

When the unit for which motion information derivation in bilateral matching is performed is a subblock, size information indicating the size of the subblock on which motion information derivation is performed may be signaled/encoded/decoded at one or more of bilateral matching steps at which motion information derivation is performed on the subblock.

For example, when the unit of motion information derivation is a subblock in performing bilateral matching, at least one of the width and the height of a subblock from which motion information is to be derived may be determined based on at least one of the size of the target block, the coding parameter of the target block, motion information of the target block, the coding parameter of a neighboring block, and the motion information of the neighboring block at one or more bilateral matching steps at which motion information derivation on the subblock is performed.

For example, when the unit of motion information derivation is a subblock in performing bilateral matching, at least one of the width and the height of a subblock from which motion information is to be derived may be one of sizes included in a size list at one or more of bilateral matching steps at which motion information derivation on the subblock is performed.

For example, the size list may be a list related to size information indicating the size.

For example, the size list may be predefined.

For example, in the case where the unit of motion information derivation is a subblock in performing bilateral matching, a motion information derivation step that uses the subblock as the unit may be performed at least once. Here, at least one of the width and the height of the subblock may be SUBBLOCK_SIZE_ALWAYS.

SUBBLOCK_SIZE_ALWAYS may be a predefined value.

For example, information indicating SUBBLOCK_SIZE_ALWAYS may be signaled/encoded/decoded.

For example, SUBBLOCK_SIZE_ALWAYS may be 1, 2, 4, 8, 16, 32, 64, 128 or a positive integer.

For example, in the case where the unit of motion information derivation is a subblock in performing bilateral matching, motion information derivation that uses the subblock as a unit may be performed at least once when the width of the target block is greater than SUBBLOCK_SIZE_ALWAYS. Here, the width of the subblock may be SUBBLOCK_SIZE_ALWAYS.

For example, in the case where the unit of motion information derivation is a subblock in performing bilateral matching, motion information derivation that uses the subblock as a unit may be performed at least once when the height of the target block is greater than SUBBLOCK_SIZE_ALWAYS. Here, the height of the subblock may be SUBBLOCK_SIZE_ALWAYS.

For example, in the case where the unit of motion information derivation is a subblock in performing bilateral matching, motion information derivation that uses the subblock as a unit may be performed at least once when the width of the target block is less than SUBBLOCK_SIZE_ALWAYS. Here, the width of the subblock may be identical to the width of the target block.

For example, in the case where the unit of motion information derivation is a subblock in performing bilateral matching, motion information derivation that uses the subblock as a unit may be performed at least once when the height of the target block is less than SUBBLOCK_SIZE_ALWAYS. Here, the height of the subblock may be identical to the height of the target block.

In the following descriptions, W may denote the weight of the target block. H may denote the height of the target block.

For example, in the case where the unit of motion information derivation is a subblock in performing bilateral matching, a motion information derivation step that uses the subblock as a unit may be performed at least once when the larger of W and H is greater than MIN_SIZE_THRES_FOR_SUBBLOCK_SIZE. Here, the size of the subblock may be SUBBLOCK_SIZE1. For example, information indicating SUBBLOCK_SIZE1 may be signaled/encoded/decoded. For example, SUBBLOCK_SIZE1 may be 1, 2, 4, 8, 16, 32, 64, 128 or a positive integer. MIN_SIZE_THRES_FOR_SUBBLOCK_SIZE may be a predefined value. For example, MIN_SIZE_THRES_FOR_SUBBLOCK_SIZE may be 8, 16, 32, 64, 128 or a positive integer.

For example, in the case where the unit of motion information derivation is a subblock in performing bilateral matching, a motion information derivation step that uses the subblock as a unit may be performed at least once when the larger of W and H is less than MAX_SIZE_THRES_FOR_SUBBLOCK_SIZE. Here, the size of the subblock may be SUBBLOCK_SIZE2. For example, information indicating SUBBLOCK_SIZE2 may be signaled/encoded/decoded. For example, SUBBLOCK_SIZE2 may be 1, 2, 4, 8, 16, 32, 64, 128 or a positive integer. MAX_SIZE_THRES_FOR_SUBBLOCK_SIZE may be a predefined value. For example, MAX_SIZE_THRES_FOR_SUBBLOCK_SIZE may be 8, 16, 32, 64, 128 or a positive integer.

For example, in the case where the unit of motion information derivation is a subblock in performing bilateral matching, a motion information derivation step that uses the subblock as a unit may be performed at least once when the smaller of W and H is greater than MIN_SIZE_THRES_FOR_SUBBLOCK_SIZE. Here, the size of the subblock may be SUBBLOCK_SIZE1. For example, information indicating SUBBLOCK_SIZE1 may be signaled/encoded/decoded. For example, SUBBLOCK_SIZE1 may be 1, 2, 4, 8, 16, 32, 64, 128 or a positive integer. MIN_SIZE_THRES_FOR_SUBBLOCK_SIZE may be a predefined value. For example, MIN_SIZE_THRES_FOR_SUBBLOCK_SIZE may be 8, 16, 32, 64, 128 or a positive integer.

For example, in the case where the unit of motion information derivation is a subblock in performing bilateral matching, a motion information derivation step that uses the subblock as a unit may be performed at least once when the smaller of W and H is less than MAX_SIZE_THRES_FOR_SUBBLOCK_SIZE. Here, the size of the subblock may be SUBBLOCK_SIZE2. For example, information indicating SUBBLOCK_SIZE2 may be signaled/encoded/decoded. For example, SUBBLOCK_SIZE2 may be 1, 2, 4, 8, 16, 32, 64, 128 or a positive integer. MAX_SIZE_THRES_FOR_SUBBLOCK_SIZE may be a predefined value. For example, MAX_SIZE_THRES_FOR_SUBBLOCK_SIZE may be 8, 16, 32, 64, 128 or a positive integer.

For example, in the case where the unit of motion information derivation is a subblock in performing bilateral matching, a motion information derivation step that uses the subblock as a unit may be performed at least once when W×H is greater than MIN_SIZE_AREA_THRES_FOR_SUBBLOCK_SIZE. Here, the size of the subblock may be SUBBLOCK_SIZE3. For example, information indicating SUBBLOCK_SIZE3 may be signaled/encoded/decoded. For example, SUBBLOCK_SIZE3 may be 1, 2, 4, 8, 16, 32, 64, 128 or a positive integer. MIN_SIZE_AREA_THRES_FOR_SUBBLOCK_SIZE may be a predefined value. For example, MIN_SIZE_AREA_THRES_FOR_SUBBLOCK_SIZE may be 8, 16, 32, 64, 128 or a positive integer. Alternatively, MIN_SIZE_AREA_THRES_FOR_SUBBLOCK_SIZE may be the product of the above-described values.

For example, in the case where the unit of motion information derivation is a subblock in performing bilateral matching, a motion information derivation step that uses the subblock as a unit may be performed at least once when W×H is less than MAX_SIZE_AREA_THRES_FOR_SUBBLOCK_SIZE. Here, the size of the subblock may be SUBBLOCK_SIZE4. For example, information indicating SUBBLOCK_SIZE4 may be signaled/encoded/decoded. For example, SUBBLOCK_SIZE4 may be 1, 2, 4, 8, 16, 32, 64, 128 or a positive integer. MAX_SIZE_AREA_THRES_FOR_SUBBLOCK_SIZE may be a predefined value. For example, MAX_SIZE_AREA_THRES_FOR_SUBBLOCK_SIZE may be 8, 16, 32, 64, 128 or a positive integer. Alternatively, MAX_SIZE_AREA_THRES_FOR_SUBBLOCK_SIZE may be the product of the above-described values.

Bilateral matching and specific processing among the processes of bilateral matching in embodiments may be performed based on the attributes of a block such as W and H. For example, the specific processing may include derivation of information generated as the result of bilateral matching, such as derivation of motion information for a subblock, and may include derivation of information used or referenced during bilateral matching.

Furthermore, the information used in bilateral matching, described in embodiments, and the information generated by bilateral matching may be derived based on the attributes of the target block such as W and H.

The attributes of the block may include coding parameters related to the block, and may include information derived in relation to block processing, described in embodiments.

Search Step of Bilateral Matching that Uses Whole Block as Unit of Bilateral Matching In an embodiment, in performing bilateral matching, whether motion information derivation that uses the whole block as a unit is performed may be predefined.

For example, in performing bilateral matching, the unit of bilateral matching may always be the whole block. That is, only derivation of motion information for the whole block may be performed, and derivation of motion information for a subblock may not be performed.

For example, in performing bilateral matching, an indicator indicating whether the unit of motion information derivation is the whole block may be signaled/encoded/decoded.

In the following descriptions, W may denote the weight of the target block. H may denote the height of the target block.

For example, in performing bilateral matching, motion information derivation that uses the whole block as a unit may be performed only when the larger of W and H is greater than MIN_SIZE_THRES_FOR_WHOLE. For example, in performing bilateral matching, an indicator indicating whether motion information derivation that uses the whole block as a unit is performed may be signaled/encoded/decoded only when the larger of W and H is greater than MIN_SIZE_THRES_FOR_WHOLE. MIN_SIZE_THRES_FOR_WHOLE may be a predefined value. For example, MIN_SIZE_THRES_FOR_WHOLE may be 8, 16, 32, 64, 128 or a positive integer.

For example, in performing bilateral matching, motion information derivation that uses the whole block as a unit may be performed only when the larger of W and H is less than MAX_SIZE_THRES_FOR_WHOLE. For example, in performing bilateral matching, an indicator indicating whether motion information derivation that uses the whole block as a unit is performed may be signaled/encoded/decoded only when the larger of W and H is less than MAX_SIZE_THRES_FOR_WHOLE. MAX_SIZE_THRES_FOR_WHOLE may be a predefined value. For example, MAX_SIZE_THRES_FOR_WHOLE may be 8, 16, 32, 64, 128 or a positive integer.

For example, in performing bilateral matching, motion information derivation that uses the whole block as a unit may be performed only when the smaller of W and H is greater than MIN_SIZE_THRES_FOR_WHOLE. For example, in performing bilateral matching, an indicator indicating whether motion information derivation that uses the whole block as a unit is performed may be signaled/encoded/decoded only when the smaller of W and H is greater than MIN_SIZE_THRES_FOR_WHOLE. MIN_SIZE_THRES_FOR_WHOLE may be a predefined value. For example, MIN_SIZE_THRES_FOR_WHOLE may be 8, 16, 32, 64, 128 or a positive integer.

For example, in performing bilateral matching, motion information derivation that uses the whole block as a unit may be performed only when the smaller of W and H is less than MAX_SIZE_THRES_FOR_WHOLE. For example, in performing bilateral matching, an indicator indicating whether motion information derivation that uses the whole block as a unit is performed may be signaled/encoded/decoded only when the smaller of W and H is less than MAX_SIZE_THRES_FOR_WHOLE. MAX_SIZE_THRES_FOR_WHOLE may be a predefined value. For example, MAX_SIZE_THRES_FOR_WHOLE may be 8, 16, 32, 64, 128 or a positive integer.

For example, in performing bilateral matching, motion information derivation that uses the whole block as a unit may be performed only when W×H is greater than MIN_SIZE_AREA_THRES_FOR_WHOLE. For example, in performing bilateral matching, an indicator indicating whether motion information derivation that uses the whole block as a unit is performed may be signaled/encoded/decoded only when W×H is greater than MIN_SIZE_AREA_THRES_FOR_WHOLE. MIN_SIZE_AREA_THRES_FOR_WHOLE may be a predefined value. For example, MIN_SIZE_AREA_TH- RES_FOR_WHOLE=8, 16, 32, 64, 128 or a positive integer. Alternatively, MIN_SIZE_AREA_THRES_FOR_WHOLE may be the product of the above-described values.

For example, in performing bilateral matching, motion information derivation that uses the whole block as a unit may be performed only when W×H is less than MAX_SIZE_AREA_THRES_FOR_WHOLE. For example, in performing bilateral matching, an indicator indicating whether motion information derivation that uses the whole block as a unit is performed may be signaled/encoded/decoded only when W×H is less than MAX_SIZE_AREA_THRES_FOR_WHOLE. MAX_SIZE_AREA_THRES_FOR_WHOLE may be a predefined value. For example, MAX_SIZE_AREA_THRES_FOR_WHOLE may be 8, 16, 32, 64, 128 or a positive integer. Alternatively, MAX_SIZE_AREA_THRES_FOR_WHOLE may be the product of the above-described values.

Bilateral matching and specific processing among the processes of bilateral matching in embodiments may be performed based on the attributes of the block such as W and H. For example, specific processing may include derivation of information generated as the result of bilateral matching, such as derivation of motion information of the target block, and may include derivation of information used or referenced during bilateral matching.

Furthermore, the information used in bilateral matching, described in embodiments, and the information generated by bilateral matching may be derived based on the attributes of the target block such as W and H.

The attributes of the block may include coding parameters related to the block, and may include information derived in relation to block processing, described in embodiments.

Subsampling

Subsampling Method

Subsampling in embodiments may be performed based on at least one of 1) whether template matching is performed; 2) an indicator indicating whether template matching is performed; 3) whether bilateral matching is performed; 4) an indicator indicating whether bilateral matching is performed; 5) motion information of a target block; 6) the coding parameter of the target block; and 7) a search step in template matching and/or bilateral matching.

For example, the subsampling method may be determined based on at least one of 1) whether template matching is performed; 2) the indicator indicating whether template matching is performed; 3) whether bilateral matching is performed; 4) the indicator indicating whether bilateral matching is performed; 5) the motion information of the target block; 6) the coding parameter of the target block; and 7) the search step in template matching and/or bilateral matching.

For example, subsampling methods used at search steps of template matching and/or bilateral matching may be identical to each other.

Alternatively, for example, subsampling methods used at search steps of template matching and/or bilateral matching may be different from each other.

Whether Subsampling is Performed

In embodiments, whether subsampling is performed may be determined based on at least one of 1) whether template matching is performed; 2) an indicator indicating whether template matching is performed; 3) whether bilateral matching is performed; 4) an indicator indicating whether bilateral matching is performed; 5) motion information of the target block; 6) the coding parameter of the target block; and 7) a search step in template matching and/or bilateral matching.

For example, the indicator indicating whether subsampling is performed may be determined based on at least one of 1) whether template matching is performed; 2) the indicator indicating whether template matching is performed; 3) whether bilateral matching is performed; 4) the indicator indicating whether bilateral matching is performed; 5) the motion information of the target block; 6) the coding parameter of the target block; and 7) the search step in template matching and/or bilateral matching.

For example, whether subsampling is performed may be equally determined at search steps of template matching and/or bilateral matching.

Alternatively, for example, whether subsampling is performed may be differently determined at search steps of template matching and/or bilateral matching.

For example, whether subsampling is performed in a horizontal direction and whether subsampling is performed in a vertical direction may be equally determined.

For example, whether subsampling is performed in a horizontal direction and whether subsampling is performed in a vertical direction may be differently determined.

In an embodiment, in template matching and/or bilateral matching, a subsampling method at a search step at which search in the whole target block is performed and a subsampling method at a search step at which search in a subblock in the target block is performed may be identical to each other.

In an embodiment, in template matching and/or bilateral matching, a subsampling method at a search step at which search in the whole target block is performed and a subsampling method at a search step at which search in a subblock in the target block is performed may be different from each other.

Template matching and/or bilateral matching may be enabled based on the type of a target picture and/or the type of a target slice.

In embodiments, enabling template matching and/or bilateral matching may mean that template matching and/or bilateral matching are performed.

For example, template matching and/or bilateral matching may be enabled in a motion information correction method only when a target picture is a B-picture.

For example, template matching and/or bilateral matching may be enabled in the motion information correction method only when a target slice is a B-slice.

Whether template matching and/or bilateral matching are enabled may be determined based on at least one of POC of reference picture candidates in a reference picture list and POC of a target picture.

Here, the reference picture list may include at least one of a reference picture list for an L0 direction and a reference picture list for an L1 direction.

For example, template matching and/or bilateral matching for the target block may be enabled only when POCs of all reference picture candidates in the reference picture list are less than the POC of the target picture.

Motion Information Correction Method

In order to improve coding efficiency, embodiments may provide an encoding/decoding method, apparatus, and bitstream storage medium, which include a motion information correction method.

Figure 39:
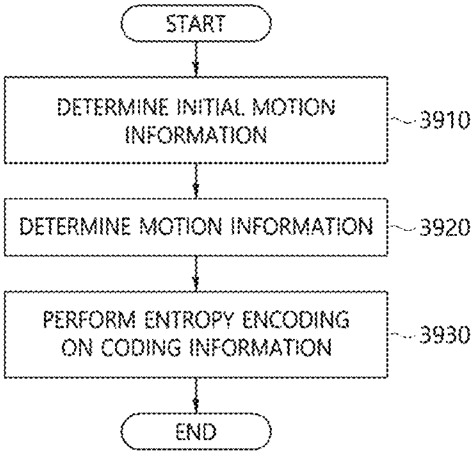
FIG. 39 is a flowchart illustrating a target block prediction method including motion information correction and a bitstream generation method according to an embodiment.

FIG. 39 is a flowchart illustrating a target block prediction method including motion information correction and a bitstream generation method according to an embodiment.

Step 1810 may include steps 3910 and 3920.

Step 1820 may include step 3930.

At step 3910, initial motion information of a target block may be determined.

At step 3920, motion information of the target block may be determined based on the initial motion information.

The motion information of the target block may be information used to generate a prediction block and/or a reconstructed block for the target block.

The prediction block for the target block may be generated using the motion information of the target block.

A list for the target block may be generated using the initial motion information. The motion information may be determined based on the list.

The list may be generated by applying correction to the initial motion information.

For example, correction may be at least one of template matching, bilateral matching, and an operation using a motion offset.

For example, each of multiple candidates in the list may be at least one of motion information, a sample, a motion information offset, and a motion information correction vector.

For example, the motion information of the target block may be one of candidates in the list. The prediction block for the target block may be generated using final motion information derived through correction of the motion information. Alternatively, the final motion information may be information used to generate a prediction block and/or a reconstructed block for the target block.

For example, the final motion information may be used to determine a reference block for the target block.

In order to select a candidate from the list, reordering of multiple candidates may be applied based on the costs of the multiple candidates.

At step 3930, encoded coding information may be generated by performing entropy encoding on coding information.

The coding information may include the initial motion information. Alternatively, the coding information may include information used to derive the initial motion information.

The coding information may include the motion information. Alternatively, the coding information may include information used to derive the motion information.

Figure 40:
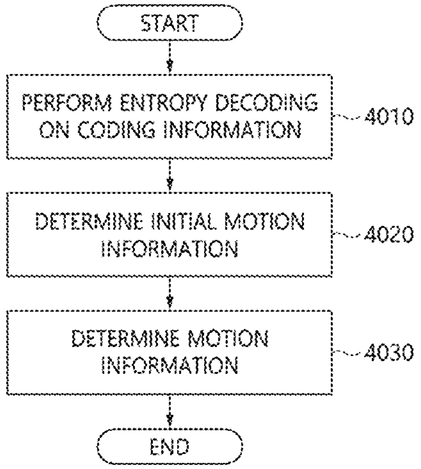
FIG. 40 is a flowchart illustrating a target block prediction method using a bitstream, which includes motion information correction, according to an embodiment.

FIG. 40 is a flowchart illustrating a target block prediction method using a bitstream, which includes motion information correction, according to an embodiment.

Step 1920 may include step 4010.

Step 1930 may include steps 4020 and 4030.

At step 4010, coding information may be generated by performing entropy decoding on entropy-encoded coding information.

The coding information may include information used to derive the initial motion information.

The coding information may include information used to derive motion information.

At step 4020, the initial motion information of a target block may be determined.

At step 4030, motion information of the target block may be determined based on the initial motion information.

The motion information of the target block may be information used to generate a prediction block and/or a reconstructed block for the target block.

The prediction block for the target block may be generated using the motion information of the target block.

A list for the target block may be generated using the initial motion information. The motion information may be determined based on the list.

The list may be generated by applying correction to the initial motion information.

For example, correction may be at least one of template matching, bilateral matching, and an operation using a motion offset.

For example, each of multiple candidates in the list may be at least one of motion information, a sample, a motion information offset, and a motion information correction vector.

For example, the motion information of the target block may be one of candidates in the list. The prediction block for the target block may be generated using final motion information derived through correction of the motion information. Alternatively, the final motion information may be information used to generate a prediction block and/or a reconstructed block for the target block.

For example, the final motion information may be used to determine a reference block for the target block.

In order to select a candidate from the list, reordering of multiple candidates may be applied based on the costs of the multiple candidates.

Figure 41:
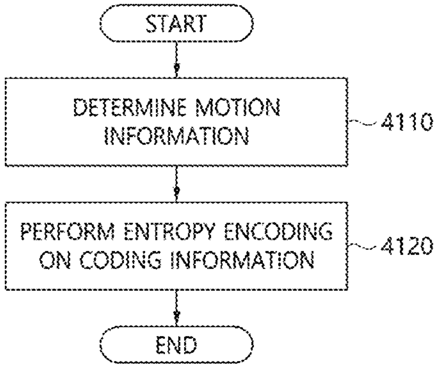
FIG. 41 is a flowchart illustrating a target block prediction method including motion information correction and a bitstream generation method according to an embodiment.

FIG. 41 is a flowchart illustrating a target block prediction method including motion information correction and a bitstream generation method according to an embodiment.

Step 1810 may include step 4110.

Step 1820 may include step 4120.

At step 4110, motion information may be determined.

At step 4120, encoded coding information may be generated by performing entropy encoding on coding information.

The coding information may include the motion information. Alternatively, the coding information may include information used to derive the motion information.

Figure 42:
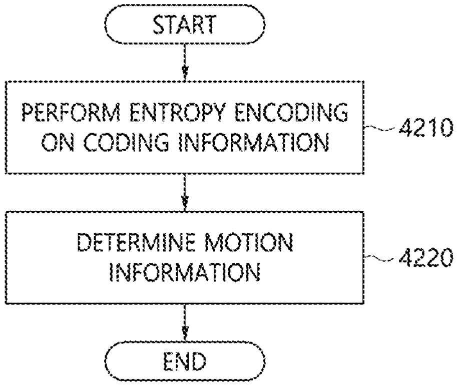
FIG. 42 is a flowchart illustrating a target block prediction method using a bitstream, which includes motion information correction, according to an embodiment.

FIG. 42 is a flowchart illustrating a target block prediction method using a bitstream, which includes motion information correction, according to an embodiment.

Step 1920 may include step 4210.

Step 1930 may include step 4220.

At step 4210, coding information may be generated by performing entropy decoding on entropy-encoded coding information.

The coding information may include information used to derive motion information.

At step 4220, the motion information of the target block may be determined.

Processing Using Final Motion Information

The final motion information in a motion information correction method in embodiments, or motion information derived from the final motion information may be determined to be motion information of the target block.

An encoding/decoding process for the target block may be performed using the determined motion information.

For example, the encoding/decoding process may include at least one of Intra Block Copy (IBC), intra-prediction, inter-prediction, transform, inverse transform, quantization, dequantization, entropy encoding/decoding, and in-loop filtering. However, the encoding/decoding process is not limited to the above-described processing types.

For example, a reference block for the target block may be determined from the final motion information resulting from the motion information correction method in embodiments or the motion information derived from the final motion information. The encoding/decoding process for the target block may be performed using the determined reference block.

Reference of Motion Information of Block to which Motion Information Correction Method is Applied Motion information to which a motion information correction method is applied may be referenced by a neighboring block.

The description that "specific motion information is referenced by a neighboring block" may mean that specific motion information is used as the motion information of the neighboring block. Alternatively, the description that "specific motion information is referenced by a neighboring block" may mean that, when the motion information of the neighboring block is referenced, the specific motion information is regarded as referenced motion information of the neighboring block.

The motion information referenced by the neighboring block may be at least one of 1) initial motion information of the motion information correction method, or 2) motion information derived at each of search steps of the motion information correction method.

For example, when a motion information correction method is performed on a neighboring block in a target image in the case where the target block refers to the motion information of the neighboring block in the target image, the motion information referenced by the neighboring block may be the initial motion information of the motion information correction method.

For example, when a motion information correction method is performed on a neighboring block in an additional image in the case where the target block refers to the motion information of the neighboring block in the additional image, the motion information referenced by the neighboring block may be the final motion information of the motion information correction method. The additional image may be a reference image other than the target image.

For example, when a motion information correction method is performed on a neighboring block in an additional image in the case where the target block refers to the motion information of the neighboring block in the additional image, the motion information referenced by the neighboring block may be corrected motion information generated at the first search step of the motion information correction method. The additional image may be a reference image other than the target image.

For example, when a motion information correction method is performed on a neighboring block in an additional image in the case where the target block refers to the motion information of the neighboring block in the additional image, one of the initial motion information and the final motion information of the motion information correction method on the neighboring block may be selected. The selected motion information may be determined to be motion information referenced by the neighbor block. For example, this selection may be performed based on matching cost. The additional image may be a reference image other than the target image.

For example, of the initial motion information and the final motion information, motion information having lower template matching cost or lower bilateral matching cost may be selected and referenced.

When the motion information of a first block to which the motion information correction method is applied is referenced by a second block, the motion information of the first block, which is referenced by the second block, may be determined based on whether the first block and the second block are blocks within the same image.

For example, when the first block and the second blocks are blocks within the same image, the motion information of the first block, referenced by the second block, may be at least one of the initial motion information of the first block and motion information derived at each of the search steps of the motion information correction method on the first block.

For example, when the first block and the second blocks are blocks in different images, the motion information of the first block, referenced by the second block, may be the final motion information of the first block.

Bilateral Matching Based on Type of Target

In a motion information correction method, bilateral matching may be enabled based on the type of a target picture and/or the type of a target slice.

In embodiments, enabling of bilateral matching may mean that bilateral matching is performed.

For example, bilateral matching may be enabled in the motion information correction method only when the target picture is a B-picture.

For example, bilateral matching may be enabled in the motion information correction method only when the target slice is a B-slice.

Whether template matching and/or bilateral matching are enabled in the motion information correction method may be determined based on at least one of POC of reference picture candidates in a reference picture list and POC of the target picture.

Here, the reference picture list may include at least one of a reference picture list for an L0 direction and a reference picture list for an L1 direction.

For example, template matching and/or bilateral matching may be enabled when the motion information correction method is performed on the target block only in the case where POCs of all reference picture candidates in the reference picture list are less than the POC of the target picture.

Determination of Initial Motion Information

Hereinafter, the initial motion information determination step at steps 3910 and 4020 will be described.

The initial motion information may refer to motion information that is the target to which correction is applied.

The correction may include at least one of 1) template matching, 2) bilateral matching, and 3) an operation using a motion information offset.

For example, the operation may include at least one of mirroring, scaling, and copying. However, the operation is not limited to the above-listed processes.

For example, a result generated by applying mirroring to a specific motion vector MV may be −MV.

For example, a result generated by applying scaling to the specific motion vector MV may be a motion vector determined by correcting the magnitude of the MV in consideration of 1) a POC interval between an image including the MV and a reference image indicated by MV and 2) a POC interval between an image including the target block and a current reference image. Here, the direction of the MV and the direction of the motion vector derived by applying scaling to the MV may be identical to each other.

For example, a result generated by applying copying to the specific motion vector MV may be MV.

For example, the motion information offset may be a motion vector.

For example, the motion information offset may be determined by combinations of angles in a predefined angle list and distance offsets in a predefined distance offset list.

For example, the predefined angle list may indicate angles between the motion vector of the motion information offset and each axis. Here, the axis may be an X axis (i.e., a transverse axis or a horizontal axis) or a Y axis (i.e., a longitudinal axis or a vertical axis).

The angle list may be configured to include angles having values of i_ANGLE×π/NUM_ANGLE.

i_ANGLE may be one of θ to integers of (2×NUM_ANGLE−1).

NUM_ANGLE may be a predefined value, and may be 4, 8, 16 or a positive integer.

The above-described NUM_ANGLE; and/or angles constituting the predefined angle list may be determined based on at least one of 1) motion information of the target block and 2) a coding parameter. For example, NUM_ANGLE may be 8 when an affine mode is used for the target block, and may be 16 otherwise. For example, NUM_ANGLE may be 8 when an affine mode is not used for the target block, and may be 4 when the affine mode is used. However, the value of NUM_ANGLE determined depending on whether the affine mode is used is not limited to the above-described values.

For example, the predefined distance offset list may indicate a relative distance to the motion vector of the target block or a relative location to the motion vector of the target block.

For example, the predefined distance offset list may be configured to include at least one of 0, 1, 2, 4 and 8.

For example, the predefined distance offset list may be configured to include a value corresponding to $multi_{offset}$-Pel. $multi_{offset}$ may be a ⅛, ¼, ½, 1, 2, 4, 8, 16, 32 or a positive number.

The distance offsets constituting the predefined distance offset list and/or the size of the distance offset list may be determined based on at least one of the motion information; and the coding parameter of the target block.

For example, the predefined distance offset list may be {4, 8, 16, 32, 64, 128} when an affine mode is not applied to the target block. The predefined distance offset list may be {1, 2, 4, 8, 16} when the affine mode is applied to the target block. However, the predefined distance offset list determined depending on whether the affine mode is applied to the target block is not limited to the above-described sets.

For example, combining the specific angle ANGLE and the specific distance offset OFFSET may mean that a motion vector is determined using ANGLE and OFFSET. Here, an angle between the determined motion vector and the axis may be ANGLE. The magnitude of the determined motion vector may be OFFSET. The axis may be the X axis or the Y axis.

Alternatively, for example, combining the specific angle ANGLE and the specific distance offset OFFSET may mean that a specific location is determined using ANGLE and OFFSET. Here, an angle between a specific straight line and the axis may be ANGLE. The size of the specific straight line may be OFFSET. The specific straight line may be a straight line from the origin to the specific location. Alternatively, the specific location may be a location indicated by the determined motion vector, described above.

For example, the motion information offset may be added to a reference image index.

For example, when the value of the reference image index of the target block is a first value and the value of the motion information offset added to the reference image index is a second value, the reference image index of the target block may be corrected to have the sum of the first value and the second value. The first value may be 0, 1 or a positive integer. The second value may be −2, −1, 0, 1, 2, or an integer.

For example, when the value of the reference image index of the target block is a first value and the value of the motion information offset to the reference image index is a second value, the reference image index of the target block may be changed to have the second value. Each of the first value and the second value may be 0, 1 or a positive integer.

Correcting the first motion information may mean that second motion information is derived using correction which performs template matching and/or bilateral matching on the first motion information, and that the first motion information is replaced with the second motion information.

Alternatively, correcting the first motion information may mean that second motion information is derived by performing an operation between the first motion information and a motion information offset and that the first motion information is replaced with the second motion information.

An initial motion information candidate list may refer to a motion information list composed of initial motion information candidates.

All or some of the initial motion information candidates may be specified as initial motion information.

The initial motion information may be specified from the initial motion information candidate list.

For example, N initial motion information candidates having lowest matching cost(s) among the initial motion information candidates may be specified as the initial motion information.

For example, a maximum of N index (indices) for specifying the initial motion information may be encoded/decoded. The initial motion information candidate(s) corresponding to index (indices) in the initial motion information candidate list may be specified as the initial motion information.

N may be 1, 2, 3, 4, 5 or a positive integer.

The initial motion information candidate list may be a predefined list composed of N_INITIAL initial motion information candidates.

For example, the initial motion information candidate may be at least one of motion information of a neighboring block at a specific location adjacent to a target block; motion information of a neighboring block at a specific location that is not adjacent to the target block; motion information in a motion information list managed and configured based on a predefined rule; and predefined motion information. However, the initial motion information candidate is not limited to the above-described pieces of information.

N_INITIAL may be a predefined value.

N_INITIAL may be 1, 2, 4, 6, 8, 10, 12 or a positive integer.

X in an LX direction may be 0, 1 or a positive integer.

The information about X may be signaled/encoded/decoded.

Alternatively, X may be determined based on at least one of the coding parameter of the target block, the coding parameter of a neighboring block, motion information of the target block, and motion information of the neighboring block.

X in the LX direction may be determined based on the index of the initial motion information.

For example, X may be determined based on the remainder of a division operation which divides the initial motion information by a specific value.

For example, X may be determined based on the quotient of a division operation which divides the initial motion information by a specific value.

Here, the specific value may be 2 or 3.

When bidirectional inter-prediction is used for the target block, the initial motion information candidate list may be configured using only motion information in the LX direction upon configuring the initial motion information candidate list.

When the motion information of the neighboring block is bidirectional motion information for bidirectional prediction upon using the motion information of the neighboring block as the initial motion information candidate, only the motion information in the LX direction of pieces of bidirectional motion information of the neighboring block may be used as the initial motion information candidate.

A part of the initial motion information candidate list or the initial motion information candidate list may be reordered.

Reordering may refer to an operation of calculating matching costs of respective initial motion information candidates and sorting the initial motion information candidates in ascending order of matching costs.

Reordering may be performed one or more times.

In embodiments, matching cost may be bilateral matching cost or template matching cost. However, the matching costs in embodiments are not limited to the above-described costs.

When the motion information in the LX direction is already determined, bilateral matching cost between each initial motion information candidate and the motion information in the LX direction may be calculated upon performing reordering of an initial information candidate list for an L(1−X) direction. The initial motion information candidates in the motion information candidate list for the L(1−X) direction may be sorted in ascending order of the matching costs thereof.

The initial motion information candidate list may be reconstructed.

For example, an initial motion information candidate list having N1 initial motion information candidates may be reconstructed into an initial motion information candidate list having N2 initial motion information candidates.

Reconstructing the first list may mean that a second list that is a new list is configured and that the first list is replaced with the second list that is the new list.

Each of N1 and N2 may be a predefined value, and may be a positive integer.

N2 may have a value less than or equal to N1.

A new initial motion information candidate list having N2 initial motion information candidates may be configured using only initial motion information candidates having the lowest N2 indices in the initial motion information candidate list having N1 initial motion information candidates.

First motion information may be a specific initial motion information candidate in the initial motion information candidate list. When the first motion information is unidirectional motion information, second motion information that is bidirectional motion information may be derived from the first motion information. The derived second motion information may be added to the initial motion information candidate list or, alternatively, the first motion information in the initial motion information candidate list may be replaced with the second motion information.

When the first motion information is unidirectional motion information in the LX direction, LX direction motion information of the second motion information may be identical to the LX direction motion information of the first motion information.

When the first motion information is unidirectional motion information in the LX direction, the motion vector of L(1−X) direction motion information of the second motion information may be derived from the LX direction motion information of the first motion information.

For example, the motion vector in the L(1−X) direction of the second motion information may be identical to the motion vector in the LX direction.

Alternatively, for example, the motion vector in the L(1−X) direction of the second motion information may have the same magnitude as the motion vector in the LX direction, and may have a direction opposite to that of the motion vector in the LX direction.

For example, a reference picture in the L(1−X) direction of the second motion information may be a first picture in a reference picture list for the L(1−X) direction of the target block.

For example, a reference picture index in the L(1−X) direction of the second motion information may be a lowest index value.

For example, the motion vector in the L(1−X) direction of the second motion information may be determined based on at least one of POC of a reference picture in the LX direction of the first motion information; POC of a reference picture in the L(1−X) direction of the first motion information; and POC of the target picture.

For example, the motion vector in the L(1−X) direction of the second motion information may be a motion vector derived by applying scaling based on POC of a reference picture in the LX direction of the first motion information; POC of a reference picture in the L(1−X) direction of the first motion information and POC of the target picture to the motion vector in the L(1−X) direction of the first motion information.

X may be 0, 1 or a positive integer.

For example, once initial motion information in the L(1−X) direction is already determined in configuring the initial motion information candidate list for the LX direction when bidirectional inter-prediction is used for the target block, $MV_{diff\_(1-x)}$ may be added to an initial motion information candidate $MI_{INITIAL\_cand\_best\_i}$ in the LX direction. That is, the initial motion information candidate $MI_{INITIAL\_cand\_best\_i}$ in the LX direction may be replaced with $MI_{INITIAL\_cand\_best\_i}+MV_{diff\_(1-x)}$.

For example, once initial motion information in the L(1−X) direction is already determined in configuring the initial motion information candidate list for the LX direction when bidirectional inter-prediction is used for the target block, $-MV_{diff\_(1-x)}$ may be added to the initial motion information candidate $MI_{INITIAL\_cand\_best\_i}$ in the LX direction. That is, the initial motion information candidate $MI_{INITIAL\_cand\_best\_i}$ in the LX direction may be replaced with $MI_{INITIAL\_cand\_best\_i}-MV_{diff\_(1-x)}$.

For example, once initial motion information in the L(1−X) direction is already determined in configuring the initial motion information candidate list for the LX direction when bidirectional inter-prediction is used for the target block, $SCALED\_MV_{diff(1-x)}$ may be added to $MI_{INITIAL\_cand\_best\_i}$. That is, the initial motion information candidate $MI_{INITIAL\_cand\_best\_i}$ in the LX direction may be replaced with $MI_{INITIAL\_cand\_best\_i}+SCALED\_MV_{diff\ (1-x)}$. Here, $SCALED\_MV_{diff\_(1-x)}$ may be a motion vector derived by applying scaling in the LX direction to $MV_{diff\_(1-x)}$ in the L(1−X) direction.

In embodiments, $MI_{INITIAL\_cand\_best\_i}$ may indicate an i-th initial motion information candidate. i may be one of θ to integers of (N_INITIAL−1).

In embodiments, $MV_{diff\_(1-x)}$ may be a motion information correction vector in the L(1−X) direction.

The motion information correction vector for the first motion information may be a motion vector derived by subtracting the first motion information from the second motion vector. In other words, the motion information correction vector for the first motion information may be the difference between the second motion vector and the first motion information. The second motion vector may be a motion vector derived by correction which performs template matching and/or bilateral matching on the first motion information.

$MV_{diff\_(1-x)}$ may be a motion vector difference or a predefined motion vector added to the motion information at the step of determining the motion information in the L(1−X) direction.

For example, the matching costs of respective initial motion information candidates may be calculated for the initial motion information candidate list, and the initial motion information candidates may be sorted in ascending order or descending order of the matching costs of the initial motion information candidates.

In configuring the initial motion information candidate list, the initial motion information candidate list may be configured using only motion information satisfying a specific condition.

The specific condition may include the enabling conditions of template matching and/or bilateral matching in embodiments or some of the enabling conditions.

For example, the initial motion information candidate list may be configured using only motion information candidates having bidirectional motion information.

In configuring the initial motion information candidate list, the initial motion information candidate list may be configured using only motion information satisfying the following [Condition 1], [Condition 2], and [Condition 3].

[Condition 1] Motion information is used for bidirectional inter-prediction.

[Condition 2] The difference between the POC of a target image and the POC of a reference image in the L0 direction is identical to the difference between the POC of the target image and the POC of a reference image in the L1 direction.

[Condition 3] The direction from the target image to the reference image in the L0 direction is different from the direction from the target image to the reference image in the L1 direction.

In configuring the initial motion information candidate list, the initial motion information candidate list may be configured using only motion information satisfying the following [Condition 4] and [Condition 5].

[Condition 4] Motion information is used for bidirectional inter-prediction.

[Condition 5] The direction from the target image to the reference image in the L0 direction is different from the direction from the target image to the reference image in the L1 direction.

The fact that the direction from the target image to the reference image in the L0 direction is different from the direction from the target image to the reference image in the L1 direction may mean that the following Equation 9 is satisfied.

$$(POC-POC0)\times(POC-POC1)<0 \quad \text{[Equation 9]}$$

The fact that the directions of the reference images are identical to each other may mean that the following Equation 10 is satisfied.

$$(POC-POC0)\times(POC-POC1)>0 \quad \text{[Equation 10]}$$

Here, POC may be the picture order count of the target image. POC0 may be the picture order count (POC) of the reference image in the L0 direction. POC1 may be the picture order count (POC) of the reference image in the L1 direction.

In the motion information correction method, whether correction of the initial motion information is performed may be determined based on the index of the initial motion information.

Based on whether the index of the initial motion information satisfies a specific condition, whether the correction of the initial motion information is performed may be determined.

For example, correction may be performed only on motion information candidates, the index of the initial motion information of which is less than or equal to DMVD_IDXTHRES.

For example, correction may be performed only on motion information candidates, the index of the initial motion information of which is equal to or greater than DMVD_IDXTHRES.

For example, correction may be performed only on motion information candidates, the index of the initial motion information of which is an even number (or an odd number).

Here, DMVD_IDXTHRES may be 0, 1, 2 or a positive integer.

Here, DMVD_IDXTHRES may be a predefined value.

In the motion information correction method, a method for performing correction on the initial motion information may be determined based on the index of the initial motion information.

Based on whether the index of the initial motion information satisfies a specific condition, whether correction is performed in the L0 direction and/or the L1 direction of the initial motion information may be determined.

For example, correction may be performed only on motion information candidates, the index of the initial motion information of which is less than or equal to DMVD_IDXTHRES.

For example, correction may be performed only on motion information candidates, the index of the initial motion information of which is equal to or greater than DMVD_IDXTHRES.

For example, correction may be performed only on motion information candidates, the index of the initial motion information of which is an even number (or an odd number).

Here, DMVD_IDXTHRES may be 0, 1, 2 or a positive integer.

Here, DMVD_IDXTHRES may be a predefined value.

For example, when the initial motion information is motion information for an affine model, whether correction is performed on at least one of CPMVs constituting the initial motion information may be determined based on whether the index of the initial motion information satisfies a specific condition.

For example, when the initial motion information is motion information for the affine model, correction on a first CPMV that is one of the CPMVs constituting the initial motion information may be performed only when the index of the initial motion information is less than or equal to DMVD_IDXTHRES.

For example, when the initial motion information is motion information for the affine model, correction on a first CPMV that is one of the CPMVs constituting the initial motion information may be performed only when the index of the initial motion information is equal to or greater than DMVD_IDXTHRES.

When the initial motion information is motion information for the affine model, correction on a first CPMV that is one of the CPMVs constituting the initial motion information may be performed only when the index of the initial motion information is less than or equal to DMVD_IDXTHRES.

For example, template matching and/or bilateral matching may be performed only on motion information candidates, the index of the initial motion information of which is an even number (or an odd number).

For example, based on the quotient and/or the remainder of a division operation which divides the index of the initial motion information by a specific value, whether correction is performed on at least one of CPMVs constituting the initial motion information may be determined.

Here, the specific value may be 2 or 3.

Here, DMVD_IDXTHRES may be 0, 1, 2 or a positive integer.

Here, DMVD_IDXTHRES may be a predefined value.

Motion Information Determination Step

Hereinafter, the motion information determination step at steps 3920, 4030, 4110, and 4220 will be described.

At the motion information determination step, a list for motion information correction may be used.

The list for motion information correction may be composed of one or more correction candidates.

Alternatively, the list for motion information correction may be empty. That is, no components (i.e., correction candidates) may be present in the list for motion information correction.

The correction candidates may include at least one of motion information, a sample, a motion information offset, and a motion information correction vector.

For example, at the initial motion information selection step, when one piece of initial motion information is specified, each correction candidate in the list for motion information correction may be a motion information correction vector.

In embodiments, "sample" may refer to information specifying the sample such as "the location of a sample" or information indicating the sample.

Configuring a list using a specific sample may also mean that a list is configured using motion information indicating the specific sample.

In the motion information correction method, the motion information offset may be one of motion information offset candidates in a motion information offset candidate list.

Alternatively, a combination of a specific angle in a predefined angle list and a specific distance offset in a predefined distance offset list in the motion information correction method may be determined to be the motion information offset.

The motion information offset candidate list may be determined from angles in the predefined angle list and distance offsets in the predefined distance offset list.

At least one of the angle list and the distance offset list may be determined based on at least one of the coding parameter and motion information of the target block.

The list for motion information correction may be configured using a maximum of NUM_MI_REFINED_CAND_LIST pieces of motion information.

NUM_MI_REFINED_CAND_LIST may be 0, 1, 2, 12, 16, 24 or a positive integer.

NUM_MI_REFINED_CAND_LIST may be a predefined value.

The list for motion information correction may be reordered.

For example, the order of correction candidates in the list for motion information correction may be sorted in ascending order of matching cost.

The list for motion information correction may be reconstructed.

For example, the list for motion information correction may be reconstructed to include only N pieces of motion information having the lowest index.

N may be a value less than or equal to NUM_MI_REFINED_CAND_LIST.

N may be a predefined value.

N may be 0, 1, 2, 12, 16, 24 or a positive integer.

For example, as the list for motion information correction, an initial motion information candidate list or a portion of the initial motion information candidate list may be used.

For example, the list for motion information correction may be configured using N initial motion information candidates having lowest indices in the initial motion information candidate list.

N may be 1, 2, 4, 6, 8, 10, 12, or a positive integer.

For example, the list for motion information correction may be configured using at least one piece of initial motion information specified at the initial motion information selection step.

In the motion information correction method, the list for motion information correction may include a specific sample within a search range.

Here, the search range may include the search range of at least one of intra-template matching, inter-template matching, and bilateral matching.

In the motion information correction method, a search for all samples or some samples in the search range may be performed. The motion information candidate list may be configured using samples to which the search is applied or some of the samples to which the search is applied.

In embodiments, some samples may refer to samples selected by subsampling in embodiments.

In embodiments, search may be performed in stages. For example, a sparse primary search may be performed only for the samples (or the locations of the samples) selected by subsampling. Next, a fine secondary search may be performed. Here, the secondary search may be performed in an area specified by the primary search.

Embodiments of the search for the samples selected by subsampling will be described in greater detail below.

As described above, the list for motion information correction may store samples, information indicating the samples, or the locations of the samples, as correction candidates. Here, the samples may be samples selected by subsampling. Therefore, determination of samples using subsampling described in embodiments may be regarded as configuration of the list for motion information correction. Further, determination and/or storage of the positions of samples using the subsampling described in embodiments may be regarded as configuration of the list for motion information correction.

For example, search for a specific sample within the search range may be performed in the motion information correction method. When the specific sample satisfies a specific condition, the specific sample may be added to the motion information candidate list.

The specific condition may be a condition related to a comparison between the matching cost of the specific sample and the matching cost of at least one motion information candidate in a current motion information candidate list. For example, the specific condition may be a condition in which the matching cost of the specific sample needs to be less than the matching cost of at least one motion information candidate in the current motion information candidate list.

For example, search for the specific sample within the search range in the motion information correction method may be performed. When the matching cost of the specific sample is less than the matching cost of at least one motion information candidate in the current motion information candidate list, a motion information candidate having highest matching cost or a motion information candidate having a highest index may be removed from the motion information candidate list. Alternatively, when the matching cost of the specific sample is less than the matching cost of at least one motion information candidate in the current motion information candidate list, the motion information candidate having the highest matching cost or the motion information candidate having the highest index in the motion information candidate list may be replaced with the specific sample. Further, the specific sample may be added to the motion information candidate list, and motion information candidates in the motion information candidate list may be reordered. Alternatively, the specific sample may be added to the motion information candidate list. Here, the specific sample may be added to the motion information candidate list so that the matching costs of the motion information candidates in the motion information candidate list are sorted in ascending order.

The matching cost of the specific sample may refer to matching cost for motion information indicating the specific sample.

The motion information indicating the specific sample may refer to motion information indicating a reference block that is a left-above sample of the specific sample.

Performing at least one of template matching, bilateral matching, and an operation using a motion information offset on the specific sample may mean that at least one of 1) template matching, 2) bilateral matching, and 3) the operation using a motion information offset is performed on the motion information indicating the specific sample.

In embodiments, the operation using the motion information offset may refer to an operation between a target described as performing the operation; and the motion information offset.

When a specific correction candidate is added to the list for motion information correction, at least one of processing 1, processing 2, and processing 3, which will be described later, may be additionally performed. Adding the specific correction candidate to the list for motion information correction may not only mean that the specific correction candidate is added to the list for motion information correction but also mean that at least one of processing 1, processing 2, and processing 3, which will be described later, is additionally performed.

[Processing 1] When the specific correction candidate is added to the list for motion information correction, a correction candidate having highest matching cost or a correction candidate having a highest index in the list for motion information correction may be removed from the list for motion information correction. Alternatively, the correction candidate having the highest matching cost or the correction candidate having the highest index in the list for motion information correction may be replaced with the specific correction candidate.

[Processing 2] A specific correction candidate may be added to the list for motion information correction. The correction candidates in the list for motion information correction may be reordered. Alternatively, the specific correction candidate may be added to the list for motion information correction. Here, a specific sample may be added to the list for motion information correction so that the matching costs of the correction candidates in the list for motion information correction are sorted in ascending order.

[Processing 3] When the specific correction candidate is added to the list for motion information correction, whether the specific correction candidate satisfies a specific condition may be checked. The specific correction candidate may be added to the list for motion information correction only when the specific correction candidate satisfies the specific condition. Here, the specific condition may be a condition in which the matching cost of the specific sample needs to be less than the matching cost of at least one motion information candidate in the current motion information candidate list.

A second correction candidate may be derived by performing at least one of template matching, bilateral matching and an operation using a motion information offset on a first correction candidate in the list for motion information correction. Thereafter, the first correction candidate in the list for motion information correction may be replaced with the second correction candidate. Alternatively, thereafter, the second correction candidate may be added to the list for motion information correction.

For example, the first correction candidate in the list for motion information correction may be replaced with the second correction candidate or, alternatively, the second correction candidate may be added to the list for motion information correction, only when the second correction candidate satisfies a specific condition.

The specific condition may be a condition in which the matching cost of the second correction candidate needs to be lower than the matching cost of at least one correction candidate in the current list for motion information correction.

Alternatively, the specific condition may be a condition in which the matching cost of the second correction candidate needs to be lower than the matching cost of the first correction candidate.

At the motion information correction step, motion information correction may be performed on the initial motion information or the initial motion information list. That is, motion correction for motion information may not be performed on initial motion information among multiple pieces of motion information in the list for motion information correction. Alternatively, motion correction may not be performed on motion information, which is not present in the initial motion information list, among multiple pieces of motion information in the list for motion information correction.

At the motion information determination step, correction for the list for motion information correction may be performed a maximum of NUM_MAX_ITER times.

At the motion information determination step, correction for the list for motion information correction may be separated into a maximum of NUM_MAX_ITER steps and may be separately performed. Alternatively, at the motion information determination step, correction for the list for motion information correction may be repeatedly performed a maximum of NUM_MAX_ITER times.

For example, steps in correction may be separated based on at least one of motion information that is the target of correction and a correction method.

The correction methods may be separated based on at least one of a correction type, a search step in correction, a search range in correction, a search method in correction, a subsampling method in correction, and the type of matching cost used in correction.

The correction type may include at least one of 1) template matching, 2) bilateral matching, 3) an operation using a motion information offset, and 4) an operation using a motion information correction vector.

For example, performing one correction step may mean that correction is performed on all or some correction candidates in the current list for motion information correction.

NUM_MAX_ITER may be 0, 1, 2, 8 or a positive integer.

For example, NUM_MAX_ITER may denote the number of multiple pieces of motion information in the initial motion information list.

For example, when bidirectional inter-prediction is used for a target block, a motion information offset $MV_{off}$ may be added to the motion vector of the target block. Here, $MV_{off}$ may be equally added in an L0 direction and an L1 direction. In other words, processing corresponding to the following Equations 11 and 12 may be performed.

$$MV0' = MV0 + MV_{off} \quad \text{[Equation 11]}$$

$$MV1' = MV1 + MV_{off} \quad \text{[Equation 12]}$$

Here, MV0 may be the motion vector of the target block in the L0 direction. MV1 may be the motion vector of the target block in the L1 direction.

Here, MV0' may be a corrected motion vector in the L0 direction. MV1' may be a corrected motion vector in the L1 direction.

$MV_{off}$ may be one of a motion information offset or a motion information offset candidate specified from the motion information offset candidate list. However, $MV_{off}$ is not limited to the above-described information.

For example, when bidirectional inter-prediction is used for the target block, a value related to the motion information offset $MV_{off}$ may be added to the motion vector of the target block. Here, $MV_{off}$ may be added in the L0 direction, and $-MV_{off}$ may be added in the L1 direction. In other words, processing corresponding to the following Equations 13 and 14 may be performed.

$$MV0' = MV0 + MV_{off} \quad \text{[Equation 13]}$$

$$MV1' = MV1 - MV_{off} \quad \text{[Equation 14]}$$

For example, when bidirectional inter-prediction is used for the target block, a value related to the motion information offset $MV_{off}$ may be added to the motion vector of the target block. Here, $MV_{off}$ may be added in the L0 direction, and SCALED_$MV_{off}$ may be added in the L1 direction. In other words, processing corresponding to the following Equations 15 and 16 may be performed.

$$MV0' = MV0 + MV_{off} \quad \text{[Equation 15]}$$

-continued $$MV1' = MV1 + \text{SCALED\_MV}_{off} \quad \text{[Equation 16]}$$

Here, SCALED_$MV_{off}$ may be a motion vector derived by applying scaling in the L1 direction to $MV_{off}$ in the L0 direction.

For example, when bidirectional inter-prediction is used for the target block, a value related to the motion information offset $MV_{off}$ may be added to the motion vector of the target block. Here, $MV_{off}$ may be added in the L1 direction, and SCALED_$MV_{off}$ may be added in the L0 direction. In other words, processing corresponding to the following Equations 17 and 18 may be performed.

$$MV1' = MV1 + MV_{off} \quad \text{[Equation 17]}$$

$$MV0' = MV0 + \text{SCALED\_MV}_{off} \quad \text{[Equation 18]}$$

When an affine mode is used for the target block, adding the motion information offset $MV_{off}$ in an LX direction may mean that $MV_{off}$ is added to at least one of CPMVs in the LX direction of the affine mode, or a motion vector determined based on $MV_{off}$ is added thereto. Here, X may be 0, 1 or a positive integer.

The CPMV that is the target to which $MV_{off}$ or the motion vector determined based on $MV_{off}$ is added may be determined based on at least one of motion information of the target block, the coding parameter of the target block, motion information of a neighboring block, the coding parameter of the neighboring block, a target template of the target block, a reference template for a reference block of the target block, and the index of a correction candidate.

For example, when an affine mode is used for the target block, adding the motion information offset $MV_{off}$ in the LX direction may mean that $MV_{off}$ is added to each CPMV in the LX direction. Here, X may be 0, 1 or a positive integer.

For example, in the case where bidirectional inter-prediction is used for the target block, $MV_{off}$ may be added only in the LX direction when the motion information offset $MV_{off}$ is added to the motion vector of the target block.

For example, when X is 0, processing corresponding to the following Equations 19-1 and 19-2 may be performed.

$$MV0' = MV0 + MV_{off} \quad \text{[Equation 19-1]}$$

$$MV1' = MV1 \quad \text{[Equation 19-2]}$$

Here, MV0 may be the motion vector of the target block in the L0 direction. MV1 may be the motion vector of the target block in the L1 direction.

Here, MV0' may be a corrected motion vector in the L0 direction. MV1' may be a correction motion vector in the L1 direction.

$MV_{off}$ may be one of a motion information offset or a motion information offset candidate specified from the motion information offset candidate list, but is not limited thereto.

Here, X may be 0, 1 or a positive integer. For example, information indicating X may be determined through signaling/encoding/decoding. For example, LX may be a direction having lower matching cost of the L0 direction and the L1 direction. Alternatively, LX may be a direction having higher matching cost of the L0 direction and the L1 direction.

X may be determined based on the remainder of a division operation which divides the index of initial motion information by a specific value.

The specific value may be 2 or 3.

X may be determined based on the index of a correction candidate.

For example, X may be determined based on the remainder of a division operation which divides the index of the correction candidate by a specific value.

For example, X may be determined based on the quotient of a division operation which divides the index of the correction candidate by a specific value.

X may be determined based on a motion information index.

For example, X may be determined based on the remainder of a division operation which divides the motion information index by a specific value.

For example, X may be determined based on the quotient of a division operation which divides the motion information index by a specific value.

Here, the specific value may be 2, 3, 6, 8, 12, 16 or a positive integer.

For example, in the case where bidirectional inter-prediction is used for the target block, $MV_{diff}$ may be equally added in the L0 direction and the L1 direction when the motion information correction vector $MV_{diff}$ is added to the motion vector of the target block. In other words, processing corresponding to Equations 20-1 and 20-2 may be performed.

$$MV0' = MV0 + MV_{diff} \quad \text{[Equation 20-1]}$$

$$MV1' = MV1 + MV_{diff} \quad \text{[Equation 20-2]}$$

Here, MV0 may be the motion vector of the target block in the L0 direction. MV1 may be the motion vector of the target block in the L1 direction.

Here, MV0' may be a corrected motion vector in the L0 direction. MV1' may be a corrected motion vector in the L1 direction.

For example, in the case where bidirectional inter-prediction is used for the target block, $MV_{diff}$ may be added in the L0 direction and $-MV_{diff}$ may be added in the L1 direction when the motion information correction vector $MV_{diff}$ is added to the motion vector of the target block. In other words, processing corresponding to Equations 20-3 and 20-4 may be performed.

$$MV0' = MV0 + MV_{diff} \quad \text{[Equation 20-3]}$$

$$MV1' = MV1 - MV_{diff} \quad \text{[Equation 20-4]}$$

For example, in the case where bidirectional inter-prediction is used for the target block, $MV_{diff}$ may be added in the L0 direction, and $SCALED\_MV_{diff}$ may be added for the L1 direction when the motion information correction vector $MV_{diff}$ is added to the motion vector of the target block. In other words, processing corresponding to Equations 20-5 and 20-6 may be performed.

$$MV0' = MV0 + MV_{diff} \quad \text{[Equation 20-5]}$$

$$MV1' = MV1 + \text{SCALED\_MV}_{diff} \quad \text{[Equation 20-6]}$$

Here, $SCALED\_MV_{diff}$ may be a motion vector derived by applying scaling in the L1 direction to $MV_{diff}$ in the L0 direction.

For example, in the case where bidirectional inter-prediction is used for the target block, $MV_{diff}$ may be added in the L0 direction and the L1 direction, and $SCALED\_MV_{diff}$ may be added in the L1 direction when the motion information correction vector $MV_{diff}$ is added to the motion vector of the target block. In other words, processing corresponding to the following Equations 20-7 and 20-8 may be performed.

$$MV1' = MV1 + MV_{diff} \quad \text{[Equation 20-7]}$$

$$MV0' = MV0 + \text{SCALED\_MV}_{diff} \quad \text{[Equation 20-8]}$$

For example, in the case where an affine mode is used for the target block, adding the motion information correction vector $MV_{diff}$ in the LX direction may mean that $MV_{diff}$ is added to at least one of CPMVs in the LX direction, or a motion vector determined based on $MV_{diff}$ is added thereto.

Here, X may be 0, 1 or a positive integer.

CPMV that is the target to which $MV_{diff}$ or a motion vector determined based on the $MV_{diff}$ is added may be determined based on at least one of motion information of the target block, the coding parameter of the target block, motion information of a neighboring block, the coding parameter of the neighboring block, a target template of the target block, a reference template for a reference block of the target block, and the index of a correction candidate.

For example, in the case where the affine mode is used for the target block, adding the motion information offset $MV_{diff}$ in the LX direction may mean that $MV_{diff}$ is added to each CPMV in the LX direction. Here, X may be 0, 1 or a positive integer.

When a motion information offset is added to bidirectional motion information, 2-sided Merge Motion Vector Differences (MMVD) may be used. When the 2-sided MMVD is used, a first motion information offset may be added to the motion vector in the LX direction. The motion information offset may indicate Motion Vector Differences (MVD). However, for the motion vector in the L(1−X) direction, second motion information may be derived from first motion information using possible scaling and mirroring while depending on POC differences. The second motion information may be added to the motion vector in the L(1−X) direction. Here, the processor of scaling may be removed from 2-sided MMVD.

When the motion information offset is added to the bidirectional motion information, 1-sided MMVD may be used. The 1-sided MMVD may be used as affine MMVD and part of non-affine MMVD. When the 1-sided MMVD is used, individual MVD may be used independently for each direction. Here, non-zero MVD may be applied to motion information in the LX direction. Zero MVD may be applied to motion information in the L(1−X) direction. In other words, when the motion information offset is added to bidirectional motion information, the motion information offset may be added only to motion information in one of the L0 direction and the L1 direction.

Which one of a candidate to which 2-sided MMVD is applied and a candidate to which 1-sided MMVD is applied corresponds to the bidirectional motion information may be determined based on the index of the MMVD candidate. Further, in 1-sided MMVD, the direction (i.e., X) in which the motion information offset is to be added may be determined based on the index of the MMVD candidate. Here, the MMVD candidate may be a correction candidate to which MMVD is applied.

An MMVD base may be motion information derived from a merge candidate list. The MMVD candidate may be at least one of MMVD bases. Additionally, the number of MMDV bases may be 2 or 3. For the affine MMVD, the number of MMVD bases may be 1, 2 or 3.

Information for specifying at least one MMVD base may be signaled/encoded/decoded.

At least one MMVD base may be determined based on motion information of the target block, the coding parameter of the target block, motion information of a neighboring block, the coding parameter of the neighboring block, and matching cost.

For example, the number of MMVD bases may be determined based on affine flags of neighbor blocks of the target block.

For example, X may be determined based on the remainder of a division operation which divides the index of a correction candidate by a predefined value.

For example, X may be determined based on the quotient of a division operation which divides the index of a correction candidate by a predefined value.

X may be determined based on the index of motion information.

For example, X may be determined based on the remainder of a division operation which divides the index of a correction candidate by a predefined value.

For example, X may be determined based on the quotient of a division operation which divides the index of a correction candidate by a predefined value.

The predefined value may be 2, 3, 6, 8, 12, 16 or a positive integer.

For example, when bidirectional prediction is used for the target block, only the motion information in an LX direction, of the L0 direction and the L1 direction, may be corrected.

Here, X may be 0, 1 or a positive integer.

For example, correcting only the motion information in the LX direction may mean that the list for motion information correction is configured using only motion information in the LX direction or only a motion information offset in the LX direction. However, the meaning that only the motion information in the LX direction is corrected is not limited to the above-described configuration.

For example, in this case, the motion information correction step for the target block may be performed in the same manner as the motion information correction step in unidirectional inter-prediction for the LX direction.

For example, in this case, motion information in the L(1−X) direction may be used for calculating matching cost. For example, bilateral matching cost calculated using the motion information in the L(1−X) direction, which is already determined and fixed, may be used as the matching cost. However, a scheme for determining the matching cost is not limited to the above-described scheme.

Based on highest matching cost among the matching costs of correction candidates in the list for motion information correction, whether correction is performed on correction candidates in the list for motion information correction may be determined.

When the highest matching cost among the matching costs of the correction candidates in the list for motion information correction is less than or equal to MATCHING_COST_THRES, correction performed on correction candidates in the list for motion information correction may be stopped. Correction may be performed on correction candidates in the list for motion information correction may be performed only when the highest matching cost among the matching costs of correction candidates in the list for motion information correction is equal to or greater than MATCHING_COST_THRES.

Here, MATCHING_COST_THRES may be 0 or a positive integer.

MATCHING_COST_THRES may be a value determined based on the size of the target block.

Alternatively, MATCHING_COST_THRES may be a value determined based on lowest matching cost among the matching costs of correction candidates in the list for motion information correction.

Alternatively, MATCHING_COST_THRES may be a value determined based on the number of samples constituting a template.

For example, based on the difference between the minimum value and the maximum value of the matching costs of correction candidates in the list for motion information correction, whether correction is performed on correction candidates in the list for motion information correction may be determined.

When the difference between the highest matching cost and the lowest matching cost among the matching costs of the correction candidates in the list for motion information correction is less than or equal to MATCHING_COST_DIFF_THRES, correction performed on correction candidates in the list for motion information correction may be stopped. Alternatively, for example, correction may be performed on correction candidates in the list for motion information correction only when the difference between the highest matching cost and the lowest matching cost among the matching costs of the correction candidates in the list for motion information correction is equal to or greater than MATCHING_COST_DIFF_THRES.

MATCHING_COST_DIFF_THRES may be 0 or a positive integer.

MATCHING_COST_DIFF_THRES may be a value determined based on the size of the target block.

Alternatively, MATCHING_COST_DIFF_THRES may be a value determined based on the number of samples constituting a template.

For example, whether correction is performed on a specific correction candidate in the list for motion information correction may be determined based on a correction candidate having an index smaller than that of the specific correction candidate by 1 (or a correction candidate having an index larger than that of the specific correction candidate by 1).

For example, whether correction is performed on the specific correction candidate in the list for motion information correction may be determined based on the matching cost of the specific correction candidate and the matching cost of the correction candidate having an index smaller than that of the specific correction candidate by 1 (or the correction candidate having an index larger than that of the specific correction candidate by 1).

For example, correction may be performed on the specific correction candidate in the list for motion information correction only when the difference between the matching cost of the specific correction candidate and the matching cost of the correction candidate having an index smaller than that of the specific correction candidate by 1 (or the correction candidate having an index larger than that of the specific correction candidate by 1) is less than or equal to MATCHING_COST_DIFF_THRES.

For example, correction may be performed on the specific correction candidate in the list for motion information correction only when the difference between the matching cost of the specific correction candidate and the matching cost of the correction candidate having an index smaller than that of the specific correction candidate by 1 (or the correction candidate having an index larger than that of the specific correction candidate by 1) is equal to or greater than MATCHING_COST_DIFF_THRES.

For example, whether correction is performed on the specific correction candidate in the list for motion information correction may be determined based on a correction candidate having the highest index (or a correction candidate having the lowest index) among the correction candidates in the list.

For example, whether correction is performed on the specific correction candidate in the list for motion information correction may be determined based on the matching cost of the specific correction candidate and the matching cost of the correction candidate having the highest index (or the correction candidate having the lowest index).

For example, correction may be performed on the specific correction candidate in the list for motion information correction only when the difference between the matching cost of the specific correction candidate and the matching cost of the correction candidate having the highest index (or the correction candidate having the lowest index) is less than or equal to MATCHING_COST_DIFF_THRES.

For example, correction may be performed on the specific correction candidate in the list for motion information correction only when the difference between the matching cost of the specific correction candidate and the matching cost of the correction candidate having the highest index (or the correction candidate having the lowest index) is equal to or greater than MATCHING_COST_DIFF_THRES.

For example, whether correction is performed on the specific correction candidate in the list for motion information correction may be determined based on a correction candidate having the highest index (or a correction candidate having the lowest index) among the correction candidates.

For example, whether correction is performed on the specific correction candidate in the list for motion information correction may be determined based on the matching cost of the specific correction candidate and the matching cost of the correction candidate having the highest index (or the correction candidate having the lowest index).

For example, correction may be performed on the specific correction candidate in the list for motion information correction only when the difference between the matching cost of the specific correction candidate and the matching cost of the correction candidate having the highest index (or the correction candidate having the lowest index) is less than or equal to MATCHING_COST_DIFF_THRES.

For example, correction may be performed on the specific correction candidate in the list for motion information correction only when the difference between the matching cost of the specific correction candidate and the matching cost of the correction candidate having the highest index (or the correction candidate having the lowest index) is equal to or greater than MATCHING_COST_DIFF_THRES.

Each correction candidate in the list for motion information correction in embodiments may be a specific sample.

When a specific correction candidate in the list for motion information correction is a specific sample, the final motion information determined in the motion information correction method may be motion information indicating the specific sample.

When the specific correction candidate in the list for motion information correction is a specific sample, determining the specific correction candidate to be the final motion information may mean that motion information indicating the specific correction candidate is determined to be the final motion information.

Each correction candidate in the list for motion information correction may be a motion information offset.

When the specific correction candidate in the list for motion information correction is the motion information offset, the final motion information determined in the motion information correction method may be motion information that is the sum of initial motion information and the specific motion information offset.

When the specific correction candidate in the list for motion information correction is a motion information offset, determining the specific correction candidate to be the final motion information may mean that the motion information that is the sum of the initial motion information and the specific correction candidate is determined to be the final motion information.

Each correction candidate in the list for motion information correction may be a motion information correction vector.

When the specific correction candidate in the list for motion information correction is the motion information correction vector, the final motion information determined in the motion information correction method may be motion information that is the sum of initial motion information and the specific motion information correction vector.

When the specific correction candidate in the list for motion information correction is the motion information correction vector, determining the specific correction candidate to be the final motion information may mean that motion information that is the sum of the initial motion information and the corresponding correction candidate is determined to be the final motion information.

Matching cost for the specific motion information offset may refer to the matching cost of the motion information that is the sum of the initial motion information and the specific motion information offset.

Matching cost for the specific motion information correction vector may refer to the matching cost of the motion information that is the sum of the initial motion information and the specific motion information correction vector.

Motion Vector Difference

A motion vector difference may be added to at least one of initial motion information, an initial motion information candidate, a correction candidate, and final motion information in a motion information correction method.

A motion vector difference may be added to an L0 direction motion vector and/or an L1 direction motion vector of at least one of the initial motion information, the initial motion information candidate, the correction candidate, and the final motion information in the motion information correction method.

Information about the motion vector difference may be signaled/encoded/decoded.

Determination of Final Motion Information in Motion Information Correction Method Prediction for a target block may be performed based on final motion information determined in the motion information correction method or motion information derived from the final motion information. A process for encoding/decoding the target block may be performed using the final motion information in the motion information correction method.

A reference block for the target block may be determined from the final motion information determined through the motion information correction method or the motion information derived from the final motion information. An image encoding/decoding process may be performed using the determined reference block.

The encoding/decoding process may include at least one of intra block copy, intra-prediction, inter-prediction, transform, inverse transform, quantization, dequantization, entropy encoding/decoding, and in-loop filtering. However, the encoding/decoding process is not limited to the above-described processes.

The final motion information may refer to at least one of multiple pieces of motion information specified from the list for motion information correction.

Alternatively, the final motion information may refer to motion information derived from at least one piece of motion information specified from the motion information candidate list.

At least one piece of final motion information may be determined in the motion information correction method in embodiments.

The final motion information may be determined from the list for motion information correction.

The final motion information may be determined using a motion information index.

For example, the motion information index may be a predefined value.

The predefined value may be a lowest index value. For example, the predefined value may be 0.

When the predefined value is used, the amount of bits for signaling or the like is reduced, whereby signaling/encoding/decoding efficiency may be improved.

For example, the motion information index may be an index determined through signaling/encoding/decoding.

The motion information index may be determined through a rate-distortion optimization process. In this case, the signaling/encoding/decoding efficiency of the target block may be improved.

For example, the motion information index may be an index derived by template matching and/or bilateral matching.

The motion information index may be the index of a motion information candidate having the lowest matching cost among the motion information candidates in the motion information candidate list.

For example, the same method for determining the motion information index may be used for the L0 direction and the L1 direction.

For example, different methods for determining the motion information index may be used for the L0 direction and the L1 direction, respectively.

For example, when the motion information index is determined, a motion information index in an LX direction may be determined by comparing the template matching costs of motion information candidates in the LX direction. A motion information index in an L(1−X) direction may be determined by comparing bilateral matching costs of motion information candidates in the L(1−X) direction.

X may be 0, 1 or a positive integer.

The information about X may be signaled/encoded/decoded.

X may be a predefined value.

The bilateral matching cost of the motion information candidate in the L(1−X) direction may be bilateral matching cost between the corresponding candidate and the LX direction motion information.

By means of one motion information index, L0 direction information and L1 direction information of the final motion information may be determined. Alternatively, by means of different motion information indices, L0 direction information and L1 direction information of the final motion information may be separately determined.

The final motion information may be specified based on matching cost.

For example, the final motion information may be a correction candidate having the lowest matching cost among the correction candidates in the list for motion information correction.

For example, the final motion information may indicate one or more correction candidates specifying a specific condition among the correction candidates in the list for motion information correction.

Alternatively, the final motion information may indicate one or more correction candidates selected depending on a specific condition or a specific criterion among the correction candidates in the list for motion information correction.

For example, the final motion information may indicate one or more correction candidates having matching costs less than or equal to a specific value among the correction candidates in the list for motion information correction.

Here, the specific value may be a value determined based on the attributes or coding parameters of the target block described in embodiments, such as the size and motion information of the target block.

The matching cost may include at least one of template matching cost and bilateral matching cost.

The type of matching cost used to determine the final motion information may be identical to each other for the L0 direction and the L1 direction.

Alternatively, the types of matching costs used to determine the final motion information may be different from each other for the L0 direction and the L1 direction.

For example, when the final motion information is specified, the final motion information in LX direction may be specified using the template matching cost of the correction candidate in the LX direction, and the final motion information in the L(1−X) direction may be specified using the bilateral matching cost of the correction candidate in the L(1−X) direction.

X may be 0, 1 or a positive integer.

The information about X may be signaled/encoded/decoded.

The bilateral matching cost of the motion information candidate in the L(1−X) direction may be bilateral matching cost between the corresponding candidate and the final motion information in the LX direction.

For example, when the final motion information is specified, template matching cost may be used for the LX direction, and bilateral matching cost may be used for the L(1−X) direction. Here, X may be 0, 1 or a positive integer. The information about X may be signaled/encoded/decoded.

The same method for determining the final motion information may be used for the L0 direction and the L1 direction.

For example, the final motion information in the L0 direction and the final motion information in the L1 direction may be determined by signaling/encoding/decoding the motion information index.

For example, each of the final motion information for the L0 direction and the final motion information for the L1 direction may be determined by signaling/encoding/decoding the motion information index for each direction.

The different methods for determining the final motion information may be used for the L0 direction and the L1 direction, respectively.

For example, for the LX direction, final motion information MVP_LX may be determined using the motion information index determined based on at least one of the coding parameter of the target block, motion information of the target block, the coding parameter of a neighboring block, and motion information of the neighboring block or the motion information index determined through signaling/encoding/decoding. MVP_LX may be used to determine the final motion information in the L(1−X) direction.

For example, among the correction candidates in the list for motion information correction in the L(1−X) direction, only a specific $MVP\_L(1-X)_i$ may be used to determine motion information in the L(1−X) direction. Here, motion information (MVP_LX, $MVP\_L(1-X)_i$) or motion information ($MVP\_L(1-X)_i$, MVP_LX) including the specific $MVP\_L(1-X)_i$ may satisfy a specific condition. In other words, when the motion information (MVP_LX, $MVP\_L(1-X)_i$) or the motion information ($MVP\_L(1-X)_i$, MVP_LX) satisfies the specific condition, $MVP\_L(1-X)_i$ may be used to determine the motion information in the L(1−X) direction.

The specific condition may be the enabling condition of template matching and/or bilateral matching or a part of the enabling condition.

For example, the final motion information in the LX direction may be derived using only N candidates having the lowest indices among the correction candidates in the list for motion information correction in the LX direction.

Here, N may be 1, 2 or a positive integer.

Here, X may be 0, 1 or a positive integer. The information about X may be signaled/encoded/decoded.

For example, the list for motion information correction in the LX direction may be reconstructed to include only N motion information candidates having the lowest indices in the list.

Here, N may be 1, 2 or a positive integer.

Here, X may be 0, 1 or a positive integer. The information about X may be signaled/encoded/decoded.

For example, for a $LX_{signal}$ direction, the final motion information may be determined using a motion information index determined based on at least one of the coding parameter of the target block, motion information of the target block, the coding parameter of a neighboring block, and motion information of the neighboring block or a motion information index determined through signaling/encoding/decoding.

Next, when $X_{signal}$ is 0, correction candidates in the list for motion information correction may be sorted in ascending order of matching costs of motion information (MVP_L0, $MVP\_L1_i$) in an $L(1-LX_{signal})$ direction.

Alternatively, next, when $X_{signal}$ is 1, correction candidates in the list for motion information correction may be sorted in ascending order of the matching costs of motion information ($MVP\_L0_i$, MVP_L1) in the $L(1-LX_{signal})$ direction.

The final motion information in the $L(1-LX_{signal})$ direction may be determined by a motion information index determined based on at least one of motion information of the target block, the coding parameter of a neighboring block, and motion information of the neighboring block or by a motion information index determined using signaling/encoding/decoding. However, a scheme for determining the final motion information in each direction is not limited to the above-described schemes.

For example, the final motion information in the $L(1-LX_{signal})$ direction may be derived using only N candidates having the lowest indices among the candidates in the list for motion information correction in the $L(1-LX_{signal})$ direction. Here, N may be 1, 2 or a positive integer. Here, X may be 0, 1 or a positive integer. The information about X may be signaled/encoded/decoded.

For example, the list for motion information correction in the $L(1-LX_{signal})$ direction may be reconstructed to include only N correction candidates having the lowest indices in the list. Here, N may be 1, 2 or a positive integer. Here, X may be 0, 1 or a positive integer. The information about X may be signaled/encoded/decoded.

$X_{signal}$ may be a predefined value. Alternatively, $X_{signal}$ may be determined by signaling/encoding/decoding the information about $X_{signal}$.

Processes Applied to Final Motion Information in Motion Information Correction Method At least one of processes, which will be described later, may be applied to final motion information in the motion information correction method described in embodiments. The motion information to which the processes in embodiments are applied may be used as the final motion information of the motion information correction method.

The final motion information may be corrected based on at least one of template matching, bilateral matching, an operation using a motion information offset, and an operation using a motion information correction vector.

For example, a motion information difference may be added to the final motion information.

For example, the motion information offset may be added to the final motion information.

For example, the final motion information or a portion of the final motion information may be changed to the same value as the motion information offset.

For example, after the final motion information in the motion information correction method is determined for the L0 direction and the L1 direction, correction for motion information in at least one direction may be performed using at least one of template matching, bilateral matching, the operation using a motion information offset, and/or the operation using a motion information correction vector, and the corrected motion information may be used as the final motion information.

In embodiments, the operation using the motion information correction vector may refer to an operation between a target described as performing the operation; and the motion information correction vector.

For example, a direction in which motion information correction is performed may be a predefined direction.

The direction in which motion information correction is performed may be the direction of motion information having higher template matching cost between the motion information in the L0 direction and the motion information in the L1 direction.

The direction in which motion information correction is performed may be the direction of motion information having lower template matching cost between the motion information in the L0 direction and the motion information in the L1 direction.

For example, information about the direction in which the correction of the final motion information is to be performed may be signaled/encoded/decoded.

For example, after the matching cost of the final motion information in the motion information correction method is equal to or greater than THRES_FOR_AFTERREFINE, correction of the final motion information may be performed using at least one of template matching, bilateral matching, the operation using a motion information offset, and the operation using a motion information correction vector, and the corrected motion information may be used as the final motion information.

THRES_FOR_AFTERREFINE may be 0, 1, 2, 4, 8, 16, 32 or a positive integer.

For example, THRES_FOR_AFTERREFINE may be the product of the number of pixels in a target block and a predefined value.

The predefined value may be 0, 1, 2, 4, 8 or a positive integer.

For example, $X_{signal}$ may be determined based on the motion information index determined based on at least one of the coding parameter of the target block, the motion information of the target block, the coding parameter of the neighboring block, and the motion information of the neighboring block or the motion information index determined through signaling/encoding/decoding. When $X_{signal}$ is determined, the final motion information in the $LX_{signal}$ direction may be determined by at least one of matching cost (e.g., template matching cost); and signaling/encoding/decoding of specific related information.

Next, among correction candidates in the $L(1-X_{signal})$ direction, a correction candidate having the lowest matching cost may be determined to be the final motion information in the $L(1-X_{signal})$ direction. Here, the matching cost of the correction candidate may be matching cost between the correction candidate and the final motion information in the $LX_{signal}$ direction. For example, the matching cost may be bilateral matching cost.

Alternatively, N correction candidates having the lowest matching cost(s) among the correction candidates in the $L(1-X_{signal})$ direction may be identified. The indices of the N identified correction candidates may be signaled/encoded/decoded. Among the N identified correction candidates, a correction candidate indicated by the index may be specified. The specified correction candidate may be determined to be the final motion information in the $L(1-X_{signal})$ direction. Here, the matching cost of the correction candidate may be matching cost between the correction candidate and the final motion information in the $LX_{signal}$ direction. For example, the matching cost may be bilateral matching cost.

For example, the specific related information signaled/encoded/decoded for the motion information in the $LX_{signal}$ direction may be at least one of a motion information index, a reference image index, and an inter-prediction indicator. However, the specific related information is not limited to the above-described pieces of information.

For example, among the motion information candidates in the $LX_{signal}$ direction, a motion information candidate having the lowest template matching may be specified as motion information in the $LX_{signal}$ direction.

N may be 1, 2 or a positive integer.

When the list for motion information correction is configured or the final motion information is determined in the motion information correction method, MVD_NUM_STEP Motion Vector Differences (MVD) may be added to the motion information.

For example, in the motion information correction method, after motion vector differences are added to the motion information, correction may be performed on the motion information.

For example, the motion information to which the motion vector differences are added may be at least one of each candidate in an initial motion information candidate list; initial motion information; each correction candidate in the list for motion information correction; final motion information; motion information derived at each search step of correction on the initial motion information, and motion information derived at each search step of correction on the final motion information.

The motion information may include at least one of a sample, a position, a motion information offset, and a motion information correction vector.

MVD_NUM_STEP may be 0 or a positive integer.

MVD_NUM_STEP may be determined based on at least one of the motion information index of the target block, the coding parameter of the target block, motion information of the target block, the coding parameter of a neighboring block, and motion information of the neighboring block.

When the value of MVD_NUM_STEP is 0, signaling/encoding/decoding of the motion vector differences for the target block may not be performed. That is, signaling/encoding/decoding of the motion vector differences for the target block may be performed only when the value of MVD_NUM_STEP is equal to or greater than 1.

For example, signaling/encoding/decoding of the motion vector differences may be performed only when the motion information index of the target block is equal to or greater than MVD_IDXTHRES.

For example, signaling/encoding/decoding of the motion vector differences may be performed only when the motion information index of the target block is less than or equal to MVD_IDXTHRES.

For example, MVD_NUM_STEP motion vector differences may be added to the motion information only when a motion information index is equal to or greater than MVD_IDXTHRES.

For example, MVD_NUM_STEP motion vector differences may be added to the motion information only when the motion information index is less than or equal to MVD_IDXTHRES.

MVD_IDXTHRES may be 0, 1, 2 or a positive integer.

MVD_IDXTHRES may be a predefined value.

When the final motion information is determined in the motion information correction method, whether at least one of a template matching, bilateral matching, the operation using a motion information offset, and the operation using a motion information correction vector is performed may be determined based on the value of the motion information index.

In embodiments, performing correction on the motion information may mean that at least one of template matching, bilateral matching, the operation using a motion information offset, and the operation using a motion information correction vector is performed.

For example, when the value of the motion information index is a first value, correction in the motion information correction method may not be performed. The first value may be, but is not limited to, 0.

For example, when the value of the motion information index is a second value, correction in the motion information correction method may be performed. The second value may be 1, 2 or a positive integer. However, the second value is not limited to the above-described values.

For example, whether correction in the motion information correction method is performed may be determined based on the quotient and/or the remainder of a division operation which divides the motion information index by a predefined value.

The predefined value may be 2, 3, or a positive integer.

For example, when the quotient and/or the remainder of the division operation, which divides the motion information index by the predefined value, indicate a first value, correction of the motion information may be performed both in the L0 direction and in the L1 direction. When the quotient and/or the remainder indicate a second value, only correction of the motion information in the L0 direction may be performed. When the quotient and/or the remainder indicate a third value, only correction of the motion information in the L1 direction may be performed.

In other words, any of multiple directions in which motion information is to be corrected may be determined based on the motion information index. Correction of the motion information may refer to an operation of adding a non-zero value to the motion information. For example, the non-zero value may be at least one of a MVD, a motion information correction vector, and a motion information offset. A non-zero value may be added to motion information in a direction specified for the motion information index. Motion information in directions other than the direction specified for the motion information index may be maintained without change. Alternatively, a zero value may be added to the motion information in directions other than the direction specified for the motion information index.

Here, correction of the motion information may refer to an operation of adding MVD to the motion information.

For example, whether correction in the motion information correction method is performed may be determined through a comparison between the motion information index and a predefined value.

For example, whether correction in the motion information correction method is performed may be determined based on whether the motion information index is less than the predefined value.

For example, whether correction in the motion information correction method is performed may be determined based on whether the motion information index is greater than the predefined value.

The predefined value may be 2, 3, or a positive integer.

For example, the type of at least one of matching costs used in the motion information correction method may be determined based on the motion information index.

For example, the motion vector differences may be signaled/encoded/decoded only when the target block does not satisfy the enabling condition of a specific decoder-side motion information derivation method.

The decoder-side motion information derivation method may be a method using template matching and/or bilateral matching. However, the decoder-side motion information derivation method is not limited to the above-described methods.

For example, the enabling condition of the specific decoder-side motion information derivation method may include the following [Condition 6], [Condition 7] and [Condition 8].

[Condition 6] Bidirectional inter-prediction is used for the target block.

[Condition 7] The difference between POC of a current image and POC of a reference image in the L0 direction is equal to the difference between POC of the current image and POC of a reference image in the L1 direction.

[Condition 8] The direction from the current image to the reference image in an L0 direction is different from the direction from the current image to the reference image in the L1 direction.

For example, the enabling condition of the specific decoder-side motion information derivation method may include the following [Condition 9] and [Condition 10].

[Condition 9] Bidirectional inter-prediction is used for the target block.

[Condition 10] The direction from the current image to the reference image in the L0 direction is different from the direction from the current image to the reference image in the L1 direction.

The motion vector differences may be added only to motion information in an LX direction between motion information in the L0 direction and motion information in the L1 direction.

X may be 0, 1 or a positive integer.

X may be a predefined value.

X may be determined through signaling/encoding/decoding.

For example, when the motion vector difference in the L0 direction and the motion vector difference in the L1 direction are respectively signaled/encoded/decoded, the motion vector differences in respective directions may be added to pieces of motion information in the respective directions.

For example, when one motion vector difference MVD_ONLY is signaled/encoded/decoded, MVD_ONLY may be added to the motion vector in the L0 direction, and −MVD_ONLY may be added to the motion vector in the L1 direction.

For example, when only one motion vector difference MVD_ONLY is signaled/encoded/decoded, MVD_ONLY may be added only to the motion vector in the LX_MVD direction.

X_MVD may be 0 or 1. However, the value of X_MVD is not limited to the above-described values 0 and 1.

X_MVD may be a predefined value.

For example, LX_MVD may be the direction of motion information having lower matching cost of the L0 direction and the L1 direction.

For example, LX_MVD may be the direction of motion information having higher matching cost of the L0 direction and the L1 direction.

X_MVD may be determined through signaling/encoding/decoding.

For example, the motion vector difference may be added only to motion information in the LX direction. The motion information in the L(1−X) direction may be corrected by the decoder-side motion information derivation method that uses the motion information in the LX direction to which the motion vector difference is added.

The corrected motion information in the L(1−X) direction may be motion information having lowest bilateral matching cost within the search range of the decoder-side motion information derivation method. Here, the bilateral matching cost of the motion information may be bilateral matching cost between the motion information and the motion information in the LX direction.

The corrected motion information in the L(1−X) direction may be motion information having lowest template matching cost within the search range of the decoder-side motion information derivation method.

When the motion information in the L(1−X) direction is corrected using the decoder-side motion information derivation method, the motion information in the LX direction may not be corrected.

When the motion information in the L(1−X) direction is corrected using the decoder-side motion information derivation method, correction of the motion information in the LX direction may also be performed together.

For example, when the decoder-side motion information derivation method is performed, only the motion information in the L(1−X) direction may be corrected at some of search steps of the decoder-side motion information derivation method.

For example, when the decoder-side motion information derivation method is performed, only the motion information in the LX direction may be corrected at some of search steps of the decoder-side motion information derivation method.

X may be 0, 1 or a positive integer.

X may be a predefined value.

X may be determined through signaling/encoding/decoding.

For example, the motion vector difference may be added only to motion information in the LX direction. Thereafter, the motion information in the L0 direction and/or the motion information in the L1 direction may be corrected by the decoder-side motion information derivation method.

For example, the motion information may be corrected only in the direction having lower template matching cost of the L0 direction and the L1 direction.

For example, the motion information may be corrected only in the direction having higher template matching cost of the L0 direction and the L1 direction.

When the motion information in the L(1−X) direction is corrected using the decoder-side motion information derivation method, correction of the motion information in the LX direction may also be performed together.

For example, when the decoder-side motion information derivation method is performed, only the motion information in the L(1−X) direction may be corrected at some of search steps of the decoder-side motion information derivation method.

For example, when the decoder-side motion information derivation method is performed, only the motion information in the LX direction may be corrected at some of search steps of the decoder-side motion information derivation method.

X may be 0, 1 or a positive integer.

X may be a predefined value.

X may be determined through signaling/encoding/decoding.

For example, when four arithmetic operations using a motion information offset are performed on the motion information of the target block, four arithmetic operations using the motion information offset may be performed on the motion information only in the LX direction.

X may be 0, 1 or a positive integer.

X may be a predefined value.

X may be determined through signaling/encoding/decoding.

For example, when the motion information of the target block is changed to the same value as the motion information offset, only the motion information in the LX direction may be changed to the same value as the motion information offset.

X may be 0, 1 or a positive integer.

X may be a predefined value.

X may be determined through signaling/encoding/decoding.

In the motion information correction method, two or more pieces of final motion information may be determined.

For example, when the target block refers to motion information of a neighboring block, in the case where the motion information correction method is performed on the neighboring block and two or more pieces of final motion information are determined, motion information referenced by the target block from the corresponding neighboring block may be motion information having the lowest template matching cost among the two or more pieces of final motion information.

For example, in the case where the motion information correction method is performed on the target block and two or more pieces of final motion information are determined, a prediction block for the target block may be generated based on a reference block and template matching cost for each of the two or more pieces of final motion information.

Here, a weighted sum may be derived based on template matching costs for the two or more pieces of final motion information.

For example, weights used to derive the prediction block for the target block may be determined based on the matching cost of at least one of the pieces of final motion information.

Entropy Signaling/Encoding/Decoding of Encoding Information

Hereinafter, signaling/encoding/decoding steps at step 3930, step 4010, step 4120, and step 4210 will be described.

Whether a motion information correction method is enabled for a target block may be determined based on at least one of the size of the target block, the coding parameter of the target block, and motion information.

DMVDMODE_FLAG may be an indicator indicating whether the motion information correction method is performed on the target block. DMVDMODE_FLAG may be signaled/encoded/decoded.

Whether DMVDMODE_FLAG is signaled/encoded/decoded for the target block may be determined based on at least one of the size of the target block, the coding parameter of the target block, and the motion information.

The motion information may refer to information including at least one of a prediction list utilization flag, reference image list information, a reference image, a motion vector candidate, a CPMV, an affine model, a motion information index, a merge candidate, a merge index, the magnitude of a motion vector difference, the sign of each component of the motion vector difference, the indicator of an Overlapped Block Motion Compensation (OBMC) mode, the indicator of a local illuminance compensation mode, a block vector, and a block vector difference, as well as a motion vector, a reference image index, and an inter-prediction indicator. However, the type of motion information is not limited to the above-described pieces of information.

The affine model may be composed of two or more CPMVs. Alternatively, the affine model may refer to an affine motion model derived from two or more CPMVs.

The coding parameter may include information about at least one of the size of the target block, the magnitude of a motion vector, the enabling condition of template matching, the enabling condition of bilateral matching, the direction of inter-prediction, the index of inter Bi-prediction with CU Weights (BCW), the index of Adaptive Motion Vector Resolution (AMVR), the indicator of the Overlapped Block Motion Compensation (OBMC) mode, and the indicator of a local illuminance compensation mode.

Based on whether the motion information correction method is performed on the target block, at least one of the coding parameter and the motion information of the target block may be determined. Furthermore, based on whether the motion information correction method is performed on the target block, signaling/encoding/decoding of a syntax element for at least one of the coding parameter and the motion information of the target block may be skipped.

For example, when the motion information correction method is performed, the motion information correction method may be enabled only for a block in which a weight for the L0 direction and a weight for the L1 direction in inter bi-prediction with weights are identical to each other.

Signaling/encoding/decoding of the index of inter bi-prediction with weights may be performed only when the motion information correction method is not performed on the target block.

DMVDMODE_FLAG may be the indicator of the motion information correction method. Signaling/encoding/decoding of the index of inter bi-prediction with weights may be performed only when DMVDMODE_FLAG for the target block has a specific value. For example, the specific value may be 0 or false.

Alternately, the indicator indicating whether the motion information correction method is performed may be signaled/encoded/decoded only when which the weight for the L0 direction and the weight for the L1 direction in inter bi-prediction with weights for the target block are identical to each other.

When the motion information correction method is performed on the target block, the weight for the L0 direction and the weight for the L1 direction in inter bi-prediction with weights for the target block may be set to be identical to each other.

For example, the motion information correction method on the target block may be enabled only when adaptive motion vector resolution is not used or when adaptive motion vector resolution is identical to default resolution.

Signaling/encoding/decoding of an adaptive motion vector resolution index may be performed only when the motion information correction method is not performed on the target block.

Alternatively, information indicating whether the motion information correction method is performed may be signaled/encoded/decoded only when adaptive motion vector resolution is not used for the target block or when adaptive motion vector resolution is identical to the default resolution.

The default resolution may refer to motion vector resolution when adaptive motion vector resolution is not applied.

When the motion information correction method is performed on the target block, adaptive motion vector resolution may not be used for the target block or, alternatively, adaptive motion vector resolution may be set to be identical to the default resolution for the target block.

For example, DMVDMODE_FLAG may indicate whether the motion information correction method is performed on the target block. When signaling/encoding/decoding of DMVDMODE_FLAG is performed, a probability model and/or a context model may be used.

For example, the probability model and/or the context model may be determined based on weights in inter bi-prediction with weights for the target block.

For example, the probability model and/or the context model may be determined based on whether the weight for the L0 direction and the weight for the L1 direction in inter bi-prediction with weights are identical to each other.

For example, for the case where the weight for the L0 direction and the weight for the L1 direction in inter bi-prediction with weights are identical to each other and the case where the weights are different from each other, different probability models and/or different context models may be determined, respectively.

For example, a probability model and/or a context model may be determined based on whether an affine mode is performed on the target block and/or an affine mode indicator.

For example, for the case where the affine mode is performed on the target block and the case where the affine mode is not performed on the target block, different probability models and/or different context models may be determined, respectively.

For the case where the affine mode indicator of the target block has a value of 0 or a false value and the case where the affine mode indicator has a value of 1 or a true value, different probability models and/or different context models may be determined, respectively.

For example, a probability model and/or a context model may be determined based on whether the target block satisfies the enabling condition of bilateral matching or a part of the enabling condition of bilateral matching.

For example, for the case where the target block satisfies the enabling condition of bilateral matching and the case where the target block does not satisfy the enabling condition, different probability models and/or different context models may be determined, respectively.

For example, a probability model and/or a context model may be determined based on whether the target block satisfies the enabling condition of template matching or a part of the enabling condition of template matching.

For example, for the case where the target block satisfies the enabling condition of template matching and the case where the target block does not satisfy the enabling condition, different probability models and/or different context models may be determined, respectively.

In embodiments, the predefined condition may be a condition related to at least one of the size of the target block, the magnitude of a motion vector, the enabling condition of template matching, the enabling condition of bilateral matching, the direction of inter-prediction, the index of inter bi-prediction with weights, the index of adaptive motion vector resolution, the indicator of an overlapped block motion compensation mode, and the indicator of a local illuminance compensation mode. However, the predefined condition is not limited to the condition related to the above-described pieces of information.

For example, the predefined condition may be a condition in which the above-described information has a specific value described in embodiments.

Inter bi-prediction with weights may be technology for determining a combination of weights of reference blocks in units of a coding block upon generating a prediction block for the target block using a reference block in the L0 direction and a reference block in the L1 direction in the case where bi-prediction is applied to the target block. For example, the weight of each reference block may be determined through a scheme for signaling/encoding/decoding the index of a predefined table.

The overlapped block motion compensation mode may be a mode in which at least two prediction blocks are generated and a weighted sum of the prediction blocks is used as a final prediction block. The weighted sum may be applied to a part of the block or the entire (whole) block. For example, the part of the block may be a set of pixels and/or locations, corresponding to the boundary of the block.

In the local illuminance compensation mode, at least one of a weight and an offset may be derived by calculating a correlation between the template of the target block and the template of the reference block. At least one of the derived weight and the derived offset may be multiplied by or added to the part of the block or the whole block. The block may be a prediction block or a reconstructed block.

For the target block, an indicator indicating the direction to which the motion information is applied may be signaled/encoded/decoded. The indicator may indicate whether motion information correction is performed only in one of the L0 direction and the L1 direction. Alternatively, the indicator may indicate whether motion information correction is performed both in the L0 direction and in the L1 direction. For example, for each direction, an indicator indicating whether correction is performed in the corresponding direction may be signaled/encoded/decoded.

For example, when the motion information correction method is performed, the motion information correction method may be performed only on the block on which bidirectional inter-prediction is performed.

Signaling/encoding/decoding of information indicating an inter-prediction direction may be performed only when a motion information correction method is not performed on the target block.

Alternatively, information indicating whether the motion information correction method is performed may be signaled/encoded/decoded only when bi-prediction is applied to the target block.

For example, bidirectional inter-prediction may be performed for the target block when the motion information correction method is performed on the target block.

For example, the motion information correction method may be performed only when an affine mode is not applied to the target block. Alternatively, the motion information correction method may be performed only when an indicator indicating whether the affine mode is applied to the target block has a value of 0 or a false value.

Signaling/encoding/decoding of the indicator indicating whether the affine mode is performed may be performed only when the motion information correction method is not performed on the target block.

Alternatively, information indicating whether the motion information correction method is performed may be signaled/encoded/decoded only when an affine mode is not performed on the target block.

For example, when the motion information correction method is performed, the motion information correction method may be performed only in the case where a direction from the current image to L0_REFPIC_MINPOC and a direction from the current image to L1_REFPIC_MINPOC are different from each other.

Alternatively, for example, when the motion information correction method is performed, the motion information correction method may be performed only in the case where the direction from the current image to L0_REFPIC_MINPOC and the direction from the current image to L1_REFPIC_MINPOC are different from each other and a first POC interval and a second POC interval are identical to each other. The first POC interval may be a POC interval between the current image and L0_REFPIC_MINPOC. The second POC interval may be a POC interval between the current image and L1_REFPIC_MINPOC.

Signaling/encoding/decoding of a reference image index may be skipped when the motion information correction method is performed on the target block. Signaling/encoding/decoding of the reference image index may be performed only when the motion information correction method is not performed on the target block.

When the motion information correction method is performed on the target block, a reference image in the L0 direction for the target block may be L0_REFPIC_MINPOC, and a reference image in the L1 direction for the target block may be L1_REFPIC_MINPOC.

For example, when the motion information correction method is performed, signaling/encoding/decoding of DMVDMODE_FLAG may be performed only in the case where the direction from the current image to L0_REFPIC_MINPOC and the direction from the current image to L1_REFPIC_MINPOC are different from each other.

Alternatively, when the motion information correction method is performed, signaling/encoding/decoding of DMVDMODE_FLAG may be performed only in the case where the direction from the current image to L0_REFPIC_MINPOC and the direction from the current image to L1_REFPIC_MINPOC are different from each other and a first POC interval and a second POC interval are identical to each other. The first POC interval may be a POC interval between the current image and L0_REFPIC_MINPOC. The second POC interval may be a POC interval between the current image and L1_REFPIC_MINPOC.

L0_REFPIC_MINPOC may be a reference image having a minimum POC interval to the current image among reference images in a reference image list for the L0 direction. In other words, L0_REFPIC_MINPOC may be a reference image having the minimum POC interval among the reference images in the reference image list for the L0 direction. The POC interval of the reference image may be a POC interval between the current image and the reference image.

L1_REFPIC_MINPOC may be a reference image having a minimum POC interval to the current image among reference images in a reference image list for the L1 direction. In other words, L1_REFPIC_MINPOC may be a reference image having the minimum POC interval among the reference images in the reference image list for the L1 direction. The POC interval of the reference image may be a POC interval between the current image and the reference image.

Whether the motion information correction method is performed on the target block may be determined for a specific unit. Here, the specific unit may be at least one unit among sequence level, picture level, tile level, tile group level, slice level, CTU level, CU level, and PU level. However, the unit for which it is determined whether the motion information correction method is performed on the target block is not limited to the above-described units.

For example, mergeFlag may be an indicator indicating whether a merge mode is applied to the target block. mergeFlag may be signaled/encoded/decoded. Here, when mergeFlag has a first value, the indicator indicating whether the motion information correction method is performed may be first signaled/encoded/decoded. Here, the first value may be 0 or false. When mergeFlag has the first value, an advanced motion vector prediction (AMVP) mode may be applied to the target block.

For example, mergeFlag may be an indicator indicating whether the merge mode is applied to the target block. mergeFlag may be signaled/encoded/decoded. Here, when mergeFlag has a second value, the indicator indicating whether a motion information correction method is performed may be first signaled/encoded/decoded. Here, the second value may be 1 or true. When mergeFlag has the second value, the merge mode may be applied to the target block.

Whether the indicator indicating whether the motion information correction method is performed is signaled/encoded/decoded may be determined based on the type of a target image and/or the type of a target slice.

For example, the indicator indicating whether the motion information correction method is performed may be signaled/encoded/decoded only when the target image is a B-picture.

For example, the indicator indicating whether the motion information correction method is performed may be signaled/encoded/decoded only when the target slice is a B-slice.

For example, the indicator indicating whether the motion information correction method is performed may be signaled/encoded/decoded only when the target picture is an I-picture.

For example, the indicator indicating whether the motion information correction method is performed may be signaled/encoded/decoded only when the target slice is an I-slice.

Whether the indicator indicating whether the motion information correction method is performed is signaled/encoded/decoded may be determined based on at least one of POCs of reference picture candidates in a reference picture list and POC of the target image.

The reference picture list may include at least one of a reference picture list for the L0 direction and a reference picture list for the L1 direction.

For example, the indicator indicating whether the motion information correction method is performed on the target block may be signaled/encoded/decoded only when POCs of all reference picture candidates in the reference picture list are less than POC of the target image.

Determination of Motion Information Related to MMVD

When IBC is used for a target block, an IBC Merge mode with Block Vector Differences (IBC-MBVD) or the like may be used to derive motion information. IBC-MBVD may be technology corresponding to MMVD of inter-prediction. A block vector in IBC may correspond to a motion vector in inter-prediction.

When motion information is determined using prediction methods such as IBC-MBVD, MMVD, and affine MMVD, an MBVD list for eight candidates for each Block Vector Predictor (BVP) may be derived by selecting the lowest template SAD costs at all possible locations. Possible locations enclosing the BVP location may include at least one of two horizontal directions and two vertical directions having an offset from a specific distance set. For example, the specific distance set may be {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}. Alternatively, the specific distance set in embodiments may be a set of specific pels described in embodiments. An MBVD index may be binarized by rice code having a specific parameter such as 1.

The possible locations may be a subset of a Block Vector (BV) search area.

A distance set interval may be determined based on the BVD distance to BVP. For example, when the BVD distance to BVP is greater than 16, the distance set interval may be 8-pel. The location in the interval may not be regarded as a possible location. The specific location may not be regarded as a possible location even when the BVD distance to BVP at a specific location is greater than a specific reference value. For example, the specific reference value may be 128 pixels.

The BVD distance at the specific location may be horizontal and/or vertical distances between the BVP and the specific location.

An adaptive BVD offset may be allowed depending on the MBVD direction. Depending on the following steps, an MBVD list of K candidates having lowest template SAD cost(s) may be derived. K may be a specific value. K may be determined based on the coding parameter of the target block.

[Step 1] A largest offset may be indicated by N-pel. N may be one of the values described in the embodiments. For example, N may be 128. The number of directions may be D. For example, D may be 4. (i.e., left, right, above, below), a start search interval may be M-pel. For example, M may be 8. The number of candidates in the MBVD list may be K. For example, K may be 8. N, D, M and K are not limited to the above-described values, and may each be an integer of 1 or more.

[Step 2] Depending on each direction, TM SAD costs may be checked for all M-th location offsets (where M does not exceed N). K candidates having the lowest TM SAD cost(s) may be maintained in the list.

[Step 3] For each candidate in the list, TM SAD costs of two candidates having an offset such as +−M/2 depending on the directions may be checked. K candidates having the lowest TM SAD cost(s) may be maintained in the list.

[Step 4] Step 3 may be repeated until the interval M reaches 1-pel while reducing the interval M by half.

As the steps progress, the interval M may be reduced. In other words, as the steps progress, the resolution of search may be gradually decreased.

Here, of the found motion information offsets, N candidates having the lowest template matching cost(s) may be stored in the list. The final motion information may be determined by signaling/encoding/decoding of the indices of candidates in the list.

BVD/MVD Prediction

Figure 43:
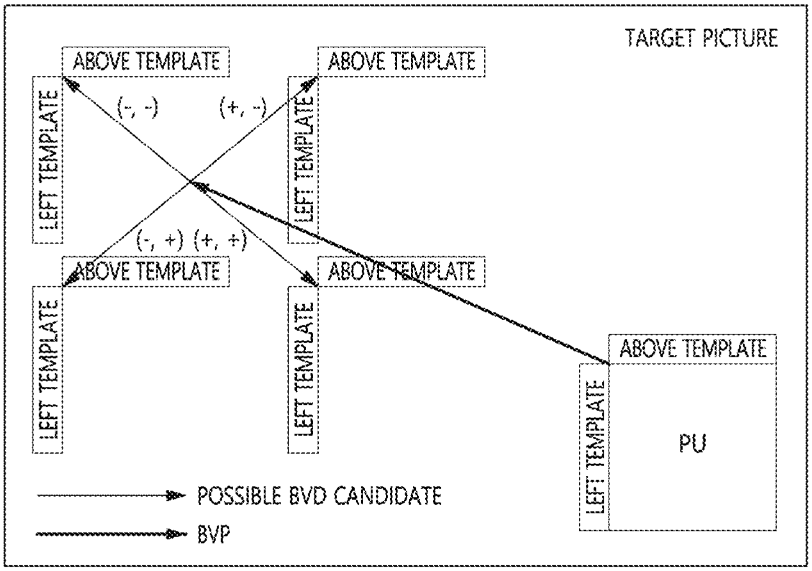
FIG. 43 illustrates derivation of template matching cost according to an example.

FIG. 43 illustrates derivation of template matching cost according to an example.

BVD signs may be directly coded in an equal probability mode. An MVD sign prediction index indicating correct MVD signs may be encoded using a context module. On a decoder side, MVD signs may be derived by the following steps.

[Step 1] The absolve values of MVD components may be parsed.

[Step 2] A context-coded MVD sign index may be parsed.

[Step 3] MV candidates may be constructed by generating combinations of possible signs and absolute MVD values, and the constructed MV candidates may be added to a MV predictor. Alternatively, the combinations of possible signs and absolute MVD values may be generated, and the generated combinations may be added to the MV predictor, and thus MV candidates may be constructed.

[Step 4] MVD sign prediction costs for respective derived MV candidates may be derived based on template matching and/or matching costs. The MV candidates may be sorted based on the derived MVD sign prediction costs. Alternatively, the order of MVD sign candidates may be sorted based on the matching costs for combinations of respective MVD signs and absolute MVD values. Here, matching costs for combinations between specific MVD signs and absolute MVD values may refer to matching cost for motion information in which the corresponding combination is added to the MV predictor.

[Step 5] In order to select a true MVD sign, an MVD sign prediction index may be used.

[Step 6] A true MVD may be added to an MV predictor for the final MV.

Block Vector Difference Sign Prediction (BVDSP) may be applied to an IBC block when a block vector difference includes a non-zero (0) component.

BVD sign combinations may be sorted depending on matching cost. An index corresponding to true BVD signs may be derived, and the derived index may be coded using a context model. On the decoder side, the BVD sign may be derived depending on the following steps.

[Step 1] N candidate BVs may be derived by a combination of BVP, possible signs, and absolute BVD. Four candidates may be the following [Candidate 1], [Candidate 2], [Candidate 3] and [Candidate 4]. For example, N may be an integer such as 4.

$$(BVP[0]+\mathrm{abs}BVD[0],\ BVP[1]+\mathrm{abs}BVD[1]) \quad \text{[Candidate 1]}$$

$$(BVP[0]+\mathrm{abs}BVD[0],\ BVP[1]-\mathrm{abs}BVD[1]) \quad \text{[Candidate 2]}$$

$$(BVP[0]-\mathrm{abs}BVD[0],\ BVP[1]+\mathrm{abs}BVD[1]) \quad \text{[Candidate 3]}$$

$$(BVP[0]-\mathrm{abs}BVD[0],\ BVP[1]-\mathrm{abs}BVD[1]) \quad \text{[Candidate 4]}$$

[Step 2] Prediction costs of N candidate BVs may be derived based on template matching. The N candidate BVs may be sorted depending on the prediction costs. Each prediction cost may refer to matching cost. For example, the prediction cost may be template matching cost.

[Step 3] A true BVD sign may be selected using the BVDSP index.

[Step 4] In order to obtain the final BV, the true BVD may be added to the BVP.

For generation of a reference template, a bilinear filter may be used. As shown in FIG. 43, the template matching cost may be measured through SAD between neighboring samples of a current CU and reference samples corresponding to the neighboring samples.

That is, the sign candidates of BVD may be reordered based on the template matching cost. The sign candidates of BVD may be sorted depending on the template matching cost.

In FIG. 43, derivation of template matching cost in BVDSP is illustrated.

In general cases, N BVD candidates may be evaluated. (+/−bvd_abs.x, +/−bvd_abs.y). When one of BVD components is 0 (i.e., x or y is 0), only two BVD candidates may be enabled. When all BVD components are 0, derivation of signs may not be required.

Figure 44:
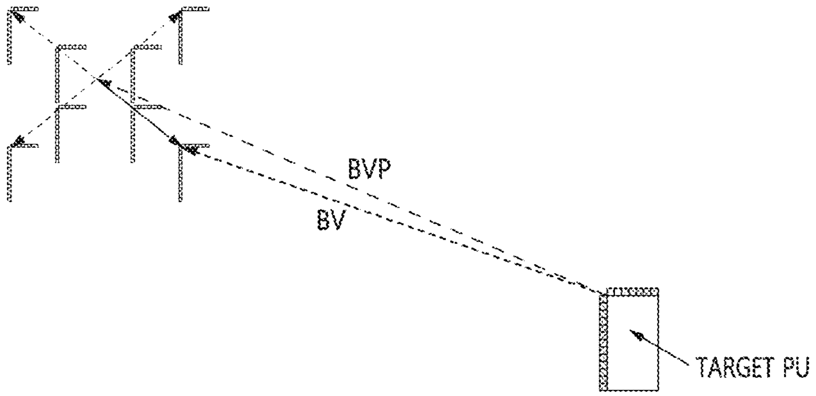
FIG. 44 illustrates prediction of signs of BVD according to an example.

FIG. 44 illustrates prediction of signs of BVD according to an example.

Figure 45:
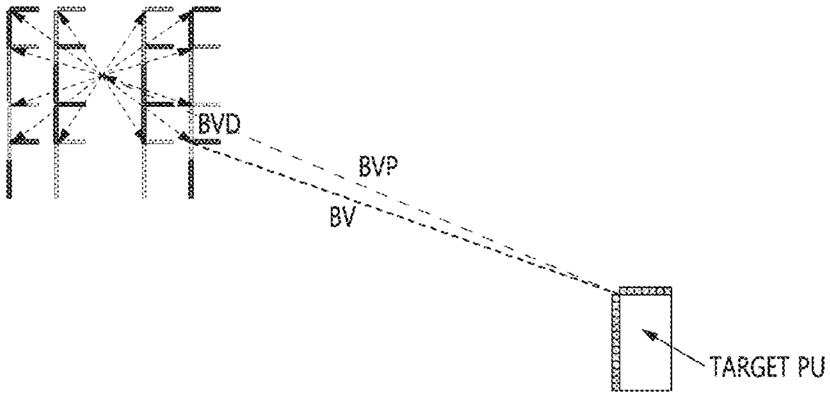
FIG. 45 illustrates prediction of suffix bins of BVD magnitudes according to an example.

FIG. 45 illustrates prediction of suffix bins of BVD magnitudes according to an example.

Sign prediction may be used to refine compression performance of MVD and coefficient coding.

Some of syntax elements indicating sign candidates of BVD and BVD magnitudes may be reordered based on matching cost.

BVD signs and suffix bins may be coded using a bypass mode. Exponential Golomb code suffix bins may be used to indicate the BVD magnitudes.

First N bins of BVD prefix may be coded in a bitstream having a CABAC context model. N may be an integer of 1 or more, and may be a specific value such as 1, 2, 3, 5 or a positive integer.

Hereinafter, a method for predicting both BVD signs and magnitude suffixes will be described.

In embodiments, as illustrated in FIG. 44, sign prediction may be applied to BVD. By further extending this approach, the suffix bins of BVD magnitudes may be predicted, as illustrated in FIG. 45.

As illustrated in FIG. 44, instead of explicit sign coding, a template matching operation may be used to determine a BVD candidate having optimal cost. Also, the template matching operation may be used to indicate, in a bitstream, whether the optimal candidate has been correctly predicted.

The suffix bins may also be derived on a decoder side by comparing the values of signaled bits with the bits of optimal candidates obtained using template matching.

The maximum number of bin that can be predicted for a PU may be controlled by a macro. Alternatively, the maximum number of bins that can be predicted for a PU may be determined based on coding parameters related to the target block or, alternatively, information for specifying the maximum number of bins may be signaled/encoded/decoded.

Most significant bins of suffixes of BVD horizontal components and BVD vertical components may be predicted. A prediction match may be coded in a bitstream using a CABAC context mode. Less significant bins of suffixes of horizontal and vertical components may be coded in a bypass mode.

BVD signs and magnitude suffix bins which are coded using the bypass mode may be predicted.

Sign prediction may be applied to BVD, and this approach may be further extended to predict the suffix bins of BVD magnitudes. The suffix bins may be derived on the decoder side by comparing the values of signaled bins with the bins of optimal candidates obtained through template matching. The maximum number of bins to be predicted for the PU may be controlled by a macro. By setting such a macro, four configurations corresponding to four implementations in which a number of BVD bins, such as in the following examples, are predicted may be used:

- a maximum number of two BVD signs and four BVD suffix bins;
- a maximum number of two BVD signs and six BVD suffix bins;
- a maximum of two BVD signs and eight BVD suffix bins; and
- a maximum of two BVD signs and ten BVD suffix bins.

In the above-described example, the four configurations are used, but the number of configurations is exemplary, and the number of configurations may be a positive integer such as 1, 2, 3, 4, or 5.

The above-described number of BVD suffix bins may be exemplary, and configurations using multiple BVD suffixes may be used.

The most significant bins of magnitude suffixes of BVD horizontal and vertical components may be predicted. The result of prediction match may be coded in a bitstream using a CABAC context mode. The least significant bins of magnitude suffixes of horizontal and vertical BVD components may be coded in a bypass mode.

Figure 46:
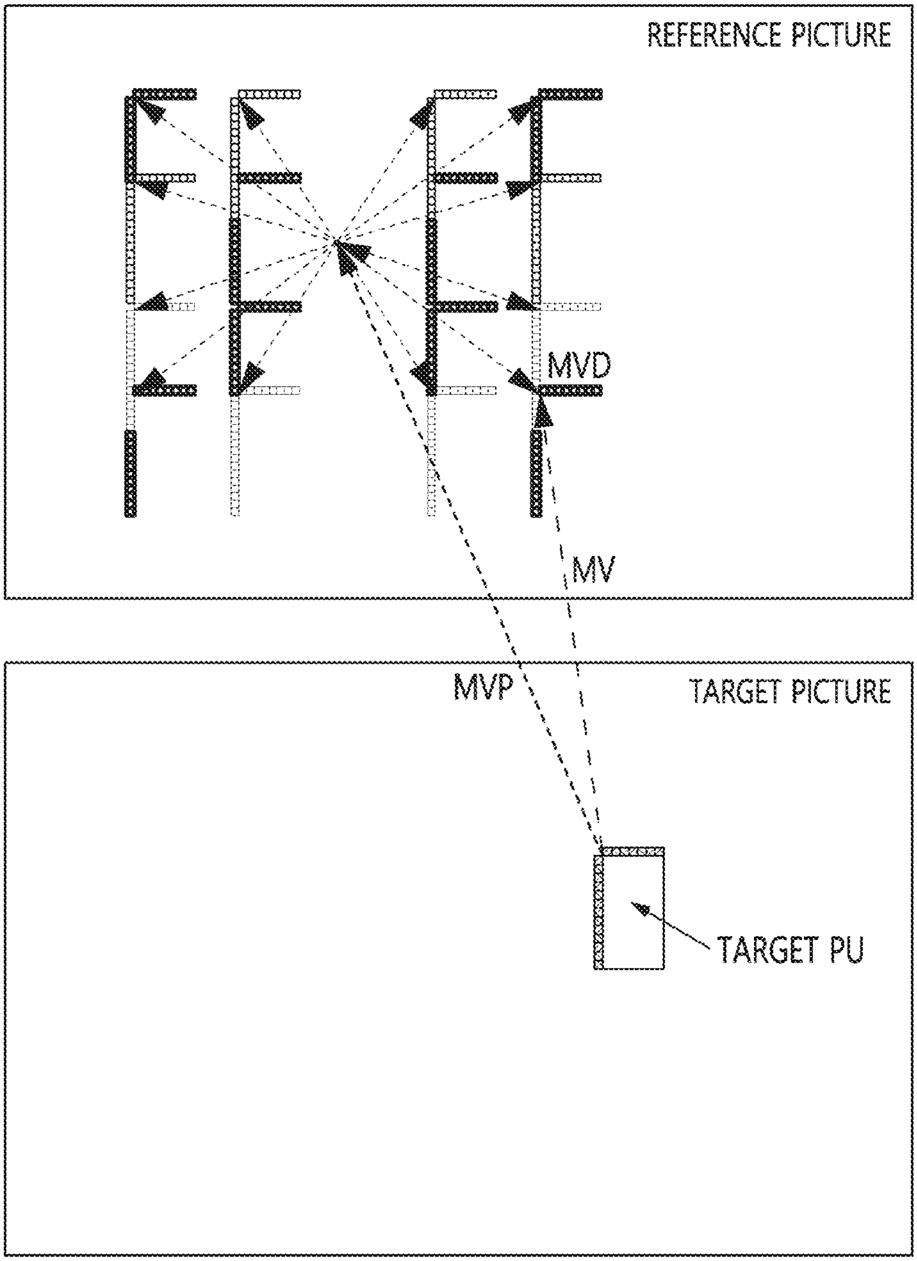
FIG. 46 illustrates prediction of BVD signs and magnitude suffix bins according to an example.

FIG. 46 illustrates prediction of MVD sign and magnitude suffix bins according to an example.

In an embodiment, MVD suffix bins may be predicted. The method described above with reference to FIGS. 44 and 45 may be applied to inter-prediction. Some of syntax elements indicating MVD sign candidates and MVD magnitudes may be reordered based on matching costs.

The most significant bins of MVD remainder suffixes may be predicted using template matching. The correctness of prediction hypotheses may be indicated by the corresponding MVD suffix bins coded in the bitstream using a regular CABAC mode.

A method according to an example may be applied to the MVDs of translational motion including a Symmetric Motion Vector Differences (SMVD) mode, an MMVD mode, an affine mode, and an affine MMVD mode.

In FIG. 46, template matching candidates used to predict bin values are illustrated. The less significant bins of magnitude suffixes of horizontal and vertical MVD components may be coded in a bypass mode.

In embodiments, in order to predict the sign of BVD and/or MVD, some of syntax elements indicating sign candidates of BVD/MVD and BVD/MVD magnitudes may be reordered based on template matching cost. By means of such reordering processing, BVD/MVD components may be regarded as initial motion information. The pieces of reordered information may be regarded as candidates in a candidate list.

Multi-Candidate Intra Template Matching Prediction (IntraTMP)

Figure 47:
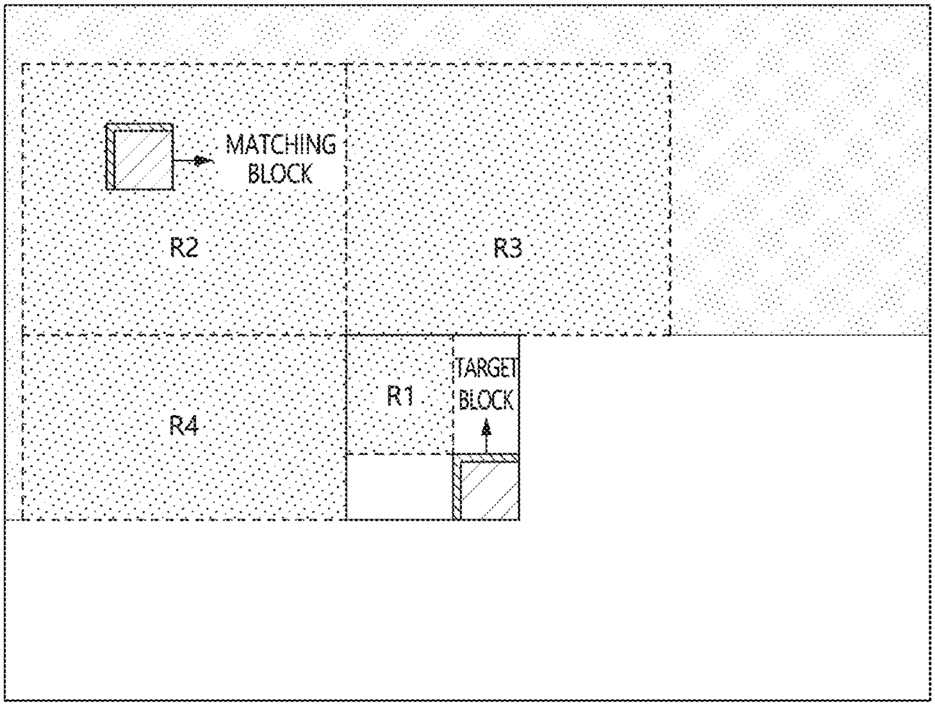
FIG. 47 illustrates search areas in intra template matching according to an example.

FIG. 47 illustrates an intra template matching search area according to an example.

Intra Template Matching Prediction (IntraTMP) may be a special intra-prediction mode in which an optimal prediction block having an L-shaped template matching a target template is copied from a reconstructed portion of a target image. Within a predefined search range, an encoder may search the reconstructed portion of a target frame for a template most similar to the target template, and may use the corresponding block as the prediction block. Then, the encoder may signal information indicating the use of the IntraTMP mode, and a decoder may perform the same prediction operation through the signaled information.

The prediction block may be generated by matching an L-shaped casual neighbor of the current block with an additional block within four predefined search areas, illustrated in FIG. 47. The four predefined search areas may be R1, R2, R3, and R4, which will be described below.

R1: current CTU

R2: left-above CTU

R3: above CTU

R4: left CTU

In addition to the above-described search areas, other search areas may be additionally used. For example, other search areas and whether the other search areas are used may be determined by the coding parameters of the target block.

SAD may be used as a cost function.

Within each region, the decoder may search the current region for a template containing the minimum SAD, and may use a corresponding block in the found template as a prediction block.

Dimensions (SearchRange_w, SearchRange_h) of all regions may be set in proportion to a block dimension (BlkW, BlkH) so as to contain a fixed number of SAD comparisons per pixel. That is, the search range may be set based on the following Equations 21 and 22.

$$\text{SearchRange\_w} = a * BlkW \quad \text{[Equation 21]}$$

-continued $$\text{SearchRange\_h} = a * BlkH \quad \text{[Equation 22]}$$

a may be a constant for controlling gain/complexity trade-off. a may be 5.

As described above, the width SearchRange_w of the search range may be set in proportion to the width BlkW of the target block. The height SearchRange_h of the search range may be set in proportion to the height BlkH of the target block.

In IntraTMP, subsampling for the search range may be performed, and search may be applied only to samples selected by subsampling. Among the found samples, samples having the lowest matching cost may be determined, and fine search may be performed on surrounding samples of the determined samples.

That is, in order to reduce the complexity of the search process, sparse search may be first performed in a search range subsampled by a factor 2. After an optimal match is found, refined search may be performed within a search range reduced around the optimal match. Here, the factor value 2 is merely exemplary, and the factor may be one of 2 or more integers.

For example, subsampling may be applied by a factor of 2 to the search areas (e.g., R1 to R4 of FIG. 47). Through subsampling, template matching search may be reduced by a factor of 4. Here, the factor of 2 is only exemplary, and the factor may be one of 2 or more integers.

After the optimal match is found, a refinement process may be performed. In the refinement process, another template matching search may be performed around the optimal match, with the reduced search range being maintained. The refined search range may be min(w, h)/2. Here, w may be the width of the target CU. H may be the height of the target CU. Furthermore, the refined search range may be determined differently based on w and h.

Figure 48:
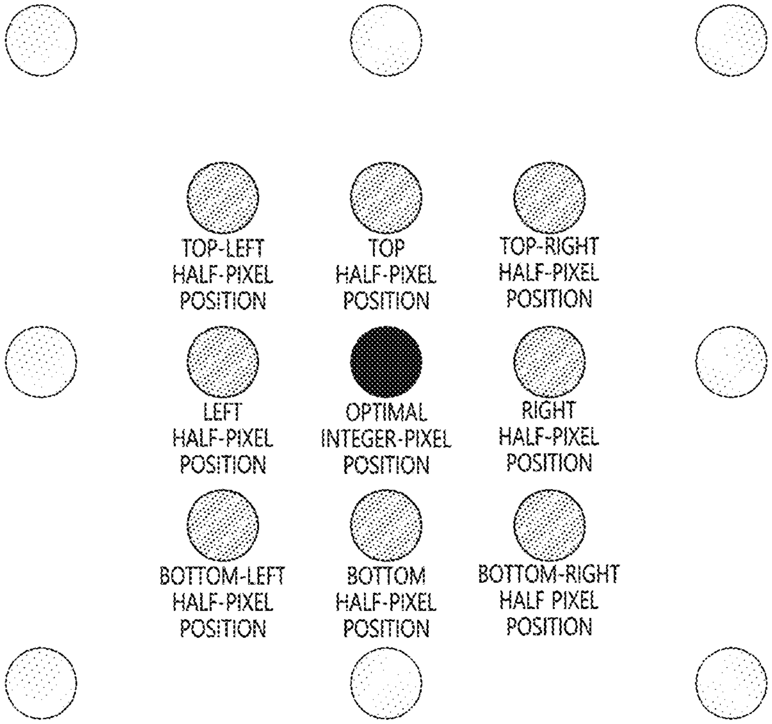
FIG. 48 illustrates adjacent half-pel positions in eight directions according to an example.

FIG. 48 illustrates adjacent half-pel positions in eight directions according to an example.

IntraTMP may generate a prediction block for a target block by copying reconstructed values of a matching block in a target image. The location of the matching block may be determined by template matching both on an encoder side and a decoder side.

Template matching may be performed based on an L-shaped template of the target block. SAD may be used as a cost function.

IntraTMP may also be used for camera-captured content as well as screen content.

In order to increase template matching speed, subsampling may be applied to a search area. After an optimal match is found, a refinement process may be performed. In the refinement process, another template matching search may be performed around the optimal match with the reduced search range being maintained. For example, the factor of subsampling may be 2.

When IntraTMP supports only integer-pel precision, prediction correctness may be limited for camera-captured content especially having rich textures.

In embodiments, a method for activating half-pixel precision in IntraTMP may be disclosed.

A template matching process may not change, and the template matching processor may find an integer-pel matching location. The selected integer-pel matching location may be an integer-pel position having lowest template matching cost.

As illustrated in FIG. 48, the encoder may additionally perform search for eight adjacent half-pel positions in eight directions around the integer-pel position. The encoder may select one of nine positions depending on rate-distortion optimization. The nine positions may be one integer-pel position and eight half-pel positions.

Here, in addition to the integer-pel position, other pel-unit positions described above in embodiments may be used as the center. Also, search may be additionally performed for positions of other pel-units other than the unit of half-pel. In other words, integer-pel and half-pel may be widely understood such that pel-unit at a central position is greater than pel-unit at the additionally found positions. Furthermore, search may be performed for different numbers of additional positions other than eight positions. For example, the number of additional positions may be an integer of 2 or more.

When an IntraTMP mode is selected for the target block, a flag indicating whether integer-pel or half-pel precision is to be used may be additionally encoded/decoded/signaled. When half-pel precision is used, an index indicating the direction of the half-pel position may be additionally signaled/encoded/decoded.

A sample specified by a flag and an index or the position of the sample may be determined to be final motion information. Here, the number of specified samples or the positions of the samples may be 2 or more.

In order to perform half-pel interpolation in IntraTMP, a 4-tap Discrete Cosine Transform-based Interpolation Filter (DCT-IF) [−5, 37, 37, −5] may be used. The interpolation filter is only an example, and at least one of the type, taps, and filter coefficient of the interpolation filter may be determined based on the coding parameter related to the target block, and may have a value different from that described above.

Figure 49:
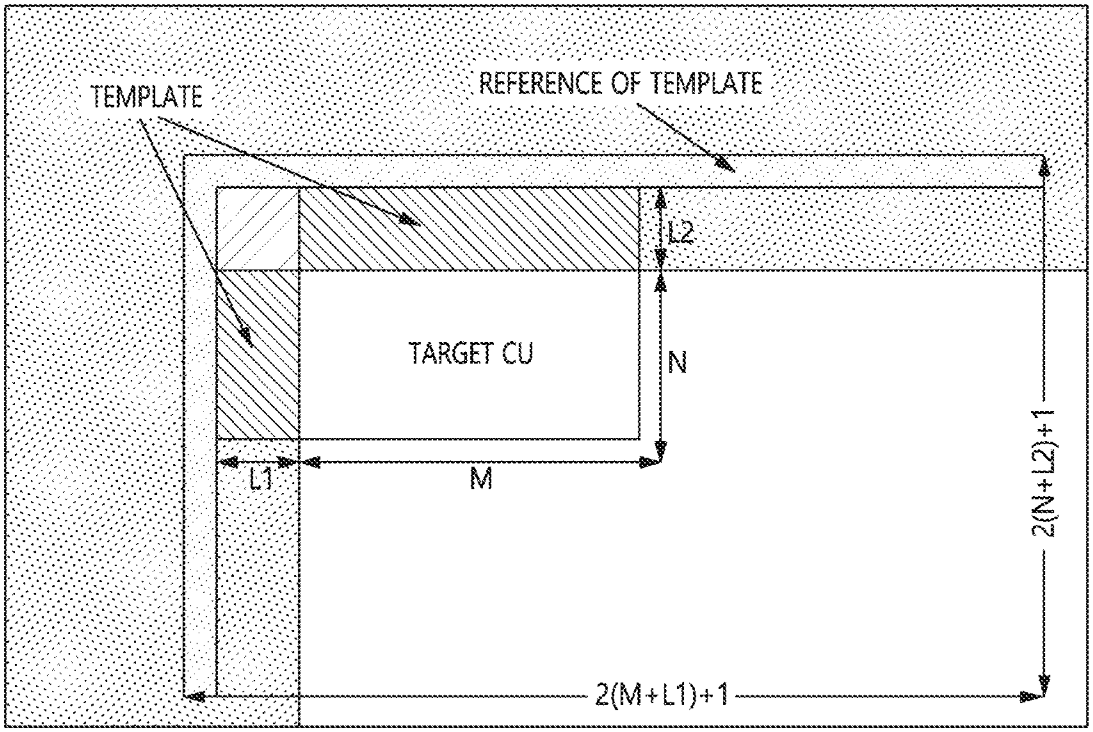
FIG. 49 illustrates templates and reference samples according to an example.

FIG. 49 illustrates templates and reference samples according to an example.

In FIG. 49, templates and reference samples used in Template-based Intra Mode Derivation (TIMD) are illustrated.

In TIMD, reference samples of a target CU may be used as a template. In a set of candidate intra-prediction modes such as MPM, an intra-mode may be selected. The selected intra-mode may be determined to be an optimal intra-mode depending on a cost function. Reconstructed samples adjacent to the current CU may be used as the template. The reconstructed samples in the template may be compared with prediction samples in the template. The prediction sample may be generated using reference samples for the template. The reference samples may be reconstructed samples adjacent to the template. Cost functions such as SAD and SATD may be used to calculate cost between the prediction sample in the template based on each intra-prediction of a candidate intra-prediction mode set and the reconstructed sample in the template. An intra-prediction mode having minimum cost may be used, as the optimal intra-prediction mode, for the target CU.

For TIMD fusion, SATD between the prediction samples and reconstructed samples in the template may be calculated for respective intra-prediction modes in MPMs. Initial N intra-prediction modes having the minimum SATD may be selected TIMD modes. For example, N may be 2. Further, N may be one of integer values of 3 or more.

These N TIMD modes may be fused with adaptive weights after a Position Dependent intra Prediction Combination (PDPC) process is applied. Such weighted intra-prediction may be used to code the current CU. PDPC may be included in derivation of TIMD modes.

The costs of N selected modes may be compared with a threshold value. As shown in the following Equation 23, a cost factor of 2 may be applied. For example, N may be 2. Further, N may be one of integer values of 3 or more.

$$costMode2 < 2 \times costMode1 \quad \text{[Equation 23]}$$

The cost factor of 2, described above, is exemplary, and another cost factor value may be used.

When this condition is true, fusion may be applied. Otherwise, only a first mode may be used.

The weights of modes may be calculated from the SATD costs of the modes, as shown in the following Equations 24 and 25.

$$\text{weight1} = costMode2/(costMode1 + costMode2) \quad \text{[Equation 24]}$$

$$\text{weight2} = 1 - \text{weight1} \quad \text{[Equation 25]}$$

Division operations may be performed using a lookup table (LUT)-based integerization system identical to that used by CCLM.

Figure 50:
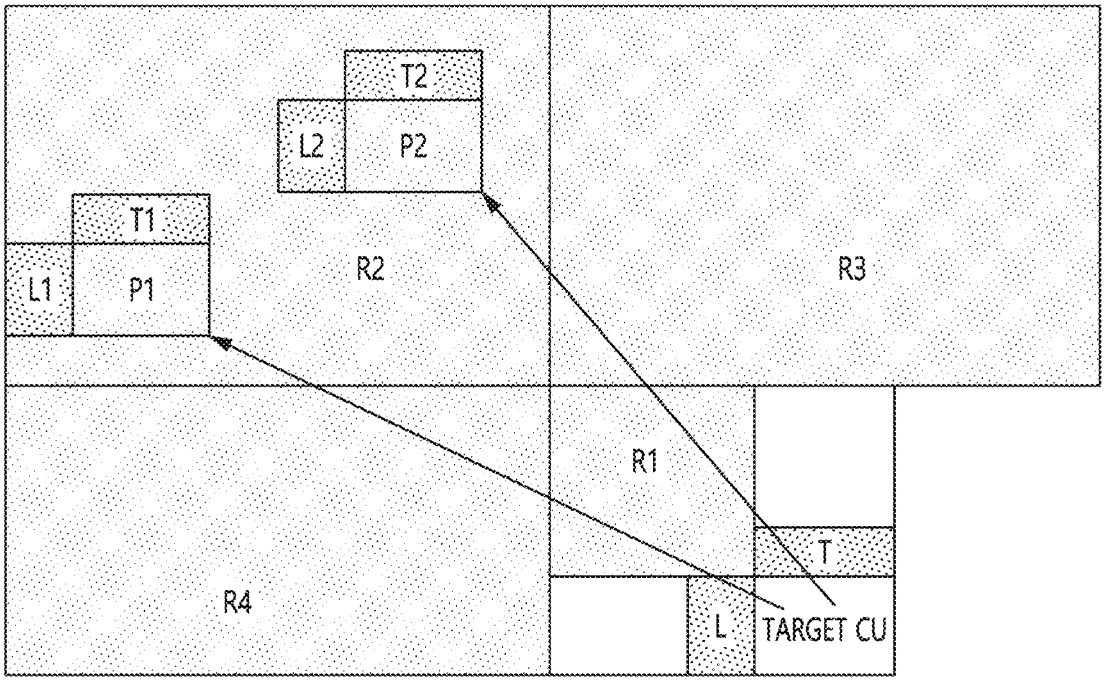
FIG. 50 illustrates IntraTMP fusion according to an example.

FIG. 50 illustrates IntraTMP fusion according to an example.

IntraTMP may identify a reference region corresponding to the lowest TM cost within a target image may be identified, and a reconstructed block in the identified reference region may be used as a prediction block for the target CU.

In an embodiment, adaptive IntraTMP fusion that uses a maximum of two prediction blocks corresponding to best TM cost and second-best TM cost may be used. Here, fusion may refer to a weighted sum.

Alternatively, the number of TM costs and the number of prediction blocks used in adaptive IntraTMP fusion may be one of integers of 3 or more. The embodiments, which will be described below, may be extended and applied even to the case where three or more TM costs and prediction blocks are used.

Two candidates having lowest matching cost(s) may be determined through search in IntraTMP. Two reference blocks for the two candidates may be blended based on template matching. Through blending of two reference blocks, a final prediction block for the target block may be generated. Here, blending may be performed based on template matching between individual candidates.

IntraTMP fusion in embodiments may employ a technique similar to fusion of TIMD.

In FIG. 50, P1 may be a prediction block corresponding to an optimal match having the lowest TM cost. P2 may be a prediction block corresponding to a second-best match having second-lowest TM cost. Fusion condition and weight derivation may be identical to those in TIMD. However, a cost factor used may be 1.5 instead of 2.

Another condition related to fusion that uses fused template cost may be added, as described below.

The fused template cost may be calculated, as shown in the following Equation 26, Equation 27, Equation 28, Equation 29 and Equation 30. Here, the fusion operation may be identical to that used in P1 and P2.

$$\text{fused left template, } Lf = \text{fusion of } L1 \text{ and } L2 \quad \text{[Equation 26]}$$

$$\text{fused top template, } Tf = \text{fusion of } T1 \text{ and } T2 \quad \text{[Equation 27]}$$

$$costLeft = \text{SAD between } L \text{ and } Lf \quad \text{[Equation 28]}$$

$$costTop = \text{SAD between } T \text{ and } Tf \quad \text{[Equation 29]}$$

$$costFusion = costLeft + costTop \quad \text{[Equation 30]}$$

Final fusion of P1 and P2 may be performed only when costFusion is less than minimum TM cost corresponding to P1.

Fusion that uses multiple prediction blocks, described above in relation to IntraTMP fusion, may be extended and applied to other prediction methods in embodiments. In other words, pieces of information (e.g., candidates in a list) for specifying two or more prediction blocks, other than one prediction block, may be determined based on a specific criterion such as cost, described in the prediction method, and the final prediction block may be derived through the fusion of specific prediction blocks. From this aspect, the foregoing description may also be applied to intra-template matching, IBC-TM, etc.

Figures 51, 52:
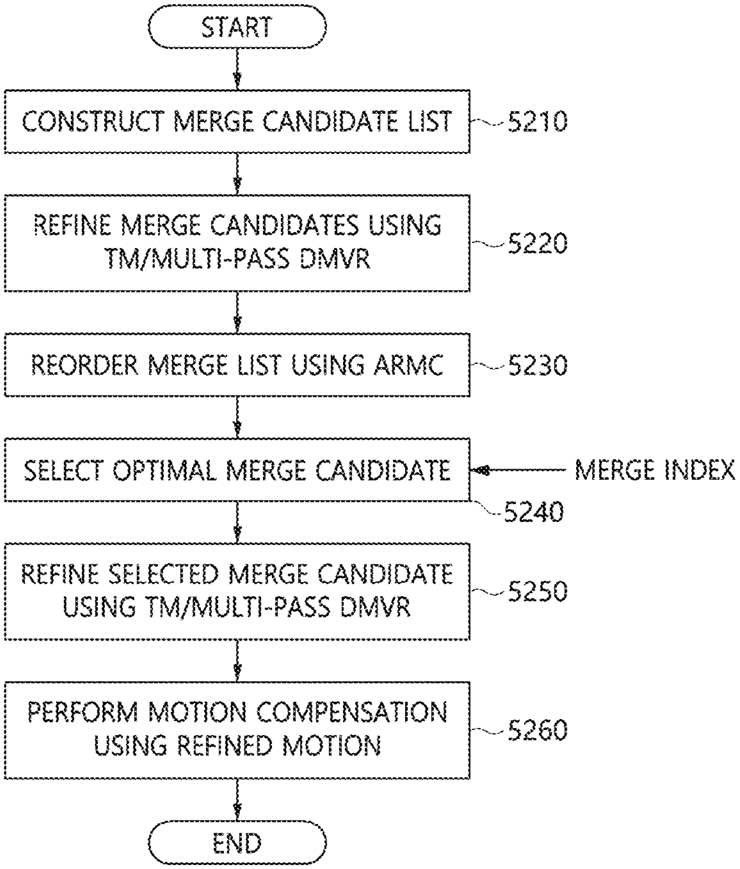
FIG. 51 illustrates syntax for multi-candidate IntraTMP according to example.
FIG. 52 is a flowchart of ARMC having refined motion according to an example.

FIG. 51 illustrates syntax for multi-candidate IntraTMP according to an example.

IntraTMP may select only one BV having lowest matching cost. In camera-captured content, it may be difficult for the decoder to find a completely matching block. Generally, there may be multiple blocks similar to a target block, and the matching costs of these blocks may be similar to each other. A Block Vector (BV) having the lowest matching cost may not be a best predictor.

In embodiments, in IntraTMP, multiple candidates may be used. A candidate list including candidate BVs may be constructed, and the candidate BVs may be ranked in ascending order of matching cost. Multiple candidate BVs having the lowest matching cost(s) may be selected. An index indicating which candidate BVs are actually used may be signaled through a bitstream.

A shortlist of prospective candidates may be selected from among the multiple possible BVs using matching. Also, the encoder that is capable of referencing an original block may make a final decision.

For multi-candidate IntraTMP, syntax may be changed, as shown in FIG. 51.

The value of intra_tmp_flag equal to 1 may mean that the target block uses IntraTMP. intra_tmp_idx may indicate a BV candidate used to identify a prediction block from a candidate BV list.

In order to construct the candidate BV list, sparse search and refined search may be used. In the sparse search, a subsampling factor may be 3, and 30 upper BVs may be maintained. In the refined search, N×N blocks surrounding each of 30 BVs may be checked. N may be an integer of 1 or more. For example, N may be 3.

Upper 15 BVs may be selected to configure a BV candidate list. Here, the subsampling factor, the number of maintained upper BVs, and the number of selected BVs are only exemplary, and each of the subsampling factor, the number of maintained upper BVs, and the number of selected BVs may be a value varying with the coding parameter of the target block, which may be one of integers of 2 or more.

In an embodiment, the search range of IntraTMP may be extended to smaller blocks. Based on the following Equations 31 and 32, the search range of IntraTMP may be determined.

$$SearchRangeWidth = \max(a * BlkWidth, \min SearchRange) \quad \text{[Equation 31]}$$

$$SearchRangeHeight = \max(a * BlkHeight, \min SearchRange) \quad \text{[Equation 32]}$$

Here, minSearchRange may be 128. Alternatively, minSearchRange may be another predefined value or may be determined by the coding parameter for the target block.

M candidate BVs having lowest matching cost(s) may be determined. One BV candidate may be selected from among the M candidate BVs in a candidate BV list including the candidate BVs by signaling/encoding/decoding the index of the candidate BV list. M may be a positive integer. For example, M may be 15.

In embodiments, multiple IntraTMP matching blocks may be derived, and a predictor may be generated by fusing the derived IntraTMP matching blocks. The method according to an embodiment may be useful for camera-captured content.

In the search of IntraTMP, a specific number of candidates having the lowest matching cost(s) may be determined, and the final prediction block may be generated through blending based on the matching costs of respective candidates. For example, the specific number may be 3, and may be another positive integer of 2 or more.

An IntraTMP fusion algorithm may include the following aspects.

Aspect 1

During IntraTMP search, multiple matching blocks may be generated.

A candidate list may be initially generated using a specific number of matching blocks having smallest template SAD in a subsampled IntraTMP search process. For example, the specific number may be a positive integer such as 30.

For each matching block, full-pixel refined search in a small area may be performed.

For example, the sampling factor in the subsampled search process may be 3.

For example, the search area may be a 3×3 area surrounding each of a specific number of matching blocks.

Next, blocks matching optimal N candidates may be selected through template SAD across all refinement areas. For example, N may be 3, and may be a positive integer of 2 or more.

Aspect 2

A candidate matching block to be used for fusion may be selected.

For each of optimal N matching blocks, in order to determine whether the corresponding block is used for fusion, a threshold value may be used, as shown in the following Equation 33.

$$\text{Threshold} = \text{SAD}_1 \ll 1 \quad \text{[Equation 33]}$$

Here, $SAD_1$ may be the smallest template SAD of N candidate matching blocks. Candidate matching blocks having SAD less than or equal to the threshold value may be used for fusion. Therefore, the number of candidate matching blocks may be determined.

Aspect 3

A weight for each matching block used for fusion may be calculated.

When blocks to be fused are determined, the blocks may be fused using the weights. In an embodiment, fusion weights may be determined using two methods.

In a first method, fusion weights may be calculated using SADs of the blocks. The fusion weights may be calculated, as shown in the following Equations 34 and 35:

$$sum = \sum_{i=1}^{n} SAD_i \quad \text{[Equation 34]}$$

$$w_i = \frac{sum - SAD_i}{(n-1)*sum} \quad \text{[Equation 35]}$$

In order to reduce implementation cost, division operations may be replaced with an integer look-up table (LUT).

In a second method, weights may be further decreased by using fixed weights. The weights may be set, as shown in the following Equation 36 or Equation 37.

$$\{w_1, w_2\} = \{1/2, 1/2\} \quad \text{[Equation 36]}$$

$$\{w_1, w_2, w_3\} = \{22/64, 21/64, 21/64\} \quad \text{[Equation 37]}$$

Aspect 4

A final fusion predictor $p_{fusion}$ may be determined, as shown in the following Equation 38:

$$p_{fusion} = \sum_{i=1}^{n} w_i p_i \quad \text{[Equation 38]}$$

Here, $p_i$ may be an i-th matching block. n may be the number of blocks selected for fusion. When only one matching block remains after [Aspect 2], the final predictor may be calculated depending on the following Equation 39.

$$p_{fusion} = w_1 p_{TMP} + w_2 p_{intra} \quad \text{[Equation 39]}$$

Here, $p_{TMP}$ may be a single matching block. $p_{intra}$ may be an intra-predictor derived in a planar mode. Weight $w_1$ may be 7/8. Weight $w_2$ may be 1/8.

By means of the fusion method according to an embodiment or existing method, a CU level flag for signaling whether an IntraTMP CU is predicted may be used.

A method using an extended search range may also be used. The changed search range may be identical to the search range, described above with reference to Equation 31 and Equation 32.

Prediction that uses multiple candidates described in relation to IntraTMP fusion may be extended and applied to other prediction methods in embodiments. In other words, multiple candidates other than one candidate may be determined based on a specific criterion such as cost described in the prediction method, and a final prediction block may be derived through fusion of multiple prediction blocks specified by multiple candidates. From this aspect, the foregoing description may also be applied to intra-template matching, inter-template matching, and bilateral matching in embodiments.

Adaptive Reordering of Merge Candidates with Template Matching (ARMC-TM)

In an embodiment, motion information may be abbreviated as motion. As described above, motion information candidates in a motion information candidate list such as merge list and an AMVP list may be reordered based on the matching costs of the motion information candidates.

In embodiments, correction using template matching or bilateral matching may be first applied to the motion information candidates. Reordering of motion information candidates corrected based on the matching costs of the motion information candidates may be performed.

FIG. 52 is a flowchart of ARMC having refined motion according to an example.

Adaptive reordering of merge candidates having refined motion may be used. In adaptive reordering, TM or multi-pass Depth Motion Vector Refinement (DMVR) may be used.

In ARMC having refined motion, each of merge candidates in a candidate list may be refined using TM/multi-pass DMVR. As illustrated in FIG. 52, refined motion may be used in ARMC so as to perform reordering on the merge candidate list.

ARMC having refined motion according to an embodiment may be applied to a TM merge mode, an adaptive DMVR mode, and a Template Matching for an Advanced Motion Vector Prediction (TM-AMVP) mode.

When DMVR is used to derive refined motion, only a first pass in the multi-pass DMVR may be applied to reordering. Here, the first pass may be a pass to a PU level.

When refined motion is derived using template matching according to an embodiment, a template size may be 1. Only first N merge candidates may be reordered using refined motion in the TM merge mode. For example, N may be 8, and may be an integer of 2 or more.

At step S210, a merge candidate list may be constructed.

At step S220, refinement of pieces of motion information using TM/multi-pass DMVR may be performed.

At step S230, reordering of a merge list using ARMC may be performed.

At step S240, an optimal merge candidate may be selected.

At step S250, the selected merge candidate using the TM/multi-pass DMVR may be refined.

At step S260, motion compensation using the refined motion may be performed.

In order to obtain better trade-off for ARMC having refined motion, the following [Change 1], [Change 2], [Change 3] and [Change 4] may be applied.

[Change 1] When a block is flat or narrow, only a top template or a left template may be used during motion refinement of TM.

Here, the flat block may be a block satisfying the following Equation 40. The narrow block may be a block satisfying the following Equation 41.

$$w > 2 \times h \quad \text{[Equation 40]}$$

$$h > 2 \times w \quad \text{[Equation 41]}$$

Here, w may be the width of the block. h may be the height of the block.

[Change 2] Only first M merge candidates other than first N merge candidates may be reordered using the refined motion in the TM merge mode. For example, M may be 4. Alternatively, M may be an integer different from N.

[Change 3] Upon configuring an AMVP list, an MVP candidate having TM cost higher than a threshold value may be skipped. For example, the threshold value may be five times the cost of the first MVP candidate. Alternatively, the threshold value may be determined based on the cost of the first MVP candidate.

[Change 4] In a TM merge mode, TM may be extended to perform 1/16-pel MVD precision.

Intra Block Copy (IBC)

An intra block copy mode may refer to a mode in which an area indicated by the block vector of a target block is used as a prediction block for the target block.

The target block may be encoded/decoded in one of intra-prediction, inter-prediction, and intra block copy modes.

An encoding/decoding method based on prediction using intra block copy may be used 1) when each of a luma component and a chroma component has an independent partitioning structure (i.e., when a dual tree structure is used), and 2) when a luma component and a chroma component have the same block partitioning structure (i.e., a single tree structure is used).

The intra block copy mode may be a method of deriving a block (i.e., a reference block or a prediction block) from a previously encoded/decoded area within a target image using a derived block vector (BV).

The target image may be an image including a target block. Here, because a block is derived from the image including the target block, the intra block copy may correspond to intra-prediction.

The block vector may refer to an intra block vector.

The previously encoded/decoded area may be an area within a reconstructed image or a decoded image for a target picture. Here, the area within the reconstructed image may refer to a reconstructed area. The area within the decoded image may refer to a decoded area.

The previously encoded/decoded area within the target image may be a reconstructed area to which at least one of in-loop filtering operations is not applied.

In embodiments, in-loop filtering may include 1) chroma scaling and luma mapping, 2) deblocking filtering, Adaptive Sample Offset (ASO), and adaptive in-loop filtering.

In embodiments, the previously encoded/decoded area within the target image may be a reconstructed/decoded area on which at least one of in-loop filtering operations is performed.

Extension of Embodiments for Inter-Prediction Mode

An inter-prediction mode, an Intra Block Copy (IBC) mode, and an Intra Template Matching Prediction (IntraTMP) mode may have common features in that a specific reconstructed block is referenced for prediction for a target block.

Therefore, in embodiments, the inter-prediction mode may be replaced with the IBC mode or the IntraTMP mode. Description of the case where the inter-prediction mode is used for the target block may also be applied to the case where the IBC mode or the IntraTMP mode is used for the target block. Description of the inter-prediction mode may be applied to the IBC mode or the IntraTMP mode, and the inter-prediction mode may be replaced with the IBC mode or the IntraTMP mode. Further, information related to the inter-prediction mode may be regarded as information related to the IBC mode or the IntraTMP mode. Description of the information related to the inter-prediction mode may be applied to the information related to the IBC mode or the IntraTMP mode. For example, when the IBC mode or the IntraTMP mode is used for the target block, the value of an inter-prediction mode indicator may be 0 (or false). However, in this case, the value of an IBC mode indicator or an IntraTMP mode indicator may be 1 (or true).

Furthermore, in embodiments, a Motion Vector (MV) for inter-prediction may be replaced with a Block Vector (BV) for IBC. Description of the case where the MV is used for the target block may also be applied to the case where the BV is used for the target block. Description of the MV may be applied to the BV, and the MV may be replaced with the BV. Further, information related to the MV may be regarded as information related to the BV. Description of the information related to the MV may be applied to the information related to the BV. However, the BV may be information indicating a specific reconstructed block in a target image including a target block rather than a reference image.

Furthermore, in embodiments, the sub-mode of the inter-prediction mode may be replaced with the IBC mode or the IntraTMP mode. Description of the case where the sub-mode of the inter-prediction mode is used for the target block may also be applied to the case where the IBC mode or the IntraTMP mode is used for the target block. Description of the sub-mode of the inter-prediction mode may be applied to the IBC mode or the IntraTMP mode, and the sub-mode of the inter-prediction mode may be replaced with the IBC mode or the IntraTMP mode. Further, information related to the sub-mode of the inter-prediction mode may be regarded as information related to the IBC mode or the IntraTMP mode. Description of the information related to the sub-mode of the inter-prediction mode may be applied to the information related to the IBC mode or the IntraTMP mode. For example, when the IBC mode or the IntraTMP mode is used for the target block, the value of the sub-mode indicator of the inter-prediction mode may be 0 (or false). However, in this case, the value of a subblock merge mode indicator may be 1 (or true).

For example, when the IBC mode or the IntraTMP mode is used for the target block, template matching in embodiments may be used for the target block. In contrast, in the IBC mode or the IntraTMP mode, reference is limited to a target image including the target block, and thus bilateral matching in embodiments may not be used.

In embodiments related to the inter-prediction mode, a reference block and a reference template for template matching are described as being present in a reference image. On the other hand, when the IBC mode or the IntraTMP mode is used for the target block, a reference block and a reference template may be present only in a target image. Therefore, in embodiments, the reference image described in relation to the inter-prediction mode may be regarded as a target image in the IBC mode and the IntraTMP mode. Alternatively, in embodiments, the reference image described in relation to the inter-prediction mode may be limited to the target image in the IBC mode and the IntraTMP mode, and images, other than the target image, may not be referenced in the IBC mode and the IntraTMP mode.

In an embodiment, description of the case where a specific mode is applied to a target block may also be applied to the case where an additional mode is applied to the target block. Here, the specific mode and the additional mode may include intra block copy, intra-template matching, and inter-template matching, and may include more detailed modes, described in embodiments.

Furthermore, descriptions of motion information and/or lists made in each embodiment may also be applied to motion information and/or lists in other embodiments. All pieces of motion information described in embodiments may be regarded as the same target. Modifiers attached to the motion information may be regarded as those provided only for convenience of understanding. Modifiers attached to lists may be regarded as those provided only for convenience of understanding.

In embodiments, the initial motion information may comprehensively mean information used to configure a list, and the motion information may comprehensively mean information derived based on the list. Further, final motion information may mean final motion information used for prediction for the target block.

In an embodiment, the encoding apparatus 1600 may perform at least one of selection of initial motion information; configuration, reconstruction, and reordering of an initial motion information candidate list; specification of initial motion information; configuration, reconstruction, and reordering of an initial motion information list; configuration, reconstruction, and reordering of a list for motion information correction; specification of a correction candidate from the list for motion information correction; correction of motion information; determination of a motion information correction vector; specification of final motion information from the list for motion information correction, determination of a motion vector to be added to the specified motion information; determination of a motion vector difference; determination of index information for motion information determination; template matching, bilateral matching; determination of a motion information offset; derivation of a motion information correction vector; and configuration of a template by utilizing/applying/modifying at least one of embodiments described for processes such as the selection of initial motion information; configuration, reconstruction, and reordering of an initial motion information candidate list; specification of initial motion information; configuration, reconstruction, and reordering of an initial motion information list; configuration, reconstruction, and reordering of a list for motion information correction; specification of a correction candidate from the list for motion information correction; correction of motion information; determination of a motion information correction vector; specification of final motion information from the list for motion information correction; determination of a motion vector to be added to the specified motion information; determination of a motion vector difference; determination of index information for motion information determination; determination of template matching; bilateral matching; determination of a motion information offset; derivation of a motion information correction vector; and configuration of a template.

Further, in an embodiment, the decoding apparatus 1700 may perform at least one of selection of initial motion information; configuration, reconstruction, and reordering of an initial motion information candidate list; specification of initial motion information; configuration, reconstruction, and reordering of an initial motion information list; configuration, reconstruction, and reordering of a list for motion information correction; specification of a correction candidate from the list for motion information correction; correction of motion information; determination of a motion information correction vector; specification of final motion information from the list for motion information correction; determination of a motion vector to be added to the specified motion information; determination of a motion vector difference; determination of index information for motion information determination; template matching; bilateral matching; determination of a motion information offset; derivation of a motion information correction vector; and configuration of a template by utilizing/applying/modifying at least one of the embodiments described for the above-described processes.

In the above-described embodiments, information about at least one of selection of initial motion information; configuration, reconstruction, and reordering of an initial motion information candidate list; specification of initial motion information; configuration, reconstruction, and reordering of an initial motion information list; configuration, reconstruction, and reordering of a list for motion information correction; specification of a correction candidate from the list for motion information correction; correction of motion information; determination of a motion information correction vector; specification of final motion information from the list for motion information correction, determination of a motion vector to be added to the specified motion information; determination of a motion vector difference; determination of index information for motion information determination; performance of template matching; performance of bilateral matching; determination of a motion information offset; derivation of a motion information correction vector; and configuration of a template may be determined based on information about at least one of the motion information, coding parameter, intra block copy mode, intra-prediction mode, inter-prediction mode, color component, size, shape, and motion vector candidate index of the target block; the type of comparison operation in template matching and/or bilateral matching; motion information; the size of the motion information; the coding parameter of a neighboring block of the target block; motion information of the neighboring block of the target block; and the size of the neighboring block of the target block.

In embodiments, as a reference image (picture) set used in a reference picture list construction process and a reference picture list modification process, a reference picture list of at least one of L0, L1, L2 and L3 may be used.

In accordance with embodiments, when the boundary strength of a deblocking filter is calculated, one or more motion vectors of the current block may be used. The number of one or more motion vectors may be 1 or more, and may be a maximum of N. Here, N may be a positive integer of 1 or more. For example, N may be 2, 3, 4 or the like.

The embodiments may also be applied to the case where the unit of a motion vector is one or more of 16-pel unit, 8-pel unit, 4-pel unit, integer-pel unit, ½-pel unit, ¼-pel unit, ⅛-pel unit, a 1/16-pel unit, 1/32-pel unit, and 1/64-pel unit. Further, in the encoding/decoding process for the target block, the motion vector may be selectively used for each of the above-described pel units.

Slice types to which embodiments are applied may be defined. The embodiments may be applied based on the slice type.

The encoding apparatus 1600 may generate entropy-encoded syntax elements by performing entropy encoding on syntax elements. The decoding apparatus 1700 may obtain the syntax elements by performing entropy decoding on the entropy-encoded syntax elements.

Syntax elements related to at least one of selection of initial motion information; configuration, reconstruction, and reordering of an initial motion information candidate list; specification of initial motion information; configuration, reconstruction, and reordering of an initial motion information list; configuration, reconstruction, and reordering of a list for motion information correction; specification of a correction candidate from the list for motion information correction; correction of motion information; determination of a motion information correction vector; specification of final motion information from the list for motion information correction, determination of a motion vector to be added to the specified motion information; determination of a motion vector difference; determination of index information for motion information determination; performance of template matching; performance of bilateral matching; determination of a motion information offset; derivation of a motion information correction vector; and configuration of a template, such as the information, indicator, index, and flag described in embodiments, may be signaled/encoded/decoded using at least one of a binarization method, a debinarization method, an entropy encoding method, and an entropy decoding method.

- Signed 0-th order Exp_Golomb binarization/debinarization method (abbreviated as se(v))
- Signed k-th order Exp_Golomb binarization/debinarization method (abbreviated as sek(v))
- O-th order Exp_Golomb binarization/debinarization method for an unsigned positive integer (abbreviated as ue(v))
- k-th order Exp_Golomb binarization/debinarization method for an unsigned positive integer (abbreviated as uek(v))
- Fixed-length binarization/debinarization method (abbreviated as f(n))
  - Truncated Rice binarization/debinarization method or binarization/debinarization method (abbreviated as tu(v)) truncated unary
- Truncated binary binarization/debinarization method (abbreviated as tb(v))
- Context-adaptive arithmetic encoding/decoding method (abbreviated as ae(v))
- Bit string in bytes (abbreviated as b(8))
- Signed integer binarization/debinarization method (abbreviated as i(n))
- Unsigned positive integer binarization/debinarization method (abbreviated as u(n)) (where 'u(n)' may denote a fixed-length binarization/debinarization method).
- Unary binarization/debinarization method Only one limited embodiment among the embodiments is not necessarily applied to signaling/encoding/decoding of a target block. A specific embodiment or at least one combination of embodiments may be used for signaling/encoding/decoding of the target block.

The embodiments may be performed using the same method and/or the corresponding methods by the encoding apparatus 1600 and by the decoding apparatus 1700. Also, the image may be encoded/decoded using at least one of the embodiments or at least one combination thereof.

The order of application of the embodiments may be different from each other by the encoding apparatus 1600 and the decoding apparatus 1700, and the order of application of the embodiments may be (at least partially) identical to each other by the encoding apparatus 1600 and the decoding apparatus 1700.

The embodiments may be performed for each of a luma signal and a chroma signal, and may be equally performed for the luma signal and the chroma signal.

The form of a block to which the embodiments are applied may have a square or non-square shape.

Whether at least one of the above-described embodiments is to be applied and/or performed may be determined based on a condition related to the size of a block. In other words, at least one of the above-described embodiments may be applied and/or performed when the condition related to the size of a block is satisfied. The condition includes a minimum block size and a maximum block size. The block may be one of blocks described above in connection with the embodiments and the units described above in connection with the embodiments. The block to which the minimum block size is applied and the block to which the maximum block size is applied may be different from each other.

For example, when the block size is equal to or greater than the minimum block size and/or less than or equal to the maximum block size, the above-described embodiments may be applied and/or performed. When the block size is greater than the minimum block size and/or less than or equal to the maximum block size, the above-described embodiments may be applied and/or performed.

For example, the above-described embodiments may be applied only to the case where the block size is a predefined block size. The predefined block size may be 2×2, 4×4, 8×8, 16×16, 32×32, 64×64, or 128×128. The predefined block size may be $(2*SIZE_X)\times(2*SIZE_Y)$. $SIZE_X$ may be one of integers of 1 or more. $SIZE_Y$ may be one of integers of 1 or more.

For example, the above-described embodiments may be applied only to the case where the block size is equal to or greater than the minimum block size. The above-described embodiments may be applied only to the case where the block size is greater than the minimum block size. The minimum block size may be 2×2, 4×4, 8×8, 16×16, 32×32, 64×64, or 128×128. Alternatively, the minimum block size may be $(2*SIZE_{MIN\_X})\times(2*SIZE_{MIN\_Y})$. $SIZE_{MIN\_X}$ may be one of integers of 1 or more. $SIZE_{MIN\_Y}$ may be one of integers of 1 or more.

For example, the above-described embodiments may be applied only to the case where the block size is less than or equal to the maximum block size. The above-described embodiments may be applied only to the case where the block size is less than the maximum block size. The maximum block size may be 2×2, 4×4, 8×8, 16×16, 32×32, 64×64, or 128×128. Alternatively, the maximum block size may be $(2*SIZE_{MAX\_X})\times(2*SIZE_{MAX\_Y})$. $SIZE_{MAX\_X}$ may be one of integers of 1 or more. $SIZE_{MAX\_Y}$ may be one of integers of 1 or more.

For example, the above-described embodiments may be applied only to the case where the block size is equal to or greater than the minimum block size and is less than or equal to the maximum block size. The above-described embodiments may be applied only to the case where the block size is greater than the minimum block size and is less than or equal to the maximum block size. The above-described embodiments may be applied only to the case where the block size is equal to or greater than the minimum block size and is less than the maximum block size. The above-described embodiments may be applied only to the case where the block size is greater than the minimum block size and is less than the maximum block size.

In the above-described embodiments, the block size may be a horizontal size (width) or a vertical size (height) of a block. The block size may indicate both the horizontal size and the vertical size of the block. The block size may indicate the area of the block. Each of the area, minimum block size, and maximum block size may be one of integers equal to or greater than 1. In addition, the block size may be the result (or value) of a well-known equation using the horizontal size and the vertical size of the block, or the result (or value) of an equation in embodiments.

Further, in the embodiments, a first embodiment may be applied to a first size, and a second embodiment may be applied to a second size. That is, the embodiments may be compositely applied according to the size.

The embodiments may be applied depending on a temporal layer. In order to identify a temporal layer to which the embodiments are applicable, a separate identifier may be signaled, and the embodiments may be applied to the temporal layer specified by the corresponding identifier. Here, the identifier may be defined as the lowest (bottom) layer and/or the highest (top) layer to which the embodiments are applicable, and may be defined as being indicating a specific layer to which the embodiments are applied. Further, a fixed temporal layer to which the embodiments are applied may also be defined.

For example, the embodiments may be applied only to the case where the temporal layer of a target image is the lowermost layer. For example, the embodiments may be applied only to the case where the temporal layer identifier of a target image is 0. For example, the embodiments may be applied only to the case where the temporal layer identifier of a target image is equal to or greater than 1. For example, the embodiments may be applied only to the case where the temporal layer of a target image is the highest layer.

A slice type or a tile group type to which the embodiments to which the embodiments are applied may be defined, and the embodiments may be applied depending on the corresponding slice type or tile group type.

In the above-described embodiments, it may be construed that, during the application of specific processing to a specific target, assuming that specified conditions may be required and the specific processing is performed under a specific determination, a specific coding parameter may be replaced with an additional coding parameter when a description has been made such that whether the specified conditions are satisfied is determined based on the specific coding parameter, or such that the specific determination is made based on the specific coding parameter. In other words, it may be considered that a coding parameter that influences the specific condition or the specific determination is merely exemplary, and it may be understood that, in addition to the specific coding parameter, a combination of one or more additional coding parameters functions as the specific coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include examples in various aspects. Although all possible combinations for indicating various aspects cannot be described, those skilled in the art will appreciate that other combinations are possible in addition to explicitly described combinations. Therefore, it should be understood that the present disclosure includes other replacements, changes, and modifications belonging to the scope of the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

A bitstream may include computer-executable code and/or program. The computer-executable code and/or program may include pieces of information described in the embodiments, and may include syntax elements described in the embodiments. In other words, the pieces of information and syntax elements described in the embodiments may be regarded as a computer-executable code in the bitstream, and may be regarded as at least a part of the computer-executable code and/or program represented by the bitstream.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. An image decoding method, comprising:

determining first initial motion information for a first direction of inter prediction for a target block and second initial motion information of a second direction of the inter prediction for the target block;

determining at least one of first final motion information and second final motion information based on at least one of the first initial motion information and the second initial motion information; and generating a prediction block for the target block based on at least one of the first final motion information and the second final motion information, wherein a refinement is performed on only one of the first initial motion information and the second initial motion information, the first final motion information is generated by the refinement in a case that the refinement is performed only on the first initial motion information, and the second final motion information is generated by the refinement in a case that the refinement is performed only on the second initial motion information.

2. The image decoding method of claim 1, wherein:

a first indicator indicating whether the refinement is performed obtained from a bitstream, a second indicator indicating one of a first direction and a second direction is obtained from the bitstream, the refinement is performed only on the first initial motion information in a case that the first indicator indicates that the refinement is performed and the second indicator indicates the first direction, and the refinement is performed only on the second initial motion information in a case that the first indicator indicates that the refinement is performed and the second indicator indicates the second direction.

3. The image decoding method of claim 1, wherein:

the refinement is performed on a sum of initial motion information and a motion information difference, and the initial motion information is one of the first initial motion information and the second inital motion informationl.

4. The image decoding method of claim 1, wherein:

the refinement is performed on initial motion information to generate refine motion information, final motion information is a sum of the refined motion information and a motion information difference, the initial motion information is one of the first initial motion information and the second initial motion information, and the final motion information is one of the first final motion information and the second final motion information.

5. The image decoding method of claim 1, wherein:

a method of the refinement is determined based on an index for the one of the first initial motion information and the second initial motion information.

6. The image decoding method of claim 5, wherein:

the method comprises a matching cost computing method.

7. The image decoding method of claim 6, wherein:

the matching cost computing method is selected from a plurality of matching cost computing methods, and the plurality of matching cost computing methods comprise a sum of absolute differences (SAD) and a sum of absolute transformed differences (SATD).

8. An image encoding method, comprising:

determining first initial motion information for a first direction of the inter prediction for a target block and second initial motion information of a second direction of the inter prediction for the target block;

determining at least one of the first final motion information and second final motion information based on at least one of the first initial motion information and the second initial motion information; and generating a prediction block for the target block based on at least one of the first final motion information and the second final motion information, wherein a refinement is performed on only one of the first initial motion information and the second initial motion information, the first final motion information is generated by the refinement in a case that the refinement is performed only on the first initial motion information, and the second final motion information is generated by the refinement in a case that the refinement is performed only on the second initial motion information.

9. The image encoding method of claim 8, wherein:

a bitstream comprises a first indicator indicating whether the refinement is performed is generated, the bitstream comprises a second indicator indicating one of a first direction and a second direction, the refinement is performed only on the first initial motion information in a case that the first indicator indicates that the refinement is performed and the second indicator indicates the first direction, and the refinement is performed only on the second initial motion information in a case that the first indicator indicates that the refinement is performed and the second indicator indicates the second direction.

10. The image encoding method of claim 8, wherein:

the refinement is performed for a sum of initial motion information and a motion information difference, and the initial motion information is one of the first initial motion information and the second initial motion information.

11. The image encoding method of claim 8, wherein:

the refinement is performed on initial motion information to generate refine motion information, final motion information is a sum of the refined motion information and a motion information difference, the initial motion information is one of the first initial motion information and the second initial motion information, and the final motion information is one of the first final motion information and the second final motion information.

12. The image encoding method of claim 8, wherein:

a method of the refinement is determioned based on an index for the one of the first initial motion information and the second initial motion information.

13. The image encoding method of claim 12, wherein:

the method comprises a matching cost computing method.

14. A method for sending a bitstream, the bitstream comprising:

coding information, wherein the coding information is information used to determine first initial motion information for a first direction of inter prediction for a target block and second initial motion information of a second direction of the inter prediction for the target block, wherein at least one of the first initial motion information and the second initial motion information is used to determine at least one of first final motion information and second final motion information, wherein at least one of the first final motion information and the second final motion information is used to generate a prediction block for the target block, wherein a refinement is performed on only one of the first initial motion information and the second initial motion information, wherein the first final motion information is generated by the refinement in a case that the refinement is performed only on the first initial motion information, and wherein the second final motion information is generated by the refinement in a case that the refinement is performed only on the second initial motion information.

15. The method of claim 14, wherein:

the bitstream comprises a first indicator indicating whether the refinement is performed, the bitstream comprises a second indicator indicating one of a first direction and a second direction, the refinement is performed only on the first initial motion information in a case that the first indicator indicates that the refinement is performed and the second indicator indicates the first direction, and the refinement is performed only on the second initial motion information in a case that the first indicator indicates that the refinement is performed and the second indicator indicates the second direction.

16. The method of claim 14, wherein:

the refinement is performed for a sum of initial motion information and a motion information difference, and the initial motion information is one of the first initial motion information and the second initial motion information.

17. The method of claim 14, wherein:

the refinement is performed on initial motion information to generate refine motion information, final motion information is a sum of the refined motion information and a motion information difference, the initial motion information is one of the first initial motion information and the second initial motion information, and the final motion information is one of the first final motion information and the second final motion information.

18. The method of claim 14, wherein:

a method of the refinement is determined based on an index for the one of the first initial motion information and the second initial motion information.

19. A non-transitory computer-readable recording medium stroing a bitstream generated by an image encoding apparatus via the image encoding method of claim 8, wherein the bitstream is formatted to include a sequence of syntax elements that, when accessed by an image decoding apparatus, causes the image decoding apparatus to determine a syntax element of a corresponding block which corresponds to the target block referenced in claim 8, and perform the inter prediction on the corresponding block using the syntax element of the corresponding block.

20. A non-transitory computer-readable recording medium storing program instruction for transmitting a bitstream, the program instructions comprising:

first instructions to perform generation of the bitstream; and second instructions to perform transmitting the bitstream, wherein the generation of the bitstream comprises:

generating the bitstream comprising coding information, wherein the transmitting the bitstream comprises:

transmitting the bitstream to a video decoding apparatus, wherien a video encoding method comprises:

determining first initial motion information for a first direction of inter prediction for a target block and second initial motion information of a second direction of the inter prediction for the target block using the coding information;

determining at least one of first final motion information and second final motion information based on at least one of the first initial motioni information and the second initial motion information; and generating a prediction block for the target block based on at least one of the first final motion information and the second final motion information, wherein a refinement is performed on only one of the first initial motion information and the second initial motion information, the first final motion information is generated by the refinement in a case that the refinement is performed only on the first inital motion information, and the second final motion information is generated by the refinement in a case that the refinement is performed only on the second inital motion information.

* * * * *